US010928620B2

(12) United States Patent
Sakamoto et al.

(10) Patent No.: US 10,928,620 B2
(45) Date of Patent: Feb. 23, 2021

(54) MICROSCOPE SYSTEM AND METHOD OF CONTROLLING THE SAME

(71) Applicant: CANON KABUSHIKI KAISHA, Tokyo (JP)

(72) Inventors: Michiie Sakamoto, Tokyo (JP); Akinori Hashiguchi, Tokyo (JP); Shinobu Masuda, Tokyo (JP); Tsuguhide Sakata, Machida (JP); Tsutomu Shimada, Musashino (JP); Hirotake Ando, Tokyo (JP); Kazuhiko Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 15/780,302

(22) PCT Filed: Dec. 7, 2016

(86) PCT No.: PCT/JP2016/086337
§ 371 (c)(1),
(2) Date: May 31, 2018

(87) PCT Pub. No.: WO2017/099111
PCT Pub. Date: Jun. 15, 2017

(65) Prior Publication Data
US 2018/0364469 A1 Dec. 20, 2018

(30) Foreign Application Priority Data

Dec. 10, 2015 (JP) .............................. JP2015-241641

(51) Int. Cl.
*G02B 21/26* (2006.01)
*G02B 21/34* (2006.01)
(Continued)

(52) U.S. Cl.
CPC ............. *G02B 21/26* (2013.01); *G02B 21/24* (2013.01); *G02B 21/244* (2013.01); *G02B 21/34* (2013.01); *G02B 21/365* (2013.01); *G02B 21/367* (2013.01)

(58) Field of Classification Search
CPC ...... G02B 21/00; G02B 21/24; G02B 21/241; G02B 21/244; G02B 21/26; G02B 21/34; G02B 21/365; G02B 21/367
(Continued)

(56) References Cited

U.S. PATENT DOCUMENTS 4,627,009 A * 12/1986 Holmes .................. H01J 37/20
250/442.11
5,323,712 A * 6/1994 Kikuiri ................ F16M 11/123
108/20
(Continued)

FOREIGN PATENT DOCUMENTS

EP 1353212 A 10/2003
JP 4600395 B2 12/2010
(Continued)

OTHER PUBLICATIONS

Apr. 6, 2017 International Search Report and Written Opinion in PCT/JP2016/086337.

*Primary Examiner* — Thong Q Nguyen
(74) *Attorney, Agent, or Firm* — Venable LLP

(57) ABSTRACT

A microscope system includes an observation optical system including an objective lens, an XY stage capable of moving an XY plane in an X-axis direction and an Y-axis direction, a first change unit configured to change a slant of the XY plane with respect to an optical axis direction of the objective lens, and a second change unit configured to change a slant of a slide placed on the XY stage with respect to the XY plane. Changing the slant of the XY plane by the first change unit is performed based on a first mark arranged on the XY
(Continued)

plane at a position observable by the observation optical system. Changing the slant of the slide with respect to the XY plane by the second change unit is performed based on a second mark arranged on the slide.

18 Claims, 52 Drawing Sheets

(51) Int. Cl.
  *G02B 21/24* (2006.01)
  *G02B 21/36* (2006.01)
(58) Field of Classification Search
  USPC .......................................... 359/368, 391–397
  See application file for complete search history.

(56) References Cited

U.S. PATENT DOCUMENTS

| | | | |
|---|---|---|---|
| 5,966,201 A * | 10/1999 | Shiraishi | G03F 9/70 |
| | | | 355/53 |
| 6,924,929 B2 * | 8/2005 | Yasuda | G02B 21/241 |
| | | | 250/201.3 |
| 7,775,433 B2 | 8/2010 | Ando | |
| 8,094,914 B2 | 1/2012 | Iki et al. | |
| 8,149,383 B2 * | 4/2012 | Czerkas | G01B 11/03 |
| | | | 355/53 |
| 9,618,370 B2 | 4/2017 | Nagura | |
| 10,634,897 B2 * | 4/2020 | Sakamoto | G02B 21/34 |
| 10,732,397 B2 * | 8/2020 | Sakamoto | G02B 21/367 |
| 2003/0027342 A1 * | 2/2003 | Sheridan | G02B 21/34 |
| | | | 436/43 |
| 2003/0223111 A1 | 12/2003 | Lamvik et al. | |
| 2008/0095424 A1 | 4/2008 | Iki et al. | |
| 2011/0157349 A1 | 6/2011 | Yamamoto et al. | |
| 2012/0099852 A1 | 4/2012 | Staker et al. | |
| 2013/0147939 A1 * | 6/2013 | Nawata | G02B 21/365 |
| | | | 348/79 |
| 2015/0054921 A1 * | 2/2015 | Dixon | G02B 21/006 |
| | | | 348/46 |
| 2015/0264270 A1 | 9/2015 | Watanabe et al. | |
| 2015/0285662 A1 | 10/2015 | Nagura | |
| 2018/0307019 A1 * | 10/2018 | Dixon | G02B 21/365 |

FOREIGN PATENT DOCUMENTS

| | | |
|---|---|---|
| JP | 2015-200568 A | 11/2015 |
| WO | 2006/033273 A1 | 3/2006 |

* cited by examiner

[Fig. 1]
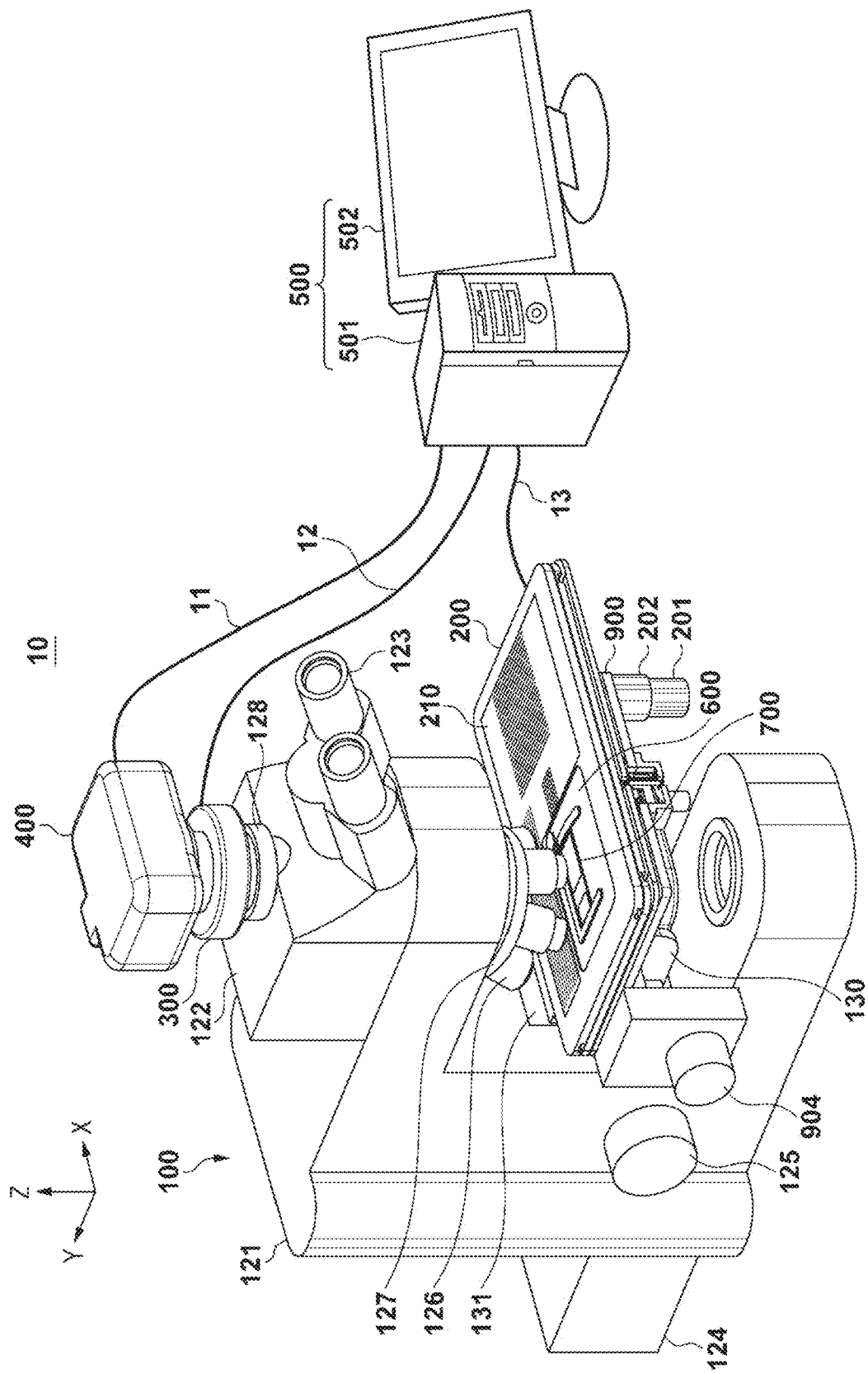

[Fig. 2]
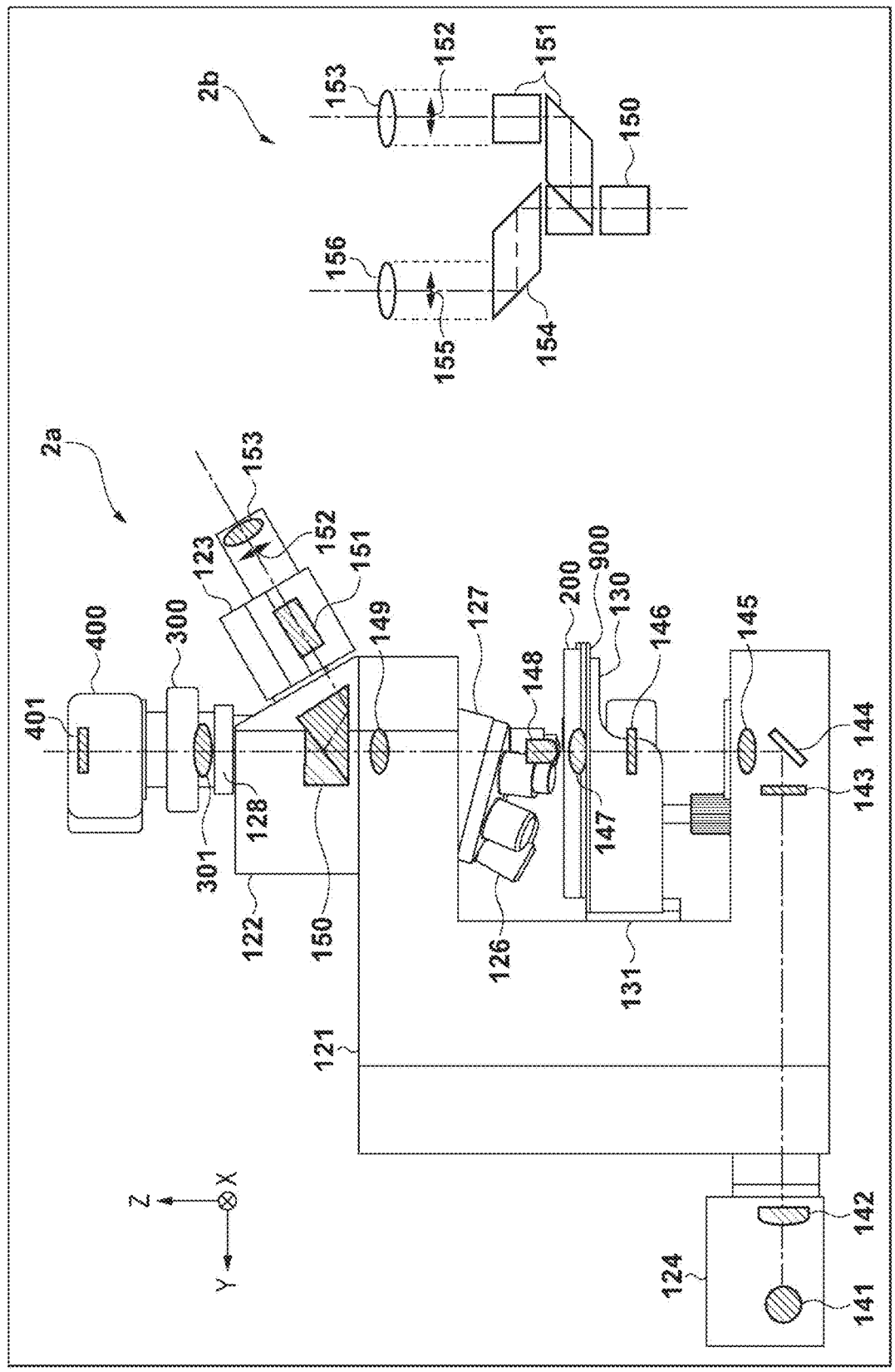

[Fig. 3]
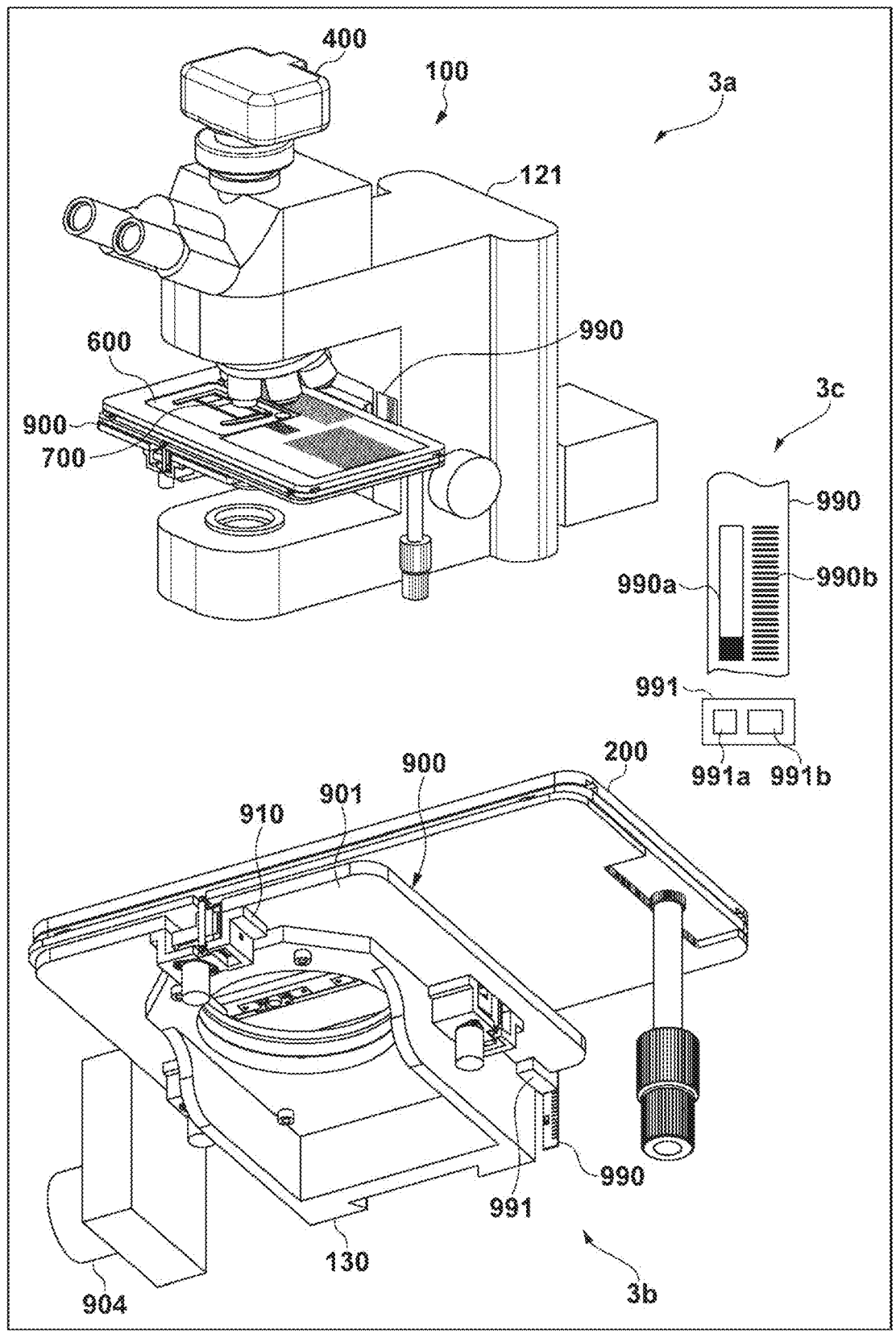

[Fig. 4]
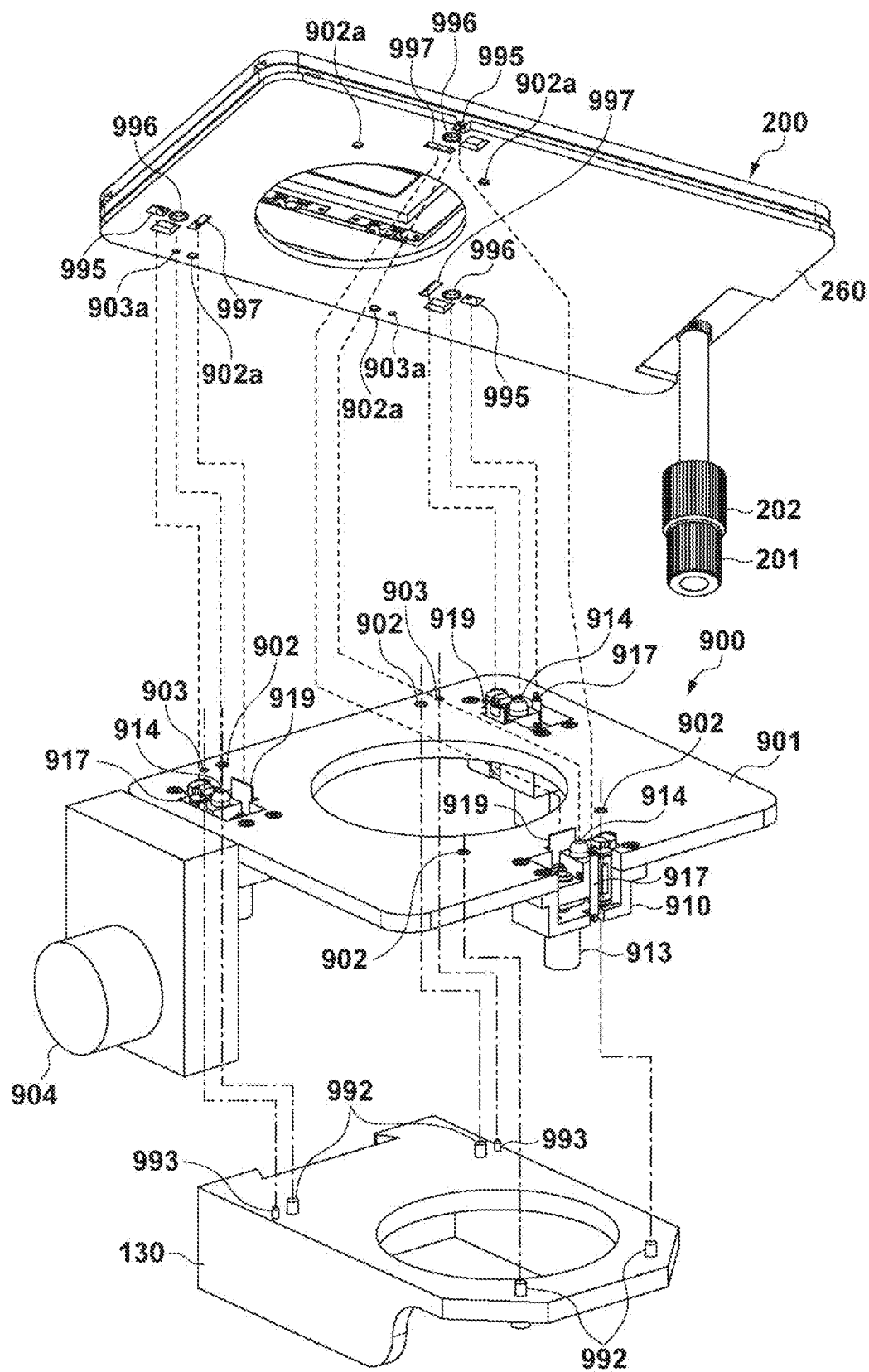

[Fig. 5]
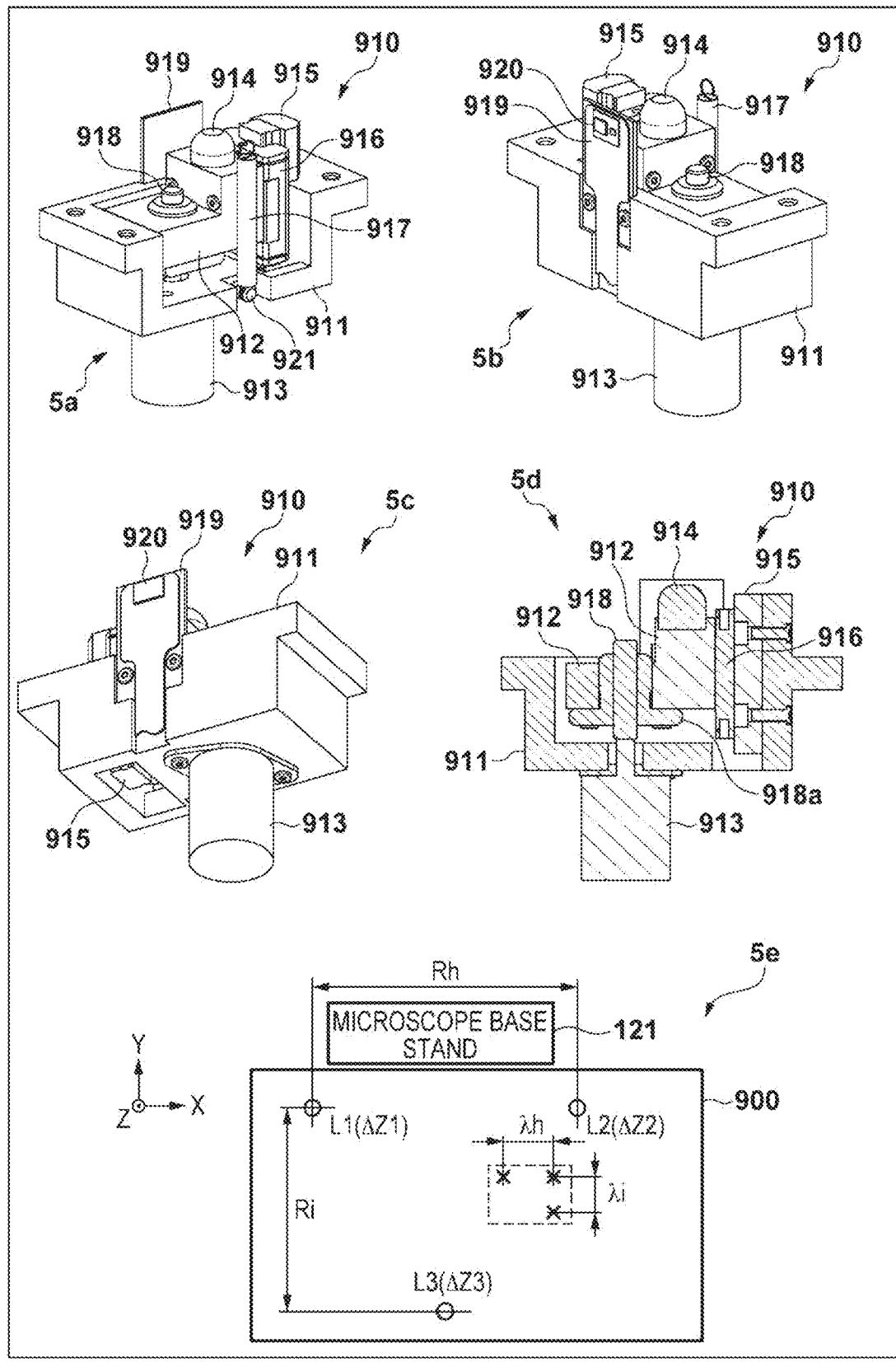

[Fig. 6]
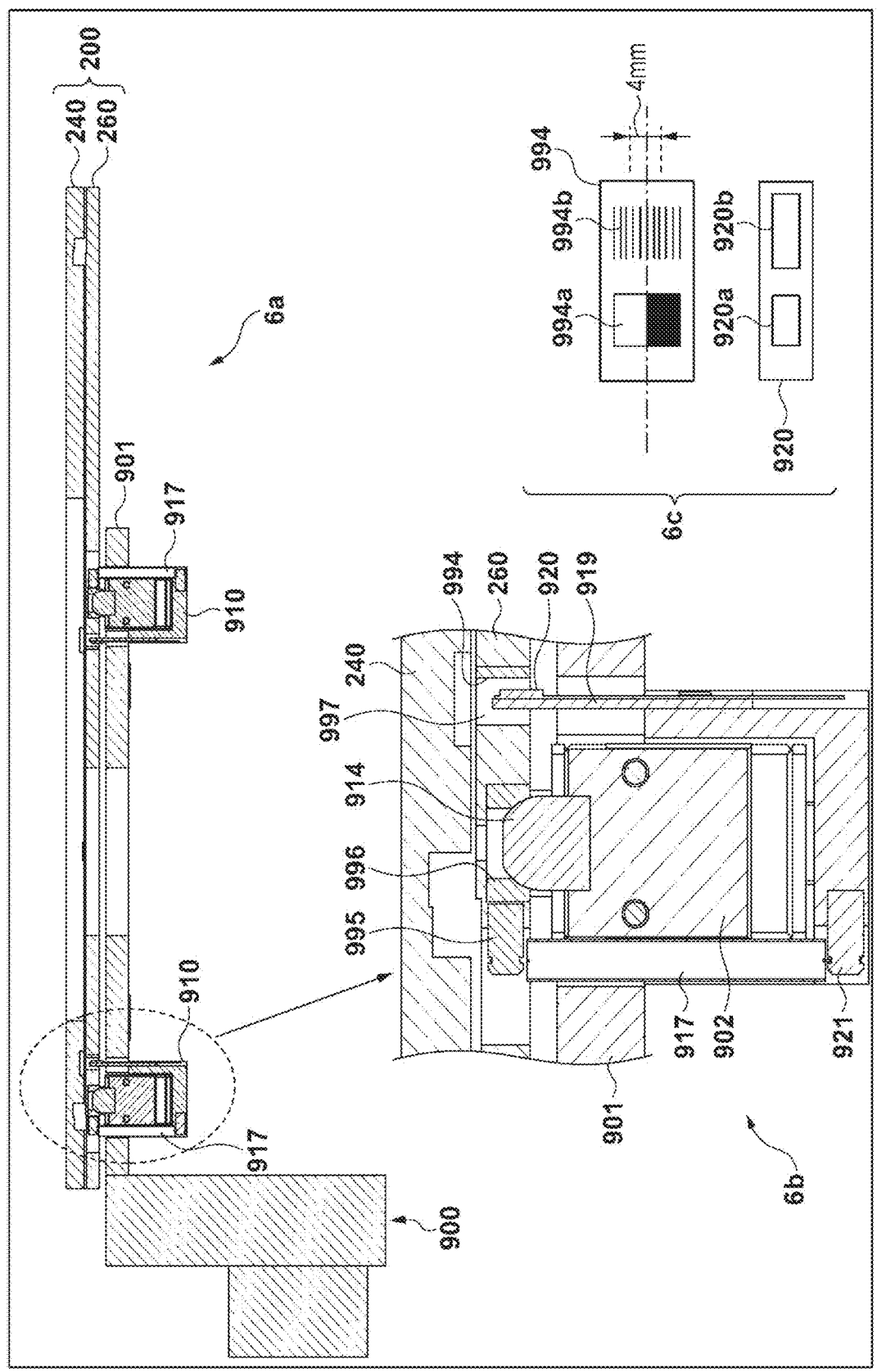

[Fig. 7]
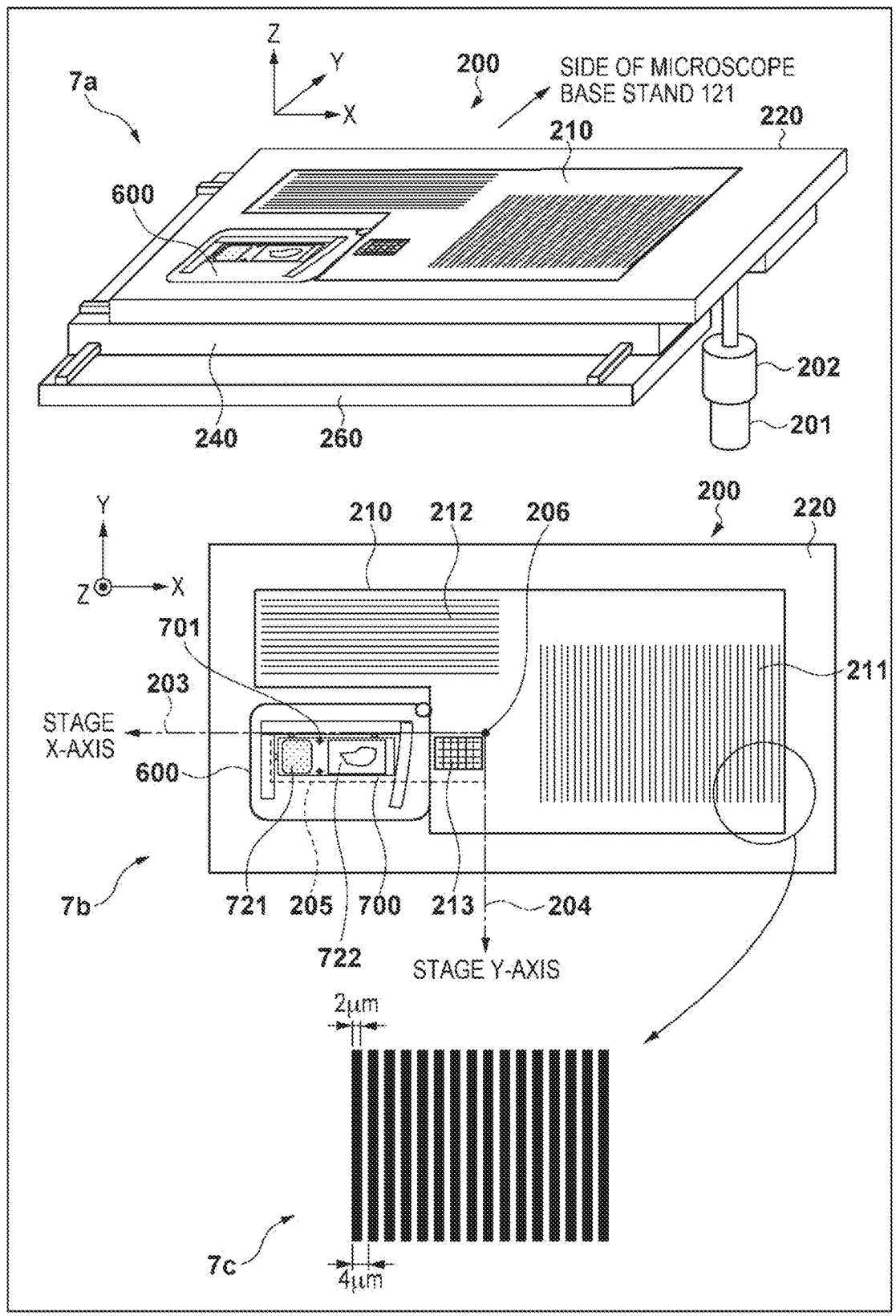

[Fig. 8]
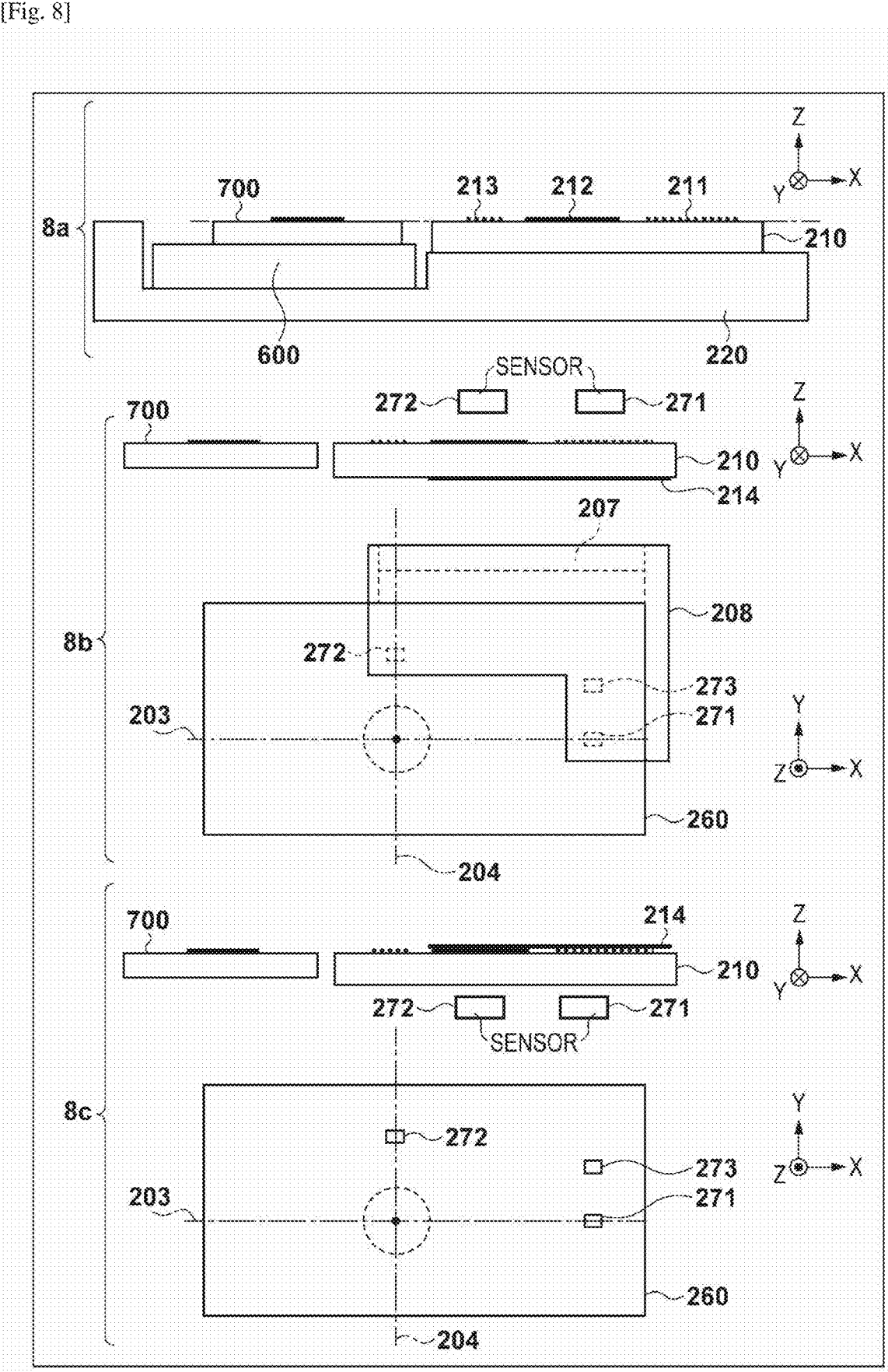

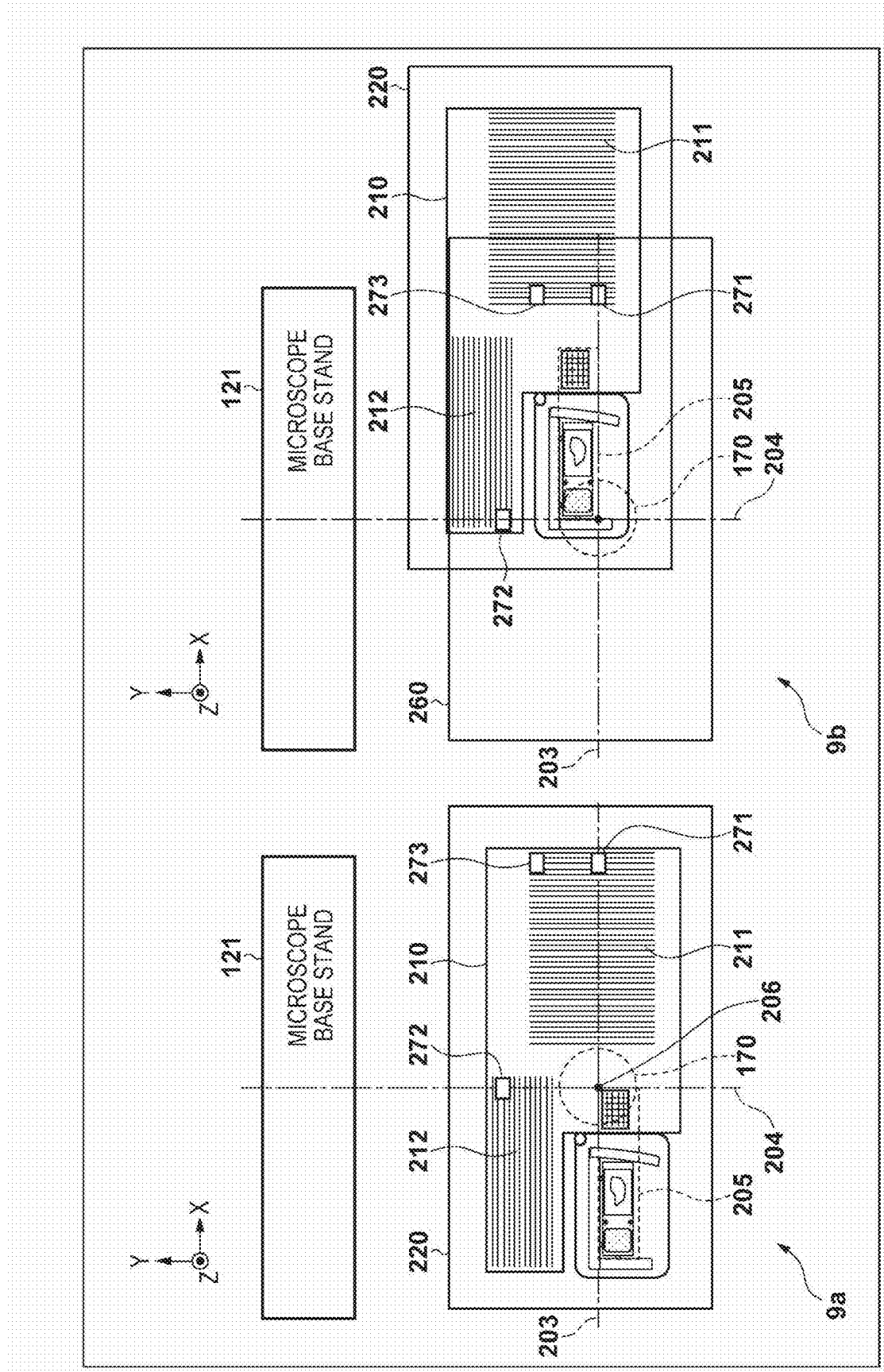
[Fig. 9]

[Fig. 10]
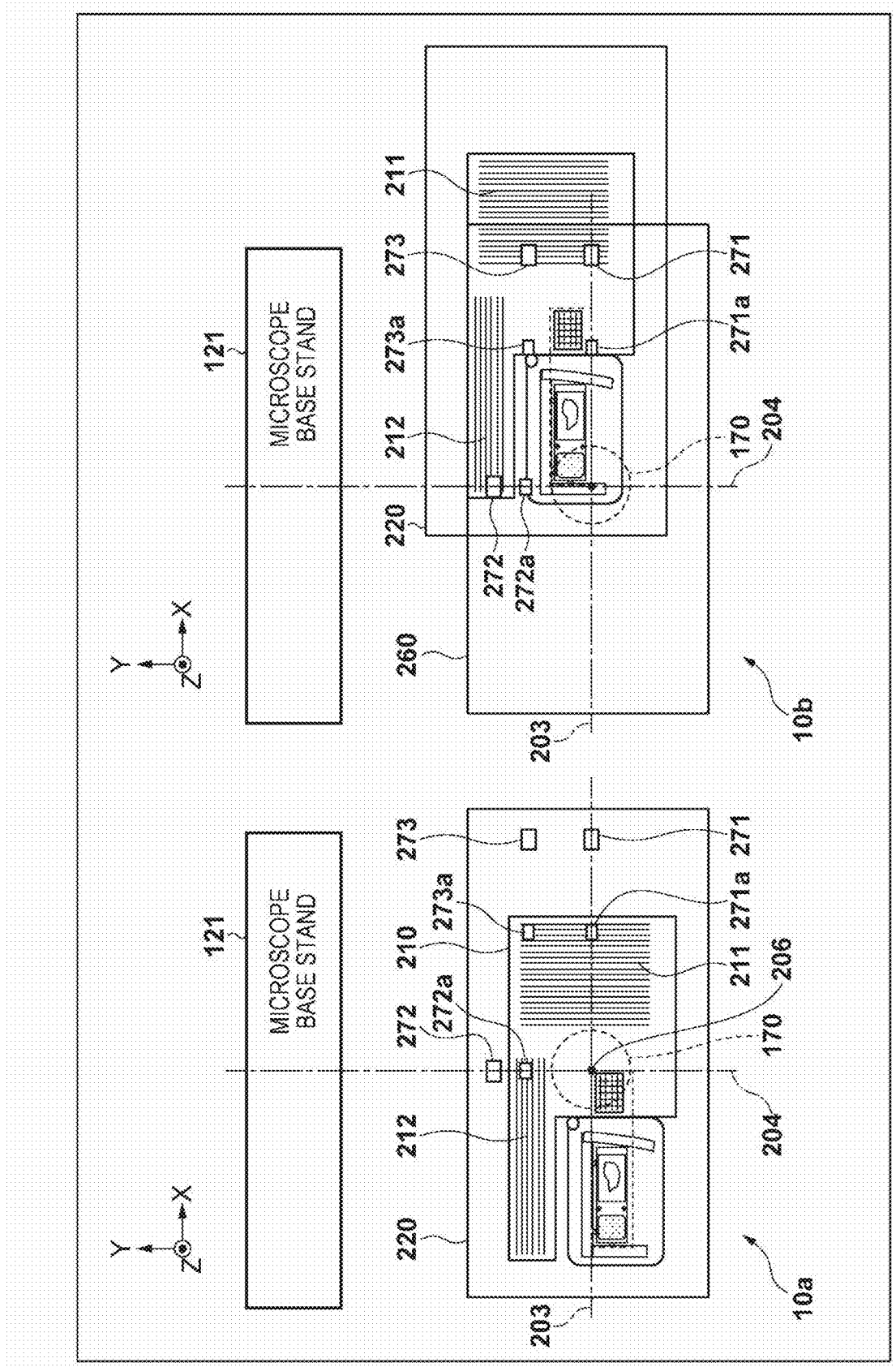

[Fig. 11]
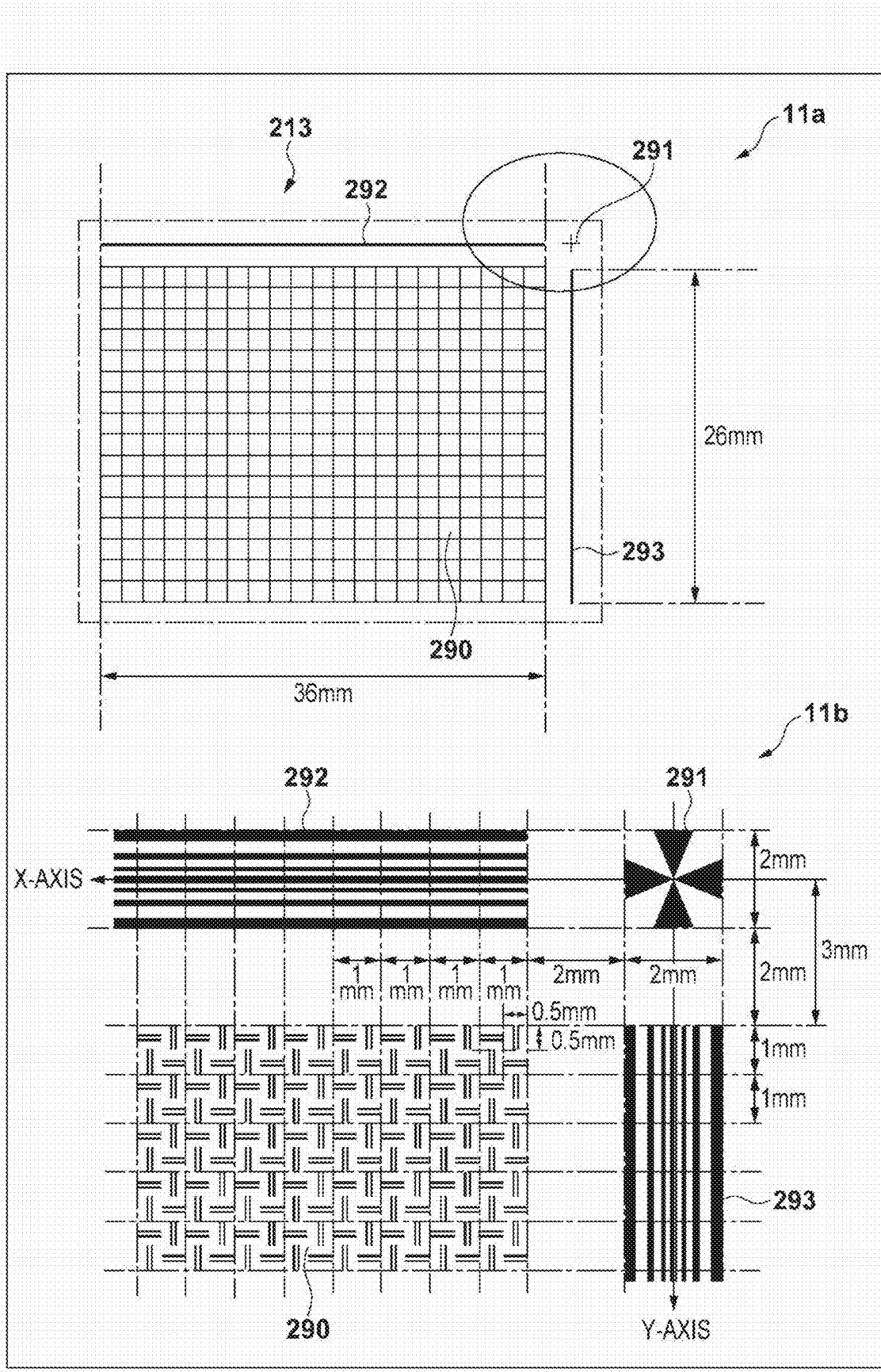

[Fig. 12]
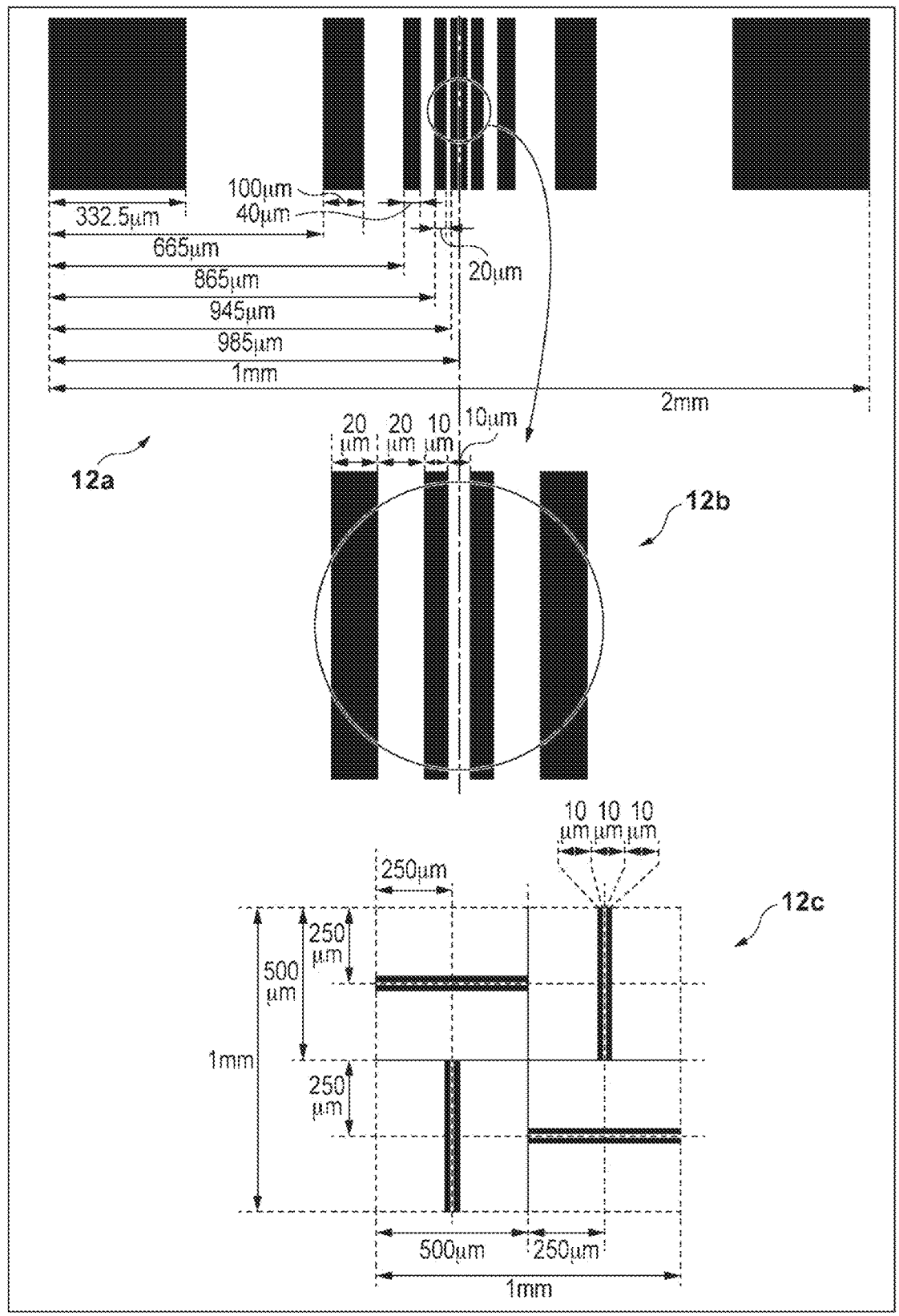

[Fig. 13]
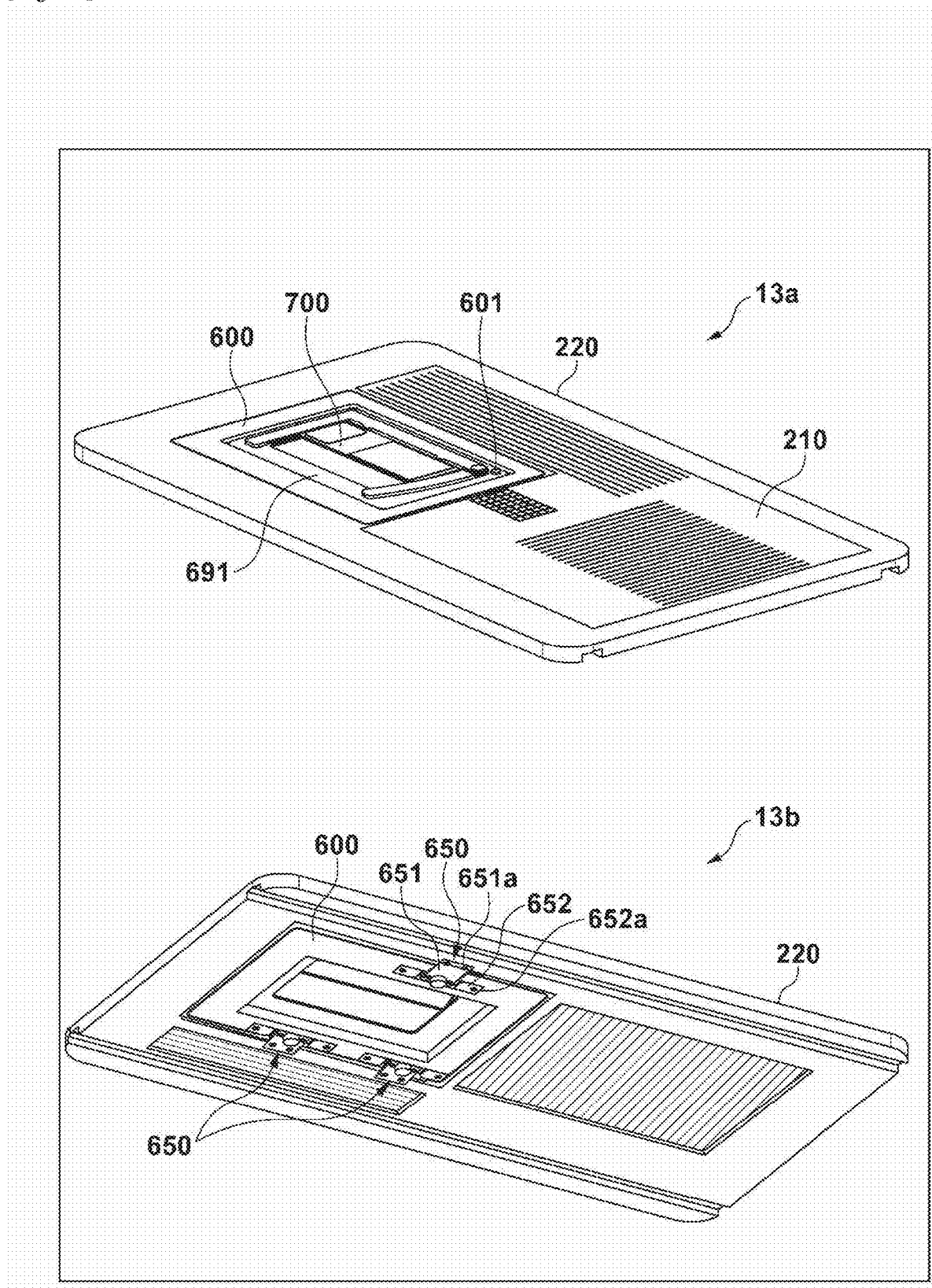

[Fig. 14]
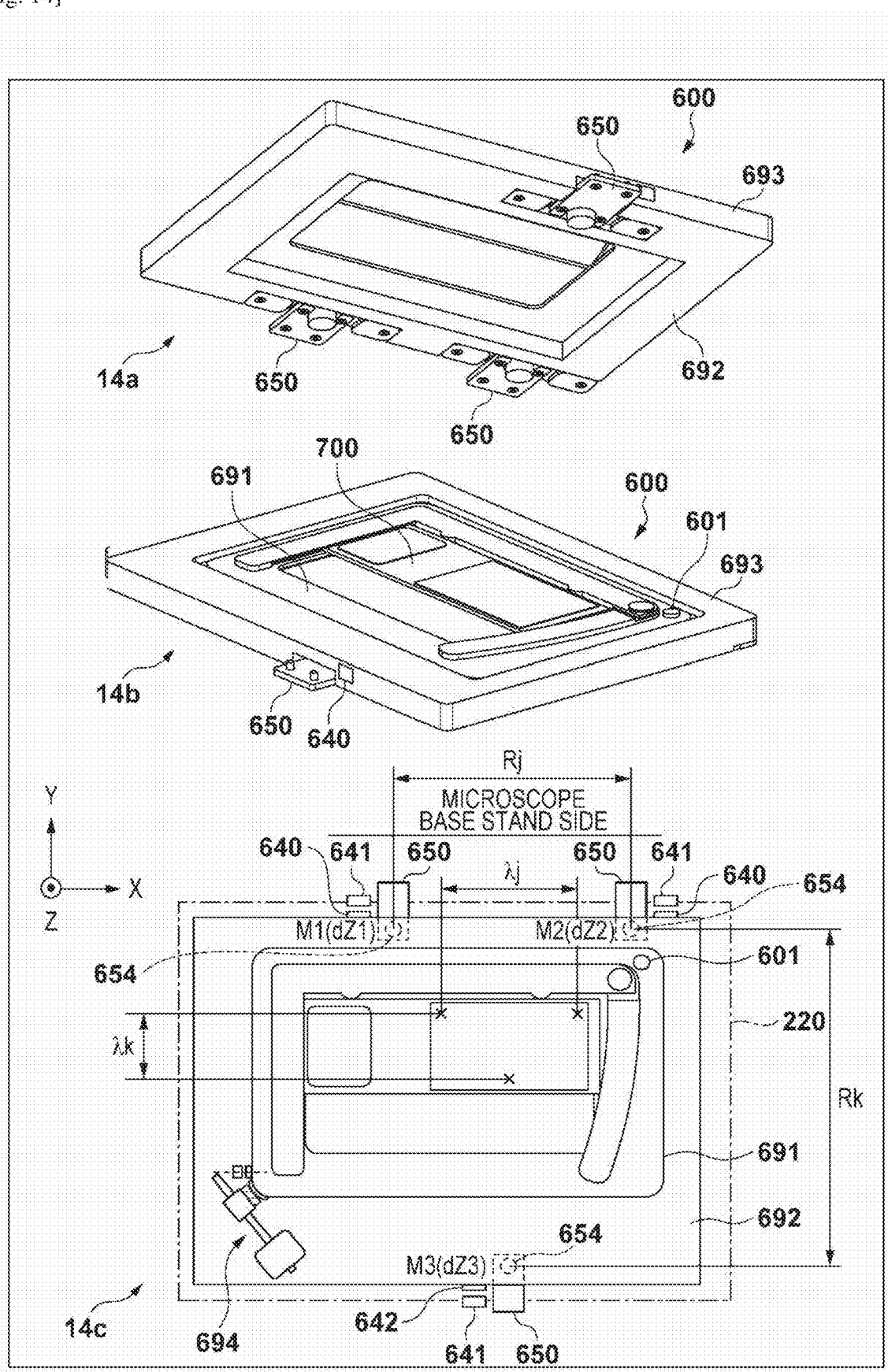

[Fig. 15]
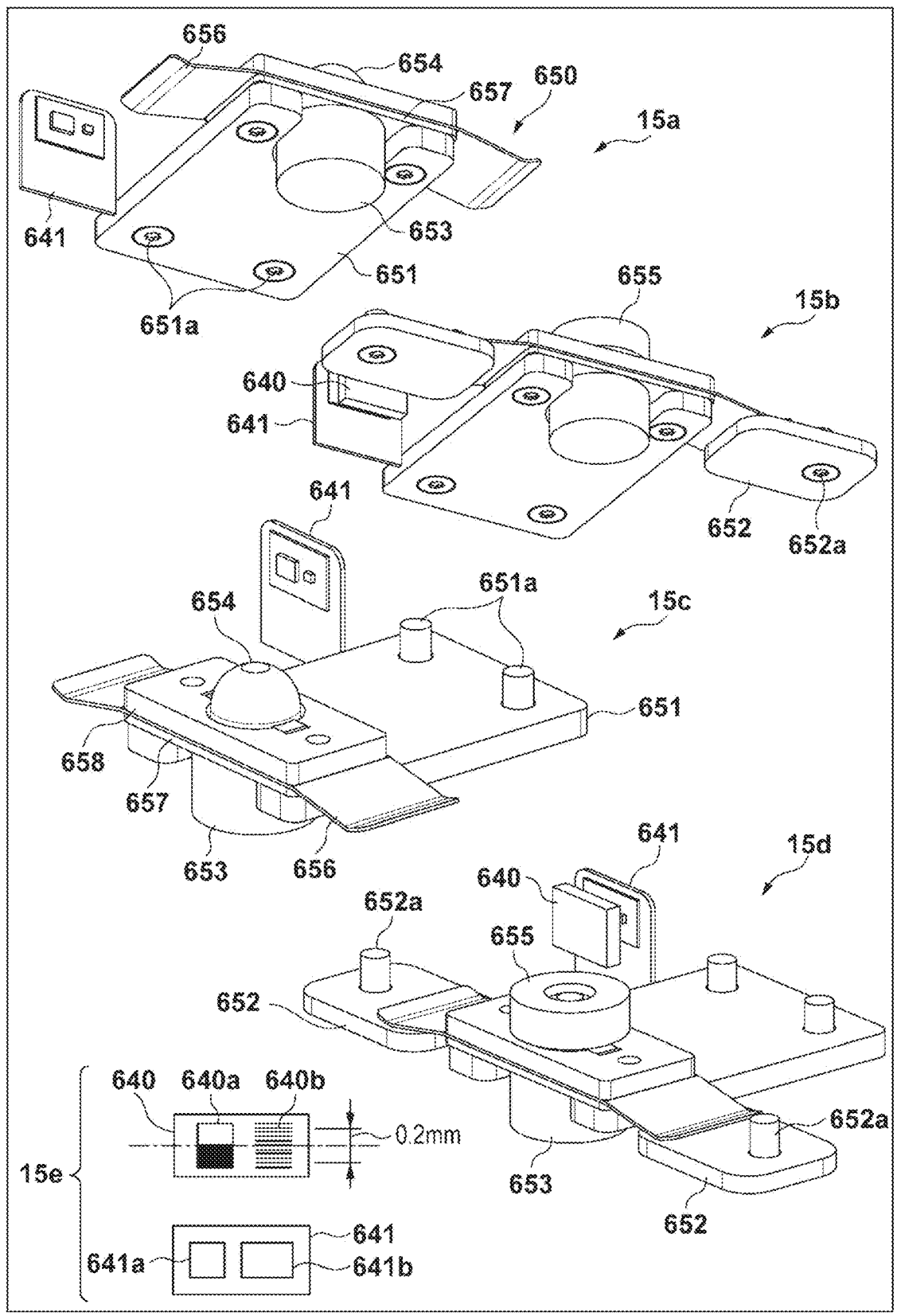

[Fig. 16]
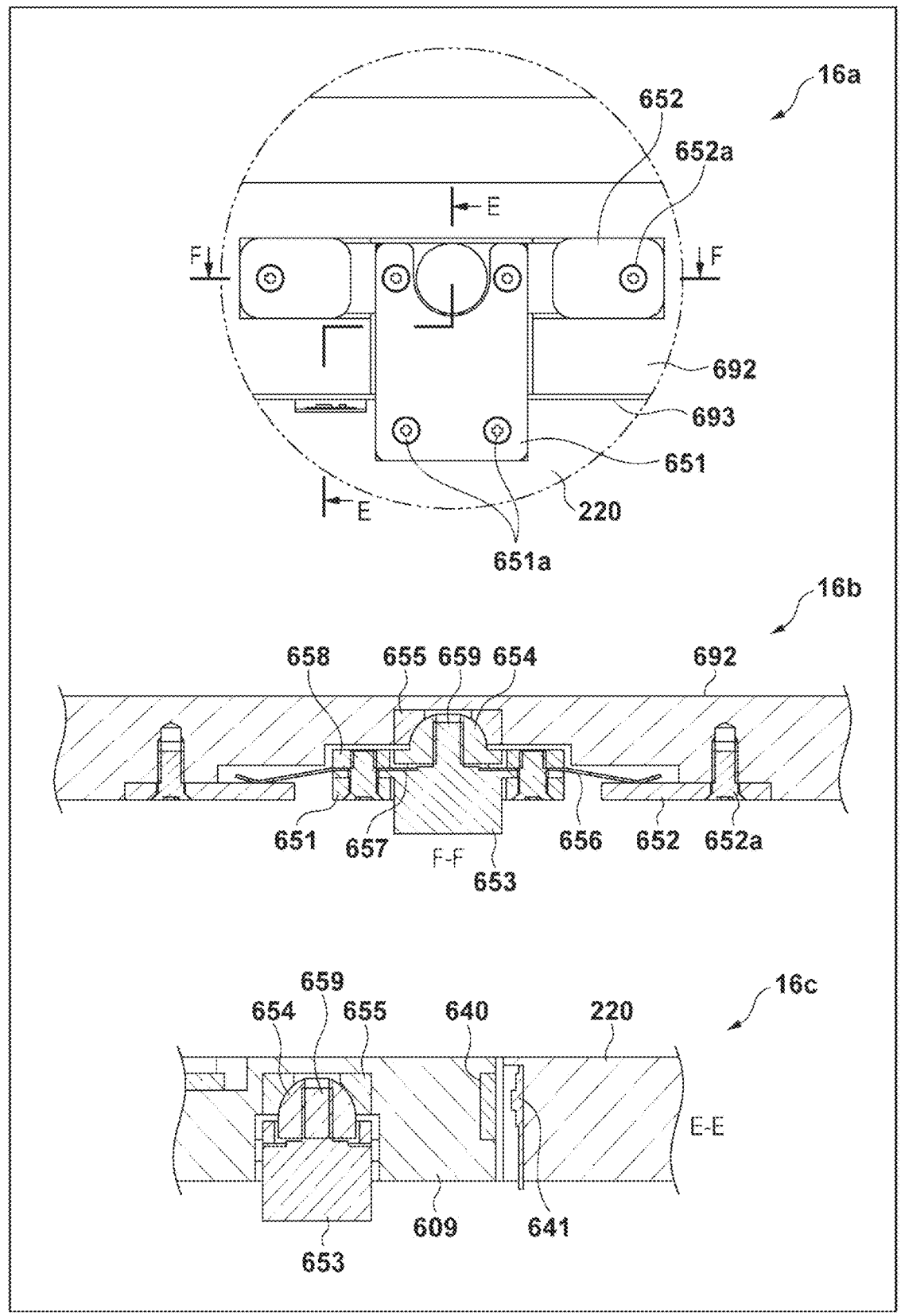

[Fig. 17]
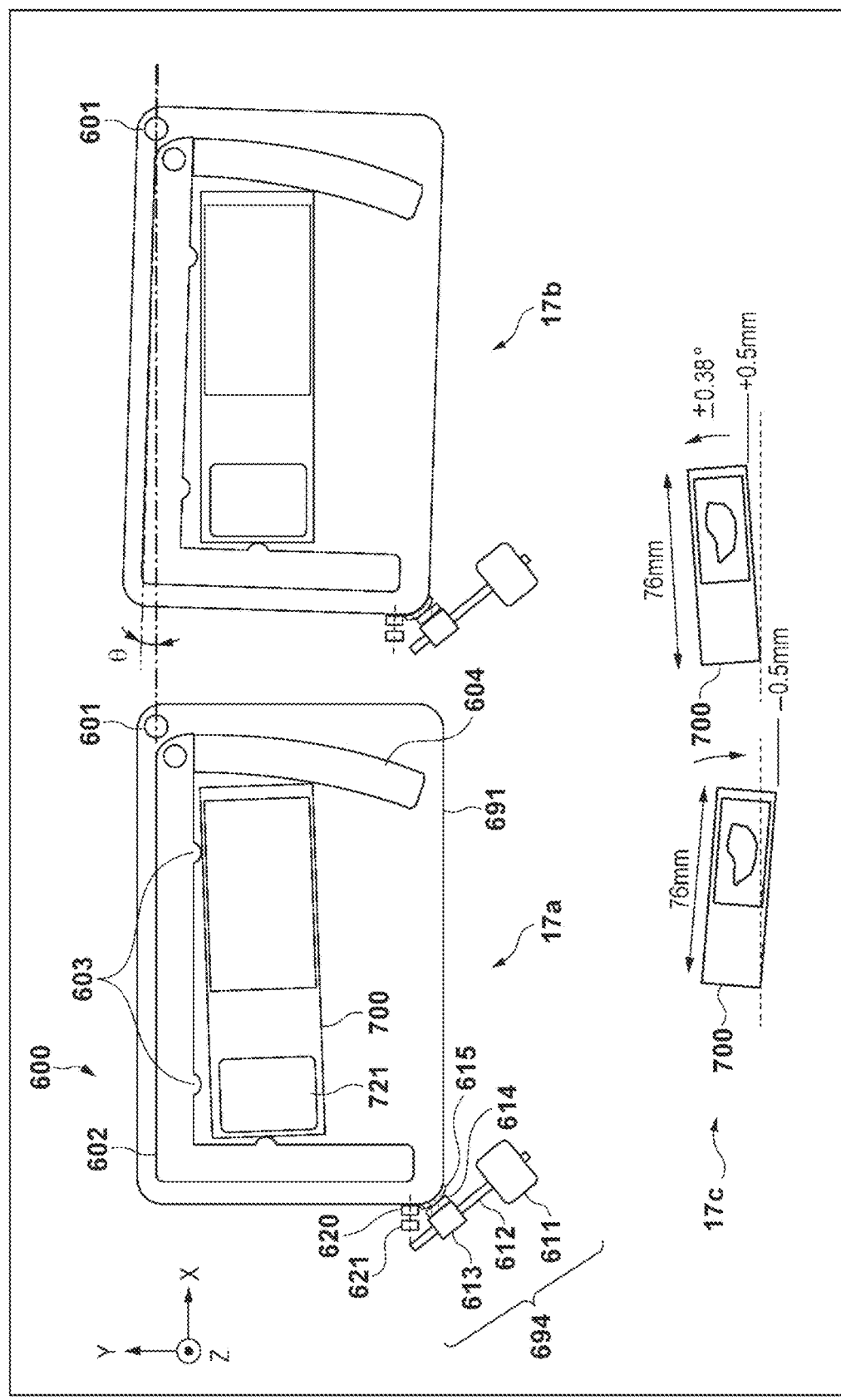

[Fig. 18]
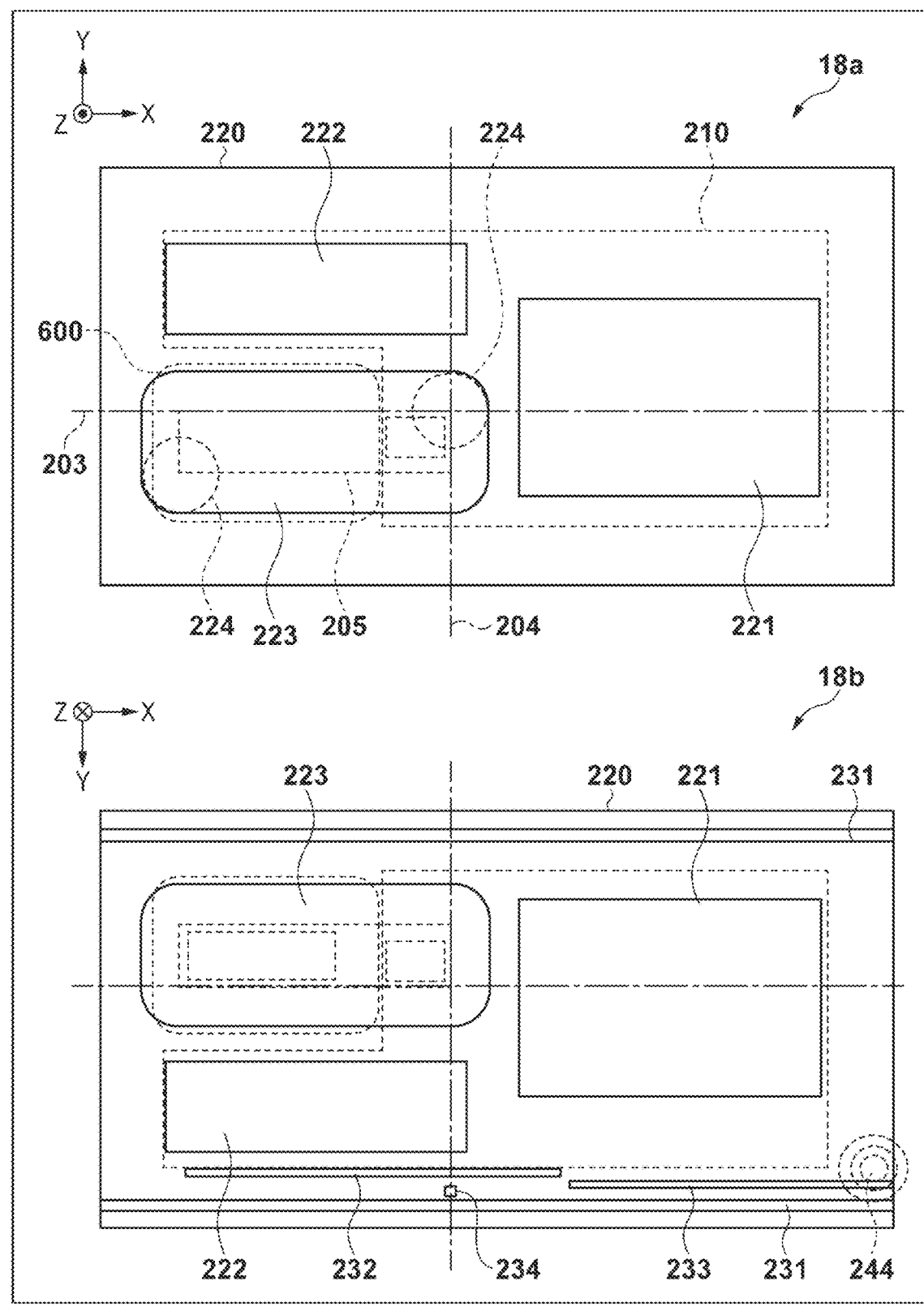

[Fig. 19]
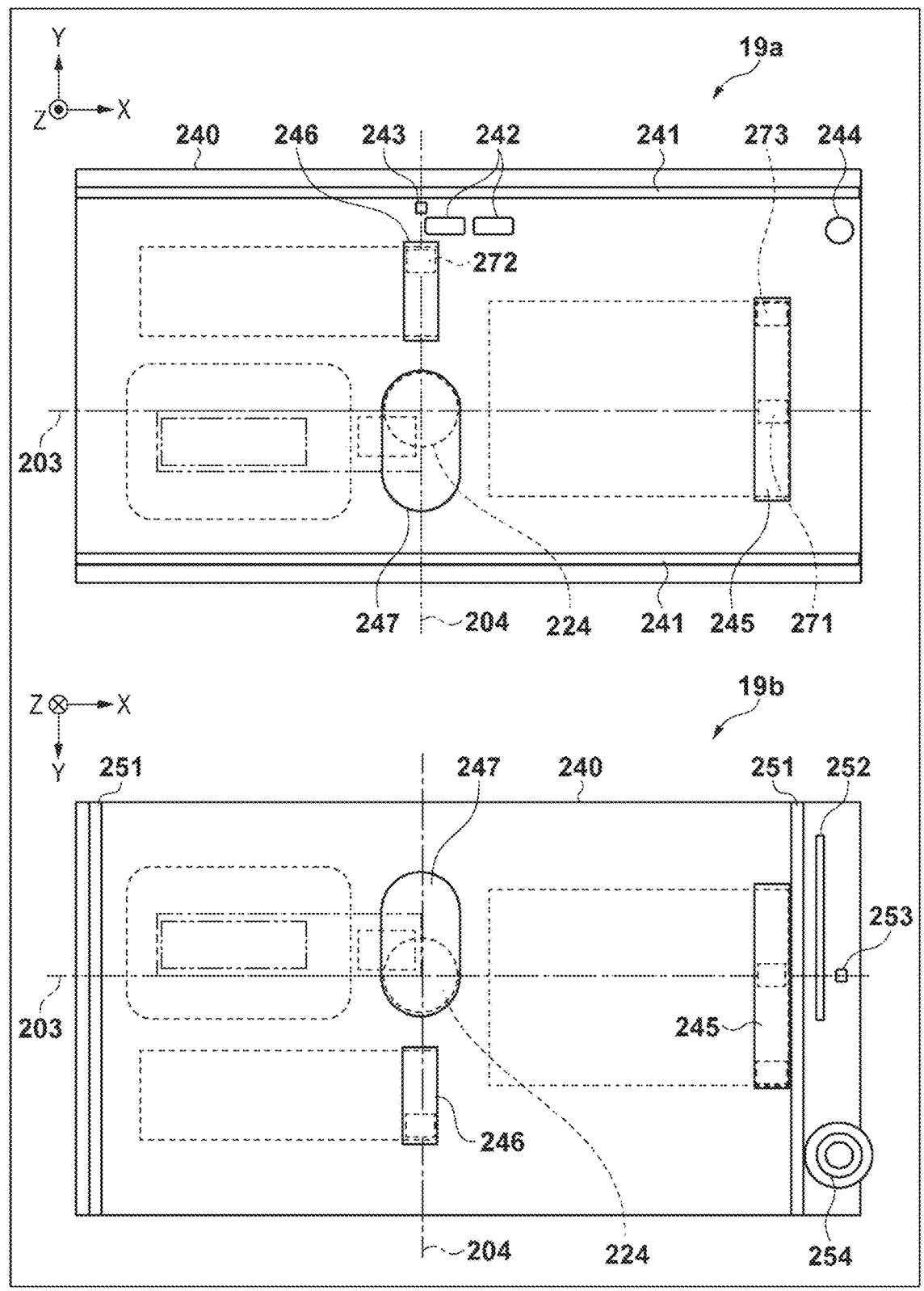

[Fig. 20]
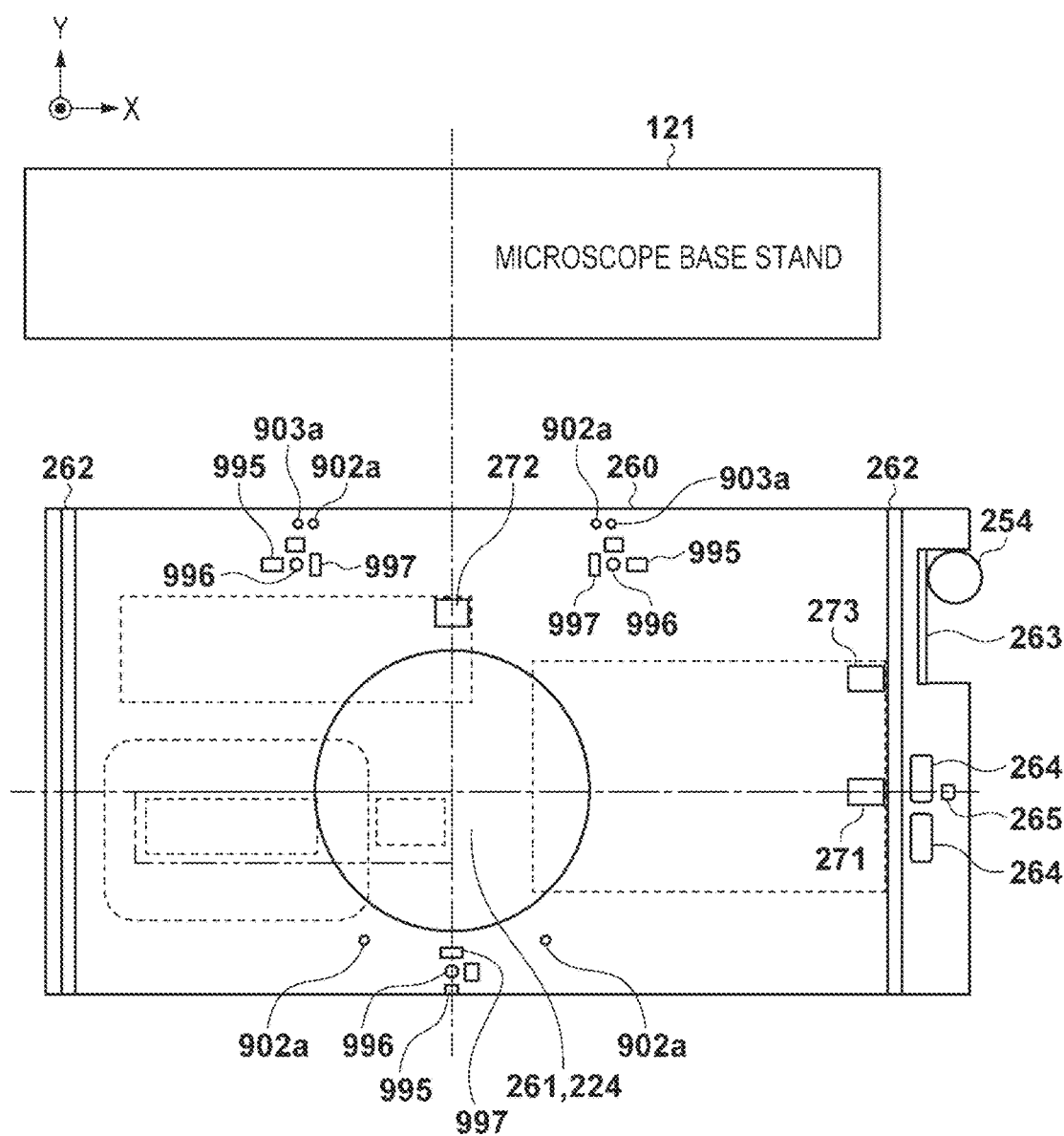

[Fig. 21]
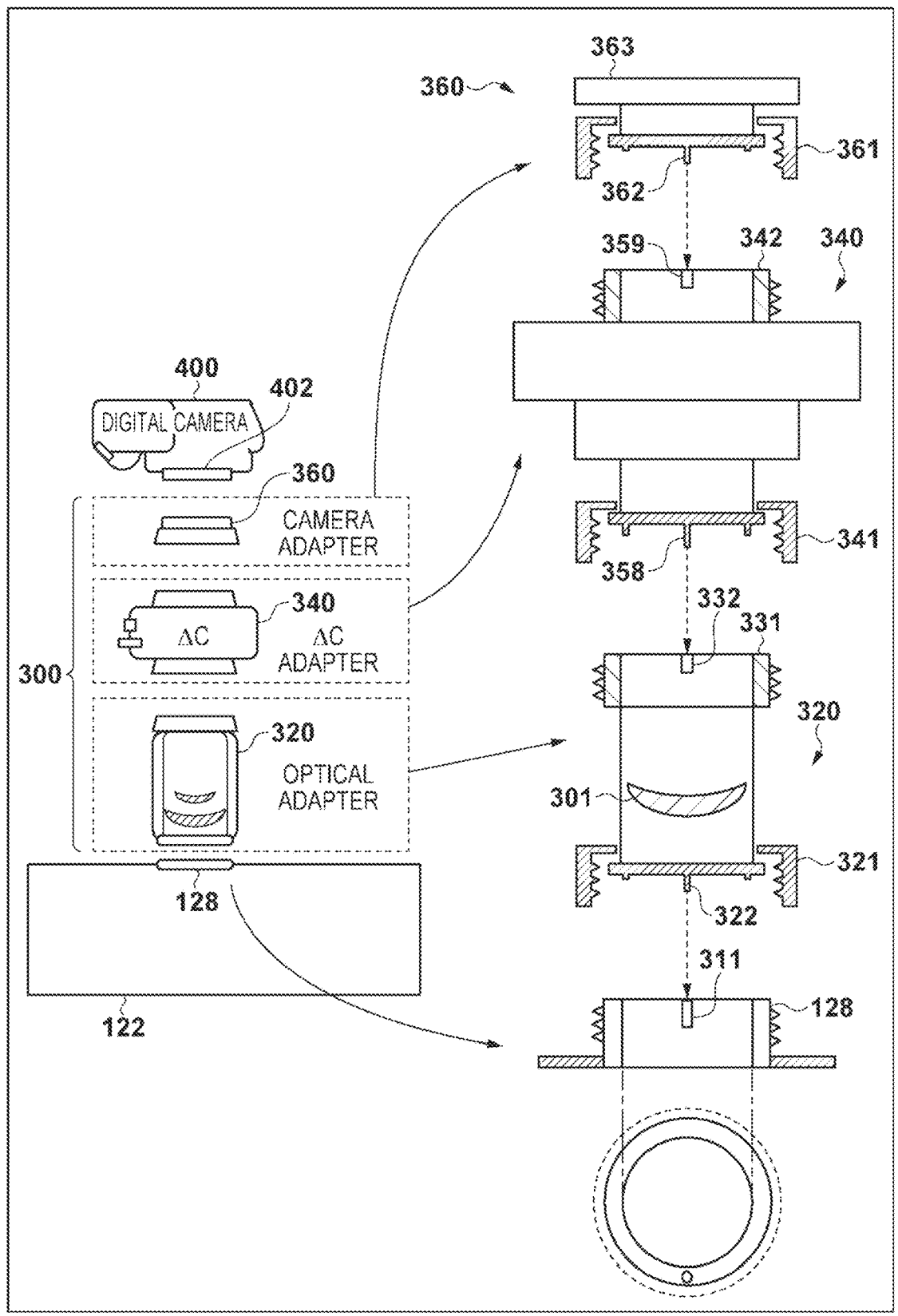

[Fig. 22]
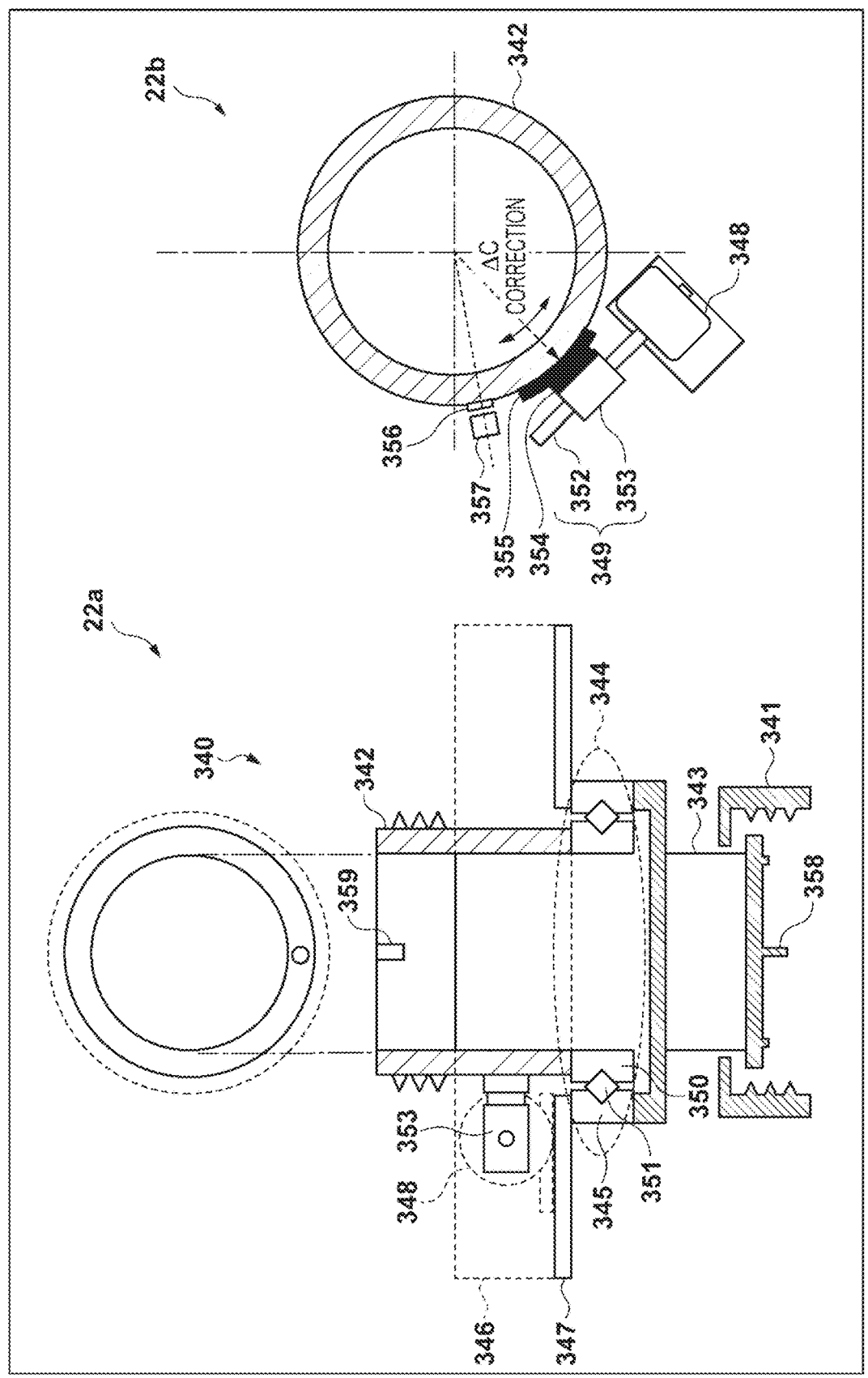

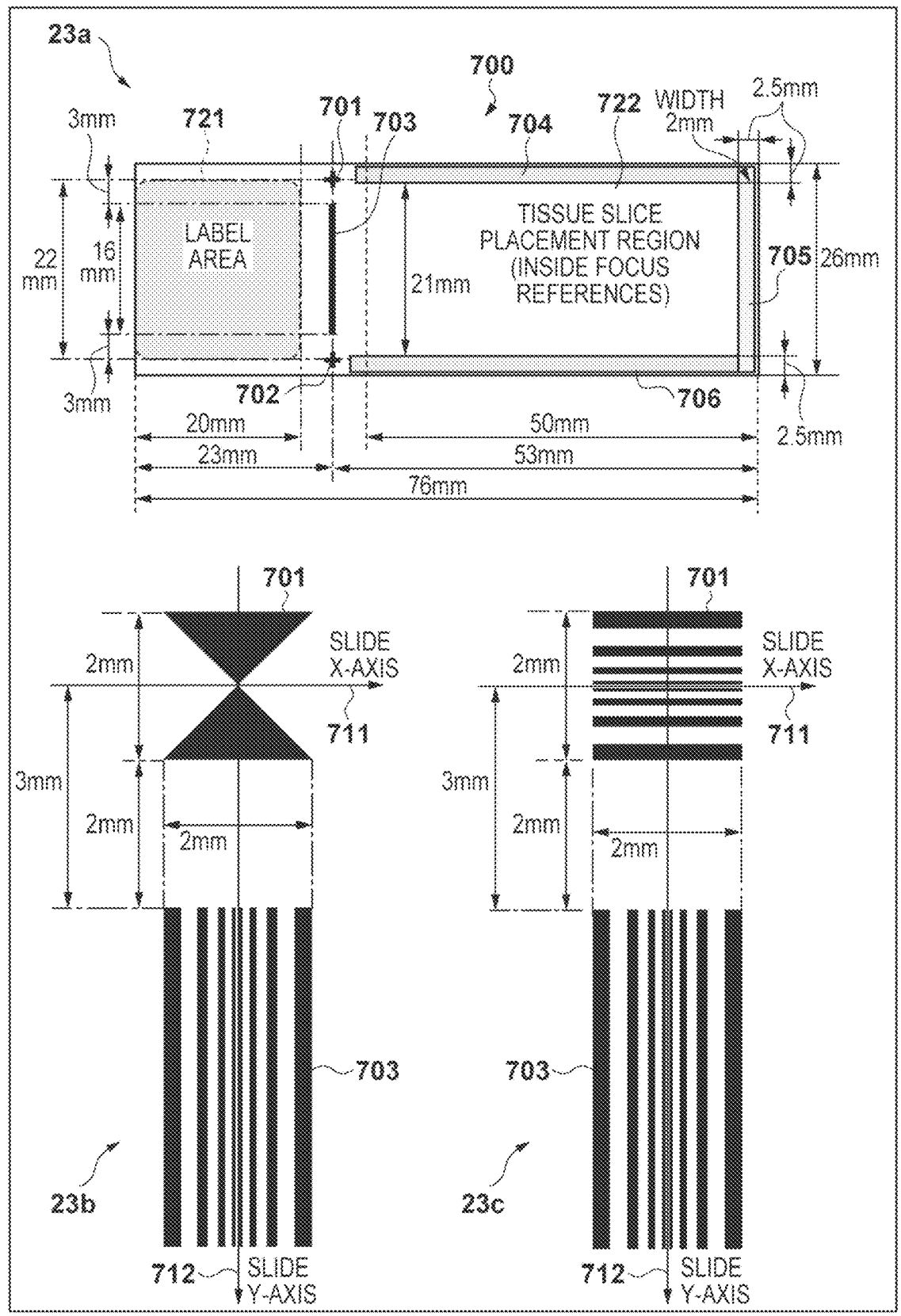
[Fig. 23]

[Fig. 24]
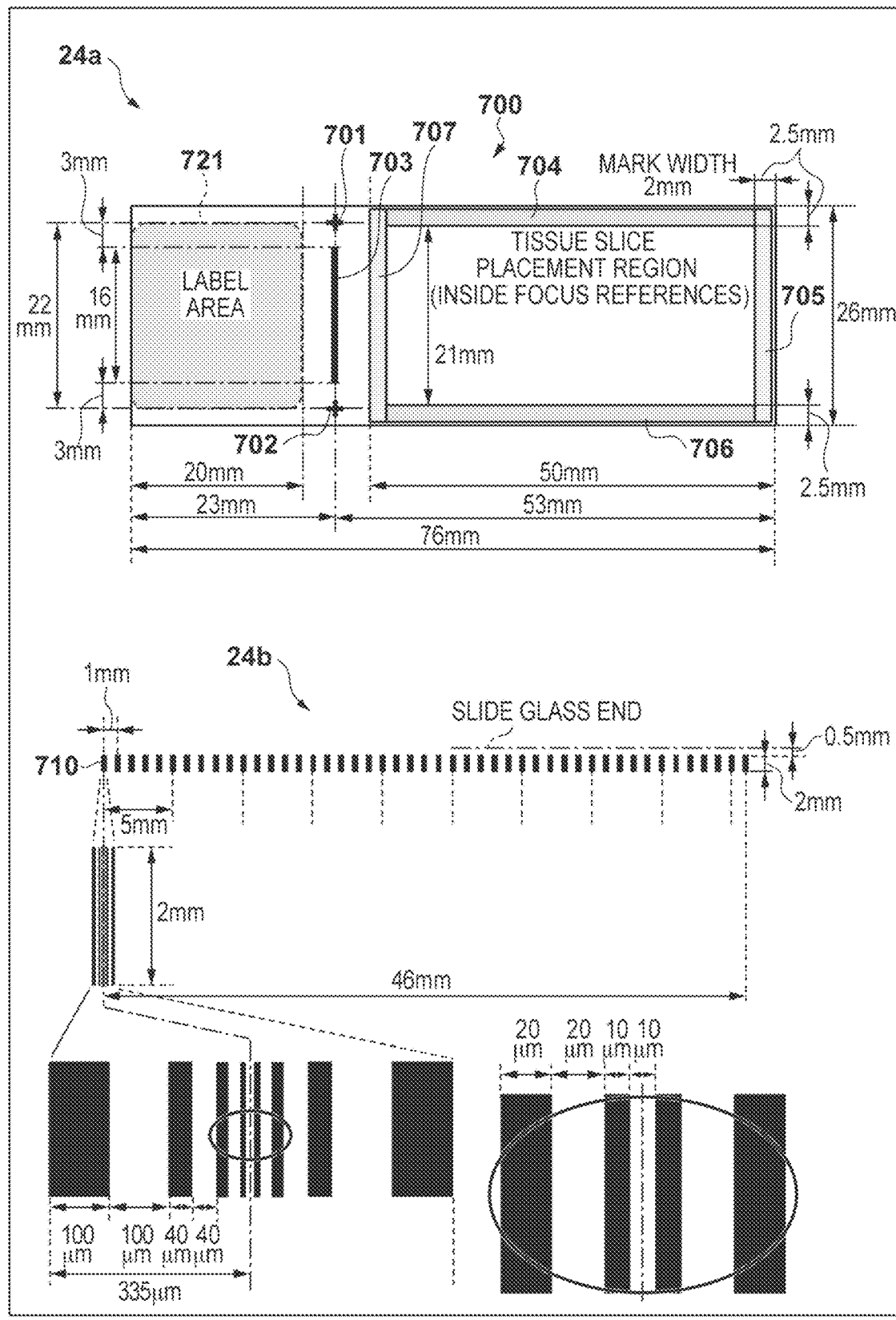

[Fig. 25]
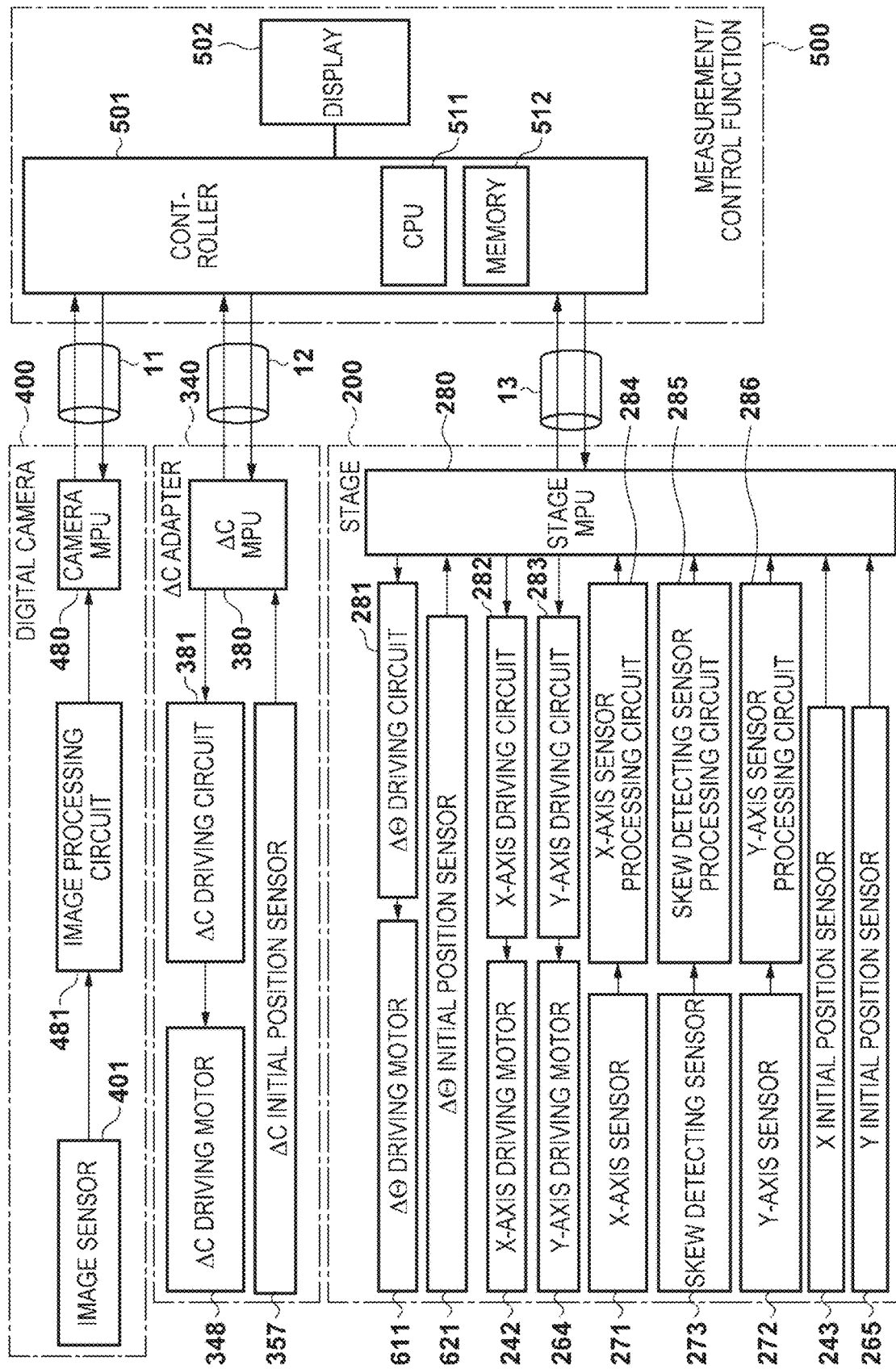

[Fig. 26]
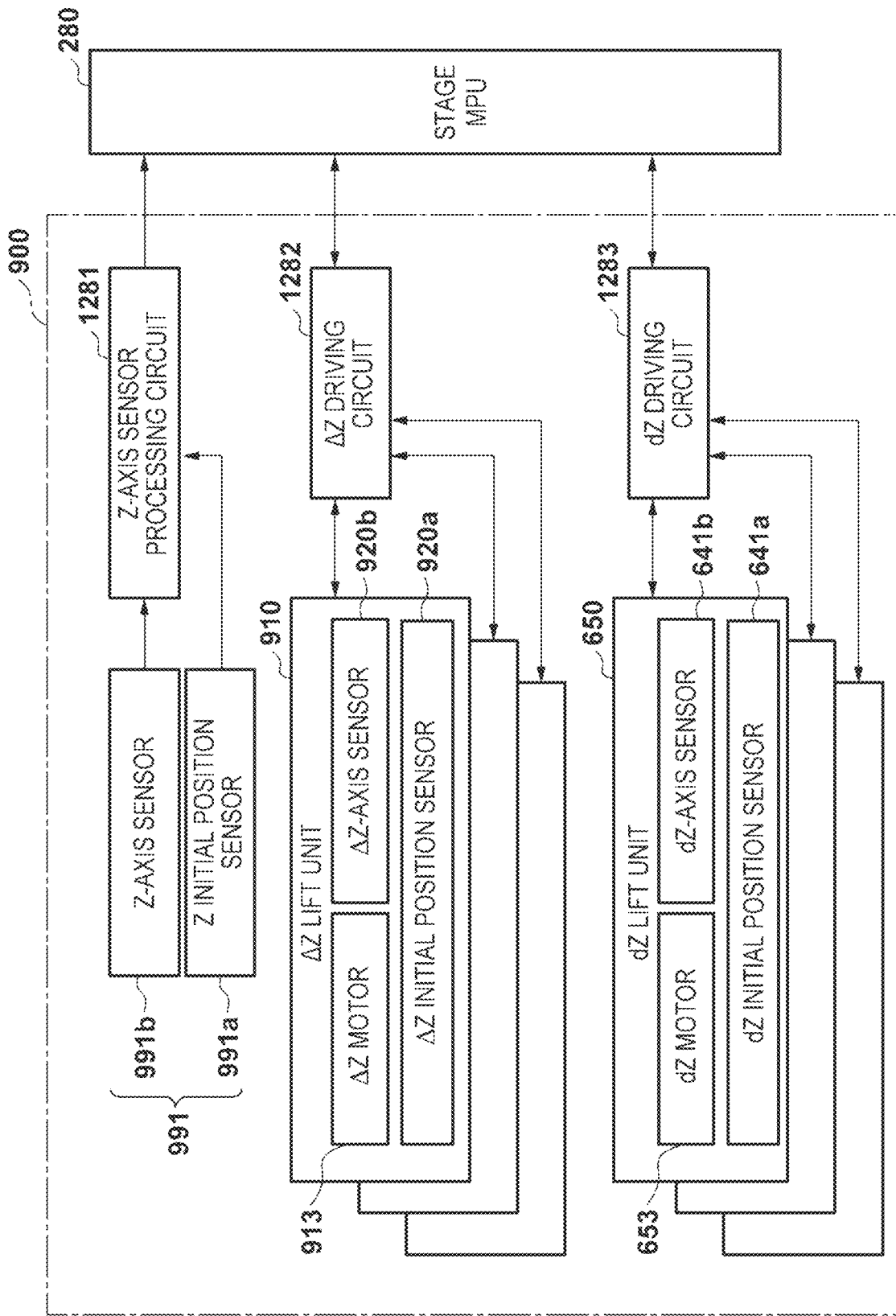

[Fig. 27]
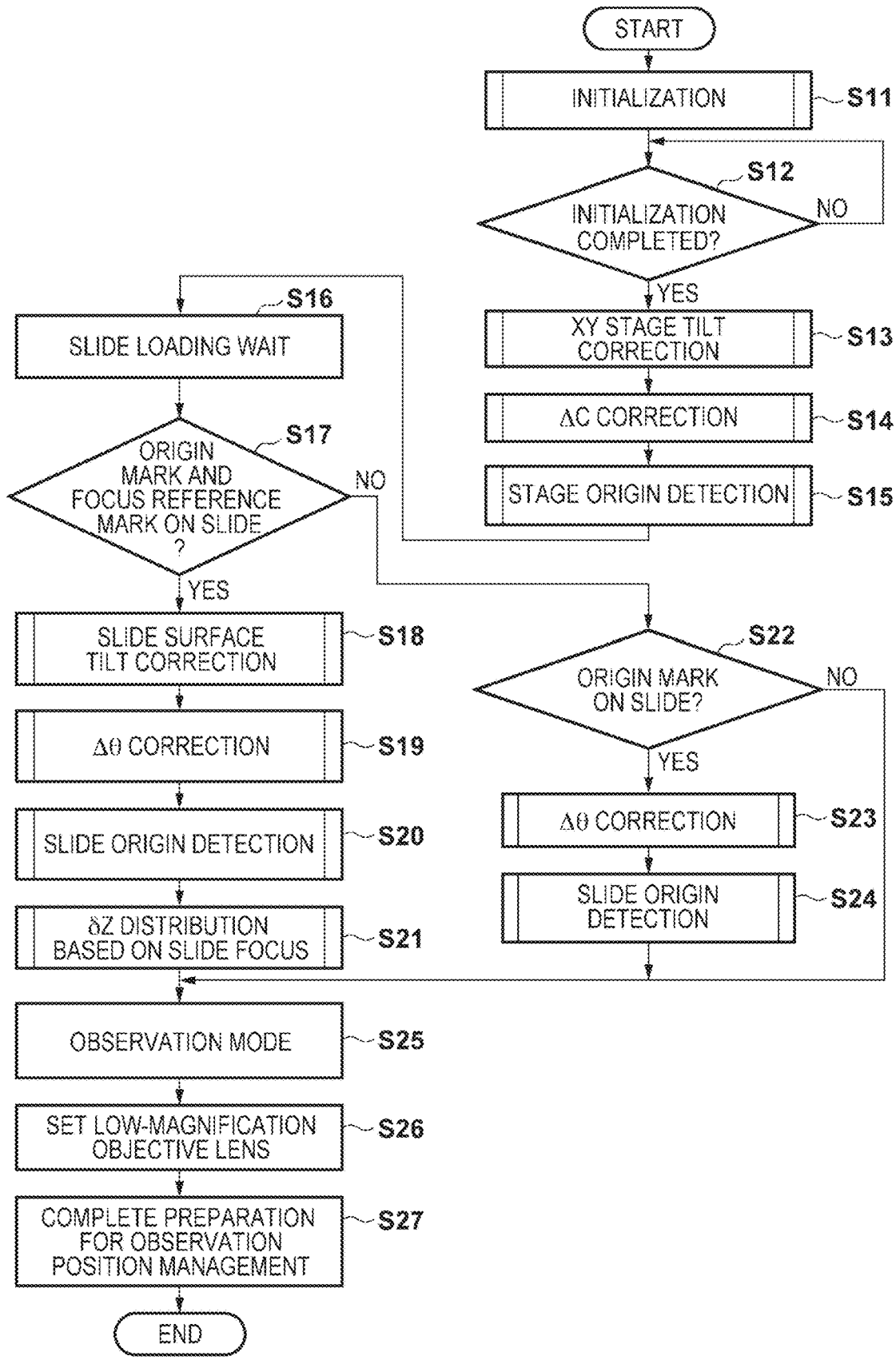

[Fig. 28]
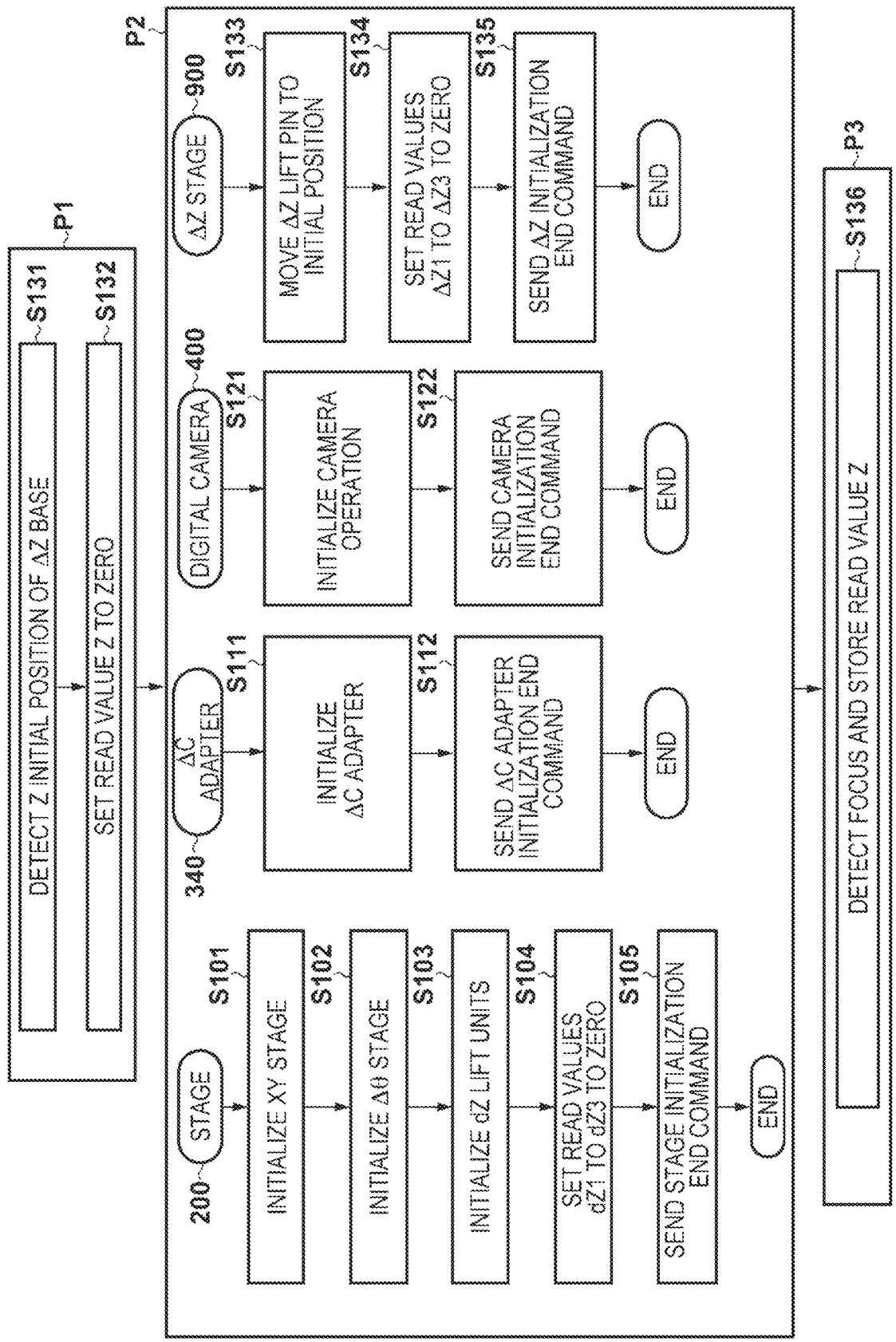

[Fig. 29]
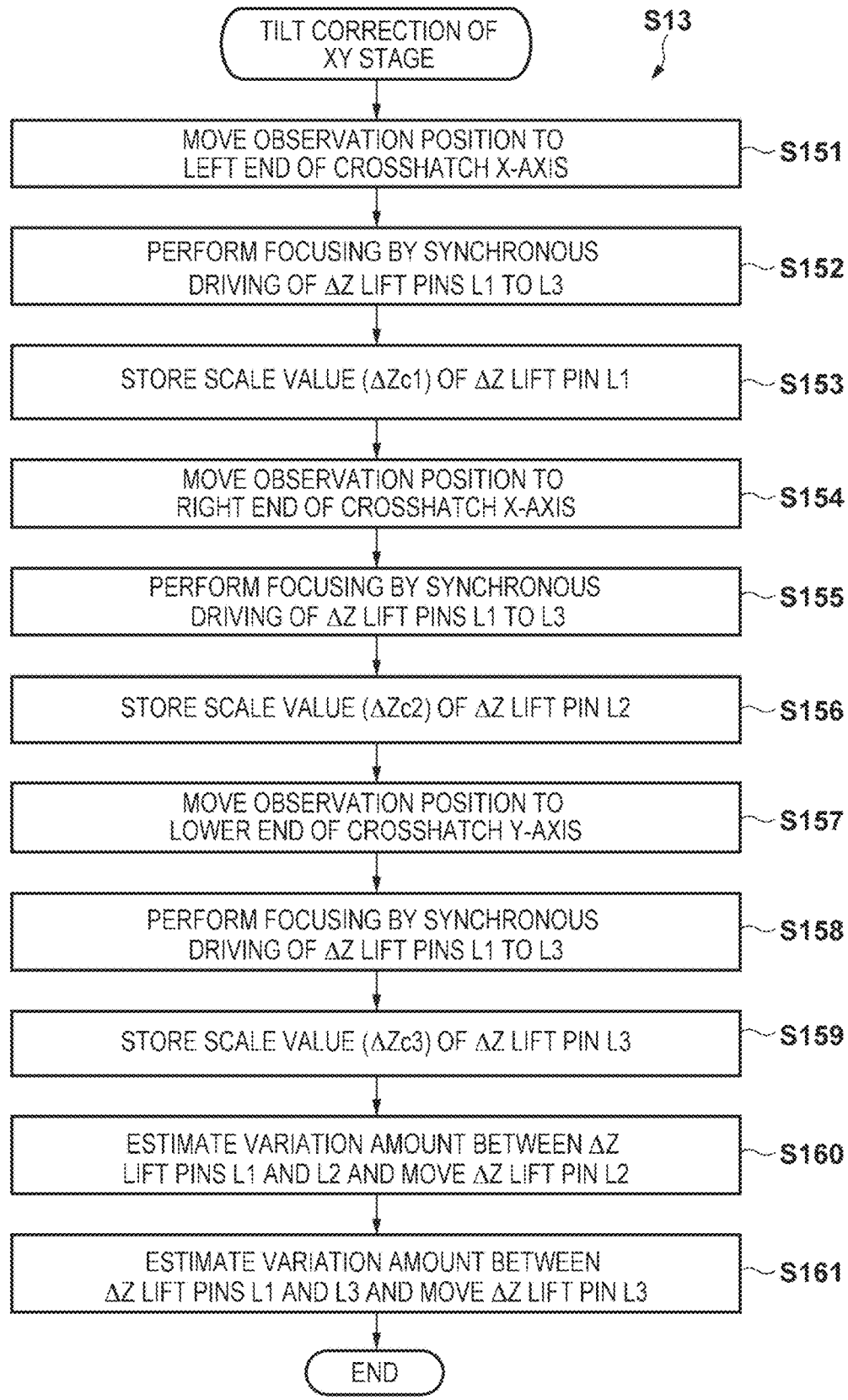

[Fig. 30]
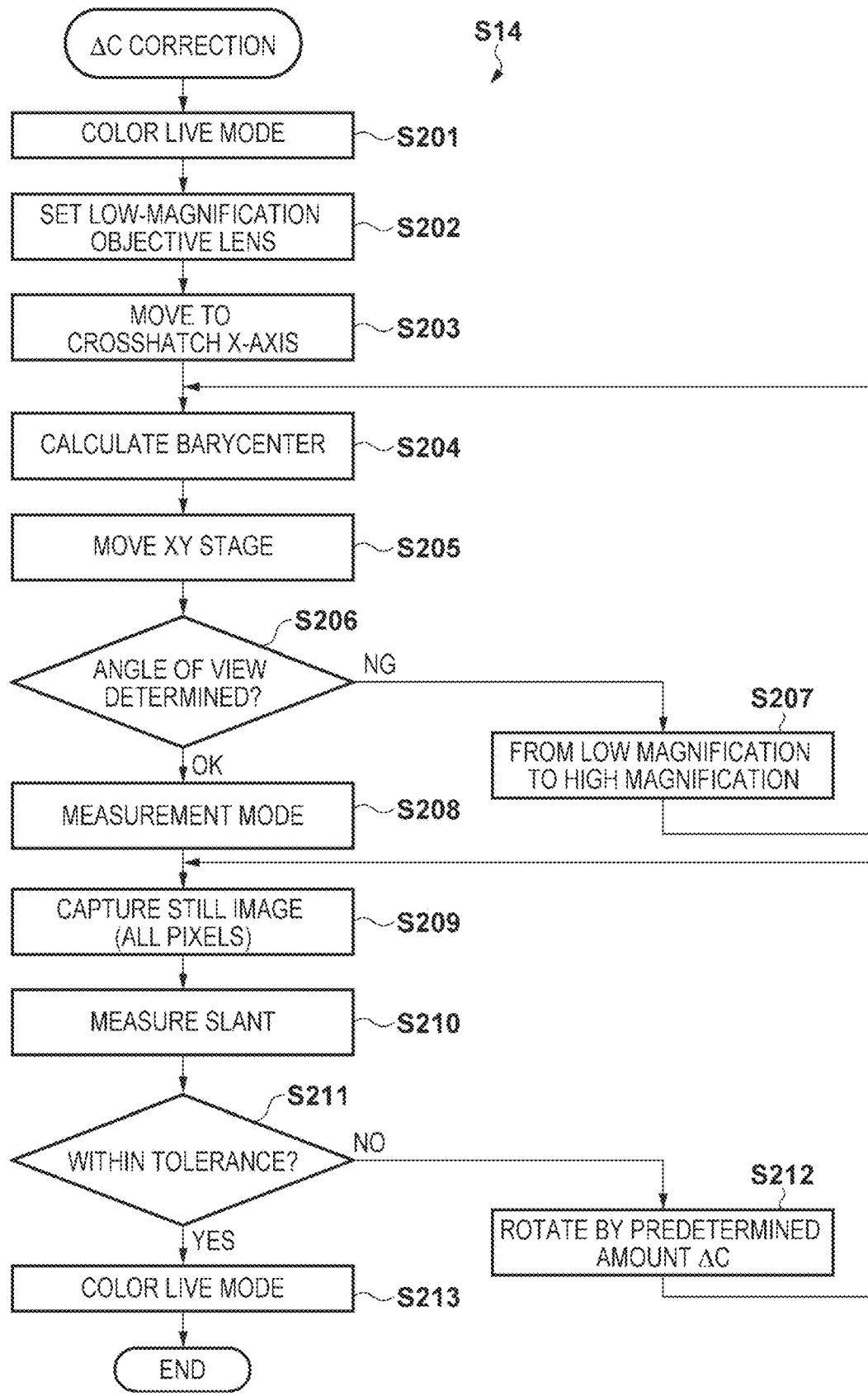

[Fig. 31]
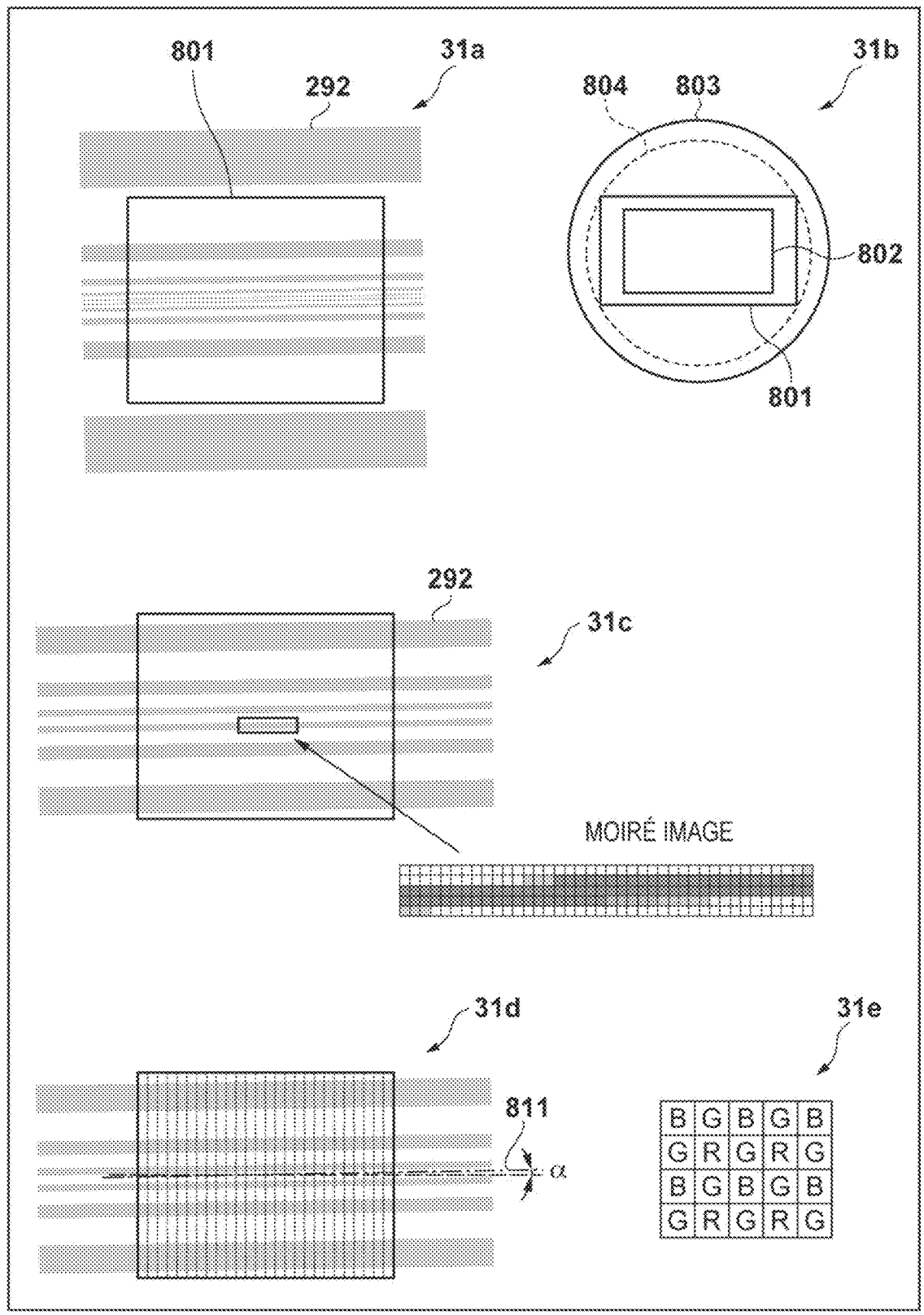

[Fig. 32]
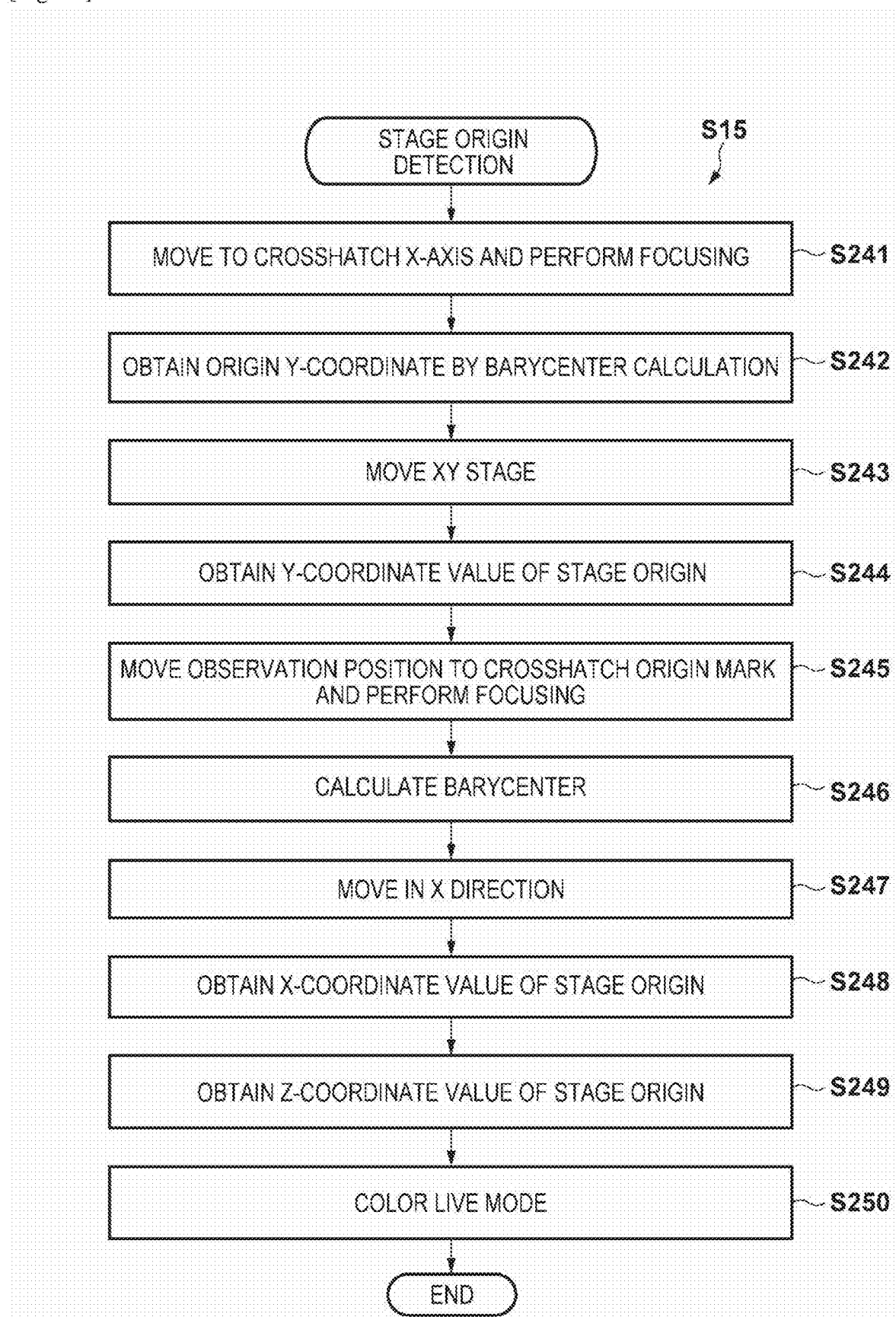

[Fig. 33]
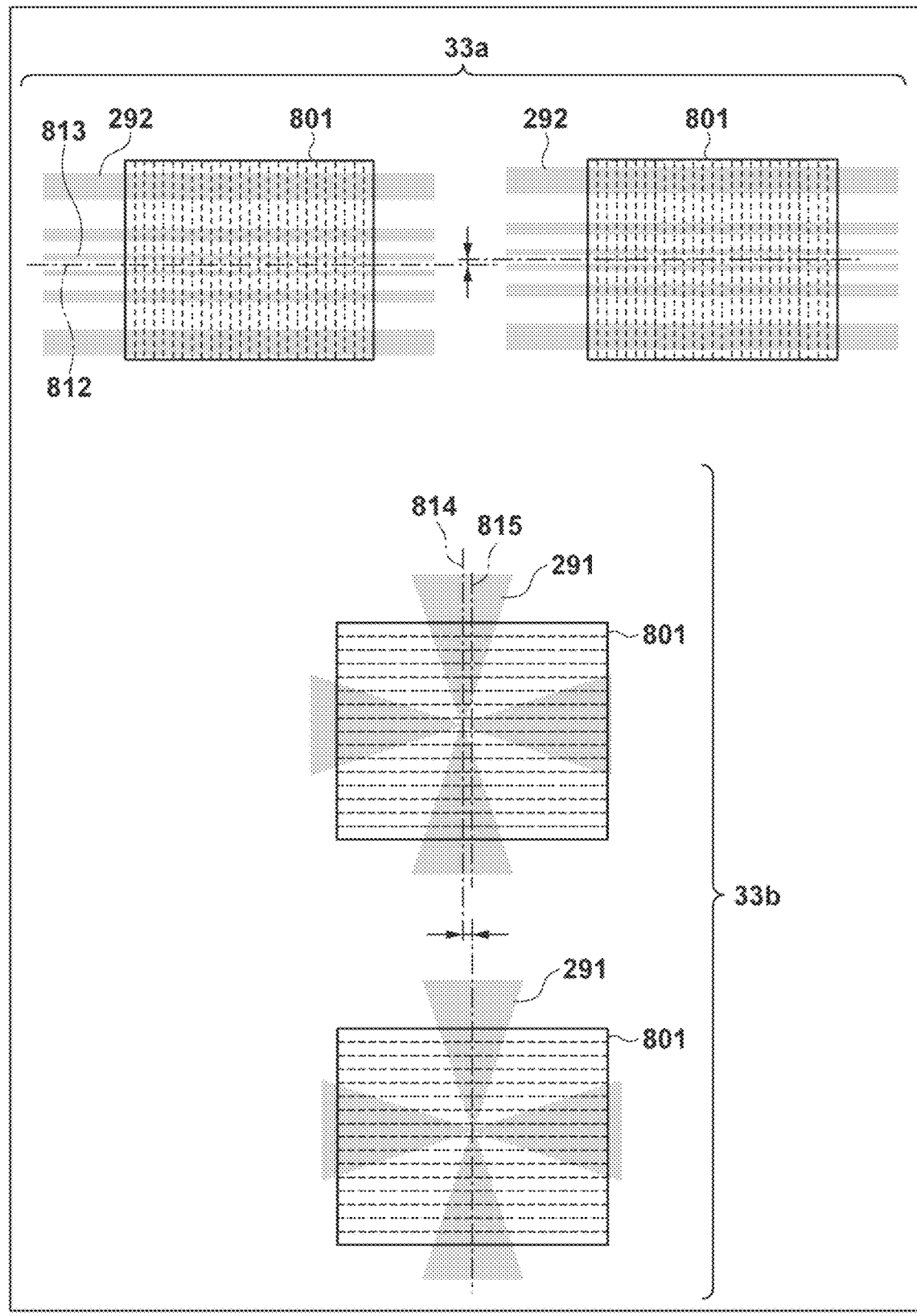

[Fig. 34]
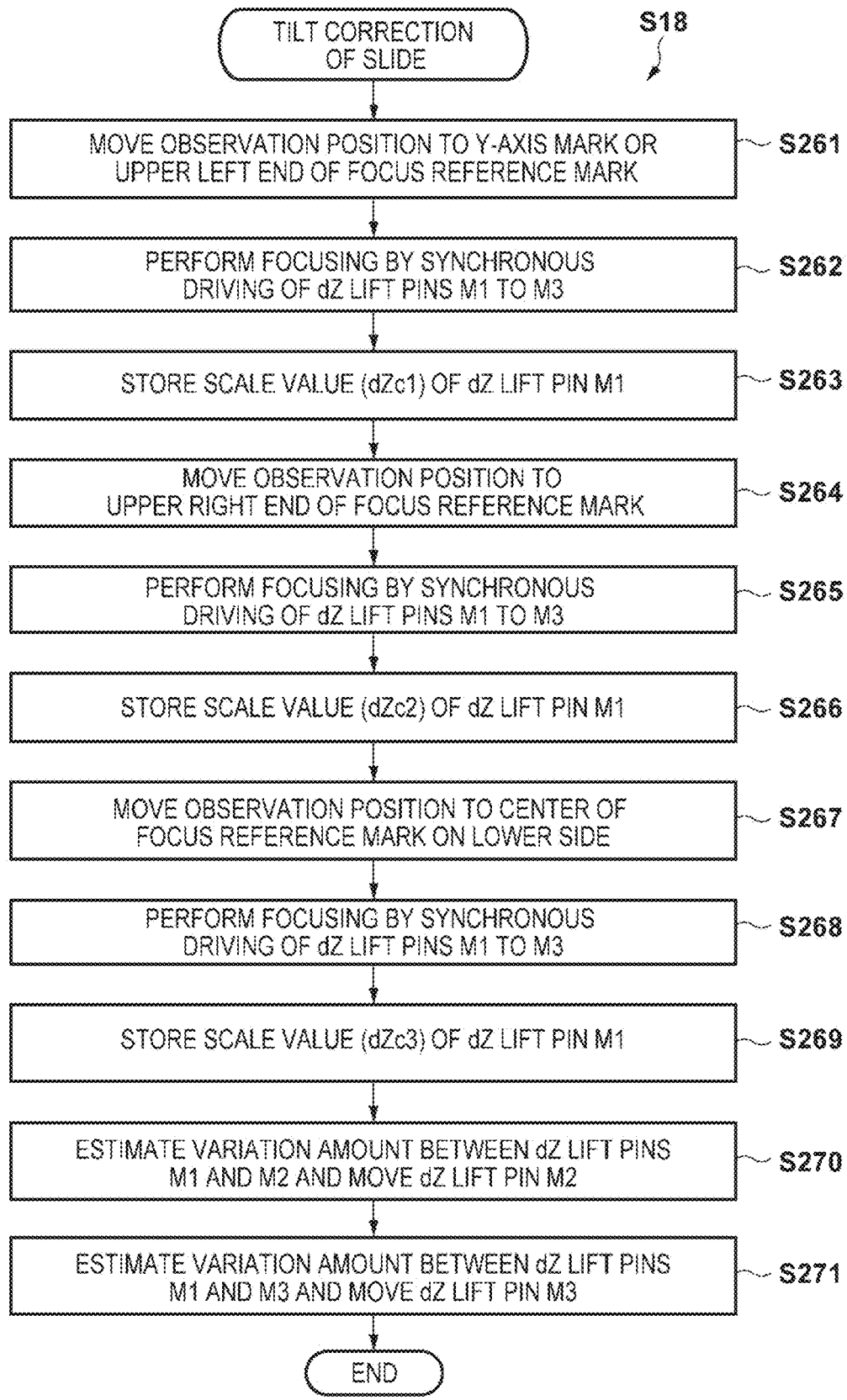

[Fig. 35]
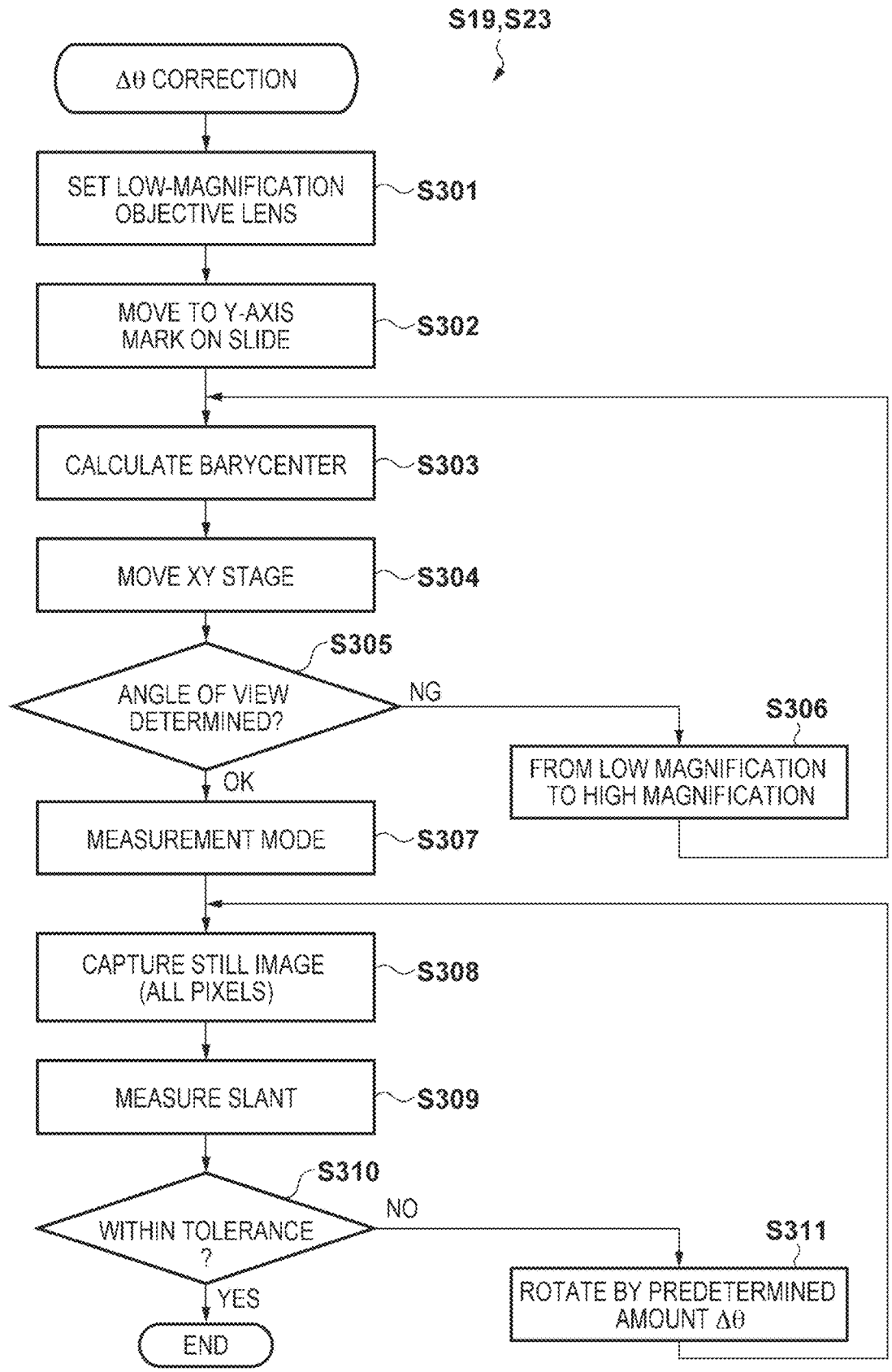

[Fig. 36]
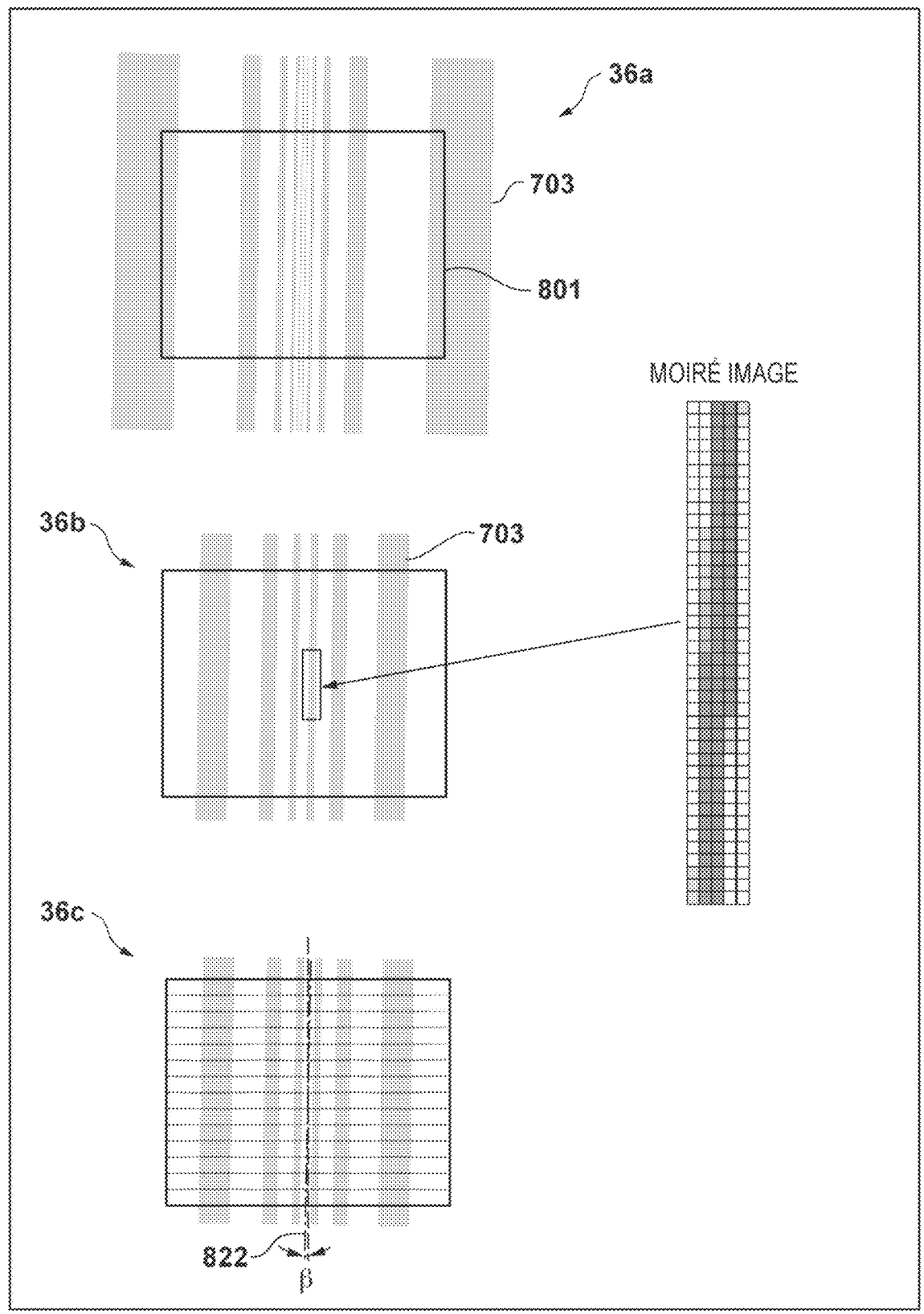

[Fig. 37]
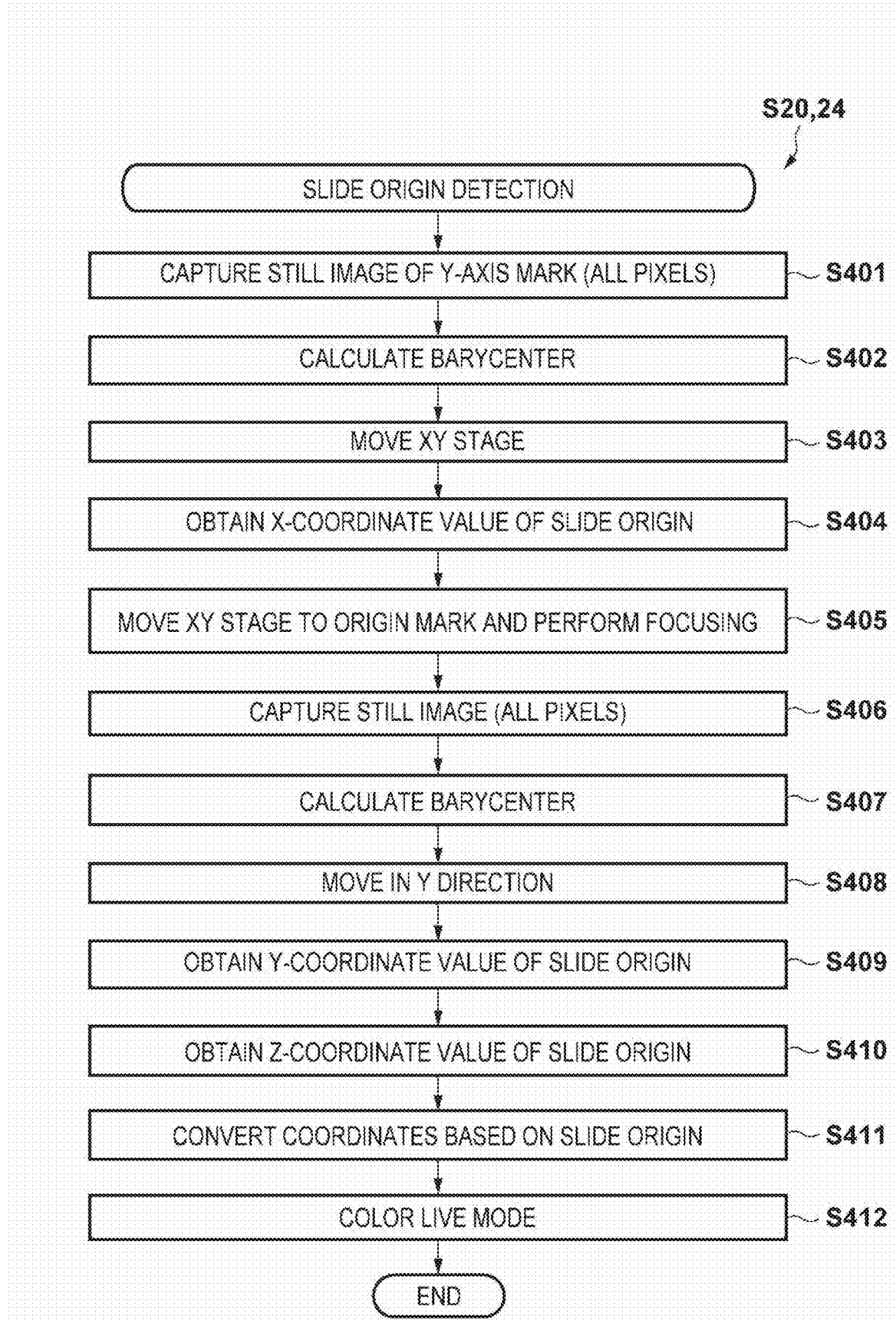

[Fig. 38]
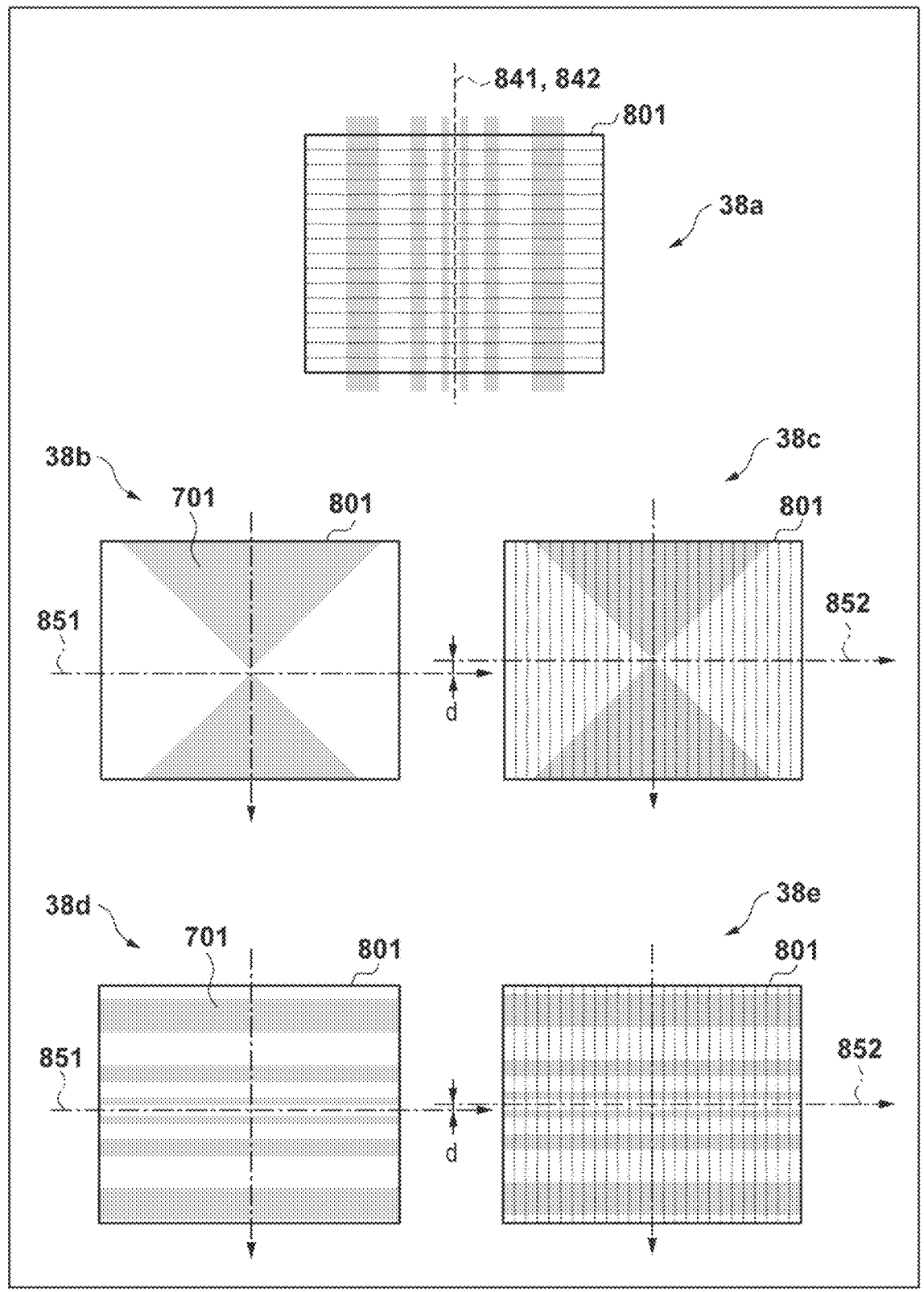

[Fig. 39]
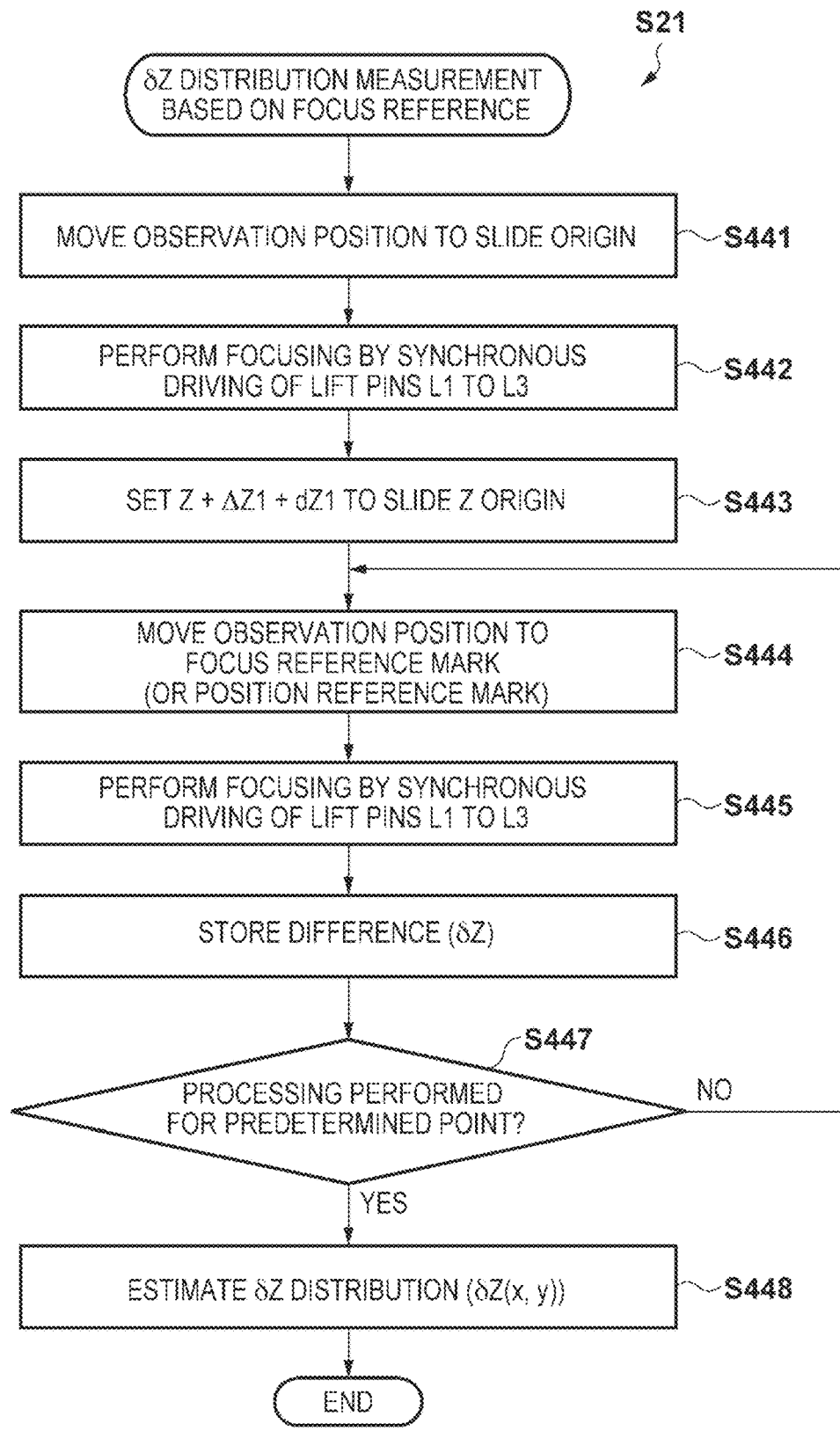

[Fig. 40]
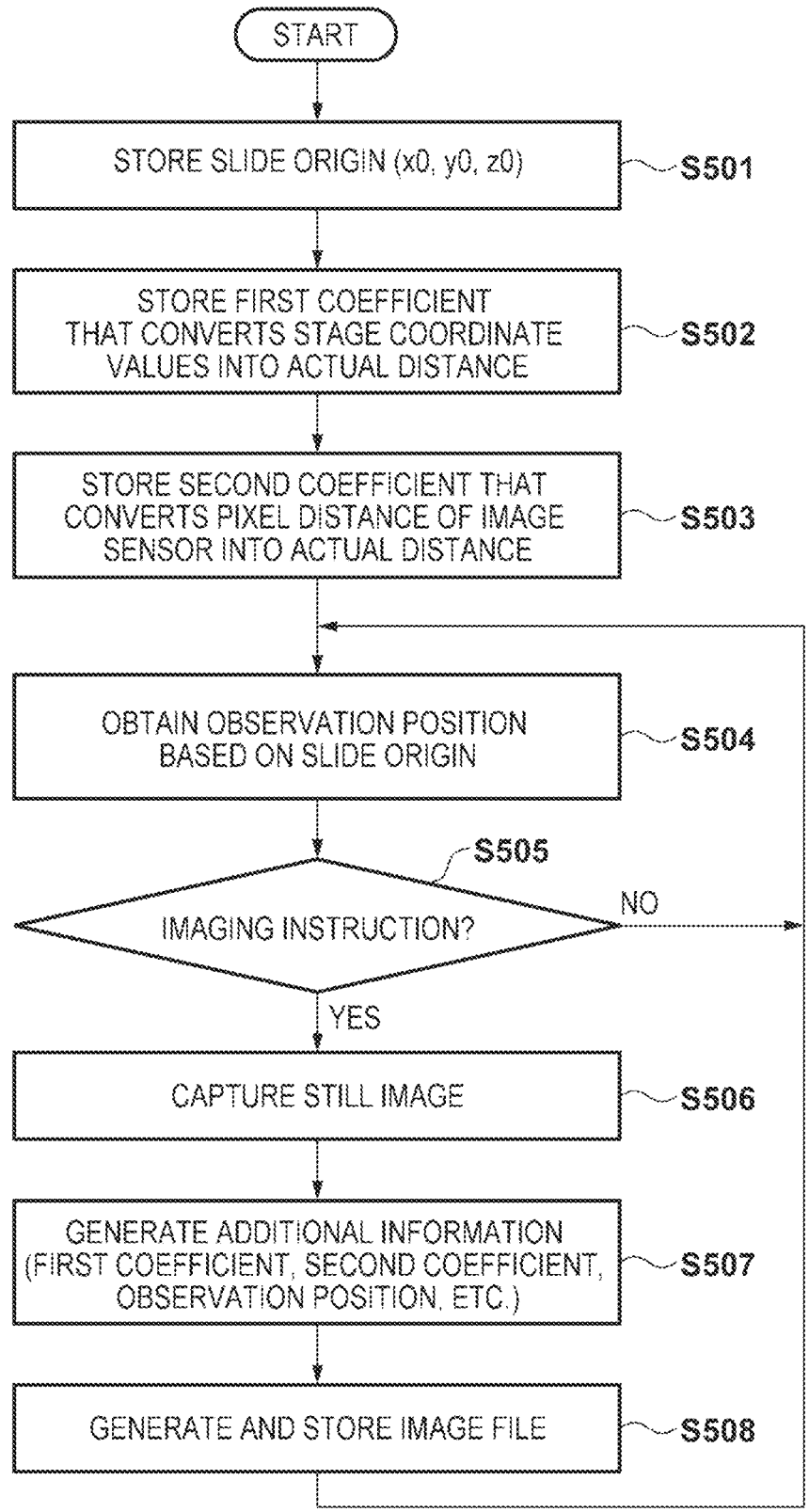

[Fig. 41]
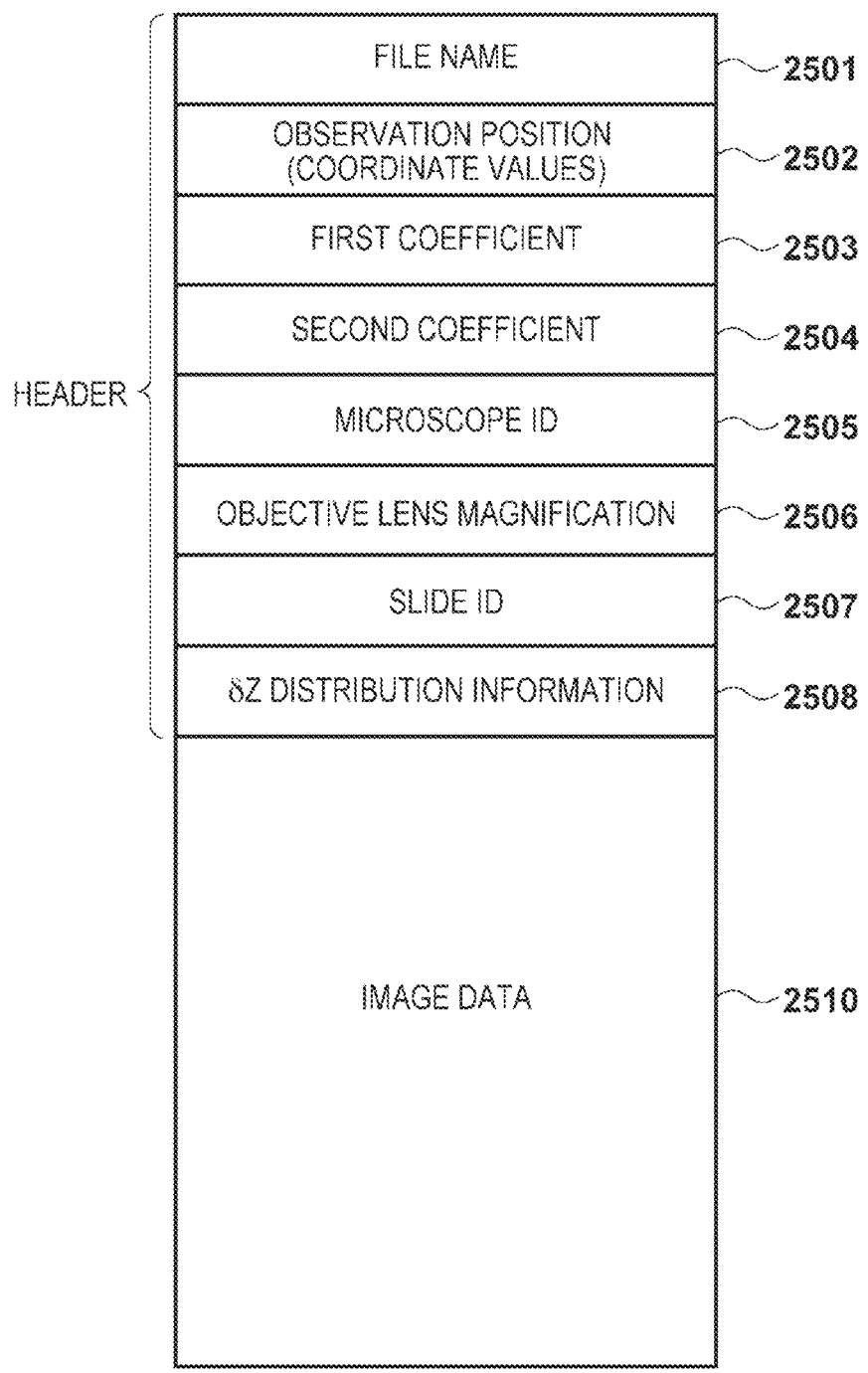

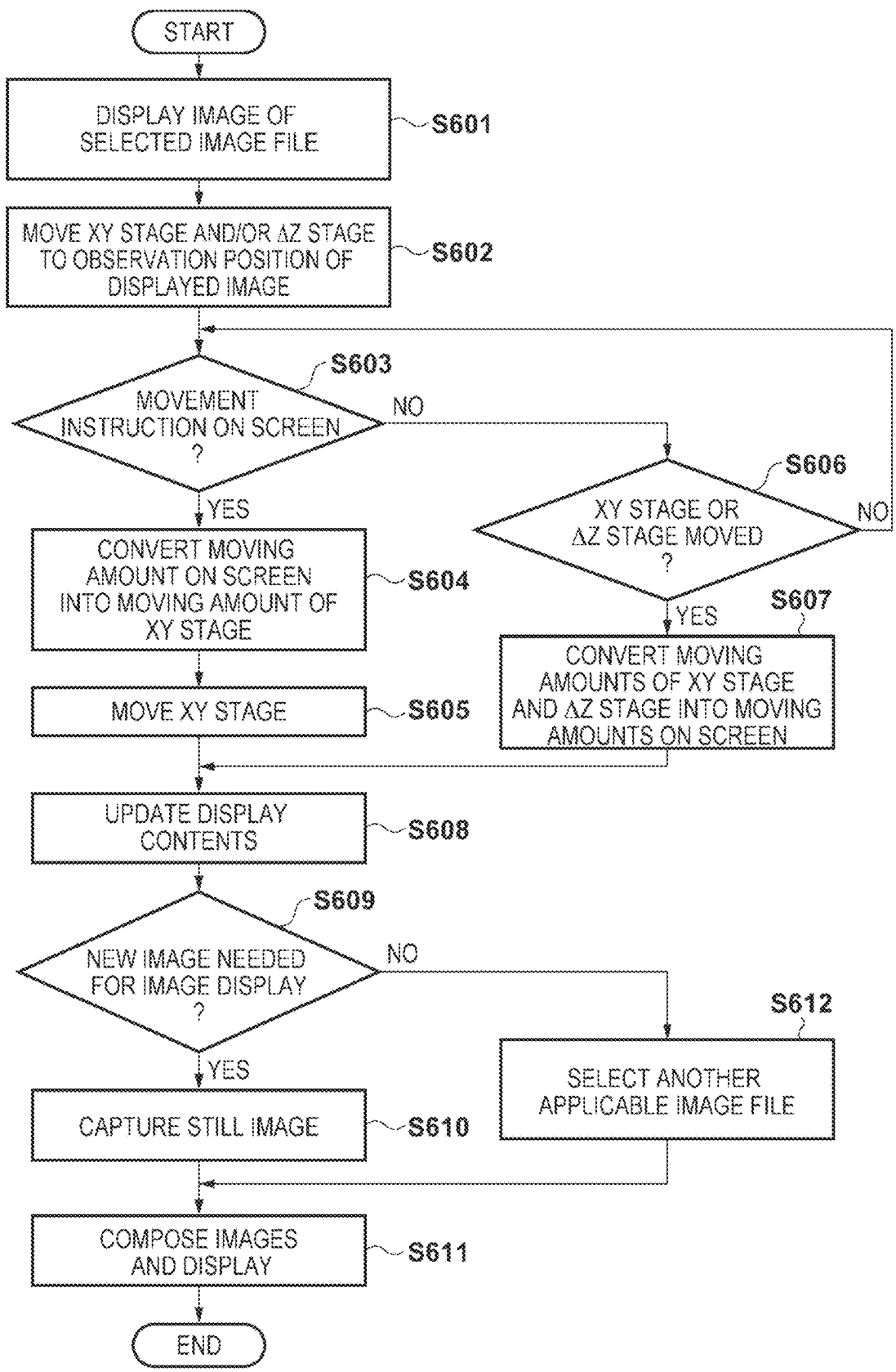
[Fig. 42]

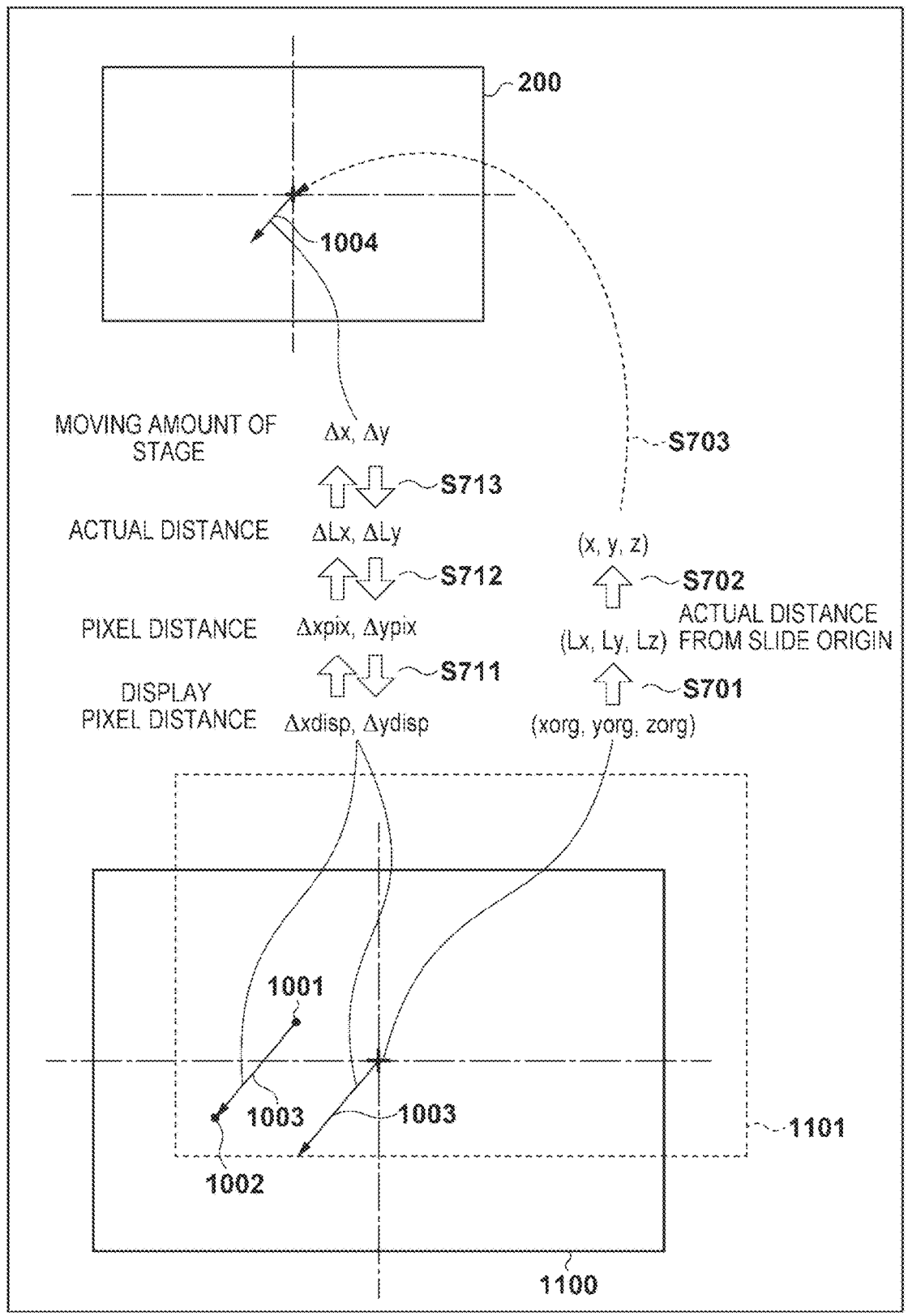
[Fig. 43]

[Fig. 44]
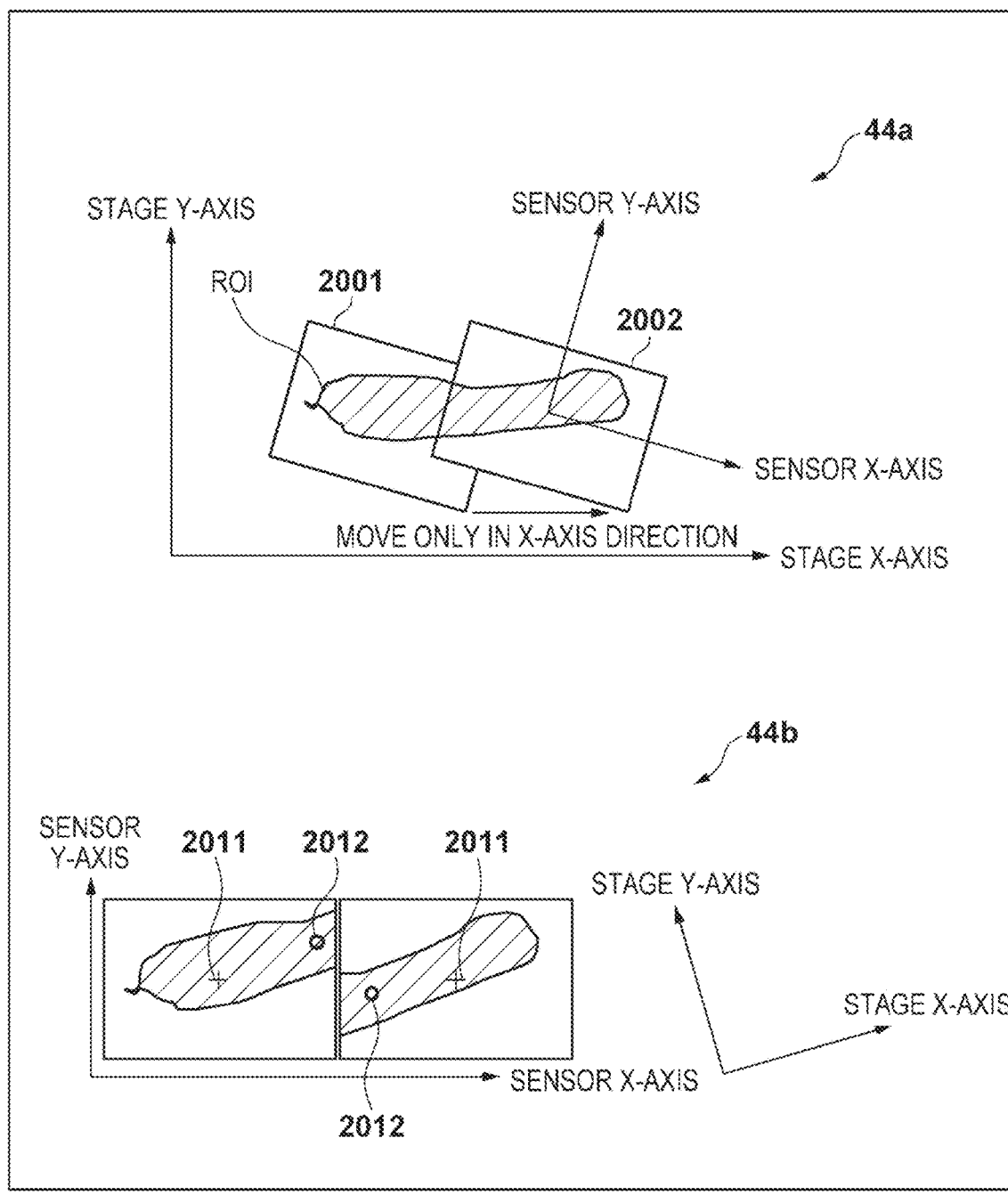

[Fig. 45]
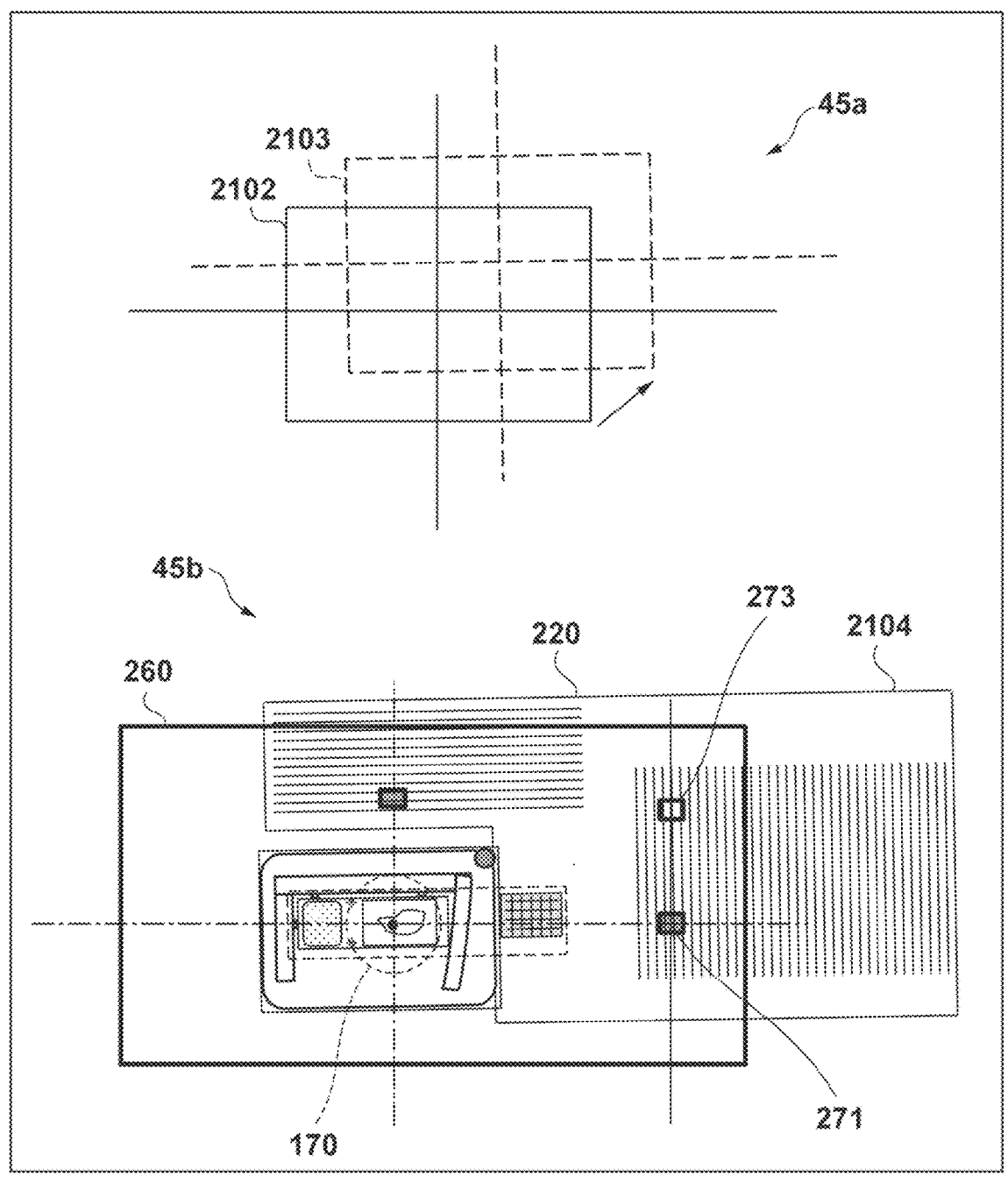

[Fig. 46]
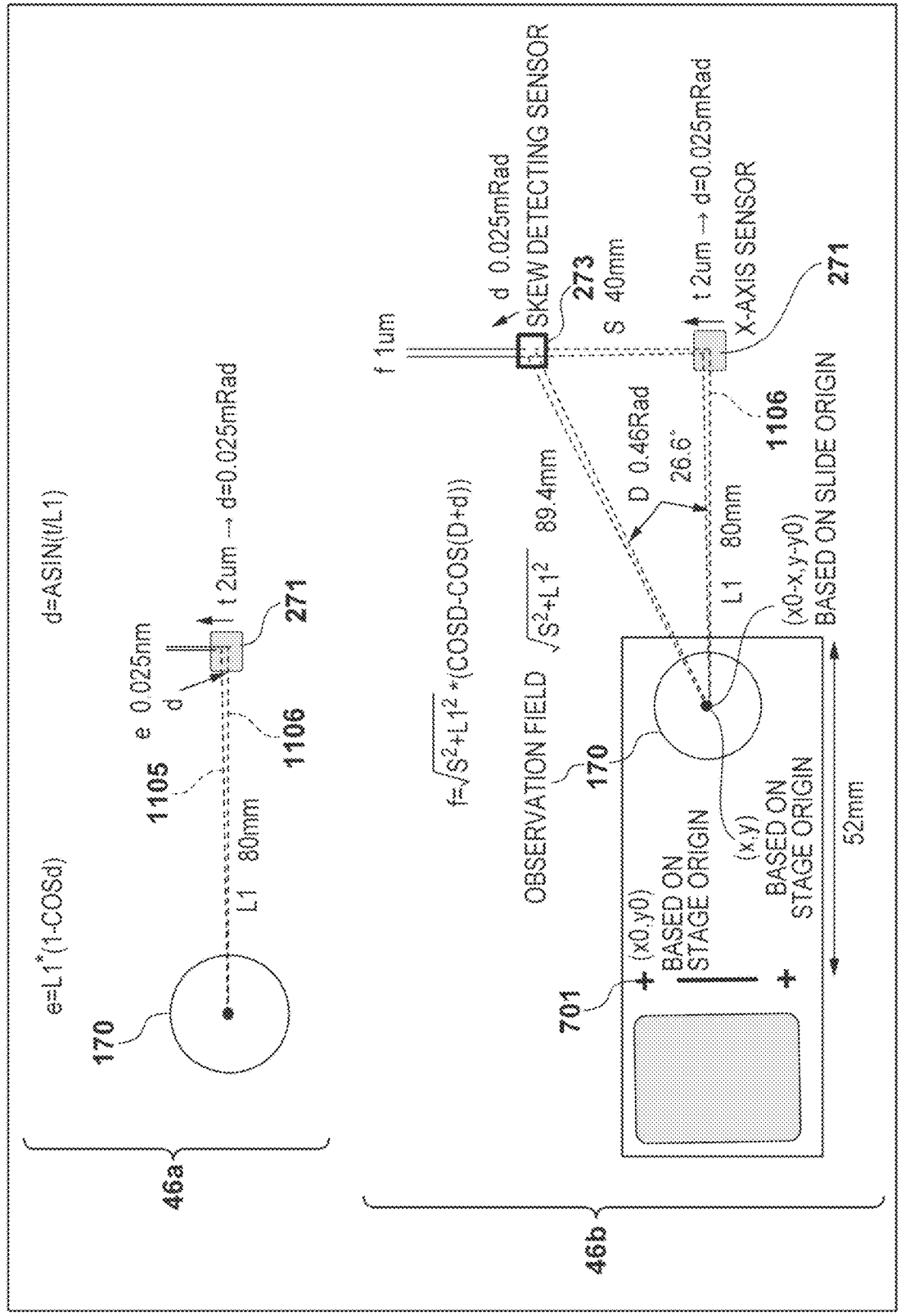

[Fig. 47]
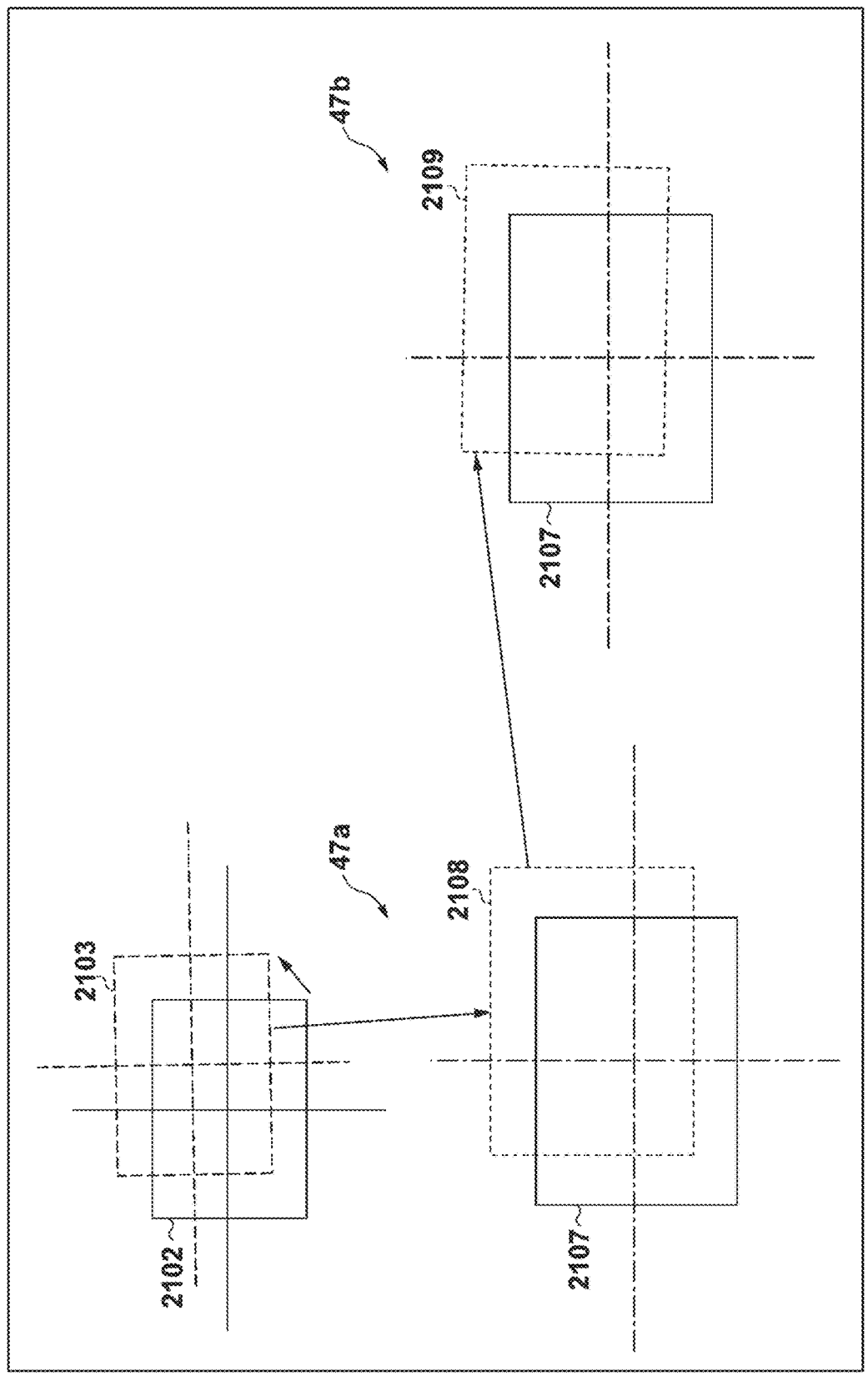

[Fig. 48]
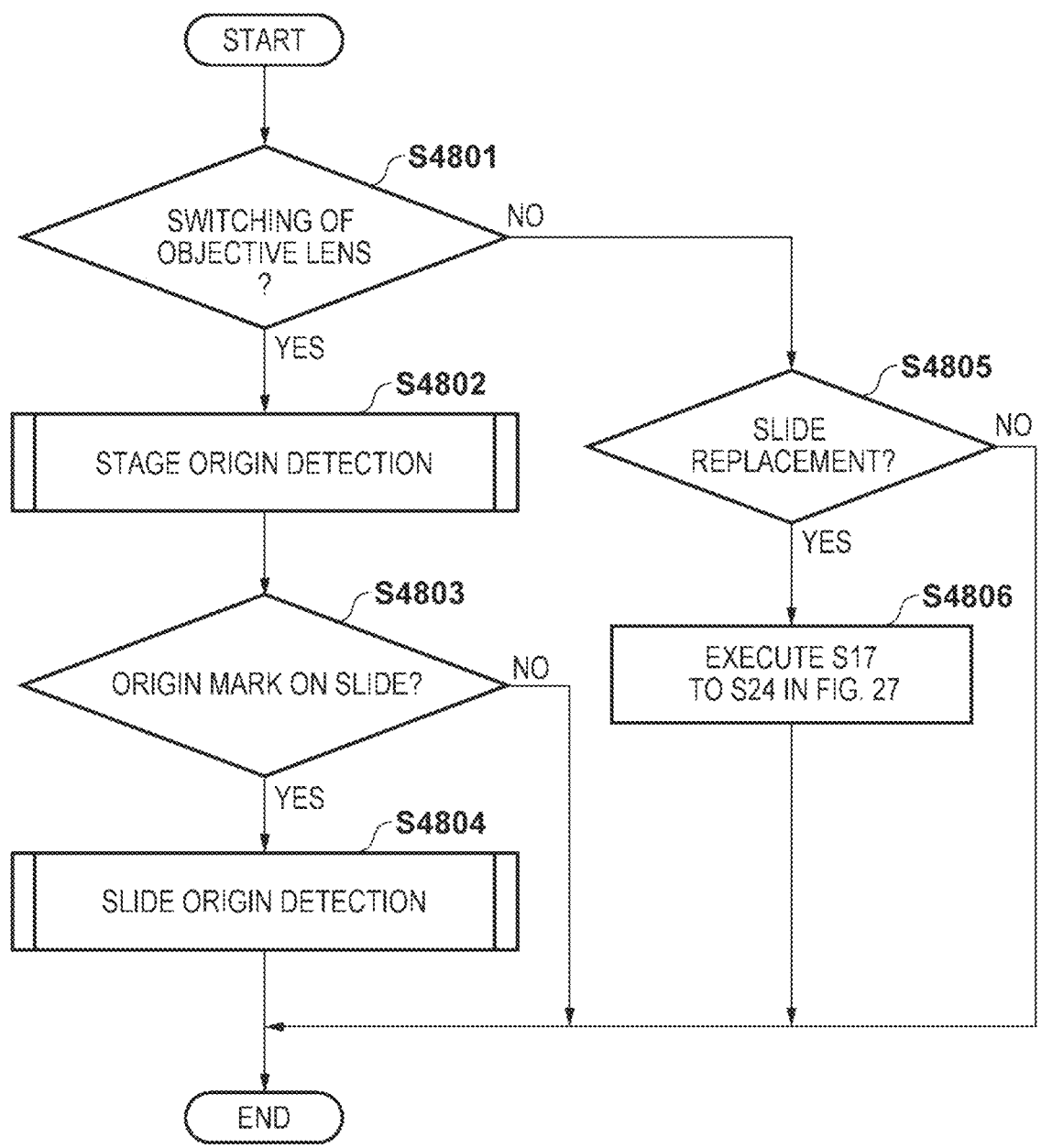

[Fig. 49]
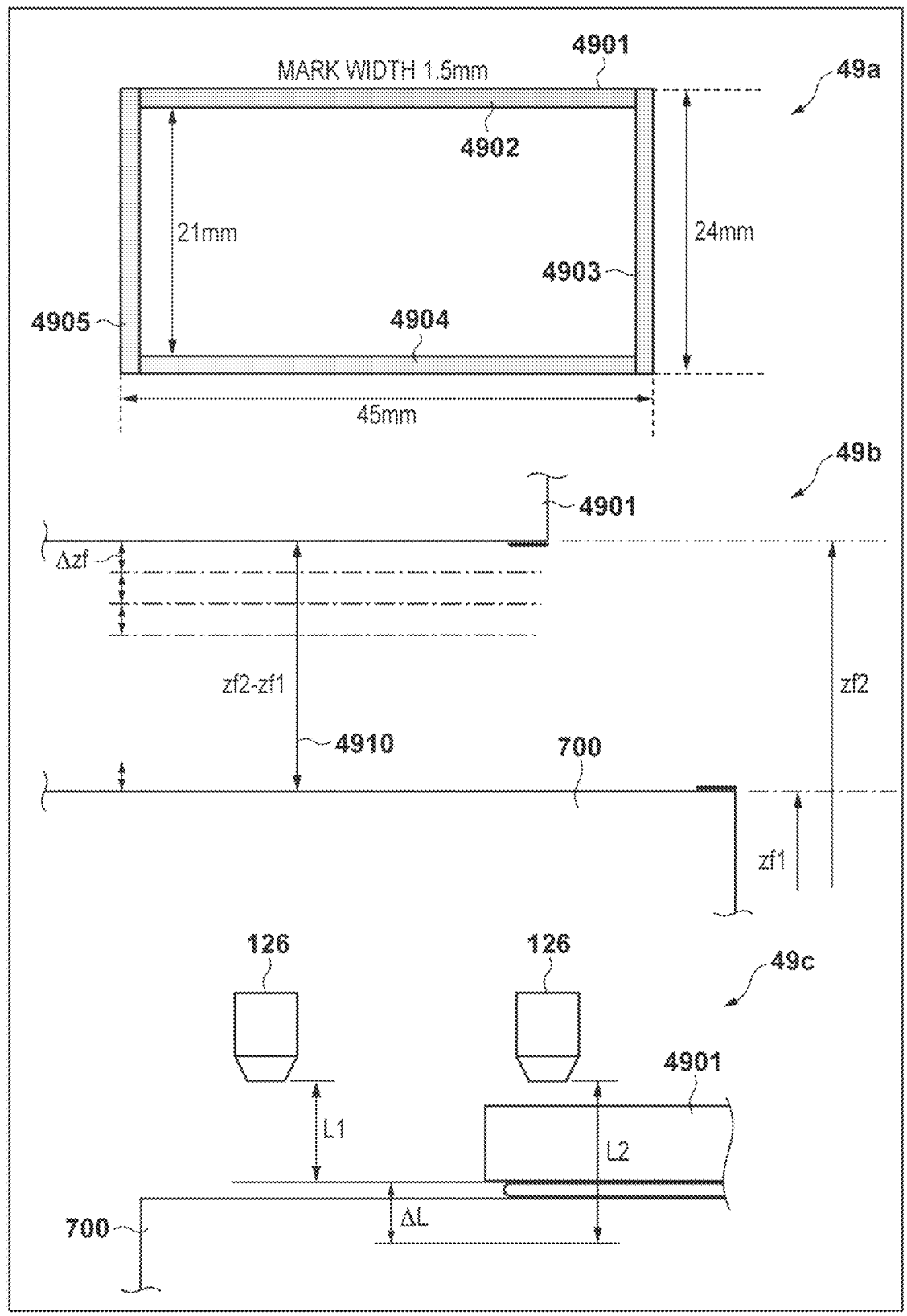

[Fig. 50]
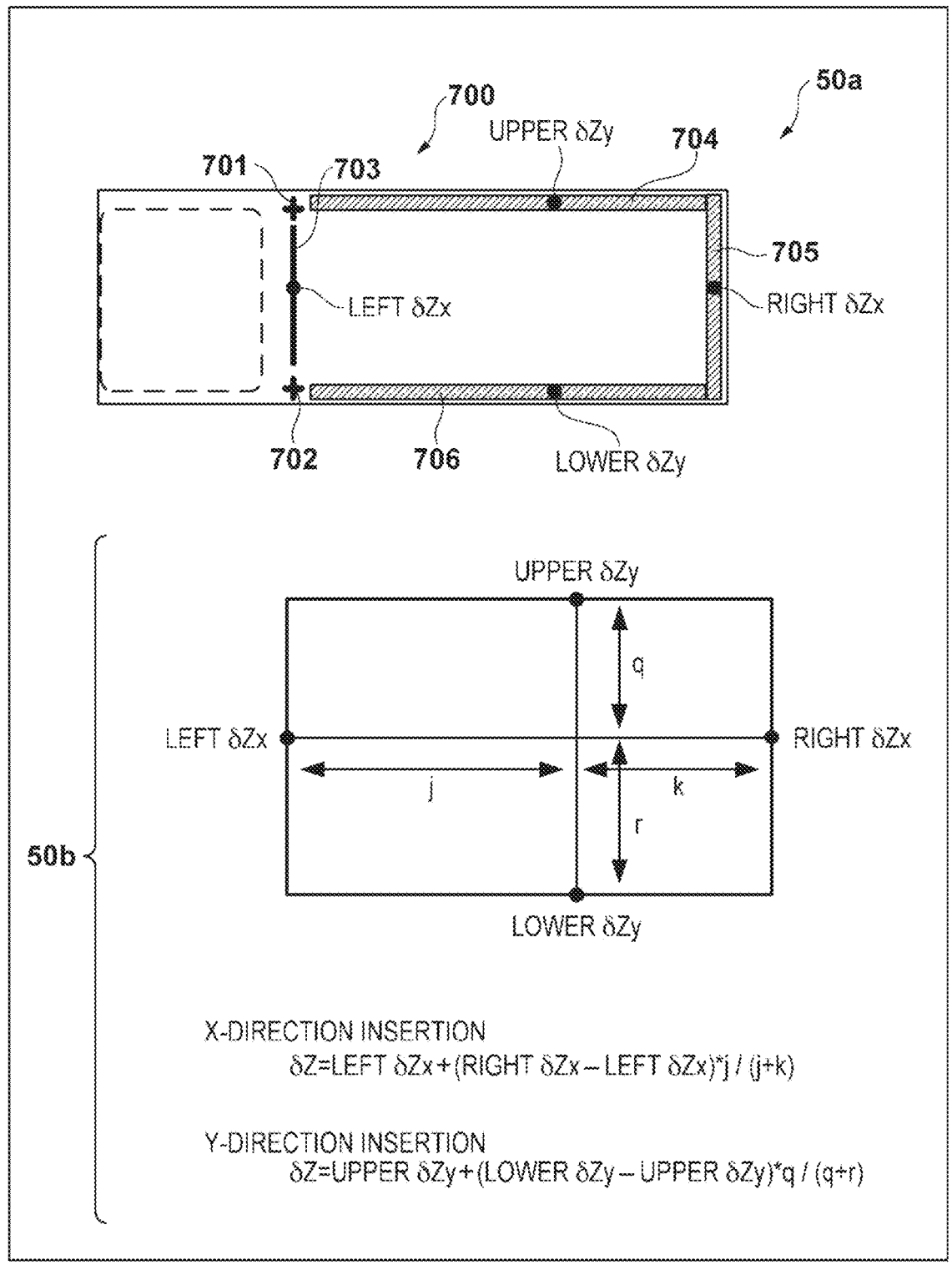

[Fig. 51]
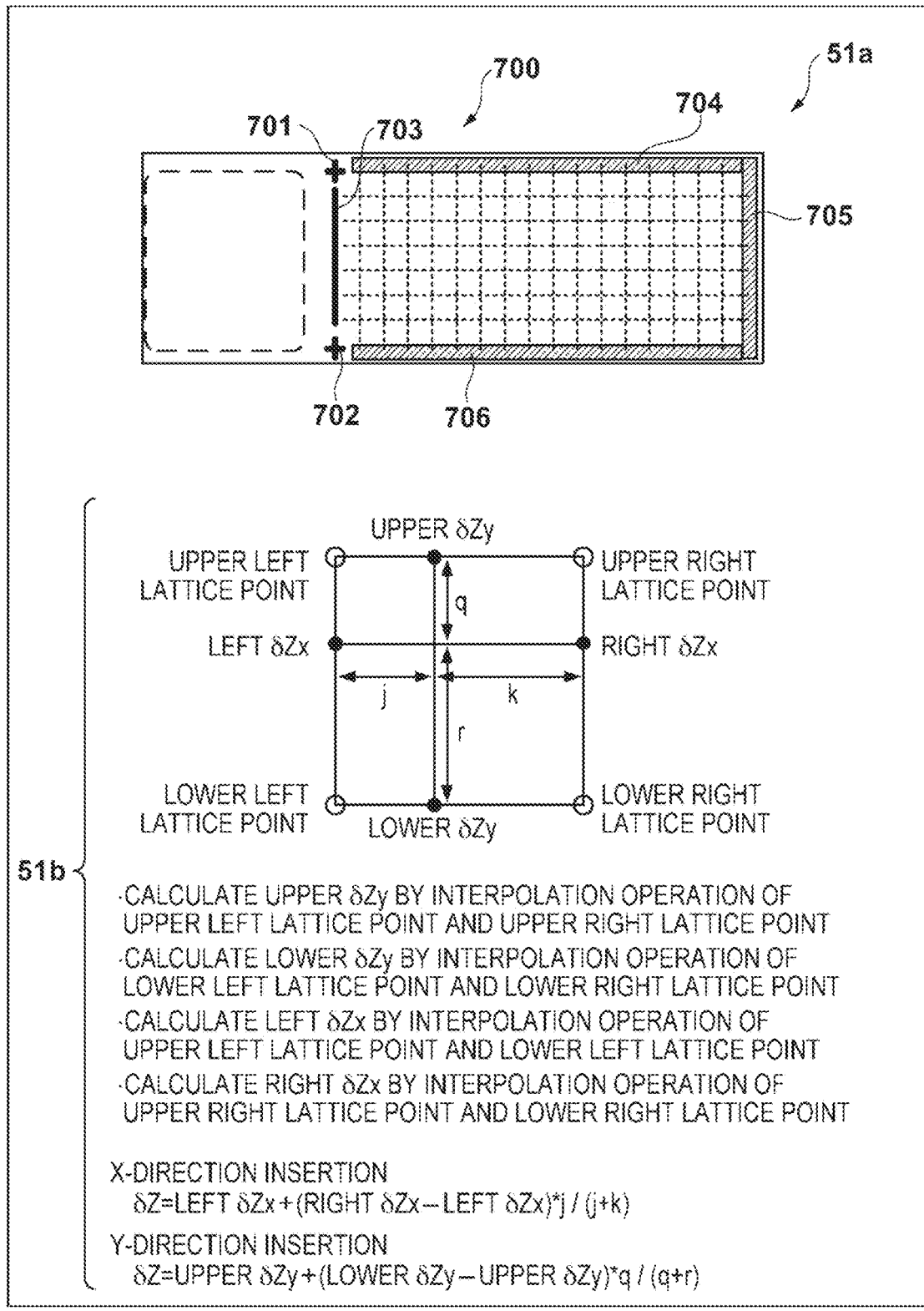

[Fig. 52]
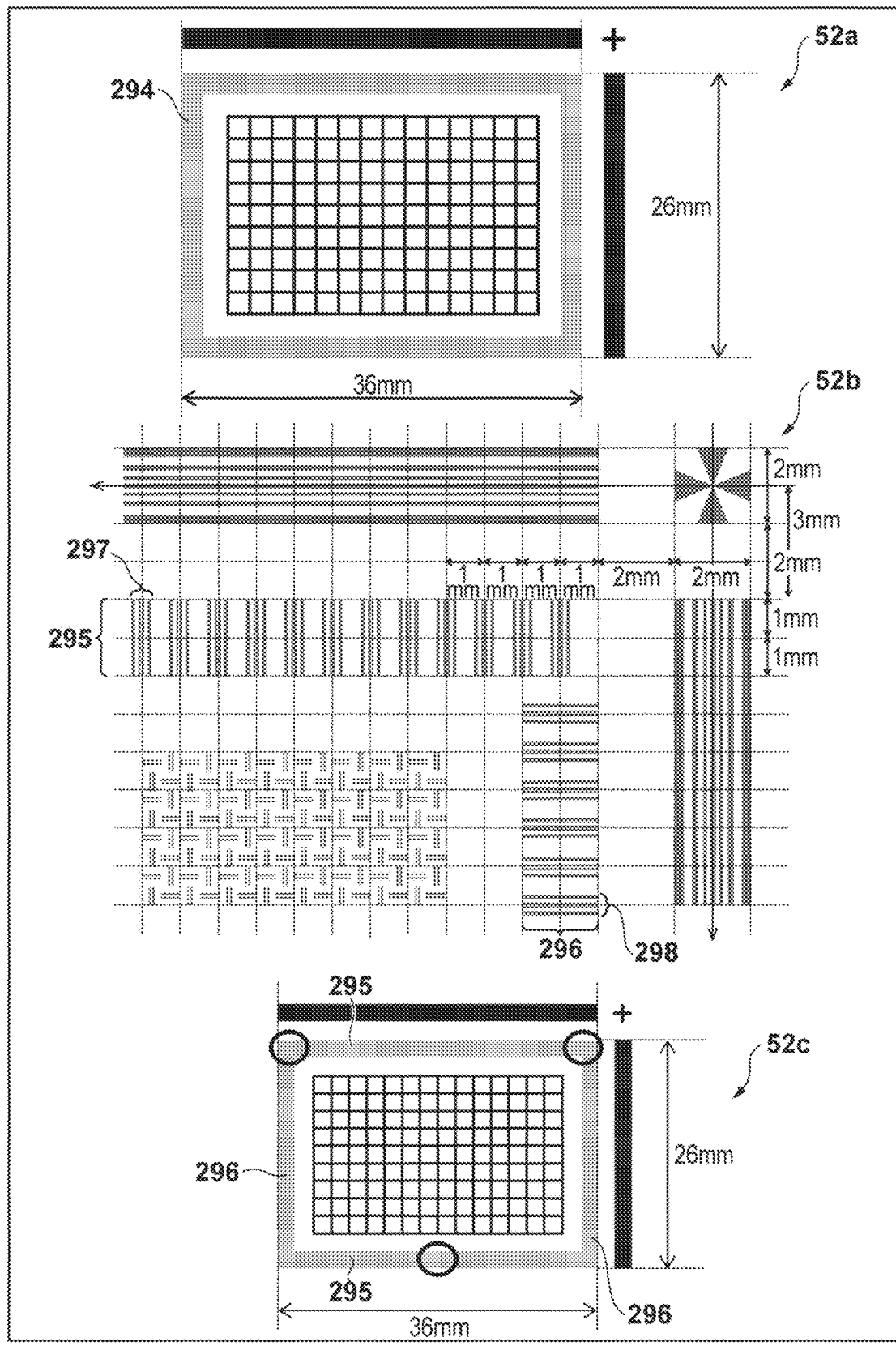

MICROSCOPE SYSTEM AND METHOD OF CONTROLLING THE SAME

TECHNICAL FIELD

The present invention relates to a microscope system and a method of controlling the same.

BACKGROUND ART

The incidence rate of cancer has recently shown a tendency to greatly increase. To treat cancer, pathological diagnosis for diagnosing properties of cancer is important, and a treatment policy is determined depending on the diagnosis contents. As for the growth mechanism of cancer, it has been understood that cancer is caused by genes. A tumultus that has occurred in a gene appears as an atypical intracellular morphology, atypical cell morphology, atypical tissue morphology, or the like. It is morphological diagnosis in pathological diagnosis that observes these atypical shapes by a microscope and determines the atypism caused by cancer (tissue type).

On the other hand, recent medical advances have revealed that overexpression of a specific protein coded by an oncogene is often observed in a cancer cell. Characteristics of cancer can be specified by detecting the excessive protein. The protein is detected by, for example, specifically staining the target protein and observing the degree of staining of a tissue on a cell basis using a microscope. This method determines a functional feature of cancer and is called functional diagnosis in pathological diagnosis.

In both of the above-described morphological diagnosis and functional diagnosis, it is essential to observe the micro-level fine structure of a tissue slice in detail using a microscope (to be referred to as micro observation or micro diagnosis hereinafter). An optical microscope is a particularly important tool for a pathologist. In micro diagnosis by the naked eye using a microscope, it is often necessary to record finding images that are important as evidence. Hence, a digital camera is mounted on the optical microscope and used to record finding images. A digital scanner or digital microscope incorporating a digital camera (image sensor) is also usable. In addition to the microscope, the digital camera that provides an imaging function is also being included in the tools important for the pathologist. For example, a digital microscope incorporating a digital camera (image sensor) (Japanese Patent No. 4600395) can easily capture an evidence image as needed during the process of diagnosis. Hence, the digital microscope is very convenient and is desired to be used not only for cancer but widely in pathological diagnosis.

Generally, in pathological diagnosis by a pathologist, morphological diagnosis of a tissue slice is conducted in accordance with a procedure to be described below. In screening performed first in morphological diagnosis, a slide glass (to be referred to as a slide hereinafter) on which a tissue slice that has undergone general staining (HE staining) is placed is observed by a microscope at a low magnification (low-magnification observation), thereby specifying a morbid portion called a region of interest (ROI). The specified ROI is observed at a high magnification (high-magnification observation), thereby making detailed diagnosis.

When the wavelength is, for example, 550 nm, the focal depths of a 4× objective lens and a 10× objective lens used in low-magnification observation are about 21 µm and about 3.5 µm, respectively. These focal depths are much larger than or almost equal to the thickness (3 to 5 µm) of a tissue slice of an observation object. For this reason, the pathologist can conduct the screening only by moving the XY stage (slide) of the microscope. On the other hand, in high-magnification observation, a 20× objective lens, a 40× objective lens, or a 100× objective lens is used. In this case, when the wavelength is, for example, 550 nm, the focal depths are about 1 µm in the 20× objective lens, about 0.6 µm in the 40× objective lens, and about 0.3 µm in the 100× objective lens. In the high-magnification observation, the focal depths are considerably smaller than the thickness (3 to 6 µm) of the tissue slice of the observation object. Hence, in the high-magnification observation of diagnosis after the screening, the tissue slice of the observation object needs to be moved in the Z direction. The pathologist observes the tissue slice while moving the Z stage in addition to the XY stage.

The movement of the Z stage in the high-magnification observation is necessary not only for the above-described detailed observation of the tissue slice in the thickness direction but also from the viewpoint to be described below. That is, the perpendicularity of the observation surface of the XY stage of the microscope with respect to the optical axis is determined by the mechanical accuracy of the microscope. Normally, there can exist a tilt of about 50 µm at worst in the slide movable range (for example, 76 mm). Even in the range of a tissue slice size (for example, 27 mm), a tilt of about 20 µm can exist at worst. Note that in this specification, "tilt" indicates a moderate waving or moderate slant of a surface (the flatness or parallism is not 0). A slide glass on which a tissue slice is placed also has a tilt of, for example, about 20 µm at worst. For this reason, when the XY stage is moved, the Z position of the tissue slice moves in accordance with the tilt amount of the XY stage or the slide, and the tissue slice shifts from the focus position. Hence, the operation of the Z stage is important. The pathologist repetitively conducts observation using a low magnification and a high magnification while moving the observation field, that is, while moving the XY and Z stages (slide) of the microscope.

In addition, the pathologist screens the specimen placed on the slide as a whole at a low magnification, and memorizes/records the position of the stage at which the part (ROI) that needs detailed observation has been observed. After ending the screening at the low magnification, the pathologist searches for the observation position of the ROI based on the memorized/recorded XY stage position, switches the magnification to the high magnification, and makes a diagnosis while moving the XY stage and the Z stage. Alternatively, the pathologist may use a procedure of immediately observing, at the high magnification, the ROI found by the low-magnification screening.

On the other hand, in functional diagnosis, normally, functional staining (for example, functional staining by immunohistochemical staining in contrast to morphological staining in morphological diagnosis) is performed for continuous tissue slices having a specific finding in morphological diagnosis, and the tissue slices are observed by the microscope. That is, morphological information and functional diagnosis information are compared and observed between slides. For this reason, in functional diagnosis, it is useful in terms of diagnosis to accurately align a morphological image by general staining (HE staining) and (a plurality of) functional images by functional staining, superimpose the images, and compare and observe a morphological atypism and a function change. In morphological diagnosis as well, it is useful in terms of diagnosis to accurately align the morphological images of a plurality of slides created from a plurality of adjacent slices, display the morphological images that are superimposed, and observe a thickness-direction change in the tissue.

In the microscope system, however, it is impossible to reproduce an observation position or a three-dimensional (XYZ) position of still image capturing at an accuracy capable of standing up to pathological diagnosis. For example, in the above-described morphological diagnosis, after the diagnosis at the high magnification ends, the observation position needs to be returned to the position in the low-magnification screening immediately before. Hence, the position (XY position) of the XY stage immediately before needs to be memorized. That is, the pathologist specifies the observation position of the ROI based on the memory of the manual operation amount in operating the XY stage and the memory of a corresponding observation image. Additionally, to observe the ROI at the high magnification again for reconfirmation from the screening portion at the low magnification, the operation of the Z stage (Z position) is necessary in addition to the operation of the XY stage (XY position). In this case as well, it is necessary to rely on the memory of the manual operation amount and the memory of the corresponding observation image. In particular, the Z stage needs to be operated at various XY positions because of the tilt that exists on the XY stage and the slide surface. Since the Z stage operation count is excessive, the burden on the pathologist is heavy. Note that if the tilt does not exist, the tissue slice can be moved in the same Z plane by moving the XY stage, and the operation of the Z stage along with the movement of the XY stage is unnecessary.

This is because the general microscope system includes no means for grasping the coordinates of an observation position easily at a necessary accuracy. For example, if the accompanying XY stage is a manual stage, the coordinate obtaining means is formed from, for example, a main scale and a subscale, like a vernier caliper. However, it is not easy to read coordinate values from the positional relationship between the main scale and the subscale. In addition, the minimum reading accuracy is about 1/10 mm, which is too coarse in micro observation. In addition, if the accompanying Z stage is a manual stage, the coordinate obtaining means is formed from, for example, scales notched in a coarse moving knob and a fine moving knob. However, it is not easy to read coordinate values from the positional relationship between the coarse moving knob and the fine moving knob. In addition, the minimum reading accuracy is about 1/10 mm, which is too coarse in micro observation, like the XY position.

A motor-driven XY stage includes, for example, an X stage that moves in the X direction, and a Y stage that is provided on the X stage and moves in the Y direction. Each of the X stage and the Y stage includes a linear encoder configured to measure a moving amount in a corresponding direction. In this case, a position in the X direction is obtained from the linear encoder of the X stage, and a position in the Y direction is obtained from the linear encoder of the Y stage. Then, the X- and Y-coordinate values of the Y stage on which a slide is placed are obtained based on both pieces of position information. With the indirect measurement method of separately obtaining the X- and Y-direction positions, it is difficult to obtain position information of an accuracy required for pathological diagnosis because of coordinate errors caused by, for example, mechanical errors of the X and Y stages.

In a motor-driven Z stage, for example, a linear encoder is incorporated in the microscope base stand of the microscope to which the Z stage is attached. Hence, obtained position information in the Z direction is only usable to grasp the Z-direction moving amount of the Z stage itself, and does not represent the Z position of a certain observation position. In addition, the Z stage moving mechanism itself aims at vertically moving the XY and Z stages which may weigh, for example, about 5 kg in total within the movable range of about 5 cm, and is barely able to ensure a reproducibility of 10 to 100 μm as a moving accuracy. Hence, for example, the minimum size of a region of interest (ROI) in pathological diagnosis is about 1 μm, and the position management accuracy necessary to reproduce the observation position is needed to be about 1 μm, probably. However, there exists no microscope system including XY and Z stages that meet the position management accuracy.

In microscopic observation (high-magnification observation) using a high-magnification objective lens, the focal depth is smaller than the thickness of a tissue slice. For this reason, even in a case in which the accuracy of the stage in the XY and Z directions is ensured, if a tilt exists on the XY plane in which the stage moves (the normal direction of the XY plane does not align with the optical axis direction of the microscope), the position in the Z direction changes as the stage is moved in the X or Y direction. Hence, if the tilt of the XY plane changes on a microscope basis, the position in the Z direction cannot correctly be reproduced, and a different image (an image at a different Z direction) is observed even if the positions in the XY and Z directions can correctly be controlled.

Hence, the general microscope system conventionally does not include a means for correcting the tilt of the XY stage and the tilt of a slide as an assumption for reproduction of a position in the Z direction and a means for grasping the coordinates of an observation position in the Z direction easily at a necessary accuracy.

SUMMARY OF INVENTION

An embodiment of the present invention has been made in consideration of the above-described problems, and provides a microscope system capable of managing the position of the stage surface of a microscope in the optical axis direction at an accuracy required for pathological diagnosis by adjusting the slant of the stage surface with respect to the optical axis direction.

According to one aspect of the present invention, there is provided a microscope system comprising: an observation optical system including an objective lens; an XY stage including an XY plane along an X-axis direction and a Y-axis direction and capable of moving the XY plane in the X-axis direction and the Y-axis direction; first change means for changing a slant of the XY plane with respect to an optical axis direction of the objective lens; second change means for changing a slant of a slide placed on the XY stage with respect to the XY plane; and control means for performing first control of changing the slant of the XY plane by the first change means based on a first mark arranged on the XY plane at a position observable by the observation optical system and second control of changing the slant of the slide with respect to the XY plane by the second change means based on a second mark arranged on the slide.

According to another aspect of the present invention, there is provided a method of controlling a microscope system including: an observation optical system including an objective lens; an XY stage including an XY plane along an X-axis direction and a Y-axis direction and capable of moving the XY plane in the X-axis direction and the Y-axis direction; first change means for changing a slant of the XY plane with respect to an optical axis direction of the objective lens; and second change means for changing a slant of a slide placed on the XY stage with respect to the XY plane, the method comprising: changing the slant of the XY plane by the first change means based on a first mark arranged on the XY plane at a position observable by the observation optical system; and changing the slant of the slide with respect to the XY plane by the second change means based on a second mark arranged on the slide.

Further features of the present invention will become apparent from the following description of exemplary embodiments with reference to the attached drawings.

BRIEF DESCRIPTION OF DRAWINGS

FIG. 1 is a perspective view showing a microscope system according to an embodiment.

FIG. 2 shows views illustrating the outline of the arrangement of the optical system of the microscope system according to the embodiment.

FIG. 3 shows a view illustrating the outer appearance of the microscope system (3a), a view for explaining the mounted state of a ΔZ stage (3b), and a view for explaining a Z scale and a Z sensor (3c).

FIG. 4 is a view for explaining mounting of the ΔZ stage on a Z base and placement of a stage.

FIG. 5 shows views for explaining the structure of the lift unit of the ΔZ stage (5a to 5e).

FIG. 6 shows views for explaining mounting of the ΔZ stage on the stage (6a to 6c).

FIG. 7 shows a view illustrating the outer appearance of the stage mounted in a microscope according to the embodiment (7a), a view illustrating the upper surface of the stage (7b), and an enlarged view of a portion of an area scale (7c).

FIG. 8 shows a side view illustrating a position management plane stage (X stage) (8a) and views for explaining the positional relationship between an XY two-dimensional scale plate and X- and Y-axis sensors (8b and 8c).

FIG. 9 shows views illustrating the positional relationship between X and Y area scales, X- and Y-axis sensors, and skew detecting sensors (9a and 9b).

FIG. 10 shows views illustrating the positional relationship between the X and Y area scales, the X- and Y-axis sensors, and the skew detecting sensors (10a and 10b).

FIG. 11 shows views for explaining an XY crosshatch provided on the XY two-dimensional scale plate (11a and 11b).

FIG. 12 shows views for explaining the XY crosshatch provided on the XY two-dimensional scale plate (12a to 12c).

FIG. 13 shows views illustrating the mounted state of a ΔΘ stage on the position management plane stage (13a and 13b).

FIG. 14 shows views for explaining the arrangement of the ΔΘ stage (14a to 14c).

FIG. 15 shows views illustrating the structure of the lift unit of the ΔΘ stage (15a to 15e).

FIG. 16 shows views for explaining mounting of the ΔΘ stage on the position management plane stage (16a to 16c).

FIG. 17 shows views for explaining rotation correction by the ΔΘ stage (17a and 17b) and a view for explaining rotation of a slide placed on the ΔΘ stage (17c).

FIG. 18 shows views illustrating the position management plane stage (18a and 18b).

FIG. 19 shows views illustrating a Y stage (19a and 19b).

FIG. 20 is a view showing a stage base.

FIG. 21 is a view for explaining an adapter unit used to mount a camera.

FIG. 22 shows views for explaining a ΔC adapter (22a and 22b).

FIG. 23 shows a view illustrating a slide glass (23a) and views showing the reference marks of the slide glass (23b and 23c).

FIG. 24 shows a view illustrating another example of the slide glass (24a) and a view for explaining focus reference marks (24b).

FIG. 25 is a block diagram showing an example of the control arrangement of the microscope system according to the embodiment.

FIG. 26 is a block diagram showing an example of the control arrangement of the microscope system according to the embodiment.

FIG. 27 is a flowchart showing the overall operation of the microscope system according to the embodiment.

FIG. 28 is a flowchart showing the initialization operation of each portion of the microscope system.

FIG. 29 is a flowchart showing tilt correction processing for the XY stage.

FIG. 30 is a flowchart for explaining a correction operation by the ΔC adapter.

FIG. 31 shows views for explaining rotation correction between an image sensor and a stage (31a to 31e).

FIG. 32 is a flowchart showing a stage origin detection operation.

FIG. 33 shows views for explaining the stage origin detection operation (33a and 33b).

FIG. 34 is a flowchart showing tilt correction processing for a slide.

FIG. 35 is a flowchart for explaining a correction operation by the ΔΘ stage.

FIG. 36 shows views for explaining rotation correction between the image sensor and the slide (36a to 36c).

FIG. 37 is a flowchart showing an operation of detecting the origin of the slide.

FIG. 38 shows views for explaining the slide origin detection operation (38a to 38e).

FIG. 39 is a flowchart for explaining processing of measuring the δZ distribution on a slide surface.

FIG. 40 is a flowchart for explaining generation and recording of an image file.

FIG. 41 is a view showing an example of the data structure of an image file.

FIG. 42 is a flowchart showing processing of synchronizing a display and an observation position on a stage.

FIG. 43 is a view for explaining synchronization between a display and an observation position on a stage.

FIG. 44 shows views for explaining the influence of a rotational shift between the X- and Y-axes of a captured image and the X- and Y-axes of the stage (44a and 44b).

FIG. 45 shows views for explaining skew processing according to the embodiment (45a and 45b).

FIG. 46 shows views for explaining skew processing according to the embodiment (46a and 46b).

FIG. 47 shows views for explaining skew processing according to the embodiment (47a and 47b).

FIG. 48 is a flowchart for explaining processing upon switching an objective lens.

FIG. 49 shows a view illustrating a cover glass with focus reference marks (49a), a view for explaining a method of obtaining the thickness of a tissue slice using the cover glass with focus reference marks (49b), and a view for explaining the relationship between the cover glass and a focus position (49c).

FIG. 50 shows views for explaining calculation of the δZ distribution (50a and 50b).

FIG. 51 shows views for explaining calculation of the δZ distribution (51a and 51b).

FIG. 52 shows views for explaining the focus reference marks used to correct the tilt of the ΔZ stage (52a to 52c).

DESCRIPTION OF EMBODIMENTS

An embodiment of the present invention will now be described with reference to the accompanying drawings. Note that an erect-type microscope used for pathological diagnosis, which includes an objective lens arranged above an observation object (slide) and performs transmitted light observation by projecting observation light from the lower surface of the slide, will be described below as an embodiment of the present invention.

An observation position management microscope system according to this embodiment can manage an observation position at a predetermined accuracy required for pathological diagnosis and correctly reproduce a past observation position. For this purpose, the observation position management microscope system uses a slide with references for position management, and also includes an accurate XY stage with a means for, when a slide is placed, correcting a rotational error of the placed slide. In addition, the XY stage has a function of directly grasping the X- and Y-coordinate values of an observation position, and includes a means for correcting, for example, an error of the relative positional relationship to a mounted digital camera (image sensor) or the like. In addition, the observation position management microscope system according to this embodiment corrects the tilt of the XY stage or the slide to the digital camera, and implements management at a predetermined accuracy required for pathological diagnosis even for an observation position in the height direction (the Z direction or the optical axis direction of the digital camera).

The predetermined accuracy required for pathological diagnosis may be the minimum size of a region of interest (ROI). Structures in a cell are distributed within a range on the micron or submicron order. An atypism observed here can be assumed to be an ROI in a minimum size obtained by pathological diagnosis. On the other hand, with a normally used objective lens for visible light, the resolution at a magnification of 100× is about 0.2 μm (green light: 550 nm). When an objective lens for ultraviolet light is used, the resolution can be raised to about 0.1 μm (ultraviolet light: 200 nm). Hence, the minimum size of an observable ROI in the X and Y directions is, for example, 10 times larger than the ultraviolet resolution limit of 0.1 μm, that is, 1 μm square. Hence, the target position management accuracy in the X and Y directions is 0.1 μm equal to the resolution limit. Coordinate management is done at, for example, 1/10 of the accuracy, that is, in steps of 0.01 μm.

On the other hand, a 100× objective lens that can be considered to have the maximum magnification of an objective lens has a focal depth of about 0.3 μm for green light (550 nm). An objective lens for ultraviolet light has a focal depth of about 0.1 μm (ultraviolet light: 200 nm). That is, the minimum size of the ROI in the Z direction is, for example, 10 times larger than the focal depth (0.1 μm) of the objective lens for ultraviolet light resolution limit of 0.1 μm, that is, 1 μm. Hence, the target position management accuracy in the Z direction is 0.1 μm equal to the minimum focal depth. Coordinate management is done at, for example, 1/10 of the accuracy, that is, in steps of 0.01 μm. Hence, the minimum size of the ROI is the cube of 1 μm, the position management accuracy is the cube of 0.1 μm, and the coordinate management unit is, for example, 1/10 of the position management accuracy, that is, the cube of 0.01 m.

An observation position management microscope system that implements the position accuracy in a three-dimensional space including X and Y directions defining the moving plane of an XY stage that moves with a slide as an observation object of the microscope placed on it and a Z direction perpendicular to the moving plane will be described below. The observation position management microscope system according to this embodiment includes a predetermined support means for supporting even an existing slide without a reference for position management from the viewpoint of compatibility.

FIG. 1 is a perspective view showing the basic arrangement of an observation position management microscope system (to be referred to as a microscope system 10 hereinafter) according to this embodiment. The microscope system 10 includes a microscope body 100, a stage 200, an adapter unit 300 used to mount a camera, a digital camera 400, a control unit 500, and a ΔZ stage 900. The stage 200, the adapter unit 300, the digital camera 400, and the ΔZ stage 900 have arrangements and functions supporting position management according to this embodiment. The control unit 500 includes a controller 501 and a display 502. The controller 501 includes a CPU 511 and a memory 512 (see FIG. 25). The CPU 511 executes a program stored in the memory 512, thereby executing various kinds of processing to be described later. The controller 501 controls display on the display 502 serving as a display unit.

A microscope base stand 121 that constitutes the microscope body 100 is a solid body frame used to attach various structures of the microscope. An eyepiece base 122 is fixed to the microscope base stand 121 and connects an eyepiece barrel 123 (in this example, binocular). A light source box 124 stores a light source (for example, a halogen lamp or LED) for transmission observation and is attached to the microscope base stand 121. A Z knob 125 is a knob used to move a Z base 130 in the Z-axis direction (vertical direction). The ΔZ stage 900 that provides a position management function in the Z direction is mounted on the Z base 130, and the stage 200 that provides a position management function in the X and Y directions is placed on the ΔZ stage 900. The Z base 130 is mounted on the microscope base stand 121 by a Z-base moving mechanism 131 (see (2a) of FIG. 2) that moves the Z base 130 in the Z direction in accordance with the rotation of the Z knob 125. The ΔZ stage 900 corrects the tilt of the stage 200 with respect to the optical axis of the digital camera 400 or the optical axis of the lens of the microscope body, and implements accurate positioning of the observation position in the Z direction. Reference numeral 126 denotes an objective lens unit. There exist a plurality of types of units according to optical magnifications. A revolver 127 has a structure capable of attaching the plurality of types of objective lens units 126. By rotating the revolver 127, a desired objective lens unit can be selected for observation by the microscope.

The stage 200 includes a ΔΘ stage 600 that rotates about the Z-axis while having a slide (to be referred to as a slide 700 hereinafter) with position references placed on it, and an XY stage that moves the ΔΘ stage 600 with the slide 700 placed on it on an XY plane including the X direction and the Y direction. The ΔΘ stage 600 provides a function of correcting a rotational shift based on the position reference marks on the slide 700, and also provides a function of correcting the tilt of the surface of the slide 700 with respect to the optical axis of the digital camera 400 or the optical axis of the lens of the microscope body (to be simply referred to as an optical axis hereinafter). The stage 200 includes an XY two-dimensional scale plate 210 with accurate scales in the X and Y directions on the XY stage. An X knob 201 and a Y knob 202 are knobs used to manually move the stage 200 in the X direction and Y direction, respectively. A ΔZ knob 904 is a knob used to manually move the ΔZ stage 900 in the Z direction.

The adapter unit 300 is an adapter used to mount a camera, which functions as a mounting unit configured to mount the digital camera 400 on the eyepiece base 122 via a base mount 128. The adapter unit 300 has a function of performing axis alignment between the digital camera 400 and the base mount 128. The base mount 128 includes a predetermined mounting mechanism, for example, a screw mechanism with a positioning reference.

The digital camera 400 is detachably attached to the microscope body 100 via the adapter unit 300 and the base mount 128 while maintaining a predetermined positional relationship to the eyepiece base 122. The digital camera 400 captures a microscope image obtained by the microscope body 100. The digital camera 400 aims at evidence recording. The digital camera 400 is connected to the controller 501 via, for example, a USB interface cable 11, and captures an observed image under the microscope in accordance with an instruction from the controller 501. The captured observed image is displayed on the display 502 under the control of the controller 501. The imaging function of the digital camera 400 includes a still image capturing function and a live image capturing function of performing so-called live view that displays an output from an image sensor on a monitor in real time. The resolution of the live image capturing function is lower than that of the still image capturing function. The live image capturing function and the still image capturing function can transmit a captured image (a moving image or a still image) to an external apparatus via a predetermined interface (in this embodiment, a USB interface).

FIG. 2 shows schematic views for explaining the optical system of the microscope system 10 according to this embodiment. As shown in (2*a*) of FIG. 2, the light source box 124 stores a light source 141 for transmission observation, and a collector lens 142 that collects source light from the light source 141. A field stop 143 determines the illumination diameter on the slide. The source light that has passed through the field stop 143 passes through a mirror 144, a relay lens 145, an aperture stop 146, and a condenser lens 147 and irradiates a specimen (tissue slice) on the slide. The light transmitted through the specimen on the slide glass enters an objective lens 148 in the objective lens unit 126. The light that has passed through the objective lens 148 reaches a split prism 150 via an imaging lens 149. Note that each of the collector lens 142, the relay lens 145, the condenser lens 147, the objective lens 148, and the imaging lens 149, and the like is normally formed from a combination of a plurality of lenses.

The split prism 150 is also called a beam splitter, and has a function of switching the optical path of an optical image from the objective lens 148 to an eyepiece optical system or an imaging optical system. For example, a reflecting prism for the eyepiece optical system and a straight prism for the imaging optical system are replaced by a push-pull rod. It is therefore possible to attain one of a state in which only imaging by the digital camera 400 (image sensor 401) is performed, and observation from the eyepiece barrel 123 cannot be done, and a state in which only observation from the eyepiece barrel 123 is performed, and imaging by the image sensor 401 cannot be done.

In place of or in addition to the above-described arrangement, a half mirror split prism that passes a half light amount to each of the eyepiece optical system and the imaging optical system may be arranged. In this case, a state in which both imaging by the image sensor 401 and observation from the eyepiece barrel 123 can be performed can be provided. When the split prism 150 is switched to the camera side, the light transmitted through the tissue slice forms an image on the image sensor 401 in the digital camera 400 via an adapter lens 301. The digital camera 400 including the image sensor 401 captures the image under the microscope.

The optical path of the eyepiece system is an optical path to the eyepiece barrel 123. In FIG. 2, (2*b*) is a view for explaining an example of the eyepiece optical system of the eyepiece barrel 123, which illustrates an example of a siedentopf binocular barrel. In (2*b*) of FIG. 2, the optical system on the right side is a left-eye optical system. A left-eye split prism 151 forms an image on an imaging plane 152 of the primary image of the left-eye system, and the image is observed by the user via a left-eye eyepiece 153. On the other hand, the optical system on the left side of (2*b*) in FIG. 2 is a right-eye optical system. A right-eye parallel prism 154 forms an image on an imaging plane 155 of the primary image of the right-eye system, and the image is observed by the user via a right-eye eyepiece 156.

Referring back to (2*a*) of FIG. 2, when the adapter unit 300 and the digital camera 400 are mounted, the adapter lens 301 and the image sensor 401 are arranged in the optical path of the imaging optical system. The adapter lens 301 is a lens incorporated in the adapter unit 300 attached to the eyepiece base 122, and is normally formed from a plurality of lenses. With the adapter lens 301, an observation image is formed on the imaging plane of the image sensor 401 disposed in the digital camera 400, and the microscope image can be captured by the digital camera 400.

The ΔZ stage 900 will be described next. In FIG. 3, (3*a*) is a perspective view of the microscope body 100 viewed from a direction different from that in FIG. 1. In FIG. 3, (3*b*) is a view showing the mounted state of the ΔZ stage 900 on the Z base 130. The microscope base stand 121 is provided with a Z scale 990 used to measure the Z-direction position of the Z base 130. The Z scale 990 is used to measure a moving amount by a Z sensor 991 mounted on a ΔZ base 901. The stage 200 is mounted on the Z base 130 of the microscope body 100 via the ΔZ stage 900. The ΔZ stage 900 is mounted on the Z base 130. As shown in (3*c*) of FIG. 3, the Z scale 990 includes a Z initial position mark 990*a* and a Z linear scale 990*b*. The Z sensor 991 includes a Z initial position sensor 991*a* and a Z-axis sensor 991*b*. The Z initial position sensor 991*a* detects the Z initial position mark 990*a*, and the Z-axis sensor 991*b* reads the Z linear scale 990*b*. Note that the Z linear scale 990*b* has the same pattern as that of an X area scale 211 ((7*c*) of FIG. 7, and the like) to be described later, and is formed as a linear scale with a narrower scale width. Like the X area scale 211, the Z linear scale 990*b* includes, for example, transmission parts and light-shielding parts, each of which is a line having a width of 2 μm. The transmission parts and the light-shielding parts are disposed in pairs at a pitch of 4 μm. Using the Z linear scale 990*b* and the Z-axis sensor 991*b*, a resolution of 10 nm (0.01 μm) or less and a position accuracy of 0.1 μm are implemented by, for example, a 1/2000 interpolation operation. Note that in this embodiment, incremental type position measurement is executed by the Z linear scale 990*b* and the Z-axis sensor 991b. However, absolute type position measurement may be performed. In the absolute type, the Z initial position mark 990a and the Z initial position sensor 991a can be omitted.

FIG. 4 is a view for explaining mounting of the ΔZ stage 900 on the Z base 130 and mounting of the stage 200 on the ΔZ stage 900. The Z base 130 and the ΔZ stage 900 are fixed by Z base attachment holes 902 provided in the ΔZ base 901 and screws 992. At this time, positioning pins 993 provided on the Z base 130 are fitted in positioning holes 903 of the ΔZ base 901, thereby improving the accuracy of the ΔZ stage 900 with respect to the Z base 130 in mounting. ΔZ lift units 910 configured to adjust the tilt of the stage 200 are mounted at a plurality of points, in this example, three points on the ΔZ base 901 of the ΔZ stage 900. A stage base 260 in the lowermost portion of the stage 200 is provided with spring hooks 995 configured to catch stage holding springs 917 of the ΔZ lift units 910. When the stage holding springs 917 of the three ΔZ lift units 910 are caught on the spring hooks 995 provided on the stage base 260, the stage 200 is pressed against the ΔZ stage 900. Spherical bearings 996 are press-fitted in the lower surface of the stage base 260 of the stage 200. In a state in which the stage 200 is pressed against the ΔZ stage 900 by the stage holding springs 917, lift pins 914 of the ΔZ lift units 910 are fitted in the spherical bearings 996 of the stage base 260. At this time, sensor plates 919 are inserted into sensor plate holes 997. Note that the stage 200 can also be fixed to the Z base 130 directly (without intervention of the ΔZ stage 900) using Z base attachment holes 902a and positioning holes 903a of the stage base 260. This aims at introducing an add-on ΔZ stage for providing a more advanced function. When a ΔZ motor 913 of a ΔZ lift unit 910 is driven, the lift pin 914 moves in the vertical direction. The slant of the XY plane of the stage 200 is controlled by vertically moving the lift pins 914 of the plurality of ΔZ lift units 910.

FIG. 5 shows views for explaining the structure of the lift unit 910. In FIG. 5, (5a) to (5c) are perspective views of the ΔZ lift unit 910, and (5d) is a sectional view of the ΔZ lift unit 910. A holder 911 is a support mechanism that plays the role of a housing to dispose each mechanism of the ΔZ lift unit 910. In this embodiment, the three ΔZ lift units 910 are arranged as shown in (Se) of FIG. 5. Of the lift pins 914 (ΔZ lift pins L1 to L3) of the three ΔZ lift units 910, two ΔZ lift pins (L1 and L2) are arranged on the microscope base stand side at an interval Rh in the X direction, and the remaining one ΔZ lift pin (L3) is arranged on the far end side with respect to the microscope base stand so as to form, for example, an isosceles triangle having a height Ri. A linear guiderail 915 is fixed to the holder 911. A slide block 916 is attached slidably with respect to the linear guiderail 915. A lift block 912 is fixed to the slide block 916 to be movable along the linear guiderail 915 together with the slide block 916. The lift block 912 is provided with the lift pin 914 that comes into contact with the spherical bearing 996 of the stage base 260.

The ΔZ motor 913 is fixed to the holder 911. A ball screw 918 is provided on the rotating shaft of the ΔZ motor 913. As the ΔZ motor 913, for example, an ultrasonic motor can be used. However, the present invention is not limited to this. A multilayered piezoelectric element may be used in place of the ΔZ motor 913. The lift block 912 includes a nut 918a that moves as the ball screw 918 rotates. With this structure, the lift block 912 can be moved along the linear guiderail 915 by rotating the ΔZ motor 913. The ΔZ motor 913, the ball screw 918, the nut 918a, the linear guiderail 915, and the slide block 916 constitute the linear driving mechanism of the lift block 912, which converts the rotation of the ΔZ motor 913 into the vertical movement of the lift block 912. The Z-direction position of the lift pin 914 can thus be moved to an arbitrary position. The stage holding spring 917 that is an elastic member has one end caught on a hold pin 921 provided on the holder 911 and the other end caught on the spring hook 995 provided on the stage base 260. The spherical bearing 996 is thus pressed against the lift pin 914, and the stage base 260 can be stabilized on the ΔZ base 901. In addition, the Z-direction position and the surface slant of the stage 200 can finely be adjusted by moving the lift pin 914 up and down. The sensor plate 919 on which a ΔZ sensor 920 configured to read a ΔZ scale 994 ((6b) and (6c) of FIG. 6) provided in the sensor plate hole 997 of the stage base 260 is mounted is fixed to the holder 911.

In FIG. 6, (6a) is a sectional view in a state which the ΔZ stage 900 is fixed to the stage base 260 by the stage holding springs 917. Note that (6a) of FIG. 6 shows the stage base 260 and a Y stage 240 of the stage 200, and a position management plane stage (X stage) is not illustrated. In FIG. 6, (6b) is a view showing details of the portion of the ΔZ lift unit 910 in the state in which the ΔZ stage 900 is fixed to the stage base 260. As described above, the ends of the stage holding spring 917 are connected to the spring hook 995 and the hold pin 921. The lift pin 914 is thus brought into contact with the spherical bearing 996, and the stage 200 is mounted on the ΔZ stage 900 to be movable in the Z direction. The sensor plate 919 is inserted into the sensor plate hole 997, and the ΔZ sensor 920 reads the ΔZ scale 994 provided on a wall surface of the sensor plate hole 997 of the stage base 260.

In FIG. 6, (6c) is a view showing an example of the ΔZ scale 994. The ΔZ scale 994 includes a ΔZ initial position mark 994a and a ΔZ linear scale 994b. Note that the Z-direction movable range of the stage base 260 by the lift block 912 is about ±2 mm with respect to the ΔZ initial position mark 994a as the center. However, the present invention is not limited to this, and ensuring a movable range necessary for adjustment of the tilt of the stage 200 suffices. The ΔZ sensor 920 includes a ΔZ initial position sensor 920a and a ΔZ-axis sensor 920b. The ΔZ initial position sensor 920a detects the ΔZ initial position mark 994a, and the ΔZ-axis sensor 920b reads the ΔZ linear scale 994b. Note that the initial position of the lift pin 914 of each ΔZ lift unit 910 is determined by the position of the ΔZ initial position mark 994a. The ΔZ linear scale 994b has the same pattern as that of the X area scale 211 ((7c) of FIG. 7, and the like) to be described later, and is formed as a linear scale with a narrower scale width. Like the X area scale 211, the ΔZ linear scale 994b includes, for example, transmission parts and light-shielding parts, each of which is a line having a width of 2 μm. The transmission parts and the light-shielding parts are disposed in pairs at a pitch of 4 m. Using the ΔZ linear scale 994b and the ΔZ-axis sensor 920b, a resolution of 10 nm (0.01 μm) or less and a position (management) accuracy of 0.1 μm are implemented by, for example, a 1/2000 interpolation operation.

The arrangement of the stage 200 will be described next. In FIG. 7, (7a) is a perspective view showing the arrangement of the stage 200 supporting position management. In (7a) of FIG. 7, a position management plane stage 220 serving as an X stage is located on the uppermost surface of the stage 200 and moves in the X direction on the Y stage 240. The XY two-dimensional scale plate 210 and the ΔΘ stage 600 are arranged and placed on the position management plane stage 220, and the slide 700 is placed on the ΔΘ stage 600. The Y stage 240 moves in the Y direction on the stage base 260. That is, in the stage 200, the stage base 260, the Y stage 240, and the position management plane stage 220 constitute an XY stage. As described with reference to FIG. 4, the stage base 260 is mounted on the ΔZ stage 900 fixed to the Z base 130 of the microscope body 100 to be movable in the vertical direction by the lift pins 914.

In FIG. 7, (7b) is a view showing the upper surface of the position management plane stage 220. As described above, the ΔΘ stage 600 and the XY two-dimensional scale plate 210 are disposed on the upper surface of the position management plane stage 220. An X area scale 211 having X-direction axis information used for position management when moving in the X direction, a Y area scale 212 having Y-direction axis information used for position management when moving in the Y direction, and an XY crosshatch 213 serving as an XY-axis alignment reference are formed highly accurately on the upper surface of the XY two-dimensional scale plate 210. Note that to form the references that implement accurate position management, a material having a very small thermal expansion coefficient, for example, synthetic quartz is used as the material of the XY two-dimensional scale plate 210, and the XY two-dimensional scale plate 210 is integrally formed.

Nanotechnology of a semiconductor exposure apparatus or the like is used to form the patterns of the X area scale 211, the Y area scale 212, and the XY crosshatch 213 of the XY two-dimensional scale plate 210. For example, the X area scale 211, the Y area scale 212, and the XY crosshatch 213 formed from sets of lines along the X- and Y-axes are integrally formed on a quartz wafer by the nanotechnology at an accuracy of 5 nm to 10 nm. Note that the X area scale 211, the Y area scale 212, and the XY crosshatch 213 can be formed by drawing using a semiconductor exposure apparatus, but nanoimprint is preferably used to implement low cost. After that, the wafer is cut into a predetermined shape by machining, thereby obtaining the XY two-dimensional scale plate 210. For this reason, the degree of alignment between the X- and Y-axes of the X area scale 211 and the X- and Y-axes of the XY crosshatch 213, the degree of alignment between the X- and Y-axes of the Y area scale 212 and the X- and Y-axes of the XY crosshatch 213, and the perpendicularity between the X-axis and the Y-axis can be formed on the nanometer order. Hence, the X-axis and the Y-axis of the XY crosshatch 213 can represent the X-axes and the Y-axes of the X area scale 211 and the Y area scale 212 at an accuracy of nanometer order. Note that the X area scale 211, the Y area scale 212, and the XY crosshatch 213 can also be individually separated or separately formed and disposed on the position management plane stage such that they hold a predetermined positional relationship. However, to implement this, an advanced alignment technique for correcting mechanical errors is needed, resulting in an increase in the cost.

The slide 700 is placed on the ΔΘ stage 600. As for the placement direction, the slide 700 is placed such that, for example, a label area 721 is located on the left side of an origin mark 701, and a cover glass area 722 that is a region to arrange the observation object and a cover glass is located on the right side of the origin mark 701, as shown in (7b) of FIG. 7. A region 205 indicated by a broken line is the observation object region of the microscope. The observation object region 205 is a range in which the center position of the objective lens 148 (or the center position (observation position) of the image sensor 401) moves relative to the XY stage. The observation object region 205 has a size to include the slide 700 and the XY crosshatch 213 with an allowance. This allows the slide 700 and the XY crosshatch 213 to be arranged in the observation object region 205 under any condition. That is, not only the slide 700 but also the XY crosshatch 213 are arranged to be captured by the digital camera 400 serving as an imaging unit.

In this embodiment, a crosshatch origin on the XY crosshatch corresponds to the upper right corner of the observation object region 205. In addition, a state in which the center of the objective lens 148 (or the center (observation position) of the image sensor 401) aligns with the crosshatch origin is defined as the XY coordinate origin of the stage 200. However, another point may be defined as the XY coordinate origin of the stage, as a matter of course. The XY coordinate origin of the stage and the initialization position of the stage mechanism are not always the same. Note that the X-axis and the Y-axis of stage coordinates, that is, a stage X-axis 203 and a stage Y-axis 204 are parallel to the X- and Y-axes of the XY crosshatch 213, respectively.

In FIG. 7, (7c) shows an example of the scale pattern of the X area scale 211. The X area scale 211 is formed as a transmission diffraction grating including transmission parts and light-shielding parts in the X direction to detect a position. For example, each of the transmission parts and the light-shielding parts is a line having a width of 2 μm. The transmission parts and the light-shielding parts are disposed in pairs at a pitch of 4 μm. Note that the scale pattern may be a phase grating that has step differences so as to periodically change the optical path length.

In FIG. 8, (8a) is a view showing the Z-direction positional relationship between the slide 700 and the X area scale 211, the Y area scale 212, and the XY crosshatch 213 on the XY two-dimensional scale plate 210. As shown in (8a) of FIG. 8, the position management plane stage 220 and the ΔΘ stage 600 are designed such that the upper surface of the slide 700 and that of the XY two-dimensional scale plate 210 become flush with each other at a predetermined accuracy. Hence, the upper surface of the AU stage 600 is lower than the upper surface of the XY two-dimensional scale plate 210 by an amount corresponding to the thickness of the slide 700. As described above, in this embodiment, the upper surface of the XY two-dimensional scale plate 210 (the surface on which the X area scale 211, the Y area scale 212, and the XY crosshatch 213 are arranged) and the upper surface of the slide 700 are aligned with each other (almost flush with each other). The Z-direction positions of the marks (patterns) arranged on the XY two-dimensional scale plate 210 can thus be aligned with those of the marks (patterns) provided on the slide 700. This makes it possible to accurately manage the XY position of the observation surface, that is, the upper surface portion of the slide 700 based on the external position references (the X area scale 211 and the Y area scale 212). Since the XY crosshatch 213 represents the X area scale 211 or the Y area scale 212, it is important that the XY crosshatch 213 is located on the same plane as these area scales. Note that from the viewpoint of implementation, the upper surface of the XY two-dimensional scale plate 210 (the surface on which the marks are arranged) and the upper surface of the slide 700 need only exist within the range of about 0.5 mm in the Z direction.

The scale pattern of the X area scale 211 or the Y area scale 212 is read by a detection sensor (an X-axis sensor 271 or a Y-axis sensor 272) fixed to the stage base 260, and the X- and Y-coordinates of the stage 200 are directly accurately obtained in correspondence with an observation position itself. That is, the microscope system does not use an indirect method in which a coordinate on one specific axis for each axis (X-axis or Y-axis) of the XY stage represents a coordinate value, for example, the coordinate values of the Y stage are obtained by combining position information in the X direction obtained from the linear encoder of the X stage and position information in the Y direction obtained from the linear encoder of the Y stage. In this embodiment, the movement of the position management plane stage (X stage) 220 that moves in the X and Y directions is directly measured by the XY two-dimensional scale plate 210. This allows the detection sensor to detect, for example, a small positional shift in the Y direction when the X stage 220 moves in the X direction or a small positional shift in the X direction when the Y stage 240 moves in the Y direction according to a mechanical play or error. Hence, the accuracy of position management can largely be improved. There are two methods concerning the Z-direction positional relationship between the X area scale 211 and the Y area scale 212 and the X-axis sensor 271 and the Y-axis sensor 272, as shown in (8b) and (8c) of FIG. 8. In (8b) of FIG. 8 that shows the first method, the X-axis sensor 271 and the Y-axis sensor 272 are arranged above the XY two-dimensional scale plate 210 (on the objective lens side). In this case, a light-shielding film 214 needs to be provided on the lower surface of the XY two-dimensional scale plate 210. In (8c) of FIG. 8 that shows the second method, the X-axis sensor 271 and the Y-axis sensor 272 are arranged under the XY two-dimensional scale plate 210 (on the side of the Z base 130). In this case, the light-shielding film 214 is provided on the upper surface of the XY two-dimensional scale plate 210. Note that the XY crosshatch 213 needs to be observed by the digital camera 400, the light-shielding film is not arranged at the position of the XY crosshatch 213.

In the first method, as shown in (8b) of FIG. 8, the X-axis sensor 271 and the Y-axis sensor 272 are implemented on the lower surface of a sensor attachment member 208 that hangs over the position management plane stage 220 via an L-shaped member 207 fixed to the stage base 260. The detection surfaces of the X-axis sensor 271 and the Y-axis sensor 272 face downward to read the X area scale 211 and the Y area scale 212 on the position management plane stage 220. In the second method, as shown in (8c) of FIG. 8, the X-axis sensor 271 and the Y-axis sensor 272, each having the detection surface facing upward, are implemented on the stage base 260 such that the detection surfaces are located at a predetermined height. The X-axis sensor 271 and the Y-axis sensor 272 on the stage base 260 located in the lowermost portion read, from the lower side via holes each formed in the Y stage 240 and the position management plane stage 220 and having a predetermined size, the X area scale 211 and the Y area scale 212 located in the uppermost portion.

Note that the X- and Y-direction arrangements of the X-axis sensor 271 and the Y-axis sensor 272 are common to the first and second methods. The attached position of the X-axis sensor 271 in the Y-direction is set on the X-axis passing through the field center (the center of the objective lens 148) of an observation field 170 (illustrated much larger than the size of the actual observation field) of the microscope, thereby ensuring the position detection accuracy in the X direction. The attached position of the Y-axis sensor 272 in the X-direction is set on the Y-axis passing through the center (the field center (the center of the objective lens 148)) of the observation field 170 (illustrated much larger than the size of the actual observation field) of the microscope, thereby ensuring the position detection accuracy in the Y direction. By the XY two-dimensional scale plate 210, the X area scale 211 and the Y area scale 212 used to obtain the X-coordinate and the Y-coordinate of the stage 200, and the XY crosshatch for axis alignment (to be described later) of the image sensor 401 are provided on the same surface of the same member. It is therefore possible to obtain the X and Y area scales having an accurate pitch and perpendicularity and the XY crosshatch that accurately aligns with the axial directions of the area scales and thus obtain accurate coordinates.

Note that in this embodiment, a skew detecting sensor 273 is provided so as to maintain the position management accuracy even if a small skew or meandering (complex skew) occurs in the position management plane stage 220. In the examples shown in (8b) and (8c) of FIG. 8, a skew is detected in the X-axis direction. The skew detecting sensor 273 is implemented at a predetermined interval in the Y direction of the attached position of the X-axis sensor 271. The longer the interval between the X-axis sensor 271 and the skew detecting sensor 273 is, the higher the accuracy is. Hence, the two sensors are arranged within the movable range of the stage as far as possible unless they are off the X area scale 211. Note that the skew may be detected in the Y-axis direction. In that case, the skew detecting sensor 273 is implemented at a predetermined interval in the X direction of the attached position of the Y-axis sensor 272. Since the orthogonality between the X area scale 211 and the Y area scale 212 is guaranteed to be accurate by the forming method, detecting a skew in one of the X and Y directions suffices.

Note that as each of the X-axis sensor 271 and the Y-axis sensor 272, a detection sensor described in Japanese Patent Application No. 2014-079401 by the same applicant is usable. When this detection sensor and an accurate area scale by nanotechnology are used, for example, a resolution of 10 nm (0.01 μm) or less is obtained by a ½₀₀₀ interpolation operation with respect to the accurate scale having a width of 2 μm and a pitch of 4 μm, and a position (management) accuracy of 0.1 μm can be implemented. This is merely an example, as a matter of course. Another commercially available detection sensor using an optical lens may be used as each of the X-axis sensor 271 and the Y-axis sensor 272, and a resolution of 10 nm (0.01 μm) or less and a position (management) accuracy of 0.1 μm may be implemented by a known interpolation operation. The scale shown in (7c) of FIG. 7 is an example of an incremental type. However, it may be an absolute type. That is, an encoder (scale and sensor) of any type is employable as long as a predetermined accuracy is obtained. Note that the Y area scale 212 has a scale pattern obtained by rotating the X area scale 211 by 90° around the Z-axis. The X area scale may include Y-axis information, or conversely, the Y area scale may include X-axis information.

In FIG. 9, (9a) and (9b) show the positional relationship between the X-axis sensor 271, the Y-axis sensor 272, and the skew detecting sensor 273 and the X area scale 211 and the Y area scale 212. This relationship is the same for both the sensor arrangement by the above-described first method and the sensor arrangement by the second method.

In FIG. 9, (9a) shows the positional relationship between the sensors and the scales in a case in which the observation position by the microscope, that is, the center of the observation field 170 (illustrated much larger than the size of the actual observation field) of the microscope is located at the crosshatch origin, that is, the XY coordinate origin (stage origin 206) of the stage. In this case, the position management plane stage 220 is located at the lower left end (the left end and the far end) with respect to the microscope base stand 121. On the other hand, (9b) of FIG. 9 shows the positional relationship between the sensors and the scales in a case in which the observation position by the microscope, that is, the center of the observation field 170 is located at the lower left corner of the observation object region 205. In this case, the position management plane stage 220 is located at the upper right end (the right end and the near end) with respect to the microscope base stand 121.

Sizes needed by the X area scale 211 and the Y area scale 212 can be known from (9a) and (9b) of FIG. 9. That is, the X area scale 211 needs a size obtained by adding a size to include the X-direction moving amount of the observation object region 205 with an allowance and the same size for skew detection, that is, a size about twice larger than the size of the observation object region 205, and the Y area scale 212 needs a size to include the Y-direction moving amount of the observation object region 205 with an allowance, that is, almost the same size as the observation object region 205.

However, when detecting a skew in the Y direction, the Y area scale 212 needs a size about twice larger than the size of the observation object region, and the X area scale 211 needs a size to include the X-direction moving amount of the observation object region 205 with an allowance.

If each of the X-axis sensor, the Y-axis sensor, and the skew detecting sensor includes a plurality of sensors, and detection is relayed by the sensors, the size of each area scale can be reduced. This enables downsizing of the position management plane stage 220. In FIG. 10, (10a) and (10b) show an example in which each sensor includes two sensors. Note that in this example, a plurality of sensors configured to do relay are arranged for each of the X-axis sensor and the Y-axis sensor. However, a plurality of sensors configured to do relay may be arranged for one of the X-axis sensor and the Y-axis sensor.

Referring to (10a) and (10b) of FIG. 10, an X-axis intermediate sensor 271a, a Y-axis intermediate sensor 272a, and a skew detecting intermediate sensor 273a are arranged at the intermediate positions (positions at which the X- and Y-direction moving amounts are halved) to the X-axis sensor 271, the Y-axis sensor 272, and the skew detecting sensor 273, respectively. In FIG. 10, (10a) shows a case in which the center of the observation field 170 is located at the crosshatch origin, that is, the stage origin 206. In FIG. 10, (10b) shows a case in which the center of the observation field 170 is located at the lower left corner of the observation object region 205. As is apparent from FIGS. 9 and 10, when relay by the intermediate sensors is performed, the X area scale 211 can have a size about ½ in the X direction, and the Y area scale 212 can have a size about ½ in the Y direction. That is, the X-axis sensor 271 and the X-axis intermediate sensor 271a are arranged at a predetermined interval along the X-axis direction, and the size of the X area scale 211 in the X-axis direction is slightly larger than the predetermined interval but can be made smaller than the moving range of the XY stage in the X-axis direction. This also applies to a case in which the Y-axis intermediate sensor 272a is provided. Hence, the size of the XY two-dimensional scale plate 210 can be reduced as compared to a case in which each of the X-axis sensor 271 and the Y-axis sensor 272 includes one sensor.

The XY crosshatch 213 provided on the XY two-dimensional scale plate 210 will be described next. In FIG. 11, (11a) and (11b) are views for explaining the pattern of the XY crosshatch 213. As shown in (11a) of FIG. 11, the XY crosshatch 213 includes four types of position reference marks, that is, a crosshatch 290, a crosshatch origin 291, a crosshatch X-axis 292, and a crosshatch Y-axis 293. The crosshatch X-axis 292 and the crosshatch Y-axis 293 are linear patterns extending in the X direction and the Y direction, respectively.

The crosshatch origin 291 is used as the stage origin 206 (the stage reference position used to obtain coordinates based on the stage origin) by setting (replacing) the center of the observation field 170 of the microscope located at the crosshatch origin 291 as the origin of the X- and Y-coordinates of the stage. Note that in FIG. 11 and the like, the observation field 170 is illustrated much larger than the size of the actual observation field. The center of the observation field 170 is the field center (the center of the objective lens 148), that is, the center of the image sensor 401. The stage origin 206 is located at the upper right corner of the observation object region 205 (the region in which the center of the objective lens 148 moves). The crosshatch 290, the crosshatch X-axis 292, and the crosshatch Y-axis 293 are the references of the X-axis and the Y-axis of the stage 200. The parts of the stage 200 are assembled so as to be aligned with the X-axis and the Y-axis of the XY crosshatch 213, or adjusted after assembled. That is, the parts are assembled such that the X and Y moving directions (the stage X-axis 203 and the stage Y-axis 204) of the stage 200 accurately align with the X and Y directions of the XY crosshatch 213. The X and Y moving directions of the stage 200 thus align with the X-axis direction of the X area scale 211 and the Y-axis direction of the Y area scale 212, respectively. The XY crosshatch 213 arranged at a position on the XY two-dimensional scale plate 210 observable by the digital camera 400 can thus be used for XY-axis alignment between the stage 200 and the image sensor 401 of the digital camera 400 as the reference of the X-axis and the Y-axis of the stage. Note that when attaching the stage 200 to the microscope body 100, the XY crosshatch 213 can also be used to align the X- and Y-axes of the stage 200 with the X- and Y-axes of the microscope base stand 121.

As will be described later, in the microscope system according to this embodiment, the X- and Y-axis directions of the stage 200 and the X- and Y-axis directions of the slide 700 placed on the stage 200 are accurately aligned via the image sensor 401. This enables universal position management without any influence of a positional shift that occurs when one slide is replaced and observed or a stage characteristic between different digital microscopes. More specifically, the X- and Y-axis directions of the stage 200 and those of the image sensor 401 are aligned based on an image (either a still image or a moving image) obtained by capturing the XY crosshatch 213 by the digital camera 400, and the X- and Y-axis directions of the slide 700 and those of the image sensor 401 are aligned based on an image (either a still image or a moving image) obtained by capturing the Y-axis mark of the slide 700 using the digital camera 400, thereby aligning the X- and Y-axis directions of the stage 200 with the X- and Y-axis direction of the slide 700 placed on the stage 200. Details of processing will be described later.

In FIG. 11. (11b) shows a detailed example of the dimensional relationship between the four marks, that is, the crosshatch origin 291, the crosshatch X-axis 292, the crosshatch Y-axis 293, and the crosshatch 290. The crosshatch X-axis 292 is a complex of a plurality of X-axis lines having different widths, and the crosshatch Y-axis 293 is a complex of a plurality of Y-axis lines having different widths. The crosshatch X-axis 292 and the crosshatch Y-axis 293 have axis information in the X-axis direction and axis information in the Y-axis direction, respectively. Note that the widths of the lines correspond to the objective lenses with a plurality of magnifications. That is, each of the crosshatch X-axis 292 and the crosshatch Y-axis 293 is formed from a plurality of lines with different widths. The plurality of lines are line patterns arranged to be symmetric with respect to the center line (X-axis or Y-axis). Note that the crosshatch 290 employs a pattern as shown in (11*b*) of FIG. 11 to avoid the lines in the X-axis direction and the lines in the Y-axis direction from intersecting, but may employ a general crosshatch pattern in which the lines in the X-axis direction and the lines in the Y-axis direction intersect, that is, a pattern as shown in (11*a*) of FIG. 11. The crosshatch origin 291 is arranged such that its center aligns with the intersection between the center line of the crosshatch X-axis 292 and that of the crosshatch Y-axis 293. In this embodiment, an X initial position mark 234 ((18*b*) of FIG. 18) and a Y initial position mark 253 ((19*b*) of FIG. 19) (both will be described later) are implemented at a predetermined accuracy according to the crosshatch origin 291.

In FIGS. 12, (12*a*) and (12*b*) show a more detailed example of the structure of the crosshatch Y-axis 293. In FIG. 12, (12*b*) is an enlarged view of the central portion of (12*a*) of FIG. 12. The crosshatch Y-axis 293 has a structure in which, for example, a plurality of pairs of lines with the same width are arranged to be symmetric with respect to the center line serving as the axis of symmetry while changing the width. Note that a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by the live image capturing function or the still image capturing function, and a predetermined accuracy is ensured in barycentric detection (to be described later). The crosshatch X-axis 292 has a structure obtained by rotating the crosshatch Y-axis 293 by 90°. The intervals of the center lines of the lines or spaces of the crosshatch X-axis 292 and the crosshatch Y-axis 293, the intervals of the boundaries (edges) between the lines and spaces, the widths of the lines or spaces, and the like are set to predetermined values and are useful as actual distance information. Each line may further be formed from an aggregate of pairs of fine lines and spaces. The width of the fine line is set to, for example, 1/10 or less of the width of the narrowest line out of the plurality of lines that form the mark (for example, 1 μm). This enables inclusion of finer actual distance information.

The crosshatch 290 is formed by, for example, arranging, in the X direction and the Y direction at a pitch of 1 mm, small crosshatches each including two X-axis lines and two Y-axis lines which are 0.5 mm long each and are alternately arranged within a 1 mm square. In FIG. 12, (12*c*) shows a detailed example of the structure of the small crosshatch. The 0.5 mm long X- and Y-axis lines of the small crosshatch are larger than the field size (for example, 0.37 mm) of a 40× objective lens. Only an X-axis line or Y-axis line can be observed in an appropriate width within the visual field, and accurate position information can be obtained by barycenteric detection. The crosshatch 290 is useful for adjustment or maintenance of the stage moving accuracy. The crosshatch 290 can also be used to measure a geometric distortion (mainly caused by the optical system of the objective lens) on the periphery of the observation field 170. The measured distortion can be used for distortion correction of a captured image. Note that the intervals between the reference marks included the XY crosshatch 213, the sizes of the reference marks, the structures of the reference marks, the intervals of the center lines of the lines or spaces of the reference marks, the intervals of the boundaries (edges) between the lines and spaces, the widths of the lines or spaces, and the like are set to predetermined values and are useful as actual distance information. Note that a general crosshatch pattern as shown in (11*a*) of FIG. 11 may be used as the small crosshatch. In this case, many variations are possible, and for example, the grid size may appropriately be selected, a plurality of crosshatches of different grid sizes may be provided, or the grid lines of the crosshatch may be formed from complex lines, like the crosshatch X-axis 292 and the crosshatch Y-axis 293. Note that as shown in (11*b*) of FIG. 11, all of the sizes of the reference marks, the distances between them, and the like are more than the field size of, for example, a 10× objective lens, that is, 1.5 mm. That is, to efficiently detect the mark positions, the position reference marks are disposed at intervals equal to or more than a distance equivalent to the field size (in this embodiment, equal to or more than the field size (1.5 mm) of the 10× objective lens) so as not to simultaneously observe adjacent position reference marks within the same visual field of the microscope. Note that the crosshatch origin 291 may also include fine lines (for example, white lines and black lines which are 1 μm wide each and are alternately arranged), like the crosshatch X-axis 292 and the crosshatch Y-axis 293.

Note that the XY two-dimensional scale plate 210 having the integral structure need not always be used if the X area scale 211, the Y area scale 212, and the XY crosshatch 213 can maintain the accuracy in the axial directions of the XY stage and the accuracy of the orthogonality between the X-axis direction and the Y-axis direction. However, if a structure in which the Y area scale configured to detect a Y-direction position is arranged on the Y stage, and the X area scale configured to detect an X-direction position is arranged on the X stage, like a general XY stage in which a linear (uniaxial) scale configured to detect a Y-direction position is arranged on the Y stage, and a linear (uniaxial) scale configured to detect an X-direction position is arranged on the X stage, is employed, an advanced machining technique and alignment technique are required to maintain the above-described accuracies. This may lead to an increase in the cost of the microscope.

The arrangement of the ΔΘ stage 600 disposed on the position management plane stage 220 will be described next with reference to FIGS. 13 to 17. The position management plane stage 220 is the stage in the uppermost portion of the stage 200, and moves the Y stage 240 configured to move in the Y direction in the X direction, thereby moving the Y stage 240 in the X and Y directions. The ΔΘ stage 600 includes a rotary stage 691 that rotates around the Z-axis around a rotation center 601. The ΔΘ stage 600 aims at correcting the rotational shift of the slide and the slant (tilt) of the upper surface of the slide with respect to the optical axis, which occur when placing the slide, without distinction between automatic loading and manual loading of the slide, and attaining the above-described target position management accuracy of ±0.1 m for the observation position in each of the X, Y, and Z directions of three dimensions.

In FIG. 13, (13*a*) is a perspective view of the position management plane stage 220 viewed from the upper surface side, and shows a state in which the ΔΘ stage 600 is incorporated in the position management plane stage 220. In FIG. 13, (13*b*) is a perspective view of the position management plane stage 220 viewed from the lower surface side, and shows a state in which the ΔΘ stage 600 is fixed to the position management plane stage 220 via dZ lift units 650.

As will be described later in detail, an attachment plate 651 of each dZ lift unit 650 is fixed to the position management plane stage 220 by screws 651a. In addition, spring holding plates 652 are fixed to the ΔΘ stage 600 by screws 652a, and a leaf spring 656 (FIGS. 15 and 16) is held between the spring holding plates 652 and the position management plane stage 220, thereby maintaining the pressed state of the ΔΘ stage 600 against the dZ lift unit 650. The ΔΘ stage 600 is thus mounted on the position management plane stage 220 via the dZ lift units 650.

In FIG. 14, (14a) and (14b) are perspective views of the ΔΘ stage 600 viewed from the lower surface side and the upper surface side (the side of the surface on which the slide 700 is placed), respectively. In (14a) and (14b) of FIG. 14, the ΔΘ stage 600 includes a ΔΘ base 692 and a ΔΘ cover 693, and has a structure in which the rotary stage 691 is mounted on the ΔΘ base 692. A dZ scale 640 is provided on a side surface of the ΔΘ cover 693. In FIG. 14, (14c) shows a state in which the ΔΘ cover 693 is removed from the ΔΘ stage 600. The rotary stage 691 is mounted on the ΔΘ base 692 to be pivotal around the rotation center 601, and pivots as a rotation driving mechanism 694 is driven. The ΔΘ base 692 is fixed to the position management plane stage 220 via the dZ lift units 650. As shown in (14c) of FIG. 14 and the like, the dZ lift units 650 connect the ΔΘ stage 600 and the position management plane stage 220 at a plurality of points, in this example, three points, and move the ΔΘ stage 600 independently in the Z direction. Of lift pins 654 (dZ1 to dZ3) of the three dZ lift units 650, two lift pins (dZ1 and dZ2) are arranged on the microscope base stand side at positions along the X-axis direction, and the remaining one lift pin (dZ3) is arranged on the far end side with respect to the microscope base stand so as to form an isosceles triangle. A dZ sensor 641 configured to read the dZ scale 640 is provided on the position management plane stage 220 at a position facing the dZ scale 640.

In FIG. 15, (15a) to (15d) are views showing the dZ lift unit 650 according to the embodiment. The attachment plate 651 extends to the lower surface of the position management plane stage 220, and is fixed to the position management plane stage 220 by the screws 651a. The spring holding plates 652 are fixed to the lower surface of the ΔΘ base 692 by the screws 652a. A motor flange 657 integrated with a dZ motor 653 is fixed to the attachment plate 651. The dZ motor 653 is thus fixed to the attachment plate 651. A lift pin guide 658 is fixed to the attachment plate 651 such that the leaf spring 656 as an elastic member and the motor flange 657 are sandwiched between them. The rotating shaft of the dZ motor 653 is provided with the lift pin 654 that comes into contact with a spherical bearing 655 press-fitted in the lower surface of the ΔΘ base 692. As described above, the dZ scale 640 is provided on a side surface of the ΔΘ stage 600, and the dZ sensor 641 is provided at a corresponding position on the position management plane stage 220.

As shown in (15e) of FIG. 15, the dZ scale 640 includes a dZ initial position mark 640a and a dZ linear scale 640b. The dZ sensor 641 includes a dZ initial position sensor 641a and a dZ-axis sensor 641b. The dZ initial position sensor 641a detects the dZ initial position mark 640a, and the dZ-axis sensor 641b reads the dZ linear scale 640b. By the dZ scale 640 and the dZ sensor 641, the moving amount of the ΔΘ stage 600 in the vertical direction is managed, and accurate tilt correction of the upper surface of the slide 700 is implemented. Note that the dZ linear scale 640b has the same pattern as that of the X area scale 211 ((7c) of FIG. 7, and the like), and is formed as a linear scale with a narrower scale width. Like the X area scale 211, the dZ linear scale 640b includes, for example, transmission parts and light-shielding parts, each of which is a line having a width of 2 µm. The transmission parts and the light-shielding parts are disposed in pairs at a pitch of 4 µm. Using the dZ linear scale 640b and the dZ-axis sensor 641b, a resolution of 10 nm (0.01 µm) or less and a position accuracy of 0.1 µm are implemented by, for example, a ½₀₀₀ interpolation operation. The Z-direction movable range of the ΔΘ stage 600 by the dZ lift unit 650 is about ±0.2 mm with respect to the dZ initial position mark 640a as the center. However, the present invention is not limited to this.

In FIG. 16, (16a) is a view showing a state in which the position management plane stage 220 and the ΔΘ base 692 are connected by the dZ lift unit 650. As described above, the attachment plate 651 is fixed to the position management plane stage 220 by the screws 651a. The spring holding plates 652 are fixed to the ΔΘ base 692 by the screws 652a. In FIG. 16, (16b) shows a section taken along a line F-F in (16a), and (16c) shows a section taken along a line E-E in (16a). When the ΔΘ base 692 is biased downward in the Z-axis direction by the leaf spring 656, the ΔΘ base 692 (spherical bearing 655) is pressed against the lift pin 654, and the ΔΘ stage 600 is stably fitted in the position management plane stage 220. The rotating shaft of the dZ motor 653 includes a screw portion 659. When the dZ motor 653 is driven, the lift pin 654 moves in the rotation axis direction. The lift pin 654 is brought into contact with the spherical bearing 655 incorporated in the lower surface of the ΔΘ base 692 by the biasing force of the leaf spring 656. When the lift pin 654 moves up and down (moves in the rotation axis direction of the dZ motor 653), the ΔΘ stage 600 moves up and down.

The arrangement and rotational shift correction of the rotary stage 691 of the ΔΘ stage 600 will be described next. The worst value of the rotational shift of the slide is assumed to be about ±0.5 mm at an end, which is equivalent to a rotational shift of about ±0.40 (±0.38°). This state is shown in (17c) of FIG. 17. To correct the rotational shift of the slide, the slide is rotated by the rotary stage 691 of the ΔΘ stage 600 and corrected to a vertical error (tangent error or TAN error) of ±0.1 µm (about ±0.1 millidegree) within the observable range (56 mm). Note that practically, if the vertical error can be suppressed to ±0.1 µm (about ±3 millidegrees) or less at the two ends of a 2 mm observation range, a level more than enough for pathological diagnosis is expected to be obtained. A range of about ±20 to ±30 is sufficient as the maximum movable range of the rotary stage 691.

In (17a) of FIG. 17, a slide holder 602 that defines the placement position of a slide is disposed on the rotary stage 691 of the ΔΘ stage 600, and the slide 700 with position references is placed. A lever 604 provided on the slide holder 602 has a function of pressing the slide 700 against reference positions 603 of the slide holder 602. The slide 700 is thus stably placed.

The rotary stage 691 can slidably rotate within the XY plane of the ΔΘ stage 600 around the rotation center 601 fixed to the ΔΘ base 692 as the rotation axis, and is rotated by the rotation driving mechanism 694. The rotation driving mechanism 694 is implemented in the ΔΘ stage 600, as shown in, for example, (17a) and (17b) of FIG. 17, and includes a ΔΘ driving motor 611, a screw shaft 612 of a ball screw, and a nut portion 613 of the ball screw. The screw shaft 612 is a member disposed at the distal end of the rotating shaft of the ΔΘ driving motor 611, and the nut portion 613 is a member that moves in the screw shaft direction in accordance with the rotation of the screw shaft 612 of the ball screw. When the ΔΘ driving motor 611 is rotated, the screw shaft 612 rotates, and a driving linear gear 614 attached to the nut portion 613 moves. For this reason, a driven arc gear 615 as the counterpart of fitting attached to an end of the rotary stage 691 moves. As a result, the rotary stage 691 rotates around the rotation center 601 together with the placed slide, and the rotational error of the slide is corrected. In FIG. 17, (17*b*) shows a state in which the slide 700 (rotary stage 691) is rotated clockwise by an angle θ from the state shown in (17*a*) of FIG. 17. Note that the rotational driving of the rotary stage 691 can be done not only by the above-described combination of a driving motor, a ball screw, and gears but also by, for example, ultrasonic driving using friction caused by a moving element and a driving motor.

In addition, a ΔΘ initial position mark 620 used for initialization at the time of activation is attached to the end of the rotary stage 691, and defines the initial position of the rotary stage 691. A ΔΘ initial position sensor 621 is provided on the side of the ΔΘ base 692 so as to face the ΔΘ initial position mark 620, and detects the initial position of the rotary stage 691 at the time of activation. If the initial position is used as a reference position in a case without a rotational shift of the slide, rotating the ΔΘ stage 600 within the range of, for example, ±20 to ±30 to each side of the reference position suffices. Control of the ΔΘ stage 600 will be described later.

The position management plane stage 220, the Y stage 240, and the stage base 260, which constitute the XY stage of the stage 200 according to this embodiment, will be described next in detail. Note that the structure of each stage in a case in which the sensor arrangement method (the method of arranging the X-axis sensor 271, the Y-axis sensor 272, and the skew detecting sensor 273 on the stage base 260) explained with reference to (8*c*) of FIG. 8 is used will be described below. However, the structures and the like in a case in which the sensor arrangement method shown in (8*b*) of FIG. 8 is used can also be known from the following explanation.

The position management plane stage 220 will be described first with reference to FIG. 18. In FIG. 18, (18*a*) is a top view of the position management plane stage 220 (viewed from the objective lens side), and (18*b*) is a bottom view of the position management plane stage 220 (viewed from the side of the Z base 130). In this embodiment, the position management plane stage 220 has the function of an X stage that moves in the X direction on the Y stage 240.

Openings 221 and 222 that allow the X-axis sensor 271, the Y-axis sensor 272, and the skew detecting sensor 273 to access the area scales are provided at positions corresponding to the X area scale 211 and the Y area scale 212 of the XY two-dimensional scale plate 210. The openings 221 and 222 have sizes to include the X area scale 211 and the Y area scale 212, respectively.

An opening 223 is provided in a range in which a condenser lens opening 224 relatively moves on the position management plane stage 220 when the center of the condenser lens opening 224 (having a size larger than the size of a condenser lens unit incorporating the condenser lens 147 so as to form an allowance) moves relative to the XY stage throughout the observation object region 205. Because of the opening 223, the condenser lens unit (the housing incorporating the condenser lens) never interferes with the position management plane stage 220 no matter where the position management plane stage 220 moves in the observation object region 205.

Two X-axis cross roller guides 231 are disposed on the lower side of the position management plane stage 220 so as to be parallel to the X-axis direction. X-axis cross roller guides 241 (FIG. 19) are attached to the upper surface of the Y stage 240 so as to face the X-axis cross roller guides 231. The position management plane stage 220 is thus supported by the Y stage 240 to be slidable in the X direction. An X slider 232 is the movable element of an X-axis driving motor 242 (FIG. 19) incorporated in the opposing surface of the Y stage 240. The position management plane stage 220 is driven in the X-axis direction by the X-axis driving motor 242. That is, the X-axis driving motor 242 and the X slider 232 form a linear motor by, for example, an ultrasonic wave.

An X-axis rack gear 233 moves the position management plane stage 220 in the X direction along with the rotation of an X-axis pinion gear 244 on the Y stage 240 that rotates in synchronism with the X knob 201. Note that the manual movement of the position management plane stage 220 in the X direction can be done not only by the rack and pinion but also by, for example, a wire and pulley method. At any rate, in this embodiment, the position management plane stage 220 can be moved in the X direction by both the manual driving means and the electric driving means.

In this embodiment, the X initial position mark 234 corresponds to the X-direction position of the crosshatch origin 291 serving as the XY coordinate origin (stage origin 206) of the stage 200 at a predetermined accuracy. That is, in this embodiment, the X initial position mark 234 is implemented on the extension of the center line of the crosshatch Y-axis 293 passing through the crosshatch origin 291 of the XY crosshatch 213 at a predetermined accuracy. Note that the initialization position of the stage on the mechanism may be another position. The stage origin 206 is defined by a case in which the sensor center of the camera aligns with the crosshatch origin 291 independently of the initialization position of the stage on the mechanism. That is, the initialization position of the stage 200, that is the disposing position of the X initial position mark 234 need not always be aligned with the crosshatch origin 291 or the stage origin 206.

The Y stage 240 will be described next with reference to FIG. 19. In FIG. 19, (19*a*) is a top view of the Y stage 240 (viewed from the side of the position management plane stage 220), and (19*b*) is a bottom view of the Y stage 240 (viewed from the side of the Z base 130).

In (19*a*) of FIG. 19, the X-axis cross roller guides 241 are paired with the X-axis cross roller guides 231 disposed on the lower surface of the position management plane stage 220 and support the position management plane stage 220 slidably in the X-axis direction. The X-axis driving motor 242 moves the position management plane stage 220 in the X direction via the X slider 232 of the position management plane stage 220. The X-axis pinion gear 244 meshes with the X-axis rack gear 233 provided on the lower surface of the position management plane stage 220, and moves the position management plane stage 220 in the X-axis direction by rotation. Since the X-axis pinion gear 244 rotates in accordance with the rotation of the X knob 201, the user can move the position management plane stage 220 in the X-axis direction by operating the X knob 201. An X initial position sensor 243 detects the X initial position mark 234 provided on the lower surface of the position management plane stage 220.

An opening 245 is an opening that causes the X-axis sensor 271 and the skew detecting sensor 273 arranged on the stage base 260 to access the X area scale 211 via the opening 221 of the position management plane stage 220.

Since the Y stage 240 moves in the Y direction out of the X and Y directions relative to the stage base 260, the opening 245 has a shape extending in the Y direction. Similarly, an opening 246 is an opening that causes the Y-axis sensor 272 provided on the stage base 260 to access the Y area scale 212 via the opening 222 of the position management plane stage 220. An opening 247 corresponds to a region in which condenser lens opening 224 moves in a case in which the center (also serving as the center of the condenser lens 147) of the condenser lens opening 224 (having a size larger than the size of the condenser lens unit incorporating the condenser lens 147 so as to form an allowance) moves in the observation object region 205. As described above, since the Y stage 240 moves in the Y direction out of the X and Y directions, the opening 247 has a shape extending not in the X-axis direction but in the Y-axis direction. Because of the opening 247, the Y stage 240 never interferes with the condenser lens unit even when moved in the Y direction of the observation object region 205.

Two Y-axis cross roller guides 251 are disposed on the lower surface of the Y stage 240 ((19b) of FIG. 19) so as to be parallel to the Y-axis. Cross roller guides paired with the Y-axis cross roller guides 251 are attached to the stage base 260. The Y stage 240 is thus supported by the stage base 260 to be slidable in the Y direction. A Y slider 252 is the movable element of a Y-axis driving motor 264 (FIG. 20) incorporated in the opposing surface of the stage base 260. The Y stage 240 is driven in the Y-axis direction by the Y-axis driving motor 264. The Y-axis driving motor 264 and the Y slider 252 form a linear motor by, for example, an ultrasonic wave.

A Y-axis pinion gear 254 rotates along with the rotation of the Y knob 202. As the Y knob 202 rotates, the Y-axis pinion gear 254 moves a Y-axis rack gear 263 (FIG. 20) fixed on the stage base 260 in the Y-axis direction. Hence, the user can manually move the Y stage 240 in the Y-axis direction by operating the Y knob 202. Note that the manual movement of the stage in the Y direction can be done not only by the rack and pinion but also by, for example, a wire and pulley method. At any rate, in this embodiment, the Y stage 240 can be moved in the Y direction by both the manual driving means and the electric driving means. The Y stage 240 moves in the Y direction relative to the stage base 260 while supporting the position management plane stage 220. In this embodiment, the Y initial position mark 253 corresponds to the Y-direction position of the crosshatch origin 291 serving as the XY coordinate origin (stage origin 206) of the stage 200 at a predetermined accuracy. That is, in this embodiment, the Y initial position mark 253 is implemented on the extension of the center line of the crosshatch X-axis 292 passing through the crosshatch origin 291 of the XY crosshatch 213 at a predetermined accuracy. Note that the initialization position of the stage on the mechanism may be another position. The stage origin 206 is defined by a case in which the sensor center of the camera aligns with the crosshatch origin 291 independently of the initialization position of the stage on the mechanism. That is, the initialization position of the stage 200, that is, the disposing position of the Y initial position mark 253 need not always be aligned with the crosshatch origin 291 or the stage origin 206.

The stage base 260 will be described next with reference to FIG. 20. FIG. 20 is a top view of the stage base 260 (a view showing the stage base 260 viewed from the side of the Y stage 240). The X-axis sensor 271 and the skew detecting sensor 273 which are configured to read the X area scale 211 and the Y-axis sensor 272 configured to read the Y area scale 212 are attached on the stage base 260. The heights of the sensors are adjusted by a base (not shown) to obtain predetermined distances to the X area scale 211 and the Y area scale 212 of the XY two-dimensional scale plate 210 provided on the position management plane stage 220. As described above, the X-axis sensor 271 is provided on the X-axis passing through the stage origin 206 (crosshatch origin 291), and the Y-axis sensor 272 is provided on the Y-axis passing through the stage origin 206. The skew detecting sensor 273 is implemented at a predetermined interval in the Y direction of the attached position of the X-axis sensor 271.

Y-axis cross roller guides 262 are paired with the Y-axis cross roller guides 251 disposed on the lower surface of the Y stage 240 and support the Y stage 240 slidably in the Y-axis direction. The Y-axis driving motor 264 is a motor configured to electrically move the Y stage 240 (Y slider 252) in the Y direction. The Y-axis rack gear 263 moves the Y stage 240 in the Y direction in accordance with the rotation of the Y-axis pinion gear 254. A Y initial position sensor 265 detects the Y initial position mark 253 provided on the lower surface of the Y stage 240. An opening 261 corresponds to the condenser lens opening 224 (having a size larger than the size of the condenser lens unit incorporating the condenser lens 147 so as to form an allowance). Because of the opening 261, the condenser lens unit never interferes with the stage base 260. Note that as described above with reference to FIG. 4, the stage base 260 is provided with the spring hooks 995, the spherical bearings 996, and the sensor plate holes 997 used to mount the stage base 260 on the ΔZ stage 900. The stage base 260 is also provided with the Z base attachment holes 902a and the positioning holes 903a which allow the stage base 260 to be directly fixed on the Z base 130.

The openings 261, 247, and 223 allow the condenser lens unit to approach the observation position on the slide from the lower side of the slide, and also pass source light condensed by the condenser lens 147.

The sizes of the openings for the X-axis sensor 271, the Y-axis sensor 272, the skew detecting sensor 273, and the condenser lens 147 provided in the above-described stages can be large to some extent as long as the mechanical strength and accuracies are maintained.

The adapter unit 300 configured to connect the eyepiece base 122 and the digital camera 400 will be described next. The image sensor 401 (FIG. 2) is an area sensor (camera sensor) in which pixels each formed from, for example, a CMOS element are arrayed in a matrix, that is, in the row direction (X direction) and the column direction (Y direction), and has X- and Y-axes. Generally, in the microscope, the X and Y-axes (determined by the optical system of the split prism 150 and the eyepiece barrel 123 (FIG. 2)) of the observation optical system are assembled in accordance with the X-axis of the microscope base stand 121. The XY stage is also attached via the Z base 130 at a predetermined accuracy in accordance with the X-axis of the microscope base stand 121. Hence, if the X-axis of the image sensor 401 has a rotational shift with respect to the X-axis of the eyepiece barrel 123 (=the X-axis of the microscope base stand 121), the X- and Y-axes have a rotational shift with respect to the X- and Y-axes of an eyepiece observation image and the X- and Y-axes of the stage.

The digital camera 400 is attached to the adapter unit 300 via a lens mount with a positioning pin. The adapter unit 300 is attached to the eyepiece base 122 by screwing with a positioning pin. The positioning pin is assumed to always produce a slight rotational shift because of its mechanical accuracy. FIG. 44 shows views for explaining the influence of a rotational shift between the X- and Y-axes of a captured image (the X- and Y-axes of the image sensor 401) and the X- and Y-axes of the stage. The views are exaggerated to some extent for the descriptive convenience. For example, as shown in (44a) of FIG. 44, when the stage 200 is moved in the X-axis direction, and an entire ROI is captured as two adjacent images 2001 and 2002, the images are captured obliquely alike due to the rotational shift.

On the other hand, the captured images 2001 and 2002 (evidence images) are displayed using the X-axis of the image sensor as the horizontal axis, as shown in (44b) of FIG. 44. Referring to (44b) of FIG. 44, reference numeral 2011 denotes a field center which aligns with the center of the image sensor 401. Reference numeral 2012 assumes an object of interest in the ROI area and indicates the same object in the images 2001 and 2002. However, because of the above-described rotational shift, the Y-coordinate value changes between the images 2001 and 2002 that are adjacent on the left and right. This means that the coordinate values on each evidence image are different from position coordinates by the stage. In particular, assuming a case in which the ROI is large, and the entire ROI area covers the whole tissue slice area on the slide, this means that the coordinates of the observation position based on the X- and Y-axes of the sensor largely shift from the coordinate values based on the X- and Y-axes of the stage. From the viewpoint of position management, the coordinates of a point of interest on the evidence image based on the X- and Y-axes of the sensor are preferably the same as the coordinates based on the X- and Y-axes of the stage. The target accuracy of the degree of alignment is the same as the target of position management by the above-described XY stage, that is, 0.1 µm (in steps of 0.01 µm).

In addition, when the controller 501 composes the two images to generate the evidence image of the entire ROI, rotation correction by image processing is necessary. However, the amount of the rotational shift is unknown, the degree of difficulty in accurately connecting images by image recognition processing is high, and rotation calculation processing normally causes degradation in image quality. However, if the rotational shift falls within the position management target of 0.1 µm, the two images can accurately be connected by simple translation. The adapter unit 300 according to this embodiment includes a mechanism configured to align the X- and Y-axes of the image sensor 401 with the X- and Y-axes of the stage 200 (XY stage), and thus copes with the above-described problem.

FIG. 21 is a view showing the structure of the adapter unit 300. In general, the microscope body 100 and the digital camera 400 are manufactured by different makers. In consideration of compatibility between products of different makers, the adapter unit 300 has a three body structure including an optical adapter 320 that is a first adapter unit, a ΔC adapter 340 that is a second adapter unit, and a camera adapter 360 that is a third adapter unit. This is because since the base mount 128 of the eyepiece base 122 complies with a standard unique to a microscope maker, and the camera mount of the digital camera 400 complies with a standard unique to a camera maker, it is preferable to provide the ΔC adapter 340 with a new mount as a new common standard.

Note that the base mount 128 on the eyepiece base 122 shown in FIG. 21, which complies with the standard unique to the microscope maker, generally only aims at fixing the optical adapter, and the position in the rotation direction is indefinite. In this embodiment, however, the base mount 128 includes a mount that is newly given a positioning reference hole 311 such that the rotation positions of the eyepiece base 122 and the optical adapter have a predetermined positional relationship. In correspondence with this, generally, a base stand-side mount 321 of the optical adapter 320 whose position in the rotation direction is indefinite is also newly given a positioning reference projection 322. When the optical adapter 320 is mounted by fitting the reference projection 322 in the positioning reference hole 311 of the base mount 128, the position of the optical adapter 320 in the rotation direction (the fitting position to the positioning reference hole 311) is uniquely determined with respect to the eyepiece base 122 at a predetermined accuracy.

The adapter lens 301 is stored in the optical adapter 320. In addition, an adapter-side mount 331 serving as the concave side of the new common standard mount is provided at an end on the opposite side of the base stand-side mount 321 of the optical adapter 320. The adapter-side mount 331 has a positioning reference hole 332 and is connected to the ΔC adapter 340. A base stand-side mount 341 that is the convex side of the new common standard mount of the ΔC adapter 340 includes a positioning reference projection 358 which is fitted in the positioning reference hole 332 to connect the base stand-side mount 341 to the adapter-side mount 331 of the optical adapter 320.

A camera-side mount 342 of the ΔC adapter 340 is a mount serving as the concave side of the new common standard mount. The camera-side mount 342 has a positioning reference hole 359 and is connected to the camera adapter 360. On the other hand, in the camera adapter 360, an adapter-side mount 361 is the convex side of the new common standard mount and includes a reference projection 362 for positioning. The adapter-side mount 361 of the camera adapter 360 is mounted on the camera-side mount 342 of the ΔC adapter 340. When mounting the camera adapter 360 on the ΔC adapter 340, the reference projection 362 of the camera adapter 360 is fitted in the positioning reference hole 359 of the ΔC adapter 340, and the rotation direction of the camera adapter 360 is uniquely determined with respect to the ΔC adapter 340. A camera lens mount 363 of the camera adapter 360 is a mount complying with a standard unique to the camera maker, and normally includes a positioning mechanism of a unique standard to a camera mount 402 of the digital camera 400.

With the above-described arrangement, via
mechanical connection between the eyepiece base 122 and the optical adapter 320
mechanical connection between the optical adapter 320 and the ΔC adapter 340
mechanical connection between the ΔC adapter 340 and the camera adapter 360, and
mechanical connection between the camera adapter 360 and the digital camera 400,
the positions of the eyepiece base 122 and the image sensor 401 of the digital camera 400 in the rotation direction are defined within a predetermined accuracy. That is, the positional relationship in the rotation direction between the X- and Y-axes of the microscope base stand 121 of the microscope and the X- and Y-axes of the image sensor 401 of the digital camera 400 is ensured within the predetermined accuracy determined by the mechanical accuracy. In this case, since the mechanical accuracies at the above-described four connection portions are totaled, the rotation positioning accuracy is, for example, ±0.5 mm (about ±1°) at worst in the periphery with 50 mmΦ. This corresponds to a rotational shift of ±0.5 mm at two ends of a 50 mm observation range.

The positioning accuracy by the above-described mechanical reference mechanism provided on the mount cannot implement the target accuracy of ±0.1 μm, and cannot cope with the problem concerning the rotation of the image sensor 401 described above with reference to FIG. 44. The ΔC adapter 340 according to this embodiment corrects the rotational shift between the microscope base stand 121 and the image sensor 401 of the digital camera 400, and implements the target accuracy of ±0.1 μm in accurate position management. A vertical error of ±0.1 μm corresponds to about ±0.1 millidegree at the two ends of a 56 mm observation range. Hence, the ΔC adapter 340 is required to have a capability of correcting an error within the range of about ±1° to about ±0.1 millidegree. Note that practically, if the vertical error can be suppressed to ±0.1 μm (about ±3 millidegrees) at the two ends of a 2 mm observation range, a level more than enough for pathological diagnosis is expected to be obtained. In this case as well, the ΔC adapter 340 needs to correct an error within the range of about ±10 to about ±3 millidegree. Note that a range of ±20 to ±30 is sufficient as the maximum correction range of the ΔC adapter 340. The ΔC adapter 340 includes a rotation mechanism configured to implement a function of performing alignment adjustment (rotation correction) at such an accuracy.

In FIG. 22, (22*a*) shows the structure of the ΔC adapter 340. The mount 341 is the convex side of the common standard mount including the positioning reference projection 358 serving as a connection portion. An inner cylinder portion 343 on the convex side is fixed to an outer ring portion 345 of a cross roller ring 344. An outer cylinder 346 is assembled to the upper portion of the outer ring portion 345. The outer cylinder 346 includes an outer cylinder base plate 347. A ΔC driving motor 348, a ball screw 349 ((22*b*) of FIG. 22), an electric circuit board (not shown) for driving control, and the like are implemented on the outer cylinder base plate 347. The mount 342 serving as the concave side of the common standard mount is assembled to an inner ring portion 350 of the cross roller ring 344. The inner ring portion 350 smoothly rotates relative to the outer ring portion 345 via a roller bearing 351 disposed between the outer ring portion 345 and the inner ring portion 350 of the cross roller ring 344. That is, the mount 342 includes the concave side of the common standard mount as the connection portion to the camera adapter 360, and rotates relative to the base mount 341 that is the convex side of the common standard mount. As a result, the digital camera 400 rotates relative to the microscope base stand 121 (eyepiece base 122). A driving mechanism that changes the arrangement relationship (in this embodiment, the rotation positional relationship) between the mount 341 and the mount 342 is thus constituted.

In FIG. 22, (22*b*) is a view showing the rotational driving method of the ΔC adapter 340. A screw shaft 352 of the ball screw 349 is formed at the end of the rotor shaft of the ΔC driving motor 348 fixed on the outer cylinder base plate 347. Along with rotation of the screw shaft 352, a nut portion 353 of the ball screw linearly moves in the axial direction of the ΔC driving motor 348. At this time, a driving linear gear 354 fixed to the nut portion 353 of the ball screw also moves. The counterpart of fitting of the driving linear gear 354 is a driven arc gear 355 fixed to the outer wall of the mount 342 serving as the concave side of the common standard mount. As the driving linear gear 354 moves, the mount 342 is rotationally driven. Rotation correction of the mount 342 serving as the concave side of the common standard mount is thus performed relative to the mount 341 serving as the convex side of the common standard mount. The ΔC driving motor 348 is driven by a control circuit (not shown) so as to rotate the mount 342 by a predetermined angle in accordance with a driving instruction from the controller 501. Note that the rotational driving of the mount 342 can be done not only by the combination of a driving motor, a ball screw, and gears but also by, for example, ultrasonic driving using friction caused by a moving element and a driving motor.

A ΔC initial position mark 356 used for initialization at the time of activation is attached to a predetermined position of the outer wall of the mount 342 serving as the convex side of the common standard mount, and defines the ΔC initial position. A ΔC initial position sensor 357 is disposed on the outer cylinder base plate 347 so as to face the ΔC initial position mark 356, and detects the initial position at the time of activation. For example, when the ΔC initial position is assumed to be the fitting position between a positioning reference hole and a positioning reference projection, the ΔC adapter 340 performs ΔC correction within the range of, for example, ±20 to ±30 based on the detected initial position. That is, the ΔC adapter 340 according to this embodiment performs coarse positioning (first adjustment) by the mechanical positioning mechanisms using the positioning reference projections 322, 358, and 362 and the positioning reference holes 311, 332, and 359 and the positioning mechanism by the ΔC initial position sensor 357. After that, fine positioning (second adjustment) using the ΔC driving motor 348 is done based on an image obtained by the image sensor 401. By the two-stage positioning, the X- and Y-axis directions of the image sensor 401 are accurately aligned with the X- and Y-axis directions of the stage.

The slide (slide 700) with position references used in the microscope system 10 according to this embodiment will be described next. FIG. 23 shows views for explaining the slide 700 according to this embodiment. As shown in (23*a*) of FIG. 23, the slide 700 has the origin mark 701, a spare origin mark 702, a Y-axis mark 703, and focus reference marks 704, 705, and 706. The origin mark 701 and the Y-axis mark 703 represent a specific position on the Y-axis and a specific position on the X-axis, respectively, and at least one of the marks represents axis information in the X direction or Y direction. With these marks, the slide reference position (origin position) and the axis direction can correctly be specified. In this embodiment, the Y-axis mark 703 defines the Y-axis direction. Position references with such a structure are suitable in a case in which only a strip-shaped narrow region is usable as the region to arrange the marks. Both the origin mark 701 and the Y-axis mark 703 are disposed in a vacant area between the label area 721 and the cover glass area 722 that is the arrangement position of a cover glass and a specimen (tissue slice) as an observation object. Note that the specimen needs to be placed within the range of the cover glass area 722. However, as for the cover glass, a cover glass larger than the cover glass area 722 may be used. At this time, it is all right to cover some or all of the focus reference marks 704 to 706 with the cover glass, although the focus position changes by only a distance uniquely determined by the refractive index and the thickness of the cover glass, as will be described later. That is, in this specification, the cover glass area 722 indicates the area in which the observation object is placed but does not define the size of the cover glass. In addition, if the specimen arrangement position changes, and the blank area usable to arrange the position reference marks moves to the right end of the slide 700 in the future, it is possible to cope with this change by disposing the position reference marks according to this embodiment at the right end.

In (23a) of FIG. 23, the origin mark 701 is a position reference mark of the slide 700, and serves as an origin used to manage the coordinates of the observation position of a specimen on the slide 700. The spare origin mark 702 is a spare origin used in a case in which the origin mark 701 is undetectable because of dirt, a flaw, or the like. The origin mark 701 and the spare origin mark 702 are disposed in a predetermined positional relationship. The Y-axis mark 703 indicates a Y-axis line having axis information in the Y direction. The axis direction represented by the Y-axis mark 703 is a direction perpendicular to end faces in the longitudinal direction of the slide 700. This direction will be referred to as a Y-axis direction. The origin mark 701, the Y-axis mark 703, and the spare origin mark 702 are arranged while being spaced apart from each other so they are not simultaneously observed when observed at a magnification of the microscope used to detect the center line (axis direction) (to be described later). The origin mark 701 and the spare origin mark 702 are arranged on both sides of the Y-axis mark 703 on the center line of the Y-axis mark 703. Note that although the center line of the Y-axis mark 703 is used to specify the origin position, as will be described later, the present invention is not limited to this, and any line (to be referred to as a reference line hereinafter) along the Y-axis direction uniquely defined by the Y-axis mark 703 is usable. A specific position on the extension of the reference line is defined as the origin position. Hence, the origin mark 701 (or the spare origin mark 702) is arranged while being spaced apart from the Y-axis mark 703 so as to indicate a specific position on the extension of the reference line. The origin mark 701, the Y-axis mark 703, and the spare origin mark 702 will generically be referred to as position reference marks hereinafter.

These position reference marks are preferably disposed at intervals equal to or more than the distance corresponding to the field size (for example, the field size of a 10× objective lens=φ1.5 mm or more). This is because the adjacent position reference marks are prevented from being visually mixed in the same visual field of the microscope, and the marks can efficiently be detected. In addition, to obtain an accurate origin reference, it is important to consider dirt or a flaw. Hence, if dirt or a flaw is found by naked-eye detection or image recognition, a measure to, for example, use the spare origin mark 702 in place of the origin mark 701 is needed. Note that since the position of the spare origin mark 702 with respect to the origin mark 701 is known, conversion of the coordinate values and the like can easily be done. The following explanation will be made assuming that the position reference marks considered not to be affected by dirt or a flaw are observed. To prevent the influence of dirt or a flaw, the position reference marks may actively be covered using a somewhat large cover glass. Alternatively, position reference marks may be disposed at the left end of the lower surface of the somewhat large cover glass, and the vacant area and the region to place the specimen on the slide may be covered with the cover glass. In this case, the slide itself need not have the position reference marks. Otherwise, position reference marks may be disposed on the lower surface of the strip-shaped cover glass, and the strip-shaped cover glass with the position reference marks may be placed in the vacant area on the slide. In this case as well, the slide itself need not have the position reference marks.

In FIG. 23, (23b) and (23c) show detailed examples of the position reference marks. In (23b) of FIG. 23, the origin mark 701 (or the spare origin mark 702) uses two, upper and lower isosceles triangles, and the contact point of their apexes is the origin (or the spare origin). The Y-axis mark 703 is formed from a complex of Y-axis lines having different widths, as shown in (23b) of FIG. 23, and its center line represents the Y-axis of the origin. Note that the Y-axis mark 703 is disposed to be perpendicular to the horizontal frames of the slide 700 at a predetermined accuracy. The Y-axis lines having different widths are arranged to cope with low to high magnifications of the objective lens magnification.

The Y-axis mark 703 has the same pattern structure as the crosshatch Y-axis 293. An example of the structure will be described with reference to (12a) and (12b) of FIG. 12. The Y-axis mark 703 has a structure in which a plurality of pairs of lines with the same width are arranged to be symmetric with respect to the center line serving as the axis of symmetry while changing the width. Note that as for the central portion, a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by imaging (in both live image and still image), and a predetermined accuracy is ensured in barycenteric detection (to be described later). The intervals of the center lines of the lines or spaces of the Y-axis mark, the boundaries (edges) between the lines and spaces, the widths of the lines or spaces, and the like are set to predetermined values and are useful as actual distance information. Each of the Y-axis mark 703, the origin mark 701, and the spare origin mark 702 may be formed from an aggregate of pairs of fine lines and spaces having a width of, for example, 1 μm, like the crosshatch Y-axis 293 or the crosshatch origin 291. This enables inclusion of finer actual distance information. Note that the intervals between the position reference marks on the slide 700, the sizes of the reference marks, the structures of the reference marks, the intervals of the center lines of the lines or spaces of the reference marks, the boundaries (edges) between the lines and spaces, the widths of the lines or spaces, and the like are set to predetermined values and are also usable as actual distance information.

In FIG. 23, (23c) shows another example of the origin mark 701 (or the spare origin mark 702) which is formed from a complex of X-axis lines having different widths, and its center line in the X-axis direction represents the X-axis of the origin or spare origin. Hence, the intersection between the center line in the X-axis direction obtained from the origin mark 701 (or the spare origin mark 702) and the center line in the Y-axis direction obtained from the Y-axis mark 703 is the origin (spare origin) of the slide 700. Note that a more detailed structure of the origin mark 701 (or the spare origin mark 702) shown in (23c) of FIG. 23 is obtained by, for example, rotating (12a) and (12b) of FIG. 12 by 90°.

As for the positional relationship between the position reference marks, the origin mark 701 and the spare origin mark 702 are arranged on the center line of the Y-axis mark 703, as shown in (23b) and (23c) of FIG. 23. In this embodiment, the center line of each of the origin mark 701 and the spare origin mark 702 is aligned with the center line of the Y-axis mark. Additionally, like the dimensional relationship exemplified in (23b) and (23c) of FIG. 23, all of the sizes of the reference marks, the distances between them, and the like are more than the field size of a 10× objective lens, that is, φ1.5 mm.

The focus reference marks 704 to 706 are arranged on three sides (the upper side, the right side, and the lower side) of the cover glass area 722. The focus reference marks 704 to 706 are used to measure focus positions along the periphery of the cover glass area 722, thus obtaining the height distribution (to be also referred to as a ΔZ distribution hereinafter) of the surface of the slide 700, and reflecting it on the management of the observation position. This makes it possible to manage a variation in the Z-direction position of the surface between slide glasses and perform more accurate position management in the Z direction. Note that to obtain the variation in the Z-direction position of the slide glass surface, focus positions are measured on the four sides of the cover glass area 722. For the left side of the cover glass area 722, the Y-axis mark 703 is used. However, the present invention is not limited to this. As shown in (24a) of FIG. 24, a focus reference mark 707 may be provided on the left side of the cover glass area 722 as well, and focus positions based on the focus reference marks may be measured for the four sides of the cover glass area 722.

In FIG. 24, (24b) is a view showing details of the focus reference mark. In the focus reference mark according to this embodiment, focus reference unit marks (to be referred to as focus units hereinafter) 710 each having a length of 2 mm are arranged at an even interval of, for example, 1 mm. The focus reference mark is thus arranged in a predetermined width or less (in this example, 2 mm or less) from a position spaced apart from a slide end by a predetermined distance (in this example, 0.5 mm) to ensure a space to place an observation object in the region surrounded by the focus reference marks. In addition, the focus reference mark has a predetermined width or more to ensure a region to cover the focus reference mark by the cover glass. The focus unit 710 is formed from a plurality of lines. For example, as shown in an enlarged view in (24b) of FIG. 24, the focus unit 710 has a structure in which a plurality of pairs of lines with the same width are arranged to be symmetric with respect to the center line serving as the axis of symmetry while changing the width. Note that a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by the live image capturing function or the still image capturing function, and a predetermined accuracy is ensured in focus detection (to be described later). The intervals of the center lines of the lines or spaces of the focus unit 710, the intervals of the boundaries (edges) between the lines and spaces, the widths of the lines or spaces, and the like are set to predetermined values and are useful as actual distance information. Note that each line may further be formed from an aggregate of pairs of fine lines and spaces. The width of the fine line is set to, for example, 1/10 or less of the width of the narrowest line (in this example, 10 μm) out of the plurality of lines that form the mark (for example, 1 μm). This enables inclusion of finer actual distance information.

Note that these position reference marks or focus reference marks are integrally formed by the same process to achieve the target accuracy and implement cost reduction as expendables. For example, the position reference marks or focus reference marks are formed on a slide at an accuracy of 5 nm to 10 nm using a nanoimprint technology. For this reason, the degree of alignment between the Y-direction center line of the Y-axis mark 703 and the Y-direction center lines of the origin marks 701 and 702 and the perpendicularity between the Y-direction center line (origin Y-axis) of the Y-axis mark 703 and the X direction center line of the origin mark 701 are formed on the nanometer order. Hence, the position of the slide origin defined by the Y-axis mark 703 and the origin mark 701 or the spare origin mark 702 and a slide X-axis 711 ((23b) and (23c) of FIG. 23) and a slide Y-axis 712 ((23b) and (23c) of FIG. 23) using the origin as the starting point have an accuracy on the nanometer order. Additionally, in this embodiment, the focus reference marks 704 and 706 in the X direction along the long sides of the slide 700 and the focus reference marks 705 and 707 in the Y direction along the short sides of the slide 700 are arranged such that the lines of different directions are arranged. However, lines of the same direction may be arranged.

Note that the position reference marks or focus reference marks may be formed by another method such as printing, coloring, or etching on a glass surface. In this case, the position management accuracy and focus accuracy lower. However, as compared to a case in which no references are formed at all, the same effect as in this embodiment can be obtained, though the degree of effect decreases. The pattern shape of the focus unit (focus reference unit mark) 710 of the focus reference mark can be any geometric shape as long as it can ensure the focus accuracy. The repetitive pitch of the focus unit is not limited to 1 mm described above. Focus units having a plurality of types of shapes may coexist.

FIGS. 25 and 26 are block diagrams showing an example of the control arrangement of the microscope system 10 according to this embodiment. The stage 200 is connected to the controller 501 via an interface cable 13 such as a USB. In the stage 200, a stage MPU 280 controls return of the stage 200 to the origin position or movement of the stage 200 according to an instruction from the controller 501. A ΔΘ driving circuit 281 drives the ΔΘ driving motor 611 of the ΔΘ stage 600 in accordance with an instruction from the stage MPU 280. In accordance with an instruction from the stage MPU 280, an X-axis driving circuit 282 drives the X-axis driving motor 242 that moves the position management plane stage 220 in the X direction. In accordance with an instruction from the stage MPU 280, a Y-axis driving circuit 283 drives the Y-axis driving motor 264 that moves the Y stage 240 in the Y direction, thereby moving the position management plane stage 220 in the Y direction.

An X-axis sensor processing circuit 284 generates an X-coordinate value based on a signal output from the X-axis sensor 271 upon detecting the X area scale 211, and supplies the X-coordinate value to the stage MPU 280. A skew detecting sensor processing circuit 285 generates an X-coordinate value based on a signal output from the skew detecting sensor 273 upon detecting the X area scale 211, and supplies the X-coordinate value to the stage MPU 280. A Y-axis sensor processing circuit 286 generates a Y-coordinate value based on a signal output from the Y-axis sensor 272 upon detecting the Y area scale 212, and supplies the Y-coordinate value to the stage MPU 280. Detection signals from the ΔΘ initial position sensor 621, the X initial position sensor 243, and the Y initial position sensor 265 are supplied to the stage MPU 280 and used for, for example, the initialization operations of the stages.

Note that the motor driving circuits such as the ΔΘ driving circuit 281, the X-axis driving circuit 282, and the Y-axis driving circuit 283, the stage MPU 280, the power supply circuit (not shown), and the like consume relatively high power and can be heat sources, and there is a fear of the influence of thermal expansion on the position accuracy. Hence, these electric circuits may be stored in another housing as external controllers. In addition, the functions of the stage MPU 280 may be implemented by the controller 501.

The microscope system 10 according to this embodiment includes the Z sensor 991 provided on the ΔZ base 901 of the ΔZ stage 900. Hence, as shown in FIG. 26, signals from the Z initial position sensor 991*a* and the Z-axis sensor 991*b* of the Z sensor 991 are processed by a Z-axis sensor processing circuit 1281 and input to the stage MPU 280. In addition, a ΔZ driving circuit 1282 configured to drive the ΔZ motor 913 of the ΔZ lift unit 910 of the ΔZ stage 900 and process a signal from the ΔZ initial position sensor 920*a* or the ΔZ-axis sensor 920*b* is connected to the stage MPU 280. Furthermore, a dZ driving circuit 1283 configured to drive the dZ motor 653 of the dZ lift unit 650 of the ΔΘ stage 600 and process a signal from the dZ initial position sensor 641*a* or the dZ-axis sensor 641*b* is connected to the stage MPU 280.

Referring back to FIG. 25, the ΔC adapter 340 of the adapter unit 300 is connected to the controller 501 via an interface cable 12 such as a USB. In the ΔC adapter 340, a ΔC MPU 380 performs, for example, rotation control of the mount 342 in the ΔC adapter 340 in accordance with an instruction from the controller 501. A ΔC driving circuit 381 drives the ΔC driving motor 348 in accordance with an instruction from the ΔC MPU 380. A signal from the ΔC initial position sensor 357 is supplied to the ΔC MPU 380 and used to return the mount 342 of the ΔC adapter 340 to the initial position (the origin position of the rotation). Note that the electric circuit components such as the ΔC driving circuit 381, the ΔC MPU 380, and the power supply circuit (not shown) consume relatively high power and can be heat sources, and there is a fear of the influence of thermal expansion on the position accuracy. Hence, these electric components may be stored in another housing as external controllers. In addition, the functions of the ΔC MPU 380 may be implemented by the controller 501.

The digital camera 400 is connected to the controller 501 via the interface cable 11 such as a USB, and transmits an image captured by the image sensor 401 to the controller 501. In the digital camera 400, a camera MPU 480 executes each control of the digital camera 400. An image processing circuit 481 processes an image signal obtained by the image sensor 401 and generates digital image data.

Note that in this embodiment, a general-purpose digital camera is used as the digital camera 400 and attached/detached via the adapter unit 300. However, the present invention is not limited to this. For example, an imaging unit with the image sensor 401 may be fixed to the eyepiece base 122. At this time, if the image sensor 401 is assembled in a state in which its X- and Y-axes accurately align with the X- and Y-axes of the stage, the rotation correction mechanism by the adapter unit 300 can be omitted. Each of the above-described stage MPU 280, ΔC MPU 380, and camera MPU 480 may implement various functions by executing a predetermined program or may be formed from a dedicated hardware circuit.

The controller 501 is a computer apparatus that includes, for example, the memory 512 that stores a program, and the CPU 511 that implements various kinds of processing by executing the program stored in the memory 512, and has a measurement/control function in the microscope system 10. The operation of the microscope system 10 according to this embodiment will be described below in detail.

FIG. 27 is a flowchart showing stage control by the controller 501 of the microscope system 10 according to this embodiment. Note that in the microscope system 10 according to this embodiment, it is necessary to dispose the Z scale 990 at a predetermined position of the microscope base stand before an operation according to FIG. 27 is executed. The disposing method is as follows.

The Z base 130 is moved in the Z direction by the Z knob 125, and an in-focus position is searched for using, for example, the crosshatch 290. The Z base 130 is lowered from the in-focus position in the minus direction (downward) by, for example, 6 mm. The Z scale 990 is disposed such that the Z initial position sensor 991*a* detects the Z initial position mark 990*a* at that position. Here, 6 mm is a value decided by the maximum moving range of the ΔZ lift unit+the maximum moving range of the dZ lift unit+an error margin. As described above, the movable range of the lift pin of the ΔZ lift unit 910 is ±2 mm, and the movable range of the lift pin of the dZ lift unit 650 is ±0.2 mm. An operation range defined by these is 4.4 mm at maximum. When a margin is added in consideration of an error at the time of disposition, the safe range is, for example, 6 mm. Note that at this stage, the dZ lift unit and the ΔZ lift unit are in an uninitialized state before moving to initial positions determined by the initial position marks. In the initialization operation of the dZ lift unit 650 and the initialization operation of the ΔZ lift unit 910 to be described below, the Z initial position is set at a position at which the distal end of the objective lens and the observation surface of the stage do not come into contact at any position in the movable range.

Referring back to FIG. 27, the operation of the controller 501 in the microscope system 10 according to this embodiment will be described. When each unit of the microscope system 10 is powered on, and the controller 501 is instructed to execute an observation position management mode, the operation shown in the flowchart of FIG. 27 starts.

First, in step S11, the controller 501 initializes itself. In the initialization of the controller 501, for example, configuration at the time of activation is set on a platform used to execute a position management application having the measurement/control function in the microscope system 10. When the configuration setting ends, for example, in Windows®, desired application software is automatically activated from an activation shortcut placed in a startup folder. In this embodiment, the activation shortcut of position management application software (to be referred to as a position management application hereinafter) that implements the measurement/control function of the microscope system is placed in the startup folder, and the position management application is automatically activated. When the position management application is activated in the above-described way, in step S12, the controller 501 waits for a notification of completion of the initialization operation to be described below.

FIG. 28 is a flowchart showing the initialization operation in the microscope system 10. When the units are powered on, they perform the initialization operations upon power-on as shown in FIG. 28 under the control of the controller 501. First, in an initialization process P1 shown in FIG. 28, the controller 501 moves the Z base 130 to the above-described Z initial position. If the Z base 130 is located at the Z initial position, the distal end of the objective lens mounted in the microscope body and the observation surface of the stage do not come into contact at any position in the movable range in the subsequent initialization operation. Note that if the moving operation of the Z base 130 of the microscope is a manual operation, the controller 501 prompts the user to do the operation via a predetermined UI, and the user manually operates the Z knob 125. When electrically performing the operation, the controller 501 controls the movement of the Z base 130. When the Z initial position sensor 991*a* of the Z sensor 991 disposed on the ΔZ base 901 of the ΔZ stage 900 detects the Z initial position mark 990*a* of the Z scale 990 (step S131), the controller 501 sets a read value Z of the Z-coordinate to zero (step S132). Accordingly, in the subsequent initialization operation, the distal end of the objective lens mounted in the microscope body and the observation surface of the stage do not come into contact at any position in the movable range.

When the initialization process P1 is completed, in an initialization process P2, the controller 501 performs the initialization operations of the stage 200, the adapter unit 300 (ΔC adapter 340), the digital camera 400, and the ΔZ stage 900 (including the Z base 130).

Initialization of XY Stage (Stage 200)

In step S101, the stage MPU 280 of the stage 200 moves the position management plane stage 220 and the Y stage 240 to the initial positions (the X initial position mark 234 and the Y initial position mark 253), respectively, thereby initializing the XY stage. That is, the stage MPU 280 sends a driving control command for a predetermined direction to each of the X-axis driving circuit 282 and the Y-axis driving circuit 283. For example, a moving direction and a moving speed are added to the driving control command as parameters. Upon receiving the driving control commands, the X-axis driving circuit 282 and the Y-axis driving circuit 283 respectively send driving signals to the X-axis driving motor 242 and the Y-axis driving motor 264 and move the X stage (position management plane stage 220) and the Y stage 240 in accordance with the designated directions and speeds.

The stage 200 includes the X-axis sensor processing circuit 284 and the Y-axis sensor processing circuit 286 which perform interpolation processing of detection signals from the X-axis sensor 271 and the Y-axis sensor 272 capable of accurately detecting the X area scale 211 and the Y area scale 212, respectively. In this interpolation processing, if, for example, a ½₀₀₀ interpolation operation is performed, a resolution of 10 nm or less is obtained from a 2 µm wide line pattern, and the target position management accuracy of the observation position management microscope system according to the embodiment, that is, an accuracy of 0.1 µm can be obtained. The stage MPU 280 accurately grasps and manages the X-direction moving amount and position (X-coordinate) of the position management plane stage 220 and the Y-direction moving amount and position (Y-coordinate) of the Y stage 240 based on the signals from the X-axis sensor processing circuit 284 and the Y-axis sensor processing circuit 286.

When the X initial position mark 234 on the position management plane stage 220 reaches the detection position of the X initial position sensor 243, a status change from the X initial position sensor 243 is transmitted to the stage MPU 280. Similarly, when the Y initial position mark 253 on the Y stage 240 reaches the detection position of the Y initial position sensor 265, a status change from the Y initial position sensor 265 is transmitted to the stage MPU 280. Upon receiving the status changes, the stage MPU 280 sends a stop control command to each of the X-axis driving circuit 282 and the Y-axis driving circuit 283 and stops the XY driving of the stage 200.

Next, the stage MPU 280 sends a control command to each of the X-axis driving circuit 282 and the Y-axis driving circuit 283 to sequentially perform forward and reverse fine movements by setting a lower moving speed, selects a more correct initial position, and stops the position management plane stage 220 and the Y stage 240. Then, the stage MPU 280 resets the X-coordinate value and the Y-coordinate value obtained based on the signals from the X-axis sensor processing circuit 284 and the Y-axis sensor processing circuit 286 and held in itself to zero, and sets the XY initial position of the XY stage (coordinates (0, 0)). Note that the detection accuracy of the XY initialization position by the X initial position mark, the Y initial position mark, the X initial position sensor, and the Y initial position sensor includes a small reproducibility error (a slight shift occurs when re-initialization is performed) caused by the mechanical accuracy. However, the moving amount of the stage is accurately managed by the area scales and the predetermined detection units (the X-axis sensor 271, the Y-axis sensor 272, and the skew detecting sensor 273). In this embodiment, the X initial position mark and the Y initial position mark are disposed based on the crosshatch origin 291, thereby making the XY initial position correspond to the crosshatch origin 291 at a predetermined accuracy (predetermined mechanical error range).

Initialization of ΔΘ Stage 600

Next, in step S102, the stage MPU 280 sends a driving control command for a predetermined direction to the ΔΘ driving circuit 281. For example, a moving direction and a moving speed are added to the driving control command as parameters. Upon receiving the driving control command, the ΔΘ driving circuit 281 sends a driving signal to the ΔΘ driving motor 611, thereby rotating the rotary stage 691 of the ΔΘ stage 600 in accordance with the designated direction and speed. When the ΔΘ initial position mark 620 reaches the detection position of the ΔΘ initial position sensor 621, a status change from the ΔΘ initial position sensor is transmitted to the stage MPU 280. Upon receiving the status changes, the stage MPU 280 sends a stop control command to the ΔΘ driving circuit 281 and stops the ΔΘ driving. Next, the stage MPU 280 issues a control command to the ΔΘ driving circuit 281 to sequentially perform forward and reverse fine rotations by setting a lower moving speed, selects a more correct initial position, and stops the ΔΘ stage 600. Then, the stage MPU 280 resets the ΔΘ-coordinate value held in itself to zero, and obtains a ΔΘ center position, that is, a correct position without a rotational shift. If the ΔΘ position of the ΔΘ stage 600 at the time of activation is unknown (for example, in a case in which the position is not saved in the nonvolatile memory), for example, the ΔΘ stage 600 is rotated by 3° in one direction, and if the ΔΘ initial position mark 620 cannot be found, returned by 6° in the reverse direction.

Initialization of dZ Lift Units 650

In step S103, the stage MPU 280 sends a control command to the dZ driving circuit 1283, drives each dZ motor 653 of the ΔΘ stage 600, and initializes the Z-direction position of each dZ lift unit 650 of the ΔΘ stage 600. The dZ motor 653 is stopped at a position at which the dZ initial position based on the dZ initial position mark 640*a* of the dZ scale 640 is detected by the dZ initial position sensor 641*a*, thereby returning the dZ lift pin to the initial position. In step S104, in this state, the stage MPU 280 initializes the read values (dZ1, dZ2, and dZ3) of the dZ linear scales 640*b* by the dZ-axis sensors 641*b* to zero. The above-described initialization processing is executed independently for each of the three dZ lift units 650. Note that as for the read values by the dZ-axis sensors 641*b*, as shown in (14*c*) of FIG. 14, the read value at the upper left point (left on the microscope base stand side) is dZ1, the read value at the upper right point (right on the microscope base stand side) is dZ2, and the read value on the lower side (opposite side of the microscope base stand) is dZ3.

When initialization of the XY stage of the stage 200, the ΔΘ stage 600, and the dZ lift units 650 is completed in the above-described way, the stage MPU 280 transmits a stage initialization end command to the controller 501 in step S105.

Initialization of ΔC Adapter 340

The initialization operation of the ΔC adapter 340 (the second adapter unit in the adapter unit 300) will be described next. In step S111, the ΔC MPU 380 sends a driving control command for a predetermined direction to the ΔC driving circuit 381. For example, a moving direction and a moving speed are added to the driving control command as parameters. Upon receiving the driving control command, the ΔC driving circuit 381 sends a driving signal to the ΔC driving motor 348. When the ΔC driving motor 348 is driven, the mount 342 serving as the concave side of the common standard mount of the ΔC adapter 340 rotates in accordance with the designated direction and speed. When the ΔC initial position mark 356 on the mount 342 serving as the concave side of the common standard mount reaches the detection position of the ΔC initial position sensor 357, a status change is transmitted from the ΔC initial position sensor 357 to the ΔC MPU 380. Upon receiving the status changes, the ΔC MPU 380 sends a stop control command to the ΔC driving circuit 381 and stops the ΔC driving motor 348.

Next, the ΔC MPU 380 issues a control command to the ΔC driving circuit 381 to sequentially perform forward and reverse fine rotations by setting a lower moving speed, selects a more correct initial position, and stops the rotational driving. Then, the ΔC MPU 380 resets the ΔC-coordinate value (the rotation angle of the ΔC adapter) held in itself to zero, and obtains a ΔC center position, that is, a correct position without a rotational shift. Note that if the ΔC position at the time of activation is unknown (for example, in a case in which the position is not saved in the nonvolatile memory), for example, the ΔC adapter is rotated by 3° in one direction, and if the ΔC initial position mark cannot be found, returned by 6° in the reverse direction. When the ΔC adapter 340 is set at the initial rotation position in the above-described way, the ΔC MPU 380 transmits a ΔC adapter initialization end command to the controller 501 in step S112.

Note that absolute-type scales and sensors may be used to manage the position of the XY stage in the stage 200, the rotation position of the ΔΘ stage 600, the dZ position, and the rotation position of the ΔC adapter 340. When absolute-type scales and sensors are used, the above-described detection of the XY initial position of the stage 200 and detection of the initial positions of the ΔΘ stage 600 and the ΔC adapter 340 and the initial positions of dZ1, dZ2, and dZ3 can be omitted.

Initialization of Digital Camera 400

The camera MPU 480 of the digital camera 400 performs configuration setting for the operation of a predetermined position management corresponding function (to be described later) (step S121). When the initialization ends, a camera initialization end command is transmitted to the controller 501 (step S122). Note that in this embodiment, the digital camera 400 executes camera operation initialization when powered on, and transmits a completion notification to the controller 501. However, the present invention is not limited to this. For example, the controller 501 may instruct initialization (step S121) to set the configuration to make a predetermined position management corresponding function (to be described later) from the user interface of the digital camera 400.

Initialization of ΔZ Stage 900

In step S133, the ΔZ lift units 910 are driven via the ΔZ driving circuit 1282 to move the ΔZ stage 900 to the ΔZ initial position. In a state in which the initial position of the Z base 130 is detected in the initialization process P1, the stage 200 and the objective lens unit 126 are sufficiently spaced apart. Hence, the initialization of the ΔZ stage 900 can safely be executed.

Step S133 will be described in detail. The stage MPU 280 sends a control command to the ΔZ driving circuit 1282, drives each ΔZ motor 913 of the ΔZ lift units 910, and moves each lift pin 914 in the Z direction. The ΔZ motor 913 is stopped at a position at which the initial position based on the ΔZ initial position mark 994a of the ΔZ scale 994 is detected by the ΔZ initial position sensor 920a, thereby completing return of the lift pin 914 to the initial position. In step S134, the stage MPU 280 sets read values ΔZ1, ΔZ2, and ΔZ3 of the ΔZ linear scale 994b by the ΔZ-axis sensor 920b to zero. Note that as for the read values by the ΔZ-axis sensor 920b, as shown in (5e) of FIG. 5, the read value at the upper left point (L1) is ΔZ1, the read value at the upper right point (L2) is ΔZ2, and the read value on the lower side (L3) is ΔZ3 when viewed from the upper surface side of the ΔZ stage 900. The above-described initialization processing is executed independently for each of the three ΔZ lift units 910. Note that absolute-type scales and sensors may be used to manage the ΔZ position. When absolute-type scales and sensors are used, the above-described detection of the initial positions of ΔZ1, ΔZ2, and ΔZ3 can be omitted. After that, in step S135, the stage MPU 280 sends a ΔZ initialization end command to the controller 501.

When the above-described initialization process P2 ends, the controller 501 advances to an initialization process P3. In step S136 of the initialization process P3, the controller 501 moves the position management plane stage 220 in the Z direction, and determines whether the XY crosshatch 213 is at the focus position of the digital camera 400. That is, the controller 501 prompts the user to do an operation, and the user manually operates the Z knob 125, thereby adjusting the Z-direction position of the position management plane stage 220 and performing focusing. As described above concerning step S131, if the Z base 130 can be driven in the Z direction by a motor or the like, the controller 501 may drive the motor incorporated in the microscope body to perform automatic focusing. Note that if the Z-axis of the microscope is driven by a motor, that is, electrically driven, a predetermined Z driving interface (not shown) is provided, and the controller 501 controls via the Z driving interface. The controller 501 determines the focus state from a captured image obtained by capturing the XY crosshatch 213 by the digital camera 400 and notifies the stage MPU 280 of it. When a focus is detected, the stage MPU 280 stores the read value Z of the Z linear scale 990b by the Z-axis sensor 991b in the memory, and simultaneously, notifies the controller 501 of it. Note that in the XY crosshatch 213 used to detect a focus, any one of the crosshatch 290, the crosshatch origin 291, the crosshatch X-axis 292, and the crosshatch Y-axis 293 is usable.

Referring back to FIG. 27, after the controller 501 ends the initialization of itself (step S11), as described above, and the initialization process P1, the initialization process P2, and the initialization process P3 end, the process advances from step S12 to step S13, and the position management application starts a preparation operation for observation position management.

In step S13, the controller 501 drives the ΔZ stage 900 (ΔZ lift units 910) to correct the slant (tilt) of the surface of the stage 200 (position management plane stage 220) with respect to the optical axis. In this tilt correction, the XY plane of the stage 200 is adjusted such that it becomes parallel to a vertical plane of the Z-axis that is the direction of observation light. This tilt correction processing will be described with reference to the flowchart of FIG. 29. Note that in the flowchart of FIG. 29, if the controller 501 drives the stage 200 and the ΔZ stage 900, the processing is implemented by, for example, giving an instruction from the controller 501 to the stage MPU 280.

First, the controller 501 moves the position management plane stage 220 such that the center of the observation position is located at the left end of the crosshatch X-axis 292 (step S151). Next, the controller 501 synchronously drives the ΔZ lift pins 914 (to be discriminately referred to as the ΔZ lift pins L1 to L3 hereinafter, as shown in FIG. 5) of the three ΔZ lift units 910 to attain a focus on the crosshatch X-axis 292 (step S152). Note that synchronous driving of the three ΔZ lift pins L1 to L3 is control to simultaneously move all the ΔZ lift pins L1 to L3 from their ΔZ initial positions by the same amount in the Z direction. The controller 501 stores, in the memory, scale values (ΔZ1 to ΔZ3) obtained when a focus is attained at the left end of the crosshatch X-axis 292 (step S153). The scale values ΔZ1 to ΔZ3 are scale values that use the ΔZ initial position marks obtained by the ΔZ-axis sensors 920b provided on the ΔZ lift units of the ΔZ lift pins L1 to L3 as a reference (zero). Note that since ΔZ1 to ΔZ3 are the same value, only one of them needs to be stored. In this embodiment, ΔZ1 is used. This value will be referred to as ΔZc1 hereinafter.

Next, the controller 501 moves the position management plane stage 220 such that the center of the observation position is located at the right end of the crosshatch X-axis (step S154). The controller 501 synchronously drives the ΔZ lift pins L1 to L3 of the three ΔZ lift units 910 to attain a focus on the crosshatch X-axis 292 (step S155). The controller 501 stores, in the memory, a scale value (one of ΔZ1 to ΔZ3, in this embodiment, ΔZ1 is used) obtained when a focus is attained at the right end of the crosshatch X-axis 292 as ΔZc2 (step S156). Then, the controller 501 moves the position management plane stage 220 such that the center of the observation position is located at the lower end of the crosshatch Y-axis 293 (step S157). The controller 501 synchronously drives the ΔZ lift pins L1 to L3 to attain a focus on the crosshatch Y-axis 293 (step S158). The controller 501 stores, in the memory, a scale value (one of ΔZ1 to ΔZ3, in this embodiment, ΔZ1 is used) obtained when a focus is attained by synchronous driving of the ΔZ lift pins L1 to L3 as ΔZc3 (step S159).

The controller 501 estimates the variation amount (the tilt amount in the X direction) between the ΔZ lift pin L1 and the ΔZ lift pin L2 from the difference between ΔZc1 and ΔZc2, and moves the ΔZ lift pin L2 such that the variation amount becomes zero (step S160). For example, assume that the distance between the ΔZ lift pin L1 and the ΔZ lift pin L2 is Rh, and the distance between the left and right ends of the crosshatch X-axis (the moving amount of the center of the observation position in step S154) is kh, as shown in (5e) of FIG. 5. In this case, the variation amount (ΔZ2−ΔZ1) between the ΔZ lift pin L1 and the ΔZ lift pin L2 is estimated as $$\Delta Z2 - \Delta Z1 = (\Delta Zc2 - \Delta Zc1) * Rh/h$$

The controller 501 moves the ΔZ lift pin L2 by the estimated variation amount to eliminate the tilt of the stage 200 in the X direction.

Next, the controller 501 estimates the variation amount (the tilt amount in the Y direction) between the ΔZ lift pin L1 and the ΔZ lift pin L3 from the difference between ΔZc1 and ΔZc3, and moves the ΔZ lift pin L3 such that the variation amount becomes zero (step S161). For example, assume that the distance between the ΔZ lift pin L1 and the ΔZ lift pin L3 is Ri, and the moving distance to the lower end of the crosshatch Y-axis (the moving amount of the center of the observation position in step S157) is λi, as shown in (5e) of FIG. 5. In this case, the variation amount (ΔZ3−ΔZ1) between the ΔZ lift pin L1 and the ΔZ lift pin L3 is estimated as $$\Delta Z3 - \Delta Z1 = (\Delta Zc3 - \Delta Zc1) * Ri/\lambda i$$

The controller 501 moves the ΔZ lift pin L3 by the estimated variation amount to eliminate the tilt of the stage 200 in the Y direction.

With the above-described processing, correction of the tilt of the position management plane stage 220 is implemented. From then on, when driving the ΔZ stage, the ΔZ lift pins L1 to L3 are synchronously driven to do positioning in the Z direction to maintain the state in which the tilt of the stage 200 is corrected. As for the position management in the Z direction (Z-coordinate), the sum of the read value Z of the Z linear scale 990b and one (in this embodiment, ΔZ 1) of the read values ΔZ 1 to ΔZ3 of the ΔZ linear scale 994b corresponding to the ΔZ lift pins L1 to L3 is used. In this embodiment, Z+ΔZ1 (+dZ (zero at this stage)) is used. That is, the Z-coordinate of the XY crosshatch 213 is Z+ΔZ1 (+dZ (zero at this stage)). Note that the value Z is the moving amount from the Z initial position (zero), and the value ΔZ1 is the moving amount from the ΔZ1 initial position (zero). Since the tilt of the position management plane stage 220 is corrected by the above processing, the position of the surface of the position management plane stage 220 in the optical axis direction (Z direction) is correctly managed. Note that after that, the Z knob 125 is not operated, and the movement in the Z direction is performed only by driving the ΔZ lift units using the ΔZ knob 904 or by a ΔZ lift unit driving instruction from the controller 501. The ΔZ knob 904 is, for example, an electric knob using a rotary encoder. The ΔZ lift pins L1 to L3 are synchronously driven in accordance with a change of the value of the rotary encoder by a knob operation. Note that the above-described tilt correction processing (steps S151 to S161) may be repeated until the variation amounts estimated in steps S160 and S161 decrease to a predetermined value or less.

Note that in the above-described correction of the slant (tilt) of the surface of the stage 200 (position management plane stage 220) with respect to the optical axis, position reference marks that provides the X- and Y-axis references are used as the focus references. That is, the left and right ends of the crosshatch X-axis 292 and the lower end of the crosshatch Y-axis 293 are used as the focus references. However, the marks that provide the focus references are not limited to this form, and any mark that is provided in the observable region of the digital camera 400 for performing imaging and allows the digital camera 400 to perform focus detection is usable. More specifically, a mark that provides a focus reference is provided on the XY plane in the observation field at a position difference from the slide placement position.

For example, as shown in (52a) of FIG. 52, the XY crosshatch 213 including a dedicated focus reference mark 294 may be used. As shown in (52a) of FIG. 52, the focus reference mark 294 is a rectangle formed from, for example, two parallel sides each having a predetermined width along the X-axis direction and two parallel sides each having a predetermined width along the Y-axis direction. The focus reference mark 294 is provided on the same plane as the XY plane of the crosshatch X-axis 292 and the crosshatch Y-axis 293. The rectangle has a predetermined rectangular size capable of representing the slant of the slide placement surface on the XY stage. In this case, the XY two-dimensional scale plate 210 is disposed such that the rectangular plane formed by the focus reference mark 294 on the XY stage becomes parallel to the slide placement surface of the XY stage. In addition, the focus reference mark 294 is disposed, for example, between the crosshatch 290 and the crosshatch X-axis 292 and the crosshatch Y-axis 293 at a predetermined interval (2 mm, as shown in (52b) of FIG. 52). That is, to efficiently detect the mark positions, the reference marks are disposed at intervals equal to or more than a distance equivalent to the field size (in this embodiment, equal to or more than the field size (1.5 mm) of the 10× objective lens) so as not to simultaneously observe adjacent position reference marks within the same visual field of the microscope. The focus reference mark 294 serves as a focus reference capable of representing the slant of the slide placement surface on the XY stage, like the crosshatch X-axis 292 and the crosshatch Y-axis.

In FIG. 52, (52b) is a view showing details of the focus reference mark. A focus reference mark 295 in the X-axis direction is formed from focus reference unit marks (to be referred to as focus units hereinafter) 297 in the Y-axis direction having a length of 2 mm each and arranged at an interval of, for example, 1 mm. The focus unit 297 has a structure in which a plurality of pairs of lines with the same width are arranged to be symmetric with respect to the center line serving as the axis of symmetry while changing the width. Note that a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by the live image capturing function or the still image capturing function, and a predetermined accuracy is ensured in focusing (to be described later). A focus reference mark 296 in the Y-axis direction is formed from focus reference unit marks (to be referred to as focus units hereinafter) 298 in the X-axis direction having a length of 2 mm each and arranged at an interval of, for example, 1 mm. The focus unit 298 has a pattern obtained by rotating the focus unit 297 by 90°. Each of the focus units 297 and 298 is formed from a plurality of lines of different line widths.

When the dedicated focus reference mark 294 is used, steps S151. S154, and S157 in the above-described correction of the slant (tilt) of the surface of the stage 200 (position management plane stage 220) with respect to the optical axis (FIG. 29) can be performed using, for example, the focus units 297 at two points on the focus reference mark 295 in the X-axis direction on the upper side and the focus unit 297 at one point on the focus reference mark 295 in the X-axis direction on the lower side shown in (52c) of FIG. 52. Hence, the necessary focus units are three focus units, that is, two focus units spaced apart at a predetermined distance along the X-axis direction and one focus unit located at a position spaced apart from the side formed by the two focus units at a predetermined distance in the Y-axis direction. Note that the triangle formed by the three focus units used to correct the tilt is preferably similar to the triangle formed by the three lift pins 914. In the above embodiment, two focus units are arranged in the X-axis direction. However, two focus units may be arranged in the Y-axis direction. That is, focus positions are measured at the apex positions of a triangle having one side aligned with the X-axis direction or Y-axis direction in both a case in which the focus units 297 and 298 are employed and a case in which the crosshatch X-axis 292 and the crosshatch Y-axis 293 are used.

The correction of the slant (tilt) of the surface of the stage 200 (position management plane stage 220) with respect to the optical axis may be performed using a slide with focus references (FIGS. 23 and 24) in which the specifications (flatness and parallism) of the slide surface are managed within a predetermined accuracy. In this case, $\lambda j$ and $\lambda k$ are used as the values $\lambda h$ and $\lambda i$ used to estimate the variation amounts ((14c) of FIG. 14).

Referring back to FIG. 27, in step S14, the controller 501 controls the ΔC adapter 340 so as to align the X- and Y-axes of the image sensor 401 with the X- and Y-axes of the stage based on the image of the XY crosshatch 213 on the stage 200 captured by the digital camera 400. ΔC correction for aligning the array of the pixels of the image sensor 401 with the stage X-axis 203 and the stage Y-axis 204 of the stage 200 is thus performed.

FIG. 30 is a flowchart for explaining the ΔC correction operation. As described above, the purpose of ΔC correction is to align the X- and Y-axes of the pixel array of the image sensor 401 with the X- and Y-axes of the stage 200. In this embodiment, axis alignment between the X- and Y-axes of the image sensor 401 and the X- and Y-axes of the XY crosshatch 213 disposed in the observation object region 205 and representing the X- and Y-axes of the stage 200 is performed.

First, in step S201, the controller 501 in which the position management application is operating sends a predetermined control command to the camera MPU 480 to set the digital camera 400 in a color live mode. In the color live mode, the camera MPU 480 of the digital camera 400 captures a color low-resolution still image (a thinned image captured without using all pixels of the image sensor) of an observed image, and transmits it to the controller 501 at a predetermined time interval as needed. Every time the low-resolution still image is transmitted from the digital camera 400, the controller 501 displays it on the display 502, thereby providing a live image.

In step S202, using, for example, the display 502, the controller 501 prompts the observer (the operator or the user) to change the objective lens of the microscope to a low magnification (for example, 10×). After changing the objective lens to the 10× objective lens by rotating the revolver 127, the observer notifies the controller 501 via an input unit (for example, a keyboard operation or a mouse operation on a GUI) (not shown) that the 10× objective lens is being used. Note that if the microscope includes a motor-driven revolver, the low magnification setting of the objective lens may automatically be executed by sending a predetermined control command from the controller 501 to the microscope.

In step S203, the controller 501 sends a control command to the stage MPU 280 to move the observation position onto the crosshatch X-axis 292 of the XY crosshatch 213 arranged so as to be captured by the digital camera 400. Note that the observation position (coordinates) of the crosshatch X-axis 292 has known coordinate values based on the stage origin. The crosshatch X-axis 292 is spaced apart from other position reference marks at distances equal to or more than, for example, the field size (for example, φ1.5 mm) of the 10× objective lens so as not to be visually mixed with the other marks. For this reason, the live image of only the crosshatch X-axis 292 is displayed on the display 502. In (31a) of FIG. 31, reference numeral 801 denotes an imaging field by the image sensor 401. Note that as shown in (31b) of FIG. 31, the imaging field 801 of the image sensor 401 is inscribed in a region 804 that is narrower than an observation field 803 of the microscope (optical system) and is located in the observation field 803 and also has a more uniform light amount and less distortion. However, for safety's sake, a region 802 smaller than the imaging field 801 may be set as the imaging field of the image sensor 401. Note that the field size of the observation field 803 of the image sensor 401 is adjusted by the magnification of the adapter lens 301 in the optical adapter 320.

In steps S204 to S207, the angle of view for imaging by the digital camera 400 is adjusted. For example, first, in step S204, the controller 501 calculates the Y-direction barycentric position (the barycenter of the pixel values) of the black image of the crosshatch X-axis 292 in the imaging field 801. Note that in this embodiment, the Y-direction barycentric position of the black image is obtained. However, the present invention is not limited to this, and the Y-direction barycentric position of the white image may be obtained. Alternatively, the average value of the Y-direction barycentric position of the black image and that of the white image may be used. In step S205, the controller 501 sends a control command to the stage MPU 280 to move the XY stage such that the barycenter calculated in step S204 is located at the center of the imaging field. In step S206, the controller 501 determines whether the angle of view of imaging by the image sensor 401 meets a condition. In this embodiment, based on the number of lines and/or the size of the line width of the black or white image of the crosshatch X-axis 292 in the imaging field 801 assumed for, for example, a 40× objective lens, the controller 501 determines whether the angle of view meets the condition. Upon determining that the angle of view meets the condition, the process advances from step S206 to step S208. If the angle of view does not meet the condition, the process advances from step S206 to step S207. In step S207, using, for example, the display 502, the controller 501 prompts the observer (operator or user) to increase the magnification of the objective lens of the microscope. In a case of a motor-driven revolver, the high magnification setting of the objective lens is automatically done by sending a control command from the controller 501 to the microscope.

By repeating steps S204 to S207 described above, the objective lens is switched from the low magnification (10×) to the high magnification by the manual operation of the user or the control command, and the stage moves to the barycentric position calculated in step S204. In this embodiment, an angle of view as shown in (31c) of FIG. 31 is finally obtained by the 40× objective lens. Note that the magnification of the objective lens may be changed stepwise from 10×→20×→40× or changed in a stroke from 10×→40×.

Upon determining in step S206 that the angle of view meets the condition, the angle of view is considered to have changed to the angle of view corresponding to the 40× objective lens, and the process advances to step S208. In step S208, the controller 501 sends a control command to the camera MPU 480 to switch the digital camera 400 to a measurement mode. The measurement mode is a mode to use the image information of the image sensor 401 on a pixel basis. For example, if the image sensor 401 uses color filters in a primary color Bayer arrangement for color image capturing as shown in (31e) of FIG. 31, the image processing circuit 481 handles the image of each of RGB pixels as a monochrome signal. At this time, the image processing circuit 481 normalizes the image signals from the RGB pixels and adjusts their dynamic ranges. Nonlinear processing such as gamma processing is not performed, and the image signals from the pixels which remain linear are processed and output. The measurement mode is the position management corresponding function including image processing such as accurate barycenter calculation and implemented in the digital camera 400.

Note that instead of using the above-described measurement mode, an image obtained in an existing color mode or monochrome mode (a luminance signal calculated from RGB signals is used) may be used. In this case, however, the accuracy of the calculation result of barycenter calculation or the like lowers. Alternatively, a monochrome camera without color filters may be used. However, color observation is impossible when observing a slide.

Next, in steps S209 to S212, ΔC correction is executed. First, in step S209, the controller 501 sends a control signal to the camera MPU 480 to do still image capturing using all pixels of the image sensor 401 in the measurement mode. A partially enlarged view of the thus obtained still image of the crosshatch X-axis 292 is shown on the right side of (31c) of FIG. 31. The image of the crosshatch X-axis captured by the pixels of the image sensor 401 is obtained as a moire image that reflects the axial shift between the image sensor and the crosshatch X-axis. That is, in the measurement mode, since information is obtained on a pixel basis, an accurate calculation result (centroidal line to be described later) can be obtained.

In step S210, the controller 501 measures the slant (axial shift), that is, calculates the rotational shift angle between the crosshatch X-axis 292 and the X-axis of the image sensor 401. As the calculation method, as shown in (31d) of FIG. 31, the imaging field of the image sensor 401 is divided into strip-shaped partial regions in the X-axis direction by strip regions 810 having the same width, and the barycenter is calculated for each strip region (partial region). The narrower the width of the strip region is, the higher the detection accuracy is. Hence, a width corresponding to one pixel may be set. That is, a strip region whose width is equal to or more than one pixel can be used. To prevent the influence of a pixel defect of the image sensor 401, a strip region having a width corresponding to a plurality of pixels may be set and shifted by the width of one pixel to subdivide the visual field. An angle α of the rotational shift is accurately obtained from the change amount of the Y-coordinate value of the barycenter of each strip region. For example, a centroidal line 811 passing through a plurality of barycentric positions obtained from a plurality of strip regions is calculated by the least-squares method or the like, and the rotational shift angle α is obtained from the angle difference between the centroidal line 811 and the X direction of the array of pixels of the image sensor 401.

In step S211, it is determined whether the slant amount (rotational shift angle) measured in step S210 falls within a tolerance (equal to or less than a predetermined threshold). If the slant does not fall within the tolerance, in step S212, the controller 501 sends a control command to the ΔC MPU 380 to rotate the mount 342 (that is, the image sensor 401) of the ΔC adapter 340 in a predetermined direction by a predetermined angle. As described above concerning the ΔC adapter 340, the predetermined threshold is preferably 3 millidegrees, and more preferably 0.1 millidegree. In the ΔC adapter 340, the ΔC driving motor 348 is driven in accordance with the control command to rotate the mount 342 by a predetermined angle. The predetermined angle is an angle equal to or less than the predetermined threshold (preferably 3 millidegrees or less, and more preferably 0.1 millidegree or less). After that, the process returns to step S209 to capture a still image (step S209) and measure the slant (step S210). The controller 501 repeats the above-described processes (steps S209 to S212). Upon determining in step S211 that the slant amount falls within the tolerance, the process advances to step S213. In step S213, the controller 501 sends a control signal to the camera MPU 480 to return the digital camera 400 to the color live mode, and ends the ΔC correction.

Note that in step S212, the mount 342 of the ΔC adapter 340 is rotated by a predetermined amount. However, the present invention is not limited to this. For example, if the arrangement can control the rotation amount of the mount 342 by the ΔC driving motor 348, control may be done so as to rotate the mount 342 by an amount corresponding to the slant (the angle difference α corresponding to the rotational shift) calculated in step S210. The crosshatch X-axis 292 is used as a pattern arranged to be captured by the digital camera 400. However, the present invention is not limited to this, and for example, the crosshatch Y-axis 293 or the crosshatch 290 may be used. Part of the X area scale 211 or the Y area scale 212 may be arranged to be captured by the digital camera 400 and used. As adjustment (change) of the arrangement of the image sensor 401 with respect to the microscope body 100, rotation adjustment (ΔC correction) is performed above. However, the present invention is not limited to this. For example, a function of performing fine adjustment in the Z direction may be provided in addition to the function of ΔC correction by the ΔC adapter 340 or as the fourth adapter. For example, the adapter unit 300 may be allowed to adjust the Z-direction position of the image sensor 401 and perform fine focus adjustment. In this case, for example, the ΔC adapter 340 can use a structure that supports three points by three actuators to be driven in the Z direction. The slant of the imaging plane of the image sensor 401 with respect to the XY plane may be adjusted. This can be done by detecting a change in the focus of the grating pattern (a change in the blur of the grating pattern) in the captured image of the crosshatch 290 and thus determining the slant of the imaging plane. The slant of the imaging plane can be adjusted by adjusting the driving amounts of the above-described three actuators. The ΔC correction is implemented by the adapter unit 300 above. However, the stage 200 may be provided with a rotation mechanism for ΔC correction.

When the ΔC correction is completed in the above-described way, the process advances to step S15 of FIG. 27. In step S15, the controller 501 accurately detects the crosshatch origin 291 (serving as one of the reference values of a position management accuracy of 0.1 μm), and sets the X- and Y-coordinate values and the Z coordinate value (Z+ΔZ+dZ) of the crosshatch origin as the stage origin. The accurate detection of the crosshatch origin is implemented using, for example, the crosshatch X-axis 292 and the crosshatch origin 291. FIG. 32 is a flowchart for explaining the processing of stage origin detection (detecting the crosshatch origin and setting the X- and Y-coordinate values and the Z coordinate value of the crosshatch origin as the stage origin). FIG. 33 shows views of examples of images captured by the digital camera 400 in the stage origin detection processing. The stage origin detection processing will be described below with reference to FIGS. 32 and 33.

First, in step S241, the controller 501 moves the center of the observation position to the crosshatch X-axis 292 such that the lines of the crosshatch X-axis 292 enter the imaging field 801 of the digital camera 400, as shown in the left view of (33a) of FIG. 33. At this time, focusing is performed by synchronous driving of the lift pins L1 to L3. The focusing can be done either by manually operating the ΔZ knob 904 or by automatic control based on focus information obtained from the image captured by the digital camera 400. In step S242, the controller 501 captures a still image of the crosshatch X-axis 292, divides the still image into the strip regions 810, obtains a centroidal line 812 of the crosshatch X-axis 292 from barycenter calculation based on the strip regions, and obtains the Y-coordinate value. The controller 501 sends a control command to the stage MPU 280 to move the stage in the Y direction such that the calculated centroidal line aligns with a center line 813 of the imaging field 801 of the image sensor 401 in the X-axis direction using the Y-coordinate value (step S243). The center line of the imaging field 801 of the image sensor 401 in the X direction is thus aligned with the center line of the crosshatch X-axis 292 in the X direction, as shown in the right view of (33a) of FIG. 33. The Y-coordinate of the stage origin is determined in this state. Hence, in step S244, the controller 501 sets the read value of the Y area scale 212 by the Y-axis sensor 272 to the Y-coordinate value of the stage origin.

Next, in step S245, the controller 501 sends a control command to the stage MPU 280 to move the observation position to the crosshatch origin 291. At this time, focusing is performed by synchronous driving of the ΔZ lift pins L1 to L3. The focusing can be done either by manually operating the ΔZ knob 904 or by automatic control based on focus information obtained from the image captured by the digital camera 400. Note that since the focusing is performed in step S241, and an excellent focus is still attained even after the observation position is moved to the crosshatch origin 291, the focusing in step S245 may be omitted. When the position management plane stage 220 is moved by a predetermined amount rightward in the X direction up to the X initial position (the X value is zero), the crosshatch origin 291 is captured within the imaging field 801 of the image sensor 401, as shown in the upper view of (33b) of FIG. 33. However, the position after the movement of the stage includes a mechanical error of the disposing position of the X initial position mark (an error that occurs when the X initial position mark is mechanically disposed in accordance with the X-direction position of the crosshatch origin 291). For this reason, the centroidal line of the crosshatch origin 291 in the Y direction has a slight shift from the center line of the imaging field 801 of the image sensor 401 in the Y direction.

Hence, in step S246, the controller 501 captures a still image of the crosshatch origin 291, and obtains a centroidal line 814 of the crosshatch origin 291 in the Y direction from barycenter calculation based on the strip regions. In step S247, the controller 501 sends a control command to the stage MPU 280 to move the stage in the X direction such that the obtained centroidal line 814 aligns with a center line 815 of the imaging field 801 of the image sensor 401 in the Y direction. The centroidal line of the crosshatch origin 291 in the Y direction can thus be aligned with the center line of the imaging field 801 of the image sensor 401 in the Y direction, as shown in the lower view of (33b) of FIG. 33. The X-coordinate of the crosshatch origin 291 is determined in this state. Hence, in step S248, the controller 501 stores the read value of the X area scale 211 by the X-axis sensor 271 in the memory as the X-coordinate value of the stage origin. Note that the crosshatch Y-axis 293 may be used in place of the crosshatch origin 291. In this case, after the stage is moved by a predetermined amount in the Y direction, the centroidal line in the Y direction is obtained by the same processing as the above-described contents, and aligned with the center line of the imaging field 801 of the image sensor 401 in the Y direction, thereby determining the X-coordinate of the crosshatch origin 291. The X-coordinate value is stored as the stage origin in the memory. In the above-described way, the coordinates are obtained in the state in which the center of the imaging field 801 aligns with the crosshatch origin 291, and set as the stage origin (X, Y). In step S249, the controller 501 obtains the read value Z+ΔZ1+dZ1 (dZ1 is zero at this stage) in the state in which the focus is attained in step S245, and stores it in the memory as the Z-coordinate value of the stage origin. In step S250, the controller 501 sends a control command to the camera MPU 480 to switch the digital camera 400 from the measurement mode to the color live mode.

Referring back to FIG. 27, when the stage origin detection is completed in the above-described way, the controller 501 notifies the observer of a slide loading permission using the display 502, and waits for placement of the slide on the ΔΘ stage 600 (step S16). Note that slide placement (the presence/absence of slide loading) can be detected either by automatic detection (not shown) or based on a manual instruction. When the slide is placed on the ΔΘ stage 600, the controller 501 determines whether an origin mark and a focus reference mark exist on the placed slide (step S17). If an origin mark and a focus reference mark exist on the placed slide, the process advances to step S18. Note that since the stage origin is obtained, a position where a position reference mark (to be referred to as an origin mark hereinafter) exists and a position where a focus reference mark exists on the loaded slide can be grasped accurately to some extent. Hence, the presence/absence of the origin mark or position reference mark can be determined by moving the stage to the position where the mark should be observed and determining whether the mark exists there.

In step S18, the controller 501 corrects the tilt of the slide surface using the focus reference marks 704 to 706 and the Y-axis mark 703 (or focus reference mark 707) of the slide 700. The slide tilt correction processing will be described below in detail with reference to the flowchart of FIG. 34.

In step S261, the controller 501 moves the position management plane stage 220 such that the center of the observation position is located at the upper end of the Y-axis mark 703, the origin mark 701, the upper end of the focus reference mark 707 on the left side, or the left end of the focus reference mark 704 on the upper side. In step S262, the controller 501 performs focusing using the above-described focus units on the slide 700 by synchronously driving the dZ lift pins 654 of the three dZ lift units 650 from their initial positions. The three dZ lift pins 654 will discriminately be referred to as the dZ lift pins 654 M1 to M3 hereinafter, as shown in (14c) of FIG. 14. Note that the scale values dZ1 to dZ3 are scale values that use the dZ initial position marks 640a obtained by the dZ-axis sensors 641b near the dZ lift units having the dZ lift pins M1 to M3 as a reference (zero). In step S263, the controller 501 stores the scale values (dZ1 to dZ3) obtained when a focus is attained in the memory as dZc1. Note that since dZ1 to dZ3 are the same value, only one of them needs to be stored, and in this embodiment, the value dZ1 is used.

Next, in step S264, the controller 501 moves the position management plane stage 220 in the X direction such that the center of the observation position is located at the upper end of the focus reference mark 705 on the right side or the right end of the focus reference mark 704 on the upper side. In step S265, the controller 501 performs focusing on the above-described focus units on the slide 700 by synchronously driving the dZ lift pins M1 to M3. In step S266, the controller 501 stores the scale values (dZ1 to dZ3) obtained when a focus is attained in the memory as dZc2 (since dZ1 to dZ3 are the same value, only one of them needs to be stored, and in this embodiment, the value dZ1 is used). Then, in step S267, the controller 501 moves the position management plane stage 220 in the Y direction such that the center of the observation position is located at the center of the focus reference mark 706 on the lower side. In step S268, the controller 501 performs focusing on the marks on the slide 700 by synchronously driving the dZ lift pins M1 to M3. In step S269, the controller 501 stores the scale values (dZ1 to dZ3) obtained when a focus is attained in the memory as dZc3 (since dZ1 to dZ3 are the same value, only one of them needs to be stored, and in this embodiment, the value dZ1 is used).

In step S270, the controller 501 estimates the variation amount (the tilt amount of the slide in the X direction) between the dZ lift pin M1 and the dZ lift pin M2 from the difference between dZc1 and dZc2, and moves the dZ lift pin M2 such that the variation amount becomes zero. For example, assume that the distance between the dZ lift pin M1 and the dZ lift pin M2 is Rj, and the distance between the left and right ends of the mark on the slide 700 (the moving amount of the center of the observation position in step S264) is λj, as shown in (14c) of FIG. 14. In this case, the variation amount (dZ2−dZ1) between the dZ lift pin M1 and the dZ lift pin M2 is estimated as $$dZ2-dZ1=(dZc2-dZc1)*Rj/\lambda j$$

The controller 501 moves the dZ lift pin M2 by the estimated variation amount to eliminate the tilt of the slide 700 in the X direction.

In step S271, the controller 501 estimates the variation amount (the tilt amount in the Y direction) between the dZ lift pin M1 and the dZ lift pin M3 from the difference between dZc1 and dZc3, and moves the dZ lift pin M3 such that the variation amount becomes zero. For example, assume that the distance between the dZ lift pin M and the dZ lift pin M3 is Rk, and the moving distance to the lower end of the mark on the slide 700 (the moving amount of the center of the observation position in the Y direction in step S267) is λk, as shown in (14c) of FIG. 14. In this case, the variation amount (dZ3−dZ1) between the dZ lift pin M1 and the dZ lift pin M3 is estimated as $$dZ3-dZ1=(dZc3-dZc1)*Rk/\lambda k$$

The controller 501 moves the dZ lift pin M3 by the estimated variation amount to eliminate the tilt of the slide 700 in the Y direction.

With the above-described processing, the tilt of the upper surface of the slide 700 placed on the ΔΘ stage 600 with respect to the optical axis is corrected. From then on, the controller 501 manages the Z-coordinate of the upper surface of the slide by Z+ΔZ1+dZ1. Note that the value Z is the moving amount from the Z initial position (zero), the value ΔZ1 is the moving amount from the ΔZ1 initial position (zero), and the value dZ1 is the moving amount from the dZ1 initial position (zero). With the above processing, the tilt of the slide surface is corrected in addition to the tilt of the position management plane stage 220, and the Z position of the slide surface in the optical axis direction (Z direction) is correctly managed. After that, the Z-direction movement is performed by synchronous driving of the ΔZ lift pins L1 to L3. With the above processing, the tilt derived from the slide surface is eliminated, and more accurate position management in the Z direction is implemented. Note that the above-described tilt correction processing (steps S261 to S271) may be repeated until the variation amounts estimated in steps S270 and S271 decrease to a predetermined value or less.

Referring back to FIG. 27, the controller 501 executes ΔΘ correction of the ΔΘ stage 600 to correct the rotational shift of the placed slide (step S19). As described above, ΔC correction is executed before ΔΘ correction, and the X-axis direction and the Y-axis direction of the stage 200 align with those of the image sensor 401. By the ΔΘ correction, the X-axis direction and the Y-axis direction of the position reference mark on the slide 700 are aligned with those of the image sensor 401. As a result, the X-axis direction and the Y-axis direction of the stage 200 and those of the position reference on the slide 700 are aligned with each other via the image sensor 401. The ΔΘ correction operation will be described below with reference to FIG. 35.

FIG. 35 is a flowchart for explaining the ΔΘ correction operation according to the embodiment. In step S301, the controller 501 sets the objective lens to a low magnification (for example, 10×) by a manual operation or by sending a control command to the microscope. In step S302, the controller 501 sends a control command to the stage MPU 280 to move the observation position onto the Y-axis mark 703 (FIGS. 23 and 24) on the slide placed on the ΔΘ stage 600. Note that the position (coordinates) of the Y-axis mark 703 on the slide 700 includes an error caused by the rotational shift based on the placed state of the slide. However, when the observation position is moved using known coordinate values of the Y-axis mark 703 from the stage origin, the mark can be captured within the visual field of, for example, the 10× objective lens. The Y-axis mark 703 is spaced apart from other position reference marks at distances equal to or more than, for example, the field size (for example, φ1.5 mm) of the 10× objective lens so as not to be visually mixed with the other marks, as described above with reference to FIGS. 23 and 24. Hence, as shown in (36a) of FIG. 36, only the Y-axis mark 703 exists in the imaging field 801 of the image sensor 401, and the live image of only the Y-axis mark 703 is displayed on the display 502.

In step S303, the controller 501 calculates the barycentric position of the black image of the Y-axis mark 703 in the imaging field 801. Note that in this embodiment, the X-direction barycentric position of the black image is obtained. However, the present invention is not limited to this, and the X-direction barycentric position of the white image may be obtained. Alternatively, the average value of the X-direction barycentric position of the black image and that of the white image may be used. In step S304, the controller 501 sends a control command to the stage MPU 280 to move the stage 200 such that the barycentric position is located at the center of the visual field. In step S305, the controller 501 determines the angle of view based on the number of lines and/or the size of the width of the black or white image of the Y-axis line mark in the imaging field 801 assumed for, for example, a 40× objective lens. If the angle of view does not meet a condition, the process advances from step S305 to step S306. Using, for example, the display 502, the controller 501 prompts the observer (operator or user) to increase the magnification of the objective lens of the microscope. In a case of a motor-driven revolver, the high magnification setting of the objective lens may automatically be done by sending a control command from the controller 501 to the microscope.

By repeating steps S303 to S306 described above, the objective lens is switched from the low magnification (10×) to the high magnification by the manual operation of the user or the control command, and in step S304, the stage moves to the barycentric position calculated in step S303. In this embodiment, an angle of view as shown in (36b) of FIG. 36 is finally obtained by the 40× objective lens. Note that the magnification of the objective lens may be changed stepwise from 10×→20×→40× or changed in a stroke from 10×→40×. Upon determining in step S305 that the angle of view for the 40× objective lens is obtained, the process advances to step S307.

In step S307, the controller 501 sends a control command to the camera MPU 480 to switch the digital camera 400 to a measurement mode, as in step S208. Next, in step S308, the controller 501 sends a control signal to the camera MPU 480 to do still image capturing using all pixels of the image sensor 401 in the measurement mode. A partially enlarged view of the thus obtained still image of the Y-axis mark 703 is shown on the right side of (36b) of FIG. 36. The image of the Y-axis line captured by the pixels of the image sensor 401 is obtained as a moire image that reflects the axial shift between the image sensor and the Y-axis line.

In step S309, the controller 501 measures the slant (axial shift), that is, calculates the rotational shift angle between the Y-axis of the image sensor 401 and the Y-axis mark 703 on the slide 700. As the calculation method, for example, as shown in (36c) of FIG. 36, the imaging field of the image sensor 401 is divided in the Y-axis direction by strip regions having the same width, and the barycenter is calculated for each strip region. The narrower the width of the strip region is, the higher the detection accuracy is. Hence, a width corresponding to one pixel may be set. To prevent the influence of a pixel defect of the image sensor, a strip region having a width corresponding to a plurality of pixels may be set, and the region is shifted by the width of one pixel to subdivide the visual field. The rotational shift angle is accurately obtained from the change amount of the X-coordinate value of the barycenter of each strip region. For example, a centroidal line 822 passing through a plurality of barycentric positions obtained from a plurality of strip regions is calculated by the least-squares method or the like, and an angle β of the rotational shift between the centroidal line 822 and the Y direction of the array of pixels of the image sensor 401 is obtained.

In step S310, the controller 501 determines whether the slant angle measured in step S309 falls within a tolerance (equal to or less than a predetermined threshold). If the slant angle does not fall within the tolerance, the process advances to step S311, and the controller 501 sends a control command to the stage MPU 280 to rotate the ΔΘ stage 600 in a predetermined direction by a predetermined amount. As described above concerning the ΔΘ stage 600, the predetermined threshold is preferably 3 millidegrees, and more preferably 0.1 millidegree. In the ΔΘ stage 600, the ΔΘ driving motor 611 is driven in accordance with the control command to rotate the ΔΘ stage 600 by a predetermined amount (predetermined angle). The predetermined angle is an angle equal to or less than the above-described predetermined threshold (preferably 3 millidegrees or less, and more preferably 0.1 millidegree or less). Then, the process returns to step S308, and the controller 501 performs still image capturing and slant measurement in the measurement mode (step S309). If the slant falls within the tolerance, the A) correction ends.

Note that in step S311, the ΔΘ stage 600 is rotated by a predetermined amount. However, the present invention is not limited to this. For example, if the arrangement can control the rotation amount of the ΔΘ stage 600 (slide) by the ΔΘ driving motor 611, control may be done so as to rotate the ΔΘ stage 600 by an amount corresponding to the slant (rotational shift angle β) calculated in step S309.

Referring back to FIG. 27, when the ΔΘ correction is completed in the above-described way, in step S20, the controller 501 starts detecting the slide origin of the slide placed on the ΔΘ stage 600. The detected slide origin is used as a reference position to manage the observation position (coordinates) on the slide 700 using the position (coordinates) of the stage 200. That is, the difference between the coordinate values of the slide origin measured as the position of the stage 200 based on the stage origin and the coordinate values of the stage at the observation position based on the stage origin is calculated, thereby obtaining coordinate values depending on the slide origin (independent of the stage origin). The coordinate values are used as the coordinates of the observation position. In other words, the observation position (coordinates) on the slide 700 is managed based on the stage origin using the difference between the coordinate values of the slide origin based on the stage origin and the coordinate values of the observation position based on the stage origin. The coordinates of the observation position on the slide thus become the position (coordinates) of the stage 200 based on the slide origin serving as the reference position. Note that at the time of execution of step S20, the objective lens is set to 40×, and the digital camera 400 is set in the measurement mode (in steps S305, S306, and S307). FIG. 37 is a flowchart of the slide origin detection operation according to the embodiment.

The controller 501 captures a still image of the Y-axis mark 703 after ΔΘ correction in step S401, and obtains a centroidal line by barycenter calculation using strip regions in step S402. Note that as a precaution, focusing may be performed before the still image capturing. In step S403, the controller 501 sends a control command to the stage MPU 280 to move the stage in the X direction such that the calculated centroidal line aligns with the center line of the imaging field of the image sensor 401 in the Y-axis direction. In this way, a center line 842 of the imaging field 801 of the image sensor 401 in the Y direction is aligned with a center line 841 of the Y-axis mark 703 in the Y direction, as shown in (38a) of FIG. 38.

In step S404, the controller 501 sends a control command to the stage MPU 280 to receive stage coordinate values at this time based on the stage origin obtained in step S15. Note that stage coordinates are obtained by replacing X- and Y-coordinates based on the XY initial position with those based on the crosshatch origin 291, and the origin is the stage origin. The stage origin of the stage coordinates has coordinates (0, 0). The X-coordinate value of the coordinate values is the X-coordinate value (defined as x0) of the center line of the accurate slide origin in the Y direction. The X-coordinate value also serves as the X-coordinate value of the center line 842 of the imaging field 801 of the image sensor 401 in the Y direction.

In step S405, the controller 501 sends a control command to the stage MPU 280 to move the image sensor observation position onto the origin mark 701 of the slide 700. At this time, focusing is executed by synchronous driving of the ΔZ lift pins L1 to L3. The focusing can be either a manual operation or an automatic operation based on focus information. The axial shift of the slide Y-axis 712 ((23b) and (23c) of FIG. 23) is eliminated by ΔΘ correction. For this reason, when the stage is moved upward in the Y direction by a predetermined amount, the origin mark 701 appears within the imaging field 801 of the image sensor 401, as shown in (38b) of FIG. 38. However, the stage moving position includes a positional shift error in the Y-axis direction that remains after the ΔΘ correction of the rotational shift of the slide (the total error is about 0.1 to 0.2 mm). For this reason, a centroidal line 851 of the origin mark in the X direction has a slight shift from a center line 852 of the imaging field 801 of the image sensor 401 in the X direction.

The controller 501 captures a still image of the origin mark 701 in the state shown in (38b) of FIG. 38 in the measurement mode in step S406, and obtains the barycentric position in the Y direction by barycenter calculation using strip regions in step S407. In step S408, the controller 501 sends a control command to the stage MPU 280 to move the stage in the Y direction such that the obtained centroidal line 851 aligns with the center line 852 of the imaging field 801 of the image sensor 401 in the X direction. In this way, the centroidal line 851 of the origin mark 701 in the X direction can be aligned with the center line 852 of the imaging field 801 of the image sensor 401 in the X direction, as shown in (38c) of FIG. 38. Note that (38b) and (38c) of FIG. 38 show a case in which the origin mark shown in (23b) of FIG. 23 is used, and (38d) and (38e) of FIG. 38 show a case in which the origin mark shown in (23c) of FIG. 23 is used.

In step S409, the controller 501 sends a control command to the stage MPU 280 to receive stage coordinate values at this time based on the stage origin (coordinates (0, 0)) obtained in step S15. The Y-coordinate value of the coordinate values is the Y-coordinate value (defined as y0) of the center line of the accurate slide origin in the X direction. The Y-coordinate value also serves as the Y-coordinate value of the center line of the observation field of the image sensor 401 in the X direction.

In step S410, the controller 501 sends a control command to the stage MPU 280 to receive the Z-coordinate value (Z+ΔZ1+dZ1) obtained in step S405. The received Z-coordinate value is the coordinate value (defined as a slide Z origin z0) of the accurate slide origin in the Z direction. Note that at this time, the degree of focusing may be confirmed again as a precaution. If the numerical value ΔZ1 has a slight change as the result of reconfirmation. Z+ΔZ1+dZ1 with the numerical value is the coordinate value (slide Z origin z0) of the slide origin in the Z direction.

In step S411, the controller 501 changes the reference of position management of the observation position from the stage origin (the X- and Y-coordinates are (0, 0), and the Z coordinate is Z+ΔZ1+dZ1) obtained in step S15 to the slide origin (x0, y0, z0) obtained in step S405. In step S412, the controller 501 sends a control command to the camera MPU 480 to switch the digital camera 400 from the measurement mode to the color live mode. Note that the slide origin detection of step S20 is preferably executed every time the objective lens (magnification) is changed. This is because the optical axis may shift upon switching the objective lens. This will be described later.

Referring back to FIG. 27, in step S21, the controller 501 measures the δZ distribution of the slide surface of the slide 700 placed on the ΔΘ stage 600. The measurement processing of the δZ distribution of the slide surface will be described with reference to the flowchart of FIG. 39. First, in step S441, the controller 501 moves the observation position to the position of the slide origin detected in step S20. In step S442, the controller 501 performs focusing based on the image captured by the digital camera 400 by driving the ΔZ lift units 910 and thus synchronously driving the ΔZ lift pins L1 to L3. In step S443, the controller 501 reads the scale value ΔZ1 in the in-focus state and sets Z+ΔZ1+dZ1 to the slide Z origin z0. Note that if the slide Z origin obtained by the slide origin detection processing described with reference to FIG. 37 is used, the processes of steps S441 to S443 described above can be omitted.

In step S444, the controller 501 moves the observation position to a focus unit or position reference mark to measure the focus position first on four sides, that is, the focus reference marks (in this embodiment, the set of focus units 710 at an interval of, for example, 1 mm) 704 to 706 and the Y-axis mark 703 or the focus reference mark 707. In step S445, the controller 501 performs focusing based on the image captured by the digital camera 400 by driving the ΔZ lift units 910 and thus synchronously driving the ΔZ lift pins L1 to L3. In step S446, the controller 501 reads the difference δZ between the scale value ΔZ1 in the in-focus state and the scale value ΔZ1 at the slide Z origin, and stores the X- and Y-coordinates of the current observation position and the read difference (δZ) of the Z-coordinate. In the processes of steps S444 to S446 described above, measurement is repetitively executed for the focus units 710 at an interval of, for example, 1 mm on each side. When the measurement of δZ is ended for all the positions of predetermined focus units 710, the process advances from step S447 to step S448. In step S448, the controller 501 estimates the distribution (to be referred to as a δZ distribution hereinafter) of Z-coordinates with respect to the slide Z origin on the slide surface (cover glass area 722) by linear interpolation of δZ of the focus units at four points of the focus reference marks (including the position reference marks) on the four sides (the upper side, the lower side, the left side, and the right side).

For example, as shown in (50a) and (50b) of FIG. 50, δZ is estimated from the values δZ (left δZx, right δZx, upper δZy, and lower δZy) at a total of four points, that is, two points along the X-axis and two points along the Y-axis. For example, the controller 501 performs an X-direction interpolation operation of left δZx and right δZx and an Y-direction interpolation operation of upper δZy and lower δZy, and calculates the average of the two interpolated values, thereby estimating δZ. The δZ distribution on arbitrary lattice points at a pitch of, for example, 1 mm (the disposing pitch of the focus units) on the slide surface in the cover glass area 722 can thus be obtained. In addition, for example, as shown in (51a) and (51b) of FIG. 51, when similar interpolation processing is performed for arbitrary positions in the lattice of a pitch of 1 mm, the δZ distribution at arbitrary positions (x, y) on the slide surface in the cover glass area 722 can be obtained. This is expressed as δZ=δZ (x, y). Note that in the above-described example, the δZ distribution is obtained by linear interpolation. This is because the change of the slide surface is moderate, and a sufficient accuracy is obtained. Multidimensional interpolation or any other arithmetic processing may be performed, as a matter of course.

Using the above-described δZ distribution, when the observation position is moved to an arbitrary position (x, y) on the slide surface, δZ(x, y) is reflected on the Z-coordinate, thereby maintaining the height of the observation position from the slide surface almost constant. For example, when the XY stage is moved from (x1, y1) to (x2, y2), the ΔZ stage is controlled to move the Z-coordinate by δZ(x2, y2)−δZ(x1, y1), thereby maintaining the height of the observation position from the slide surface more uniform.

Note that in the measurement of the focus units arranged at an interval of 1 mm in the focus reference mark on each side, the presence/absence of the cover glass has an influence. If a cover glass exists, the focal length changes to be long. That is, the refractive index of the cover glass for the microscope is about 1.53. However, since the thickness varies within the range of 0.12 to 0.17 mm, the change amount also varies from 42 μm (when the thickness is 0.12 mm) to 60 μm (when the thickness is 0.17 mm). This is reflected on the value δZ. Hence, the size of the cover glass in use affects the measurement of the δZ plane distribution. Cover glass sizes have a plurality of types. For example, heights are 24 mm and 25 mm, and lengths are 32 mm to 60 mm. There are following cases depending on the positional relationship between the cover glass size and the focus reference on the slide 700.

(1) The height of the cover glass is 25 mm, and the length is 55 mm to 60 mm (2) The height of the cover glass is 25 mm, and the length is 50 mm (3) The height of the cover glass is 25 mm, and the length is 45 mm to 32 mm (4) The height of the cover glass is 24 mm Note that the size of the cover glass is selected in accordance with the size of the specimen to be placed. Additionally, the cover glass is generally aligned with the right end of the slide glass.

In (1), all of the position reference marks (701 to 703) and the three focus reference marks (704 to 706) or four focus reference marks (704 to 707) of the slide 700 are covered with the cover glass, and the above-described δZ distribution measurement method is applied.

In (2), only the position reference marks on the slide 700 are located outside the cover glass, and the three or four focus reference marks are covered with the cover glass. In this case, since the cover glass does not exist on the position reference marks, the focus position moves close to the objective lens side by 42 to 60 μm. Hence, the focus position varies between the position reference marks and the focus reference marks 704 to 707 covered with the cover glass because of the presence/absence of the cover glass. The position reference marks cannot be used in focusing. Since the tilt of the slide is about 20 μm, a change in δZ more than that can be recognized by the controller 501 as the difference caused by the presence/absence of the cover glass. Hence, in this case, if the focus reference mark 707 on the left side covered with the cover glass is detected, this is selected, and the above-described δZ distribution measurement method is applied. On the other hand, if the focus reference mark 707 does not exist, the focus reference marks (704 and 706) disposed on the upper and lower sides of the slide 700 are used, and the δZ distribution is obtained by performing interpolation processing based on the measurement result of the upper and lower focus positions.

In (3), the left side of each of the focus reference marks (704 and 706) disposed on the upper and lower sides of the slide 700 falls outside the cover range of the cover glass. The range outside the cover glass can be detected based on the change amount of δZ, as described above. Hence, in the range with the cover glass, interpolation processing is performed based on δZ of the upper and lower focus reference marks (704 and 706).

In (4), since the height of the cover glass is 24 mm, the upper and lower focus reference marks partially fall outside the cover range of the cover glass. Even if the cover glass is placed along the upper side of the slide glass, the focus reference mark on the lower side is covered 0.5 mm in width with the cover glass. Hence, when measuring δZ of the upper and lower focus reference marks, the stage is moved in the X and Y directions within the width (2 mm originally) of the focus reference mark covered with the cover glass. The range where the cover glass exists is specified based on the change amount of the value δZ, and δZ within that range is used. The same δZ distribution measurement processing as in the cases (1) to (3) can thus be applied in accordance with the size of the cover glass in the longitudinal direction.

Note that if the height of the specimen is large, and the placement range needs to be ensured up to the positions of the upper and lower focus reference marks, a slide that does not have the upper and lower focus reference marks may be used. However, even in this case, when the length of the cover glass is 50 mm or more, the left and right focus references are covered with the cover glass, and interpolation processing can be performed based on δZ of the left and right focus references.

In (1), since the position reference marks are also covered with the cover glass, the value at an arbitrary position (x, y) of the δZ distribution indicates the Z-direction position from the Z-coordinate of the slide origin. Hence, the δZ distribution represents the Z-coordinates of the slide surface. On the other hand, in (2) to (4), the position reference marks are located outside the cover glass. Hence, the δZ distribution represents a relative variation of the slide surface but does not indicate the Z-direction position of the slide surface itself. As shown in (49c) of FIG. 49, a focal length L2 increases due to the cover glass. Letting L1 be the focal length at a position without the cover glass, and ΔL be the change amount of the focal length generated by the cover glass, L2=L1+ΔL holds. The change amount ΔL based on the presence/absence of the cover glass can be obtained by measuring focus positions in a portion where the cover glass exists and a nearby portion where the cover glass does not exist for the focus reference marks or the position reference marks and calculating the difference between them. For example, near the boundary of the cover glass mounted on the slide, the focus position of a focus reference mark covered with the cover glass and the focus position of the focus reference mark that is not covered with the cover glass are measured, and the difference between them is calculated as ΔL. When the change amount ΔL is subtracted from the δZ distribution, the δZ distribution becomes the distribution of Z-direction positions of the slide surface based on the Z position of the slide origin. Note that in the above-described case (2) or (3), the δZ distribution may be obtained by subtracting ΔL from the focus position of a mark covered with the cover glass and directly using the focus position of a mark that is not covered with the cover glass. This makes it possible to measure the δZ distribution using all focus reference marks whether a portion is covered with the cover glass or not.

Referring back to FIG. 27, if an origin mark or a focus reference mark does not exist on the slide in step S17, the process advances to step S22. Upon determining in step S22 that not a focus reference mark but an origin mark exists on the slide, in step S23, the controller 501 executes the same ΔΘ correction as in step S19. In step S24, the controller 501 executes the same slide origin detection positioning as in step S20. If neither a focus reference mark nor an origin mark exists, the process advances from step S22 to step S25.

In step S25, the controller 501 (in which the position management application is operating) transits to an observation mode. In step S26, the controller 501 notifies via the display 502 to switch the objective lens to a low magnification, or switches the objective lens to a low magnification by sending a control command to the microscope. In step S27, the controller 501 notifies the observer via the display 502 that preparation for observation position management is completed. After that, it is convenient to move the stage and locate the observation position (the center of the imaging field) on the slide origin.

Note that since the center of the visual field may slightly shift upon switching the objective lens, an arrangement using a slide origin according to an objective lens to be used is preferably provided. To implement this, for example, to detect the stage origin or the slide origin every time the objective lens is switched, the controller 501 starts executing processing shown in FIG. 48. In step S4801 of FIG. 48, the controller 501 determines whether the objective lens is switched. Switching of the objective lens can be detected by providing a sensor that detects that the objective lens is switched by the revolver 127. Alternatively, switching of the objective lens may be detected by notifying the controller 501 via a predetermined user interface that the user has switched the objective lens.

Upon detecting switching of the objective lens, in step S4802, the controller 501 detects the stage origin again. This processing is the same as in step S15 of FIG. 27. In step S4803, the controller 501 determines whether an origin mark exists on the currently placed slide. If an origin mark exists, the slide origin is detected in step S4804. As for the presence/absence of the origin mark, the determination result in step S17 or S22 of FIG. 27 may be stored. Alternatively, the observation position may be moved to the position where the origin mark should exist, and the presence/absence to the origin mark may be confirmed. The slide origin detection is the same as described concerning step S20 of FIG. 27. Since the slide does not change here, correction of the tilt of the slide surface and δZ distribution measurement are unnecessary.

Upon detecting that a slide is newly loaded, the process advances from step S4805 to step S4806. In step S4806, the processes of step S17 to S24 of FIG. 27 are executed for the newly loaded slide.

Note that if the mechanical accuracy of the revolver 127 is high, and the slight shift of the field center or focus position mainly depends on the magnification of the objective lens, the processing of step S4804 may be omitted by obtaining a slide origin in correspondence with each magnification of the objective lens and storing it. Note that in that case, the controller 501, for example, obtains information representing the magnification of the objective lens from the microscope body 100 via a signal line (not shown), and stores the coordinates of the slide origin obtained in step S4804 in the memory 512 in association with the magnification of the objective lens used at the time of detection. Upon detecting switching of the objective lens, if the coordinates of the slide origin corresponding to the magnification of the objective lens after switching are stored in the memory 512, the controller 501 uses the stored coordinates. If the slide origin corresponding to the magnification of the objective lens after switching is not stored, the controller 501 executes slide origin detection (step S4804) as described above.

When correction by the ΔC adapter 340, correction by the ΔΘ stage 600, and detection of the origin of the slide 700 have ended in the above-described way, the controller 501 operates the microscope system 10 in the observation mode. FIG. 40 is a flowchart for explaining processing of the controller 501 that controls position management of the observation position in the observation mode and still image capturing and recording using the digital camera 400.

First, in step S501, the controller 501 stores, in the memory, the position (X-, Y-, and Z-coordinate values) of the slide origin based on the stage origin, which is obtained in step S20 or S24 (FIG. 27) described above, as the coordinates of the slide origin. The slide origin coordinates based on the stage origin will be referred to as (x0, y0, z0) hereinafter, and the observation position in the observation area on the slide is managed based on the slide origin. That is, when the coordinate values of an observation position based on the stage origin are represented by (x, y, z), (x0−x, y0−y, z0−z) are the coordinate values of the observation position based on the slide origin.

In step S502, the controller 501 obtains the conversion coefficient between the X- and Y-coordinate values of the stage 200 and the actual distance using the intervals of the center lines of two marks with a known interval or lines or spaces which form one mark and have a known interval, the boundaries (edges) between lines and spaces, the widths of the lines or spaces, and the like. If an accurate correspondence relationship (conversion coefficient) between the actual moving amount of the stage and the moving amount based on the scale coordinates is obtained, the actual distance can be calculated from the moving amount based on the scale coordinates. The distance between two points in the same observation screen without stage movement can also be grasped as the actual distance by obtaining the correspondence relationship to the actual distance. The correspondence relationship is important when grasping the actual size of the observation object. In this embodiment, the crosshatch X-axis 292, the crosshatch Y-axis 293, the crosshatch 290, the Y-axis mark 703 of the slide, and the like can be used. The obtained conversion coefficient (a first coefficient for the X- and Y-coordinates) is stored in the memory 512. Note that as for the Z-coordinate, for example, the moving distance of the upper surface of the stage 200 by synchronous driving of the ΔZ lift units is measured by a linear gauge having a step difference in a predetermined thickness direction (Z direction), and the relationship between the change amount of the Z-coordinate and the moving distance is obtained, thereby obtaining the conversion coefficient (a first coefficient for the Z-coordinate) between the Z-coordinate value and the actual distance. In this case, the thus obtained first coefficient for the Z-coordinate is stored in, for example, the memory 512, like the first coefficient for the X- and Y-coordinates.

Note that the first coefficient for the X- and Y-coordinates is obtained, for example, in the following way. First, the controller 501 moves the stage 200 such that a predetermined position (for example, the observation position) of the image sensor 401 is located at the center of each of two marks or two lines (patterns) in one mark with a known interval out of the position reference marks of the XY crosshatch 213 or the slide 700. Based on the difference between the coordinates of the positions and the actual distance of the interval between the center lines of the two marks or lines, the controller 501 calculates the first coefficient used to do conversion between the coordinate values and the actual distance. For example, in the small crosshatch located at the upper right corner of the crosshatch 290 of the XY crosshatch 213, the observation position is sequentially set at the center of each of the left Y-axis-direction mark and the right Y-axis-direction mark in the line width direction. The first coefficient is obtained based on the change amount of the X-coordinate value and the actual distance (for example, 0.5 mm) between the marks at this time. Alternatively, for example, using the two 10 μm lines ((12b) of FIG. 12) at the center of the crosshatch Y-axis 293 of the XY crosshatch 213, the observation position is sequentially set at the center of each line by moving the stage 200. The first coefficient is obtained based on the change amount of the X-coordinate value and the actual distance (for example, 20 m) between the lines at this time. Note that in this embodiment, the first coefficient is obtained for the X-coordinate. However, the first coefficient may be obtained for the Y-coordinate. In this embodiment, the first coefficient obtained for the X-coordinate is applied to the Y-coordinate.

However, the first coefficient for the X-coordinate and that for the Y-coordinate may individually be measured and held, and the individual first coefficients may be used for the X- and Y-coordinates. The two marks/patterns used to obtain the conversion coefficient need not be included in the same visual field. For example, the rightmost Y-axis-direction mark and the leftmost Y-axis-direction mark of the crosshatch 290 may be used.

In step S503, the controller 501 executes still image capturing such that the two marks with the known interval are included in one image. The controller 501 obtains the conversion coefficient (second coefficient) between the pixel distance of the image sensor 401 and the actual distance using the obtained image and stores it in the memory.

The second coefficient is obtained, for example, in the following way. First, still image capturing is performed such that two lines in one mark with a known interval out of the position reference marks of the XY crosshatch 213 or the slide 700 are included in the imaging field. The controller 501 analyzes the still image, counts the number of pixels between the two lines, and calculates the second coefficient used to do conversion between the pixel distance and the actual distance based on the count value and the actual distance of the interval between the two lines. For example, imaging is performed such that the two outer lines of the crosshatch Y-axis 293 are included in the screen. The second coefficient is obtained from the number of pixels corresponding to the interval between the lines and the known actual distance. Note that two lines in one mark are used above. However, two marks with a known interval may be used.

In step S504, the coordinate values (x, y, z) based on the stage origin of the stage 200 obtained from the stage MPU 280 are converted into coordinate values (x0−x, y−y0, z−z0) based on the slide origin, and position management is performed by the coordinate values based on the slide origin. Here, (x0, y0, z0) are the coordinates of the slide origin based on the stage origin, which is stored in step S501.

Note that the user adjusts the Z-direction position by operating the ΔZ knob 904. The rotation operation of the ΔZ knob 904 is converted by the stage MPU 280 into a driving signal to the ΔZ motors 913 configured to vertically move the ΔZ lift pins 914 of the ΔZ lift units 910, and the vertical movement of the stage 200 is controlled by the synchronous driving of the ΔZ lift pins L1 to L3. As described above, the Z-coordinate (value Z) is [read value Z of Z linear scale 990b]+[read value ΔZ of ΔZ linear scale 994b]+[read value dZ of dZ linear scale 640b].

After that, when the user instructs the controller 501 to do still image capturing, the process advances from step S505 to step S506, and the controller 501 instructs the digital camera 400 to do still image capturing. Upon receiving the still image capturing instruction from the controller 501, the digital camera 400 in the observation mode immediately captures a still image and transmits the image data to the controller 501. In steps S507 and S508, the controller 501 generates an image file including the image data received from the digital camera 400 and stores it.

In step S507, additional information to be added to the image file is generated. The additional information includes the first coefficient, the second coefficient, and the observation position (the coordinate values (x0−x, y−y0, z−z0) based on the slide origin) described above. Note that a microscope ID used to identify the microscope in use, the objective lens magnification at that time, a slide ID used to identify the observation object slide, the δZ distribution information measured in step S21 (FIG. 27), and the like may also be included as additional information. Some pieces of the additional information (for example, the microscope ID and the objective lens magnification) are notified from the microscope body 100 to the controller 501 via a signal line (not shown). Note that obtaining of the slide ID is implemented using, for example, a barcode. In this case, a specific number is added as a barcode to a label attached to the label area 721. Alternatively, a barcode is directly printed on the slide glass in the label area 721 and read by a barcode reader (not shown) or the image sensor 401.

The δZ distribution information can have any form such as
- the X- and Y-coordinates of the centers of focus units (at an interval of 1 mm in this embodiment) that constitute a focus reference mark and the measurement result of the focus position δZ at that time,
- a table of the X- and Y-coordinates of lattice points (the center of a focus unit is located ahead a lattice point in the X or Y direction) at an interval of 1 mm in the cover glass area and the estimation results of δZ(x, y), or
- the parameters of a curved surface that approximates the δZ distribution.

That is, the δZ distribution information can have any form as long as it can obtain a result that is the same as or similar to that of δZ distribution estimation in step S448.

In step S508, using the image data received in step S506, the controller 501 generates an image file in which the additional information generated in step S507 is inserted in the file header, and records it. FIG. 41 shows an example of the data structure of the image file. The header of the image file stores the above-described additional information of image data 2510, that is, an observation position 2502, a first coefficient 2503, a second coefficient 2504, a microscope ID 2505, an objective lens magnification 2506, a slide ID 2507, and δZ distribution information 2508 as well as a file name 2501. The additional information and the image data 2510 are thus recorded in association. Note that the additional information need not always be stored in the header of the image file and may be stored in the footer. The additional information may be recorded as another file, and link information for reference may be added to the header or footer of the image data. Note that as the observation position 2502, coordinate values based on the position indicated by the origin mark 701, that is, (x0−x, y−y0, z−z0) are recorded. If the origin mark 701 is dirty and unusable, the spare origin mark 702 is used. In this case as well, the coordinate values are preferably converted into values based on an origin position indicated by the origin mark 701 and recorded. Note that since the positional relationship between the origin mark 701 and the spare origin mark 702 is strictly defined, the reference position by the origin mark 701 can be specified using the spare origin mark 702. When the spare origin mark 702 is used, a position indicated by the spare origin mark 702 (a position different from the position indicated by the origin mark 701) may be used as the origin, as a matter of course. In this case, however, which origin mark is used needs to be recorded as additional information together with the coordinates.

Note that in this embodiment, the skew detecting sensor 273 is provided to further improve the accuracy of position management of the stage 200. Skew detection and skew correction by the skew detecting sensor 273 will be described later.

Synchronization between the stage 200 and still image file display by the controller 501 will be described next. In this embodiment, since the observation position ((x, y, z) coordinates) of a specimen on the slide 700 can accurately be managed, the observation position of a still image captured using the slide 700 at the time of imaging can easily be reproduced on the microscope side. In addition, movement of the stage 200 can be instructed from the display 502 on which a still image is displayed, and a captured still image can selectively be displayed in synchronism with the movement of the stage 200.

FIG. 42 is a flowchart for explaining synchronization between still image display and movement control of the stage 200 by the controller 501. FIG. 43 is a view for explaining synchronization between the display screen and the position of the stage 200.

In step S601, the controller 501 displays the image data of a selected image file on the display 502. At this time, the controller 501 can grasp the relationship between the size of one pixel of the image data and the size of a display pixel of the display 502 (how many pixels on the display correspond to one pixel of the image sensor) from the display size of the image data on the display 502.

In step S602, the controller 501 moves the stage 200 and the ΔZ stage 900 such that the observation position of the microscope aligns with the observation position (coordinates) (xorg, yorg, zorg) based on the slide origin and included in the additional information. Note that before step S602, the slide 700 used to capture the displayed image is loaded to the stage 200, and slide origin detection is performed by the steps in FIG. 27. The controller 501 also holds the coordinate values (x0, y0, z0) of the slide origin of the slide based on the stage origin. That is, from the observation position (coordinates) (xorg, yorg, zorg) based on the slide origin and the coordinates (x0, y0, z0) of the slide origin based on the stage origin, the controller 501 calculates the coordinate values of the observation position based on the stage origin by (x0−xorg, y0+yorg, z0+zorg). In addition, the controller 501 replaces from the coordinate values based on the stage origin with coordinate values based on the initialization position of the stage, and controls the stage 200 and the ΔZ stage 900. In this embodiment, position management inside the stage is done based on the initialization position of each stage. However, the above-described conversion of the coordinates of the observation position from the coordinate values based on the slide origin to the coordinate values based on the stage origin and then to the coordinate values based on the initialization position may be performed in the stage 200 and the ΔZ stage 900, as a matter of course. The observation position with respect to the slide 700 and the observation position of the image that is being displayed on the display 502 can accurately be aligned in this way. The controller 501 can also convert the observation position (xorg, yorg, zorg) obtained from the image file and the slide origin coordinates (x0, y0, z0) into an actual distance using the first coefficient obtained from the image file, and instructs the stage 200 and the ΔZ stage 900 to move using the actual distance. Use of the actual distance makes it possible to cope with a case in with the microscope (stage 200) used to capture the still image and the microscope (stage) currently in use are different. Upon receiving the observation position based on the actual distance, the stage 200 and the ΔZ stage 900 convert the actual distance into coordinate values using the first coefficient of their own notified from the controller 501 to the stage MPU 280, and the stage 200 is moved.

Note that if supporting the actual distance is a burden on the stage MPU 280, the conversion from the actual distance to the coordinate values may be executed by the controller 501 in which the position management application is operating. For example, a stage driver (USB driver software for the stage MPU 280 if the stage MPU 280 and the control unit 500 are connected via, for example, a USB) operating in the controller 501 may execute the conversion on its behalf.

That is, as shown in FIG. 43, the CPU 511 of the controller 501 reads out the observation position coordinates (xorg, yorg, zorg) (based on the slide origin) recorded as additional information from the header of the image file of a displayed image 1100. Note that as for the displayed image 1100, for example, the CPU 511 obtains three-dimensional coordinates (x, y, z) input by the user via an operation unit (not shown) connected to the controller 501, reads out the image file of the header including the three-dimensional coordinates as the observation position coordinates, and displays it on the display 502. The coordinates are converted into the coordinates (Lx, Ly, Lz) of an actual distance using the first coefficient of the stage at the time of recording, which is recorded as additional information (step S701 in FIG. 43). The actual distances Lx, Ly, and Lz from the slide origin to the observation position are thus obtained. The coordinates (Lx, Ly, Lz) represented by the actual distances are converted into stage coordinate values using the first coefficient of the stage currently in use, thereby obtaining the coordinates (xs, ys, zs) of the observation position (based on the slide origin) corresponding to the stage in use. Then, the observation position (x, y, z) based on the stage origin= (x0−xs, y0+ys, z0+zs) is obtained from the slide origin coordinates (x0, y0, z0) based on the stage origin of the stage currently in use (step S702). The controller 501 instructs to move the stage 200 and the ΔZ stage 900 to locate the imaging center of the image sensor 401 at the thus obtained coordinates (x, y, z) of the observation position based on the stage origin (step S703). Note that in an arrangement that does not execute conversion to an actual distance concerning the Z-coordinate, zorg=zs.

Note that as described above, the stage 200 is moved in the Z direction by synchronously driving the three ΔZ lift units 910. With the above-described operation, the observation position of the displayed image and the observation position of the slide 700 in the microscope can be aligned in the three, X, Y, and Z directions. That is, the observation position used to capture the still image is correctly reproduced in the three-dimensional space.

Next, the controller 501 determines whether an observation position moving instruction is generated on the screen of the display 502 (step S603) and whether a movement of the stage 200 and the ΔZ stage 900 has occurred (step S606). If an observation position moving instruction is generated on the screen of the display 502, the process advances from step S603 to step S604. Note that concerning the X and Y directions, the observation position moving instruction on the screen is made by detecting the start point and the end point of a drag operation by a mouse. In step S604, for example, in FIG. 43, when a start point 1001 and an end point 1002 of drag by the mouse are detected, a vector 1003 having the moving direction and moving amount of the screen is obtained as an XY-direction moving instruction. This means moving the observation position (xorg, yorg, zorg) (based on the slide origin) of the displayed image 1100 by an amount corresponding to the vector 1003.

That is, upon detecting the XY-direction screen moving instruction on the display 502, the controller 501 converts the moving amounts in the X and Y directions into the moving amounts of the XY stage. For example, referring to FIG. 43, the display pixel distance on the display 502 is obtained from the vector 1003. The display pixel distance is represented by an X-direction moving amount Δxdisp and a Y-direction moving amount Δydisp, which are converted into pixel distances (Δxpix, Δypix) on the image sensor 401 (step S711). Next, the controller 501 converts the pixel distances into actual distances (ΔLx, ΔLy) using the second coefficient (step S712). The controller 501 converts the actual distances into moving amounts (Δx, Δy) of the stage using the first coefficient (obtained in step S502 of FIG. 40) of the currently used stage 200 (step S713). When the stage 200 is moved from the current position (x, y) by the thus obtained moving amounts (Δx, Δy) (step S605), the stage 200 moves as indicated by a vector 1004. As a result, the new observation position (the observation position moved by the vector 1003) on the display 502 synchronizes with the observation position (the observation position moved by the vector 1004) by the stage 200.

Note that since the movement in the Z direction is not instructed by the operation of the mouse, the stage 200 does not move in the Z direction. Note that when the stage 200 moves in the X and Y directions, the observation position from the slide surface may be maintained using the δZ distribution. In this case, to maintain the height of the observation position from the slide surface, a change in the Z-coordinate of the slide surface according to the movement of the X- and Y-coordinates of the stage 200 from (x, y) to (x+Δx, y+Δy) is obtained by δZ=δZ(x+Δx, y+Δy)−δZ(x, y) based on the δZ distribution of the slide. Along with the movement of the stage 200 to (x+Δx, y+Δy), the stage 200 is moved in the Z direction by the change amount of δZ. The observation position in the Z direction is thus maintained almost at a predetermined distance from the slide surface. Note that the user may be able to set whether to move the stage 200 while maintaining a predetermined Z-coordinate or move the stage 200 while maintaining the height of the observation position from the slide surface.

Note that as for the moving instruction on the screen in step S603, the drag operation of the mouse is used for the movement in the X and Y directions, as described above. On the other hand, the moving instruction in the Z direction is done by, for example, displaying up and down arrows on the display screen and operating them by the mouse. In this case, when the mouse accesses the up arrow, the stage moves in the Z-axis positive direction (upward). When the mouse accesses the down arrow, the stage moves in the Z-axis negative direction (downward). The movement of the stage 200 in the Z direction in this case is implemented by synchronously driving the ΔZ lift pins 914 of the three ΔZ lift units 910 of the ΔZ stage 900. In this case, as for the limitation of the upward movement of the stage 200, for example, the δZ distribution δZ(x, y) of the slide surface+10 μm is set. This is because the specimen thickness varies but never exceeds 10 Lm. As for the limitation of the downward movement of the stage 200, for example, the δZ distribution δZ(x, y) is set. Alternatively, an interface that displays a slider bar or a knob and instructs the movement in the Z direction by the mouse or the like may be used. In this case, the upper and lower limit values are, for example, "the δZ distribution δZ(x, y) of the slide surface+10 μm" and "the δZ distribution δZ(x, y) of the slide surface", respectively.

On the other hand, when the stage 200 and the ΔZ stage 900 are moved by operating the X knob 201, the Y knob 202, and the ΔZ knob 904 or in accordance with an (electric) moving instruction by a console (not shown) for the stage 200 and the ΔZ stage 900, the process advances from step S606 to step S607. In step S607, the controller 501 moves the display on the display 502 in accordance with the moving amount of the stage. As for the movement in the X and Y directions, the process of step S604 described above is executed in a reverse direction. That is, referring to FIG.

43, if the stage 200 is moved as indicated by the vector 1004, the controller 501 converts the moving amounts (Δx, Δy) into the actual distances (ΔLx, ΔLy) using the first coefficient obtained in step S502 (step S713). Then, the controller 501 converts the actual distances in the X and Y directions into the pixel distances (Δxpix. Δypix) using the second coefficient recorded in the additional information of the currently displayed image file (step S712). The pixel distances are converted into the display pixel distances (Δxdisp, Δydisp) on the display 502 (step S711). Control is performed to move the image by the vector 1003.

Note that when moving in the X and Y directions, as for the Z-direction position of the stage 200, for example, automatic adjustment to maintain the observation position in the Z direction at a predetermined distance from the slide surface is performed. In this automatic adjustment, a change in the value of the δZ distribution caused by the movement of the X- and Y-coordinates of the stage 200 from (x, y) to (x+Δx, y+Δy), that is, δZ=δZ(x+Δx, y+Δy)−δZ(x, y) is obtained. The stage 200 is moved in the Z direction by δZ by controlling the ΔZ stage 900. The observation position in the Z direction is thus maintained at a predetermined position from the slide surface. Note that the Z-coordinate of the stage 200 may be maintained without performing the automatic adjustment. The user may be able to set whether to perform automatic adjustment.

As for the movement in the Z direction, the Z-coordinate of the observation position moves by the manual operation of the ΔZ knob 904 or in accordance with an (electric) moving instruction by a console (not shown) for the ΔZ stage 900. At this time, as for the limitation of the upward movement, for example, the δZ distribution δZ(x, y) of the slide surface+10 μm is set. This is because the specimen thickness varies but never exceeds 10 μm. As for the limitation of the downward movement, for example, the δZ distribution δZ(x, y) is set.

As for the movement in the X and Y directions, in step S608, the display contents are updated in accordance with the vector 1003 obtained in step S604 or S607. In this case, the display range of the currently displayed image 1100 is updated to the display range of an image 1101. However, of the image data in the display range of the image 1100, only the image data of a portion overlapping the display range of the image 1101 can be displayed in the display range of the image 1101. That is, a portion that does not overlap the image 1100 is displayed as a short (blank) portion on the display screen of the image 1101. Hence, the image is obtained from another image file including the short portion and composed. The image file to be used is selected from image files with common objective lens magnification, slide ID, and microscope ID based on the observation position. Note that if an image file corresponding to the observation position does not exist as the result of stage movement, the mode may automatically switch to live view. If an image file that can be composed exists (NO in step S609), the image file is selected, and image composition is performed using it (step S611).

If an image file that can be composed does not exist, a new image is needed for image display (YES in step S609). Hence, the controller 501 generates a new image file by performing still image capturing after the movement of the stage 200, and displays it or composes it with the existing overlap portion so as to compensate for the above-described short portion (blank portion) (steps S610 and S611). Note that both in a case in which a new image file is displayed and in a case in which an image is composed to compensate for the short portion, a composed image of the images 1100 and 1101 is obtained. However, the method of composing the images 1100 and 1101 is not particularly limited. For example, part of the image 1101 may be composed with the periphery of the image 1100, part of the image 1100 may be composed with the periphery of the image 1101, or the composition may be done at a position to divide the image overlap region to ½. With this composition processing, a seamless observation image of the subject on the slide can be obtained. When an image is sequentially composed with the short portion generated by the movement of image (or XY stage), the composed image grows during movement of the observation position.

As for the movement in the Z direction, the display range of the currently displayed image 1100 is updated to the image at the new Z position. If an applicable image file exists, the applicable image file is selected, and the image is updated using it. If an applicable image file does not exist, a new image is needed for image display. Hence, the controller 501 generates a new image file by performing still image capturing after the movement of the stage 200 in the Z direction, and displays it.

As described above, according to this embodiment, since the observation position can be managed using coordinates based on the reference position on the slide, the observation position can easily be reproduced. That is, as for the position accuracy, the movement of the stage in the X and Y directions can be controlled at an accuracy of 0.1 μm by accurately detecting the position using the XY two-dimensional scale plate 210. Concerning the Z direction, the movement in the Z direction can be controlled at an accuracy of 0.1 μm by accurately detecting the position using the Z linear scale 990b, the ΔZ linear scale 994b, and the dZ linear scale 640b. Additionally, concerning the Z direction, tilt correction for the stage and the slide surface and grasping of the δZ distribution are performed. This makes it possible to define or reproduce the correct observation position in the plane direction (XY) and thickness direction (Z) of the specimen in pathological diagnosis. That is, reproduction of the observation position of an ROI, which conventionally depends on a memory, can be done correctly and quickly. In addition, since the AU stage 600 is employed, even after the slide is temporarily unloaded from the stage, the influence of the placement state (for example, rotational shift) of the slide can be reduced, and the observation position can correctly be reproduced.

As described above, in observation position management, since the position coordinates of a display image and the position coordinates on the stage accurately synchronize, the observer can always accurately know the coordinate values of the observation position based on the slide origin. The course of the movement of the observation position can be recorded by predetermined application software. An arbitrary observation position can accurately be reproduced by designating coordinate values. When a recorded evidence image is reproduced, the observation position on the slide corresponding to the displayed image can correctly be re-observed by the microscope. This function is executed when the slide ID recorded in the additional information of the displayed image file matches the ID read from the label of the slide currently placed on the stage.

The controller can thus record the moving path of the observation position (x, y, and z-coordinates) in diagnosis as a path log in association with the slide ID. If the objective lens or the like is changed, or the ROI is captured midway, the information can usefully be recorded in addition to the path log. The controller can also reproduce the process of observation based on the path log. This is implemented by selecting a corresponding path log based on the slide ID, automatically driving the stage according to the path, and controlling the objective lens of the microscope.

Accordingly, processing that is supposed to be valuable as pathological diagnosis can be implemented in morphological diagnosis, for example, it is possible to superimpose the images of a plurality of slides generated from a plurality of tissue slices adjacent in the thickness direction and observe a change in the thickness direction of the tissue. As additional processing necessary in this case, for example, the plurality of images at the same position coordinates of the plurality of slides are superimposed in the vertical direction, and a feed operation in the vertical direction (thickness direction) is performed to switch the display image as needed. Alternatively, the images of the plurality of slides may be displayed side by side, and the same position may be indicated by a predetermined mark, or the observation portion may be moved synchronously in the plurality of images. Otherwise, when more continuous tissue slice images are used, 3D display can be implemented using an existing 3D algorithm. These processes are executed by software on the controller 501.

In functional diagnosis, the controller 501 can display a plurality of images in different staining on the display 502 in a superimposed manner by similar software processing. For example, it is possible to observe a slide that has undergone morphological staining, after that, apply functional staining to the slide and observe it, and compose and display, at a predetermined accuracy, microscope images captured in the morphological staining and the functional staining.

For example, the microscope system obtains the image 1100 (first image) of an observation object on a first slide, which is in a first staining. This image is stored in the memory (not shown) of the controller 501. After that, the staining of the first slide is changed to a second staining, and the slide is placed on the ΔΘ stage 600 of the microscope system again. The microscope system captures the observation object in the second staining again and obtains an image (second image). At this time, the CPU 511 reads out the image 1100 (first image) from the memory and obtains the observation position coordinates (xorg, yorg, zorg) stored in the header of the image 1100. The microscope system performs the above-described stage position control based on the values of the observation position coordinates and sets the observation position of the second image. This allows the first image and the second image to have the same imaging range. The controller 501 displays the first image and the second image on the display 502, as described above. By the stage control and display control, the pathologist can easily observe the same observation object in different staining while reducing the labor to manually adjust the stage.

Alternatively, it is possible to display morphological images of continuous tissue slices and (a plurality of) functional images by functional staining in a superimposed manner and compare and observe a morphological atypism and a function change. These processes are supposed to be valuable as pathological diagnosis but are conventionally unimplementable.

In addition, the array of the elements of the image sensor, the X and Y directions of the stage, and the X and Y directions of the slide can correctly be aligned. It is therefore possible to eliminate the rotational shifts of a plurality of still images and easily compose the plurality of captured images at different observation positions.

Coordinates can be managed via an actual distance. Hence, even if the stage 200 with a different relationship between the coordinates and the actual distance is used, the observation position can correctly be specified. Note that the actual distance may be used for the coordinate values of the observation position (based on the slide origin) recorded as additional information, as a matter of course. In this case, the above-described first coefficient (the conversion coefficient between the coordinate values of the stage 200 and the actual distance) may be omitted from the additional information. In addition, information representing whether the description is based on the actual distance or is based on the distance (coordinate value) on the stage may additionally be recorded together with the coordinate values.

A form in which the digital camera 400 is mounted has been described above. However, the image sensor 401 may be incorporated in the microscope body 100. In this case, rotational shift correction by the ΔC adapter 340 can be omitted.

Note that in the above-described operation procedure, the digital camera 400 may have a setting to set the color live mode when powered on or a function of implementing image processing unique to the measurement mode in the live mode as well. The digital camera 400 may have a function of performing still image capturing from any live mode and then automatically returning to the live mode.

Note that in the above-mentioned operation procedure, allotment of various kinds of image processing in the measurement mode of the digital camera and various kinds of processing such as strip width setting, barycenter calculation, and angle-of-view determination in the CPU has specifically been described. However, some or all of the processes may be implemented by another apparatus.

In the above-described embodiment, only a slide having a normal size (1 inch*3 inches) has been handled. However, this also applies to a slide with a larger size (2 inches*3 inches), as a matter of course.

In the above-described embodiment, focusing is needed in some cases in angle-of-view determination (steps S206 and S305), still image capturing (steps S209, S308, S401, and S406), and the like of the high-magnification objective lens. Such focusing is implemented by synchronously driving the lift pins 914 by the ΔZ lift units 910 provided on the ΔZ stage 900.

Additionally, when a general slide without a position reference mark such as an origin mark is used, position management of the stage is performed based on the crosshatch origin 291 that can serve as an accurate stage origin position. That is, coordinate management of the observation position in the Y direction based on the crosshatch origin is implemented by alignment of the stage origin in the X and Y directions using the crosshatch origin 291. The position in the Z-axis direction in a case in which a focus is placed on the crosshatch origin 291 is used as the reference of position management of the observation position in the Z-axis direction. According to this method, the accuracy greatly rises as compared to coordinate management based on the initial position of the stage containing a mechanical error by the X, Y, and Z initial position marks and the X, Y, and Z initial position sensors. As described above, even if the slide does not have the origin mark, accurate alignment is performed by the stage origin (crosshatch origin 291). It is therefore possible to perform position management by exploiting accurate position management capability by the stage 200, the ΔZ stage 900, and the adapter unit 300 (ΔC adapter 340). For example, in a case in which the stage 200 is powered off and then powered on again while keeping a slide without an origin mark placed on it, alignment of the stage origin is accurately executed in step S15. Hence, more accurate position management can be continued.

For a slide that has an origin mark but no focus reference mark, the δZ distribution cannot be measured. The controller 501 performs position management assuming that the δZ distribution in the entire cover glass area 722 equals the focus position of the origin mark, that is, δZ(x, y)=0.

As described above, an accuracy of 0.1 μm is implemented as the position management accuracy by the Z linear scale 990b, the ΔZ linear scale 994b, and the dZ linear scale 640b. This is because a 100× objective lens has a focal depth of, for example, about 0.1 μm for ultraviolet light that has the shortest wavelength (200 nm) observable by an optical microscope, and it is adequate to set the target value of the position management accuracy in the vertical (Z) direction to 0.1 μm, like the X and Y directions. When position management at an accuracy of 0.1 μm in the Z direction is implemented, the observation position within a tissue slice can be managed at an accuracy of 0.1 μm. This can implement image composition (3D image formation) in the vertical direction by Z stack imaging of a tissue slice at an interval of, for example, 0.1 μm. Additionally, in continuous tissue slice slides, it is possible to perform Z stack imaging at an interval of 0.1 μm in the Z direction at the same XY position of the slides and superimpose the images by position synchronization in the X and Y directions. A 3D image of a tissue in a thickness corresponding to the created slides can thus be composed by continuous slices. That is, when a tissue image in each slide is captured by Z stack, and the Z stack images of the slides are further composed for continuous tissue slices, composition of a 3D image of the entire tissue in a thickness corresponding to the created slides is implemented.

Note that at the time of Z stack, when a tilt in a visual field is removed by controlling the dZ lift pins M1 to M3 based on an estimated δZ distribution. Z stack along the slide surface is implemented in the visual filed (observation range). In this case, the controller 501 decides the slant of the upper surface of the slide in the observation range by the microscope body based on the estimated δZ distribution. For example, a plane is approximated from the δZ distribution in the observation range, and the slant of the approximated plane is decided, thereby obtaining the slant of the upper surface of the slide. The controller 501 drives the dZ lift pins and adjusts the slant of the slide placement surface to eliminate the thus obtained slant of the upper surface of the slide.

Note that display on the display 502 by the CPU 511 of the controller 501 may be done by simultaneously or selectively displaying a plurality of images obtained by capturing a plurality of observation objects. In this case, a plurality of images obtained by capturing an observation object in different staining may be displayed. Alternatively, a first image and a second image obtained by capturing two observation objects that are sliced from the same specimen and are adjacent in a direction orthogonal to the slice surface may be displayed on the display 502 by the CPU 511 of the controller 501.

As shown in (49a) of FIG. 49, focus reference marks 4902 to 4905 may be arranged on four sides around the lower surface (a side facing the upper surface of a slide) of a cover glass 4901. The focus reference marks 4902 to 4905 are the same as the focus reference marks 704 to 707 of the slide 700. When the focus reference marks 4902 to 4905 are used, the δZ distribution on the lower surface of the cover glass can be measured, like the δZ distribution on the slide 700. The Z-coordinate (zf1) of the upper surface of the slide 700 at the observation position and the Z-coordinate (zf2) of the lower surface of the cover glass 4901 can thus be obtained, as shown in (49b) of FIG. 49. From the difference (zf2−zf1) between the values, the thickness (including the influence of a transparent mounting agent that fixes the cover glass on the slide surface) of a tissue slice 4910 at the observation position can be known.

Note that as for the values zf1 and zf2, the expected value of the thickness of the tissue slice 4910 can be obtained even for a specimen region without the focus reference marks by using the δZ distribution and δZ1 on the slide surface and the δZ distribution and δZ2 on the lower surface of the cover glass. In addition, zf1 and zf2 can be used to set the division step of imaging in step imaging (Z stack) in the Z direction. For example, using "the value (Δzf) of a focal depth corresponding to the objective lens used for observation" and "the Z-coordinates zf2 and zf1 of the upper and lower ends of the tissue slice", imaging is performed while moving from zf1 in the Z direction by Δzf. Imaging is performed at a position at which the Z position exceeds zf2 for the first time. After recording, the processing is ended. Alternatively, the integer part of ((zf2−zf1)/Δzf)+1 is set to the number n of divisions and (zf2−zf1)/n is set to the division step in the Z direction. For example, imaging is sequentially performed for each division step from the upper surface (zf1) of the slide to the lower surface (zf2) of the cover glass, and images are recorded. In the above-described way, the position of the upper surface of the slide and the position of the lower surface of the cover glass at the imaging position are obtained based on the estimated distribution. While setting the position of the upper surface of the slide to the lower limit and the position of the lower surface of the cover glass to the upper limit, imaging by the digital camera 400 is performed at a predetermined interval in the Z-axis direction. Appropriate stack imaging can thus be performed.

A plurality of images obtained in the above-described way are in position synchronization in the X and Y directions, as described above. Hence, the images can be composed by superimposing them in the vertical direction. For example, a 3D image can also be constructed. Note that the axial direction of each focus reference mark on the cover glass is, for example, different by 90° from the axial direction of a corresponding focus reference mark on the slide. Accordingly, even if the focus reference mark on the upper surface of the slide and the focus reference mark on the lower surface of the cover glass overlap, which focus unit has the focus can be identified based on the difference of the direction. The above-described position reference marks and focus reference marks of the slide are arranged at a distance equal to or more than the angle of view of a low-magnification objective lens. When the cover glass is placed at a predetermined position of the slide, the reference marks of the slide and the focus reference marks of the cover glass are arranged at a distance equal to or more than the angle of view of a low-magnification objective lens.

When the above-described accurate Z position management is implemented, the following added values of the system are provided. For example, the necessity of retreat (an operation of moving the stage 200 downward) to avoid a collision in rotation of the objective lens can be obviated. The working distances of objective lenses (the distances from the distal ends of objective lenses to the upper surface of the cover glass) are, for example, 13 mm for 4×, 3.1 mm for 10×, 0.6 mm for 20×, 180 μm for 40×, and 130 μm for a 100× immersion lens. When the movement upper limit of the Z-coordinate is set to 10 μm (specimen)+170 μm (the maximum thickness of cover glass), the objective lens and the upper surface of the cover glass are spaced apart by about 130 µm–10 µm=120 µm even in a 100× objective lens. Hence, when switching the objective lens, the objective lens does not collide against the upper surface of the cover glass.

In the Z-direction operation, a collision of the objective lens against the observation surface can be avoided. For example, when adjusting the Z position by a user operation of the ΔZ knob 904, the controller 501 prevents the stage from moving from the slide Z origin more than a predetermined amount. Alternatively, when adjusting the Z position of the Z base 130 by operating the Z knob 125, a warning may be given, or the movement may forcibly be stopped if the Z position of the slide glass on the stage 200 moves close to the objective lens from the slide Z origin more than a predetermined amount.

The above description has been made without including a processing operation concerning the skew detecting sensor. In this embodiment, the skew detecting sensor 273 is provided to further improve the accuracy of position management of the stage 200. The role of the skew detecting sensor and skew correction processing will be described below.

The position management plane stage 220 on which the slide 700 is placed may generate a small axial fluctuation on the micrometer order when driving the stage 200 in the X- and Y-axis directions. This results from a small skew or meandering (complex skew) caused by a small distortion of the stage mechanism and the machining accuracy of the X- and Y-axis cross roller guides. Such a small axial fluctuation on the micrometer order may consequently appear as a small rotational shift as shown in (45a) of FIG. 45.

In (45a) of FIG. 45, reference numeral 2102 denotes a position of the position management plane stage 220 before movement; and 2103, a position of the position management plane stage 220 with a rotational shift after movement. In FIG. 45, (45b) shows the state of the position 2103 in more detail. In FIG. 45, (45b) shows a position 2104 of the position management plane stage 220 including a slight rotational shift with respect to the stage base 260 on which the X-axis sensor 271 and the skew detecting sensor 273 are disposed. In FIG. 46, (46a) shows the relationship between the X-axis sensor 271 in (45b) of FIG. 45, the center of the observation field 170, and an X-direction axis 1105 passing through the observation field 170 at the position 2104 of the position management plane stage 220.

As shown in (46a) of FIG. 46, the axis 1105 shifts in the vertical direction with respect to a line 1106 that passes through the center of the observation field 170 and the detection center of the X-axis sensor 271. In this example, the axis 1105 is assumed to shift in, for example, the vertical direction by 2 µm at the detection center of the X-axis sensor 271. Let t be the vertical shift amount, and d be the small rotational shift angle generated by the shift. A change e in the X-coordinate by the X-axis sensor 271 according to the rotational shift is 0.025 nm. This change is undetectable because it is much smaller than the resolution (10 nm) of the X sensor. In this regard, an example of the formula of e is given by $$d = A\ SIN(t/L1), e = L1*(-COS\ d)$$

where L1 is the distance between the center of the observation field 170 and the detection center of the X-axis sensor 271. In this example, L1=80 mm. That is, to obtain an accurate coordinate of the center of the observation field 170, the X-axis sensor 271 is disposed on the axis that passes through the center of the observation field 170. The X-axis sensor 271 is never affected by the small rotational shift, and therefore, cannot detect the small rotational shift.

On the other hand, the skew detecting sensor 273 is spaced apart from the axis passing through the center of the observation field 170 and disposed vertically above the X-axis sensor 271, and therefore, can detect the rotational shift. In FIG. 46, (46b) is a view for explaining a change amount in the skew detecting sensor 273. In 30D, f represents the amount of a change in the X-coordinate in the skew detecting sensor 273 with respect to the rotational shift d. Based on a distance S (in the example of 30D, 40 mm) between the X-axis sensor 271 and the skew detecting sensor 273, f is calculated by $$f = (S^2 + L1^2)^{1/2}(COS\ D - COS(D+d))$$

where D=A TAN(S/L1), and d=A SIN(t/L1)

According to this formula, f is obtained as 1 µm with respect to the shift of 2 µm (t) in the vertical direction. This change amount is sufficient relative to the sensor resolution of 10 nm. According to the skew detecting sensor 273, the small rotational shift angle d of the position management plane stage 220 can be detected.

When the position management plane stage 220 has a small rotational shift, the placed slide 700 also has the small rotational shift, and the captured image at the position 2103 includes the rotational shift. In FIG. 47, (47a) shows the display images of the captured images of the slide 700 at the positions 2102 and 2103 shown in (45a) of FIG. 45. In (47a) of FIG. 47, reference numeral 2107 denotes a display image of the captured image at the position 2102; and 2108, a display image of the captured image at the position 2103. The display image 2108 has a rotational shift and causes a little mismatch when composed with the display image 2107 based on the position coordinates. Accordingly, a small rotational shift occurs when synchronizing the display screen with the position of the stage 200. In this embodiment, the target position management accuracy is 0.1 µm, and skew correction needs to be performed so the rotational shift does not cause a vertical shift more than 0.1 µm in a predetermined observation range (for example, the observation object region 205). This rotational shift needs to be corrected as needed in accordance with the movement of the stage using a predetermined threshold as a determination criterion, unlike the rotational shift (ΔC) of the digital camera 400 and the rotational shift (ΔΘ) of the slide itself when placing the slide, which can be eliminated by performing correction only once for a predetermined target.

For example, when the vertical shift amount t=0.1 µm, f is calculated as 50 nm according to the above-described formula. Hence, in this embodiment, to implement the position management accuracy of 0.1 µm, f=50 nm is used as the threshold to determine whether to perform skew correction. This example of the threshold is applicable in a case in which the distance L1 between the center of the observation field 170 and the detection center of the X-axis sensor 271 is 80 mm. On the other hand, the distance from the origin mark 701 to the far end of the slide 700 is 53 mm (see (23a) of FIG. 23), which is smaller than 80 mm. Hence, the coordinates (x0–x, y–y0) of the center of the observation field 170 based on the slide origin have a position management accuracy of 0.1 µm or less.

For example, when initializing the XY stage, the skew detecting sensor 273 resets the coordinates to zero. After that, the controller always monitors the difference value between the X-coordinate value detected by the X-axis sensor 271 and the X-coordinate value detected by the skew detecting sensor 273 as the change amount (f). Note that the change amount (f) is zero at the time of initialization. If a difference value is generated later in detection of the slide origin or detection of the crosshatch origin 291, the controller newly sets the difference value as a reference value, and always monitors the X-coordinate change amount (f) of the skew detecting sensor 273 from the newly set reference value. If the change amount f is equal to or less than the threshold (for example, 50 nm), the controller determines that no skew exists, and performs the above-described processes shown in FIGS. 27 and 40 to 43. If the change amount f exceeds the threshold, the controller determines that a skew exists. The controller executes skew processing to be described below and then performs the above-described processes shown in FIGS. 27 and 40 to 43.

In the skew processing, first, the rotational shift angle d is obtained by a formula in a reverse direction represented by $$d = A \cos(\cos D - f/L2) - D,$$

where D=A TAN(S/L1), and

L2 is the distance between the center of the observation field 170 and the detection center of the skew detecting sensor 273. The display image 2108 is rotated by the rotational shift angle d around the center (corresponding to the center of the observation field 170) of the display image as a rotation axis. That is, as shown in (47*b*) of FIG. 47, the display image 2108 including a rotational shift shown in (47*a*) of FIG. 47 is rotated by d to obtain a display image 2109. The rotation direction is reverse to the rotational shift of the position 2103 of the position management plane stage 220 shown in (45*a*) of FIG. 45. With the above-described skew processing, the small rotational shift caused by a small distortion of the stage mechanism, a small axial fluctuation of the X- and Y-axis cross roller guides, or the like is corrected, and a necessary position management accuracy is ensured.

Note that as another example of the threshold, shift amounts generated by rotation of the center of the observation field 170 based on the origin mark 701 may be calculated from the rotational shift angle d obtained from the change amount f, and whether the shift amounts in the X and Y directions are equal to or less than 0.1 μm may be determined. As another example of skew correction, when the skew amount exceeds the threshold, the position may be moved to the latest position where the skew amount is equal to or less than the threshold, an image may be captured at the position, and the moving amount may be corrected to do position synchronization. If the machining accuracy improves, and the frequency of skew correction becomes low, skew detection may be used as stage fault detection without performing skew correction.

The embodiment of the present invention also includes an apparatus for executing the following processing and a method of the processing. That is, the processing is processing of supplying software (program) that implements the functions of the above-described embodiment to the system or apparatus via a network or various kinds of storage media, and reading out and executing the program by the computer (or CPU or MPU) of the system or apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-241641, filed Dec. 10, 2015 which is hereby incorporated by reference herein in its entirety.

The invention claimed is:

1. A microscope system comprising:
    a microscope base stand;
    an observation optical system configured to be adjustably secured to the microscope base stand and including an objective lens having an optical axis;
    an XY stage configured to be adjustably secured to the microscope base stand and including a stage including a placement region upon which is to be placed a slide glass to be observed, wherein the stage of the XY stage (a) includes a plurality of first marks each having a plurality of lines having different line width and extending along one of an X-axis direction and a Y-axis direction and (b) is capable of moving in the X-axis direction and the Y-axis direction;
    a first change unit configured to change a slant of the stage of the XY stage with respect to the optical axis of the objective lens;
    a second change unit configured to change a slant of the slide glass with respect to the stage of the XY stage; and
    a control unit (a) configured to control the first change unit to change the slant of the stage of the XY stage based on detection of the plurality of first marks in an observable region of the observation optical system and (b) configured to control the second change unit to change the slant of the slide glass with respect to the stage of the XY stage based on detection of a plurality of second marks arranged in the slide glass.

2. The system according to claim 1, wherein the control unit controls the change of the slant of the stage of the XY stage by the first change unit such that the stage of the XY stage becomes orthogonal to the optical axis.

3. The system according to claim 1, wherein the control unit controls the first change unit to change the slant of the stage of the XY stage such that a first virtual plane, computationally obtained based on at least three focused positions in respective association with at least three specific points in the plurality of first marks in the stage of the XY stage, becomes orthogonal to the optical axis.

4. The system according to claim 3, wherein the three focused positions are respectively obtained by setting a focus of an imaging unit configured to capture an observation image under a microscope on the three specific points in the plurality of first marks.

5. The system according to claim 1, wherein the first change unit comprises a plurality of ΔZ lift units configured to support the XY stage and to move in a Z-axis direction, and
wherein the control unit changes the slant of the stage of the XY stage by individually driving the plurality of ΔZ lift units.

6. The system according to claim 5, wherein the plurality of ΔZ lift units comprise three ΔZ lift units arranged at apexes of a triangle with one side aligned with one of the X-axis direction and the Y-axis direction.

7. The system according to claim 6, wherein an observation range of the microscope system exists inside the triangle.

8. The system according to claim 1, wherein the second change unit (a) comprises a ΔΘ stage which comprises a rotary stage having a first surface to place the slide glass upon in the placement region and capable of rotating about a Z-axis direction together with the slide glass and (b) changes a slant of the first surface of the rotary stage with respect to the Z-axis direction, and
wherein the control unit controls the second change unit to change a slant of a second surface of the ΔΘ stage, on which the rotary stage is placed, based on a second virtual plane in association with the slide glass, the second virtual plane being computationally obtained based on at least three focused positions in respective association with at least three specific points in the plurality of second marks in the slide glass placed on the second surface of the ΔΘ stage.

9. The system according to claim 8, wherein the control unit controls the change of the slant of the second surface of the ΔΘ stage by the second change unit such that a surface of the slide glass becomes orthogonal to the Z-axis direction.

10. The system according to claim 8, wherein the control unit controls the second change unit to change the slant of the second surface of the ΔΘ stage such that the second virtual plane becomes orthogonal to the Z-axis direction.

11. The system according to claim 8, wherein the at least three focused positions are respectively measured by setting a focus of an imaging unit configured to capture an observation image under a microscope on the at least three specific points in the plurality of second marks provided on the slide glass.

12. The system according to claim 1, further comprising a display control unit configured to display, on a display unit, an image of an observation object of the slide glass placed on the XY stage by the imaging unit in a state in which the display control unit is controlled by the control unit.

13. The system according to claim 12, wherein the display control unit displays, on the display unit, a plurality of images obtained by capturing the observation object in different states of staining.

14. The system according to claim 12, wherein the display control unit displays, on the display unit, a first image and a second image obtained by capturing two observation objects that are sliced from the same specimen and are adjacent in a direction orthogonal to a slice surface.

15. A microscope system comprising:
a microscope base stand;
an observation optical system configured to be adjustably secured to the microscope base stand and including an objective lens having an optical axis;
an XY stage configured to be adjustably secured to the microscope base stand and including a stage including a placement region upon which is to be placed a slide glass to be observed, wherein the stage of the XY stage (a) includes a plurality of first marks each of which extends along one of an X-axis direction and a Y-axis direction and (b) is capable of moving in the X-axis direction and the Y-axis direction;
a first change unit configured to change a slant of the stage of the XY stage with respect to the optical axis of the objective lens;
a second change unit configured to change a slant of the slide glass with respect to the stage of the XY stage; and
a control unit (a) configured to control the first change unit to change the slant of the stage of the XY stage such that a first virtual plane, computationally obtained based on three focused positions in respective association with three specific points in the plurality of first marks in an observable region of the observation optical system, becomes orthogonal to the optical axis and (b) configured to control the second change unit to change the slant of the slide glass with respect to the stage of the XY stage based on detection of a plurality of second marks arranged in the slide glass,
wherein the three specific points are arranged at apex positions of a triangle with one side aligned with one of the X-axis direction and the Y-axis direction, and
wherein the three focused positions are respectively obtained by setting a focus of an imaging unit configured to capture an observation image under a microscope on the three specific points.

16. A microscope system comprising:
a microscope base stand;
an observation optical system configured to be adjustably secured to the microscope base stand and including an objective lens having an optical axis;
an XY stage configured to be adjustably secured to the microscope base stand and including a stage including a placement region upon which is to be placed a slide glass to be observed, wherein the stage (a) includes a plurality of first marks each of which extends along one of an X-axis direction and a Y-axis direction and (b) is capable of moving stage in the X-axis direction and the Y-axis direction;
a ΔΘ stage secured to the placement region in the stage of the XY stage and comprising a rotary stage, wherein the rotary stage (a) has a first plane to place the slide glass upon, (b) is capable of rotating about a Z-axis direction together with the slide glass, and (c) is placed on a second plane of the ΔΘ stage;
a first change unit configured to change a slant of the stage of the XY stage with respect to the optical axis of the objective lens;
a second change unit comprising a plurality of dZ lift units configured to support the ΔΘ stage and to each move in a Z-axis direction to change a slant of the slide glass with respect to the stage of the XY stage; and
a control unit (a) configured to control the first change unit to change the slant of the stage of the XY stage based on detection of the plurality of first marks in an observable region of the observation optical system and (b) configured to control the second change unit to change the slant of the slide glass with respect to the stage of the XY stage based on detection of a plurality of second marks arranged in the slide glass, wherein the control unit changes a slant of the second plane of the ΔΘ stage by individually driving the plurality of dZ lift units based on a second virtual plane in association with the slide glass, the second virtual plane being computationally obtained based on at least three focused positions in respective association with at least three specific points of the plurality of second marks in the slide glass placed on the first plane of the rotary stage.

17. The system according to claim 16, wherein the plurality of dZ lift units comprise three dZ lift units arranged at apexes of a triangle with one side aligned with one of the X-axis direction and the Y-axis direction.

18. A method of controlling a microscope system including: (1) a microscope base stand; (2) an observation optical system including an objective lens; (3) an XY stage including an XY plane a stage upon which is to be placed a slide glass to be observed, wherein the stage of the XY stage includes (a) a plurality of first marks each having a plurality of lines having different line width and extending along an X-axis direction or a Y-axis direction and (b) is capable of moving in the X-axis direction and the Y-axis direction; (4) a first change unit configured to change a slant of the stage of the XY stage with respect to an optical axis direction of the objective lens; and (5) a second change unit configured to change a slant of the slide glass with respect to the stage of the XY stage, the method comprising:

changing the slant of the stage by the first change unit based on detection of the plurality of first marks arranged in the stage in an observable region of the observation optical system; and changing the slant of the slide glass with respect to the stage by the second change unit based on detection of a plurality of second marks arranged in the slide glass.

* * * * *